United States Patent
Adato et al.

(10) Patent No.: US 12,423,740 B2
(45) Date of Patent: Sep. 23, 2025

(54) CROWDSOURCING INCENTIVE BASED ON SHELF LOCATION

(71) Applicant: TRAX TECHNOLOGY SOLUTIONS PTE LTD., Singapore (SG)

(72) Inventors: Yair Adato, Kfar Shmuel (IL); Mark Cook, Tel Aviv (IL)

(73) Assignee: Trax Technology Solutions Pte Ltd., Singapore (SG)

( * ) Notice: Subject to any disclaimer, the term of this patent is extended or adjusted under 35 U.S.C. 154(b) by 0 days.

(21) Appl. No.: 18/434,952

(22) Filed: Feb. 7, 2024

(65) Prior Publication Data

US 2024/0177583 A1 May 30, 2024

Related U.S. Application Data

(63) Continuation of application No. 17/465,276, filed on Sep. 2, 2021, now Pat. No. 11,935,376, which is a
(Continued)

(51) Int. Cl.
*G06Q 30/00* (2023.01)
*G06F 18/21* (2023.01)
(Continued)

(52) U.S. Cl.
CPC ......... *G06Q 30/0639* (2013.01); *G06F 18/21* (2023.01); *G06N 20/00* (2019.01);
(Continued)

(58) Field of Classification Search
None
See application file for complete search history.

(56) References Cited

U.S. PATENT DOCUMENTS

| 8,630,924 | B2 | 1/2014 | Groenevelt et al. |
| 11,295,163 | B1 | 4/2022 | Schoner et al. |

(Continued)

FOREIGN PATENT DOCUMENTS

| WO | WO 2018/002709 A2 | 1/2018 |
| WO | WO 2019/048924 A1 | 3/2019 |

OTHER PUBLICATIONS

International Search Report and Written Opinion of the International Searching Authority issued on Jul. 23, 2020 for International Application PCT/US2020/021144.
(Continued)

*Primary Examiner* — Mila Airapetian
(74) *Attorney, Agent, or Firm* — Haynes and Boone, LLP

(57) ABSTRACT

A method for identifying perishable products in a retail store and for automatically generating offers relating to the identified products is provided. The method may include receiving a set of images depicting perishable products of at least one product type displayed on at least one shelving unit in a retail store. The method may also include analyzing the set of images to determine information about a displayed inventory of the perishable products. The method may further include accessing a database storing information about the at least one product type. The method may also include using the information about the displayed inventory and the stored information about the at least one product type to determine at least one offer associated with the at least one product type. The method may further include providing the at least one offer to at least one customer of the retail store.

20 Claims, 64 Drawing Sheets

Related U.S. Application Data continuation of application No. PCT/US2020/021144, filed on Mar. 5, 2020.

(60) Provisional application No. 62/879,565, filed on Jul. 29, 2019, provisional application No. 62/872,751, filed on Jul. 11, 2019, provisional application No. 62/829,160, filed on Apr. 4, 2019, provisional application No. 62/814,339, filed on Mar. 6, 2019.

(51) Int. Cl.

| | | |
|---|---|---|
| *G06N 20/00* | (2019.01) | |
| *G06Q 10/0631* | (2023.01) | |
| *G06Q 10/0637* | (2023.01) | |
| *G06Q 10/087* | (2023.01) | |
| *G06Q 20/20* | (2012.01) | |
| *G06Q 30/0201* | (2023.01) | |
| *G06Q 30/0207* | (2023.01) | |
| *G06Q 30/0242* | (2023.01) | |
| *G06Q 30/0251* | (2023.01) | |
| *G06Q 30/0601* | (2023.01) | |
| *G06T 7/00* | (2017.01) | |
| *G06T 7/70* | (2017.01) | |
| *G06V 10/75* | (2022.01) | |
| *G06V 20/00* | (2022.01) | |
| *G06V 20/13* | (2022.01) | |
| *G06V 20/20* | (2022.01) | |
| *G06V 20/52* | (2022.01) | |
| *G08B 13/196* | (2006.01) | |
| *H02J 7/00* | (2006.01) | |
| *H02J 9/06* | (2006.01) | |
| *H04N 7/18* | (2006.01) | |
| *H04N 23/51* | (2023.01) | |
| *H04N 23/54* | (2023.01) | |
| *H04N 23/65* | (2023.01) | |
| *G06V 30/10* | (2022.01) | |

(52) U.S. Cl.
CPC . *G06Q 10/06312* (2013.01); *G06Q 10/06315* (2013.01); *G06Q 10/06375* (2013.01); *G06Q 10/087* (2013.01); *G06Q 20/203* (2013.01); *G06Q 20/208* (2013.01); *G06Q 30/0201* (2013.01); *G06Q 30/0207* (2013.01); *G06Q 30/0223* (2013.01); *G06Q 30/0242* (2013.01); *G06Q 30/0261* (2013.01); *G06Q 30/0641* (2013.01); *G06Q 30/0643* (2013.01); *G06T 7/0006* (2013.01); *G06T 7/001* (2013.01); *G06T 7/70* (2017.01); *G06V 10/751* (2022.01); *G06V 20/00* (2022.01); *G06V 20/13* (2022.01); *G06V 20/20* (2022.01); *G06V 20/52* (2022.01); *G08B 13/19632* (2013.01); *G08B 13/19641* (2013.01); *H02J 7/00036* (2020.01); *H02J 7/0013* (2013.01); *H02J 7/0048* (2020.01); *H02J 7/0068* (2013.01); *H02J 9/06* (2013.01); *H04N 7/18* (2013.01); *H04N 7/181* (2013.01); *H04N 23/51* (2023.01); *H04N 23/54* (2023.01); *H04N 23/65* (2023.01); *G06T 2207/10016* (2013.01); *G06T 2207/30232* (2013.01); *G06V 30/10* (2022.01); *G06V 2201/07* (2022.01)

(56) References Cited

U.S. PATENT DOCUMENTS

| | | | |
|---|---|---|---|
| 2006/0163349 A1* | 7/2006 | Neugebauer | G06Q 20/387 235/383 |
| 2013/0039543 A1 | 2/2013 | Fuhr et al. | |
| 2013/0110652 A1* | 5/2013 | Herring | G06Q 50/188 705/16 |
| 2013/0268363 A1 | 10/2013 | Liberty et al. | |
| 2015/0112826 A1* | 4/2015 | Crutchfield, Jr. | G06Q 30/0643 705/26.1 |
| 2016/0086255 A1 | 3/2016 | Sainfort et al. | |
| 2017/0124613 A1* | 5/2017 | Beyagudem | G06Q 30/0631 |
| 2017/0142373 A1* | 5/2017 | Black | H04W 64/00 |
| 2018/0040046 A1 | 2/2018 | Gotoh et al. | |
| 2018/0247264 A1 | 8/2018 | Taylor et al. | |
| 2019/0180150 A1 | 6/2019 | Taylor et al. | |
| 2019/0205933 A1 | 7/2019 | Glaser et al. | |
| 2019/0362381 A1* | 11/2019 | Farshori | G06Q 30/0253 |
| 2020/0005225 A1 | 1/2020 | Chaubard | |

OTHER PUBLICATIONS

Office Action dated Feb. 16, 2023 for U.S. Appl. No. 17/464,880.

* cited by examiner

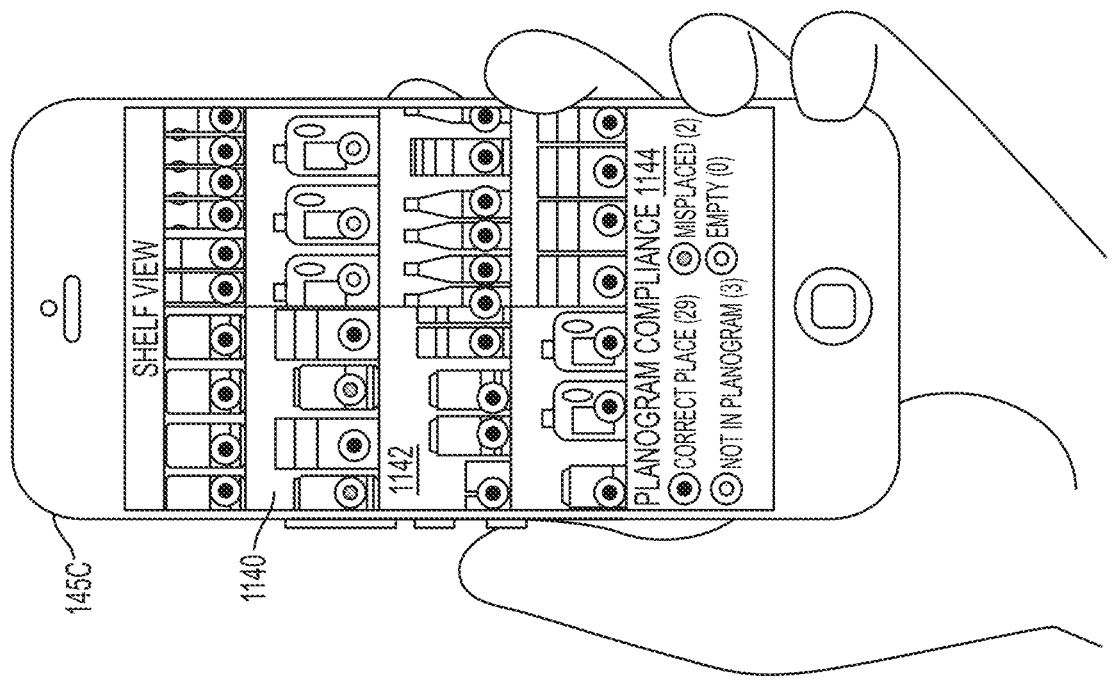
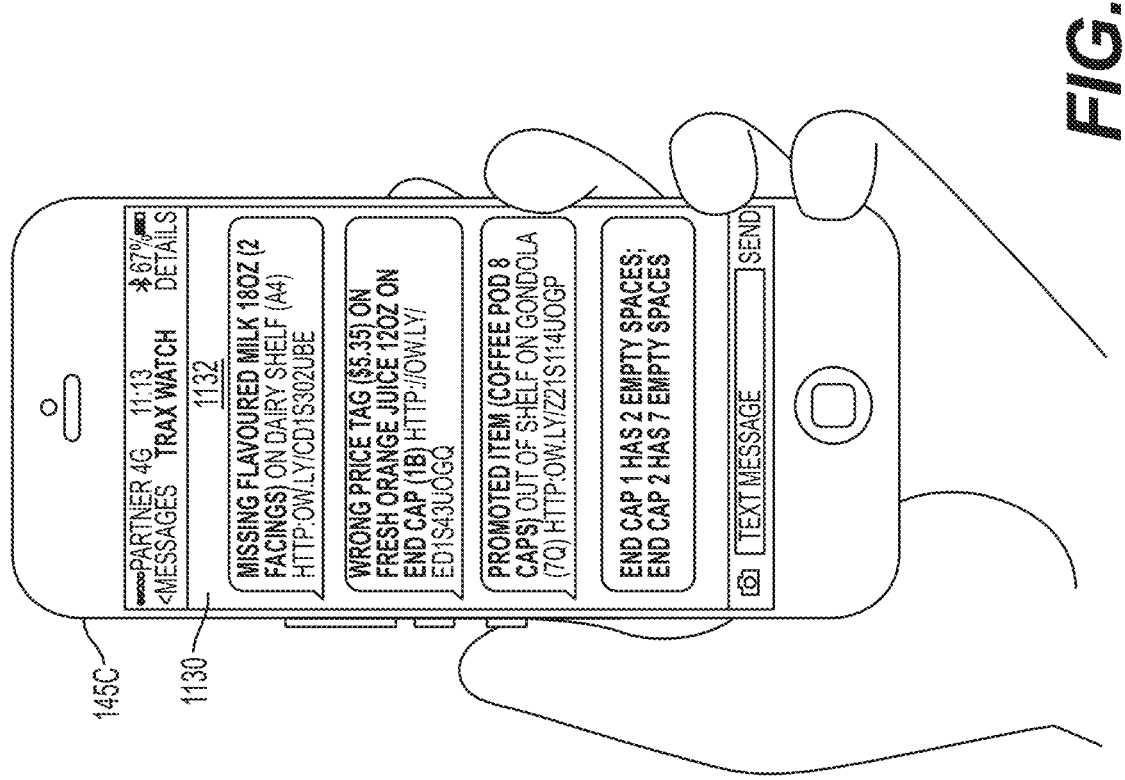
FIG. 11D

1400

```
┌─────────────────────────────────────┐
│ RECEIVE ONE OR MORE IMAGES CAPTURED │ ⟵ 1401
│    IN A RETAIL STORE AND DEPICTING A │
│ PLURALITY OF PRODUCTS DISPLAYED ON AT│
│         LEAST ONE STORE SHELF        │
└─────────────────────────────────────┘
                  │
                  ▼
┌─────────────────────────────────────┐
│   ANALYZE THE ONE OR MORE IMAGES TO  │ ⟵ 1403
│     DETERMINE AT LEAST ONE TASK      │
│       ASSOCIATED WITH A STORE SHELF  │
└─────────────────────────────────────┘
                  │
                  ▼
┌─────────────────────────────────────┐
│ DETERMINE AN INCENTIVE FOR COMPLETING│ ⟵ 1405
│    THE AT LEAST ONE TASK BASED ON A  │
│      PROPERTY OF THE STORE SHELF     │
└─────────────────────────────────────┘
                  │
                  ▼
┌─────────────────────────────────────┐
│   PROVIDE AN OFFER TO AT LEAST ONE   │ ⟵ 1407
│  INDIVIDUAL NON-EMPLOYEE INDIVIDUAL  │
│      ASSOCIATED WITH THE RETAIL STORE│
└─────────────────────────────────────┘
```

```
┌─────────────────────────────────────┐
│  RECEIVE IMAGES DEPICTING PERISHABLE │──1701
│  PRODUCTS OF AT LEAST ONE PRODUCT    │
│  TYPE DISPLAYED ON AT LEAST ONE      │
│  SHELVING UNIT                       │
└─────────────────────────────────────┘
                  │
                  ▼
┌─────────────────────────────────────┐
│     ANALYZE THE IMAGES TO DETERMINE  │──1703
│  INFORMATION ABOUT THE PERISHABLE    │
│              PRODUCTS                │
└─────────────────────────────────────┘
                  │
                  ▼
┌─────────────────────────────────────┐
│  OBTAIN INFORMATION ABOUT THE AT     │──1705
│        LEAST ONE PRODUCT TYPE        │
└─────────────────────────────────────┘
                  │
                  ▼
┌─────────────────────────────────────┐
│  USE THE INFORMATION ABOUT THE       │──1707
│  PERISHABLE PRODUCTS AND THE         │
│  INFORMATION ABOUT THE AT LEAST ONE  │
│  PRODUCT TYPE TO DETERMINE AT LEAST  │
│  ONE OFFER ASSOCIATED WITH THE AT    │
│        LEAST ONE PRODUCT TYPE        │
└─────────────────────────────────────┘
                  │
                  ▼
┌─────────────────────────────────────┐
│  PROVIDE THE AT LEAST ONE OFFER TO   │──1709
│         AT LEAST ONE CUSTOMER        │
└─────────────────────────────────────┘
```

- 2001 OBTAIN A FIRST PLANOGRAM
- 2002 RECEIVE A FIRST SET OF IMAGES DEPICTING A FIRST PLURALITY OF PRODUCTS
- 2003 ANALYZE THE FIRST SET OF IMAGES TO DETERMINE AN ACTUAL PLACEMENT OF A FIRST PLURALITY OF PRODUCTS
- 2004 IDENTIFY A FIRST DEVIATION OF AN ACTUAL PLACEMENT OF AT LEAST SOME OF THE FIRST PLURALITY OF PRODUCTS FROM THE DESIRED PLACEMENT OF PRODUCTS ASSOCIATED WITH THE FIRST PLANOGRAM
- 2005 ISSUE A FIRST USER-NOTIFICATION ASSOCIATED WITH THE FIRST DEVIATION
- 2006 RECEIVE A SECOND SET OF IMAGES DEPICTING A SECOND PLURALITY OF PRODUCTS
- 2007 IDENTIFY A SECOND DEVIATION OF THE ACTUAL PLACEMENT OF AT LEAST SOME OF THE SECOND PLURALITY OF PRODUCTS FROM THE DESIRED PLACEMENT OF PRODUCTS ASSOCIATED WITH THE FIRST PLANOGRAM

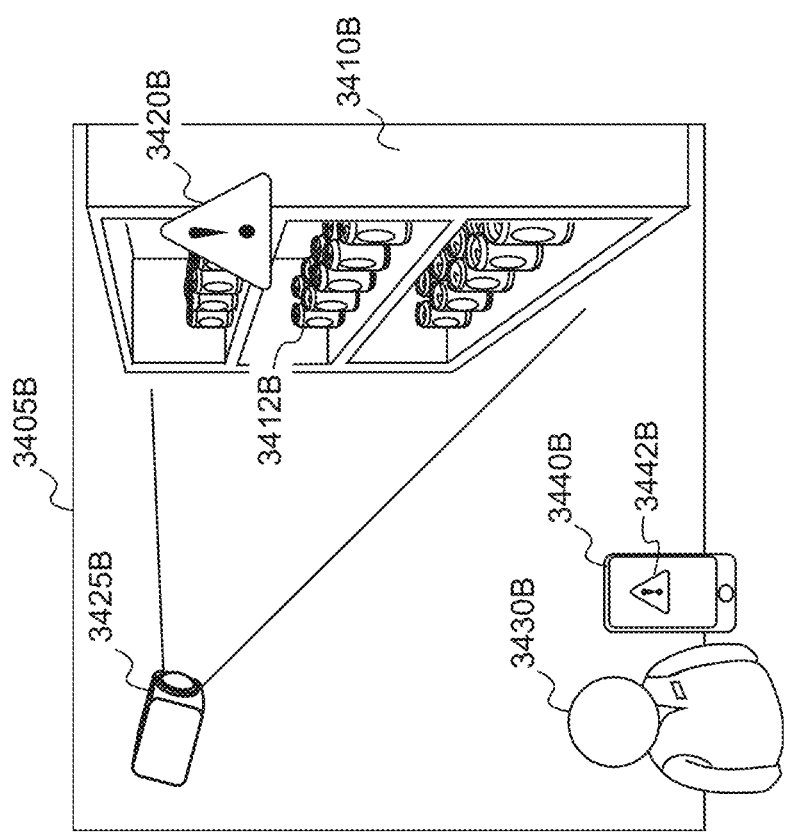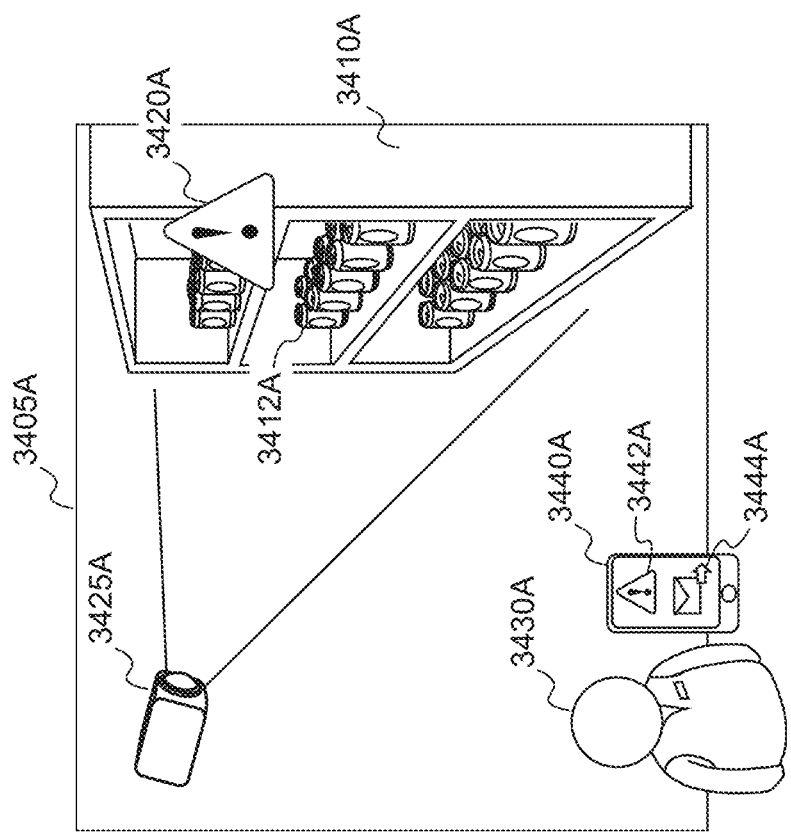
FIG. 34

CROWDSOURCING INCENTIVE BASED ON SHELF LOCATION

CROSS REFERENCES TO RELATED APPLICATIONS

This application is a continuation of application Ser. No. 17/45,276, filed Sep. 2, 2021 (now allowed), which is a continuation of International Application No. PCT/US2020/021144, filed on Mar. 5, 2020, which claims the benefit of priority of U.S. Provisional Application No. 62/814,339, filed Mar. 6, 2019; U.S. Provisional Application No. 62/829,160, filed Apr. 4, 2019; U.S. Provisional Application No. 62/872,751, filed Jul. 11, 2019; and U.S. Provisional Application No. 62/879,565, filed Jul. 29, 2019. The foregoing applications are incorporated herein by reference in their entirety.

BACKGROUND

I. Technical Field

The present disclosure relates generally to systems, methods, and devices for identifying products in retail stores, and more specifically to systems, methods, and devices for capturing, collecting, and automatically analyzing images of products displayed in retail stores for purposes of providing one or more functions associated with the identified products.

II. Background Information

Shopping in stores is a prevalent part of modern daily life. Store owners (also known as "retailers") stock a wide variety of products on store shelves and add associated labels and promotions to the store shelves. Typically, retailers have a set of processes and instructions for organizing products on the store shelves. The source of some of these instructions may include contractual obligations and other preferences related to the retailer methodology for placement of products on the store shelves. Nowadays, many retailers and suppliers send people to stores to personally monitor compliance with the desired product placement. Such a monitoring technique, however, may be inefficient and may result in nonuniform compliance among retailers relative to various product-related guidelines. This technique may also result in significant gaps in compliance, as it does not allow for continuous monitoring of dynamically changing product displays. To increase productivity, among other potential benefits, there is a technological need to provide a dynamic solution that will automatically monitor retail spaces. Such a solution, for example and among other features, may automatically determine whether a disparity exists between a desired product placement and an actual product placement.

The disclosed devices and methods are directed to providing new ways for monitoring retail establishments using image processing and supporting sensors.

SUMMARY

Embodiments consistent with the present disclosure provide systems, methods, and devices for capturing, collecting, and analyzing images of products displayed in retail stores. For example, consistent with the disclosed embodiments, an example system may receive an image depicting a store shelf having products displayed thereon, identify the products on the store shelf, and trigger an alert when disparity exists between the desired product placement and the actual product placement.

Another aspect of the present disclosure is directed to a computer program product for identifying products and monitoring planogram compliance using analysis of image data embodied in a non-transitory computer-readable medium and executable by at least one processor, the computer program product including instructions for causing the at least one processor to execute the method described above.

In an embodiment, a computer-implemented system for processing images captured in a retail store to determine tasks for non-employee individuals associated with the retail store may include at least one processor configured to receive one or more images captured in a retail store and depicting a plurality of products displayed on at least one store shelf. The at least processor may also be configured to analyze the one or more images to determine at least one task associated with a store shelf and determine an incentive for completing the at least one task based on a property of the store shelf. The incentive may be intended for a non-employee individual associated with the retail store. The at least one processor may further be configured to provide an offer to at least one individual non-employee individual associated with the retail store. The offer may include receiving the incentive in response to completing the at least one task.

In an embodiment, a computer program product for processing images captured in a retail store to determine tasks for non-employee individuals associated with the retail store is provided. The computer program product may be embodied in a non-transitory computer-readable medium and executable by at least one processor. The computer program product may include instructions for causing the at least one processor to execute a method including receiving one or more images captured in a retail store and depicting a plurality of products displayed on at least one store shelf. The method may also include analyzing the one or more images to determine at least one task associated with a store shelf and determining an incentive for completing the at least one task based on a property of the store shelf. The incentive may be intended for a non-employee individual associated with the retail store. The method may further include providing an offer to at least one non-employee individual associated with the retail store, and the offer may include receiving the incentive upon completing the at least one task.

In an embodiment, a method for processing images captured in a retail store to determine tasks for non-employee individuals associated with the retail store may include receiving one or more images captured in a retail store and depicting a plurality of products displayed on at least one store shelf. The method may also include analyzing the one or more images to determine at least one task associated with a store shelf and determining an incentive for completing the at least one task based on a property of the store shelf. The incentive may be intended for a non-employee individual associated with the retail store. The method may further include providing an offer to at least one non-employee individual associated with the retail store, and the offer may include receiving the incentive upon completing the at least one task.

In an embodiment, a computer-implemented system for identifying perishable products in a retail store based on analysis of image data and for automatically generating offers relating to the identified products is provided. The system may include at least one processor configured to receive a set of images depicting a plurality of perishable products of at least one product type displayed on at least one shelving unit in a retail store. The at least one processor may also be configured to analyze the set of images to determine information about a displayed inventory of the plurality of perishable products and access a database storing information about the at least one product type. The at least one processor may further be configured to use the information about the displayed inventory and the stored information about the at least one product type to determine at least one offer associated with the at least one product type and provide the at least one offer to at least one costumer of the retail store.

In one embodiment, a computer program product for identifying perishable products in a retail store based on analysis of image data and for automatically generating offers relating to the identified products embodied in a non-transitory computer-readable medium and executable by at least one processor is provided. The computer program product includes instructions for causing the at least one processor to execute a method including receiving a set of images depicting a plurality of perishable products of at least one product type displayed on at least one shelving unit in a retail store. The method may also include analyzing the set of images to determine information about a displayed inventory of the plurality of perishable products and accessing a database storing information about the at least one product type. The method may further include using the information about the displayed inventory and the stored information about the at least one product type to determine at least one offer associated with the at least one product type, and providing the at least one offer to at least one costumer of the retail store.

In an embodiment, a method for identifying perishable products in a retail store based on analysis of image data and for automatically generating offers relating to the identified products is provided. The method may include receiving a set of images depicting a plurality of perishable products of at least one product type displayed on at least one shelving unit in a retail store. The method may also include analyzing the set of images to determine information about a displayed inventory of the plurality of perishable products and accessing a database storing information about the at least one product type. The method may further include using the information about the displayed inventory and the stored information about the at least one product type to determine at least one offer associated with the at least one product type, and providing the at least one offer to at least one costumer of the retail store.

In an embodiment, a computer-implemented system for processing images captured in a retail store and automatically identifying changes in planograms is provided. The system may include at least one processor configured to access a plurality of planograms stored in a database. Each planogram may describe a desired placement of products on shelves of a retail store during a time period. The plurality of planograms may include at least a first planogram and a second planogram. The at least one processor may also be configured to receive a first set of images captured at a first time and depicting a first plurality of products displayed on at least one of the shelves of the retail store. The at least one processor may further be configured to analyze the first set of images to determine an actual placement of the first plurality of products displayed on the shelves of the retail store at the first time. The at least one processor may also be configured to identify a deviation of an actual placement of at least some of the first plurality of products from the desired placement of products associated with the first planogram. The at least one processor may further be configured to issue a first user-notification associated with the deviation of the actual placement of the at least some of the first plurality of products from the desired placement of products associated with the first planogram. The at least one processor may also be configured to after issuing the first user-notification, receive a second set of images captured at a second time and depicting a second plurality of products displayed on the at least one of the shelves of the retail store. The at least one processor may further be configured to analyze the second set of images to determine an actual placement of the second plurality of products displayed on the shelves of the retail store at the second time. The at least one processor may also be configured to identify a deviation of the actual placement of at least some of the second plurality of products from the desired placement of products associated with the first planogram. The at least one processor may further be configured to use the second planogram to determine whether an arrangement associated with the second plurality of products conforms to the second planogram rather than to the first planogram. The at least one processor may also be configured to, when the arrangement associated with the second plurality of products conforms to the second planogram, withhold issuance of a second user-notification indicating a deviation relative to the first planogram.

In an embodiment, a computer program product for processing images captured in a retail store and automatically identifying changes in planograms, which may be embodied in a non-transitory computer-readable medium and executable by at least one processor, is provided. The computer program product includes instructions for causing the at least one processor to execute a method including accessing a plurality of planograms stored in a database. Each planogram may describe a desired placement of products on shelves of a retail store during a time period. The plurality of planograms may further include at least a first planogram and a second planogram. The method may also include receiving a first set of images captured at a first time and depicting a first plurality of products displayed on at least one of the shelves of the retail store. The method may further include analyzing the first set of images to determine an actual placement of the first plurality of products displayed on the shelves of the retail store at the first time. The method may also include identifying a deviation of an actual placement of at least some of the first plurality of products from the desired placement of products associated with the first planogram. The method may further include issuing a first user-notification associated with the deviation of the actual placement of the at least some of the first plurality of products from the desired placement of products associated with the first planogram. The method may also include after issuing the first user-notification, receiving a second set of images captured at a second time and depicting a second plurality of products displayed on the at least one of the shelves of the retail store. The method may further include analyzing the second set of images to determine an actual placement of the second plurality of products displayed on the shelves of the retail store at the second time. The method may also include identifying a deviation of the actual placement of at least some of the second plurality of products from the desired placement of products associated with the first planogram. The method may further include using the second planogram to determine whether an arrangement associated with the second plurality of products conforms to the second planogram rather than to the first planogram. The method may also include when the arrangement associated with the second plurality of products conforms to the second planogram, withholding issuance of a second user-notification indicating a deviation relative to the first planogram.

In an embodiment, a method for processing images captured in a retail store and automatically identifying changes in planograms may include accessing a plurality of planograms stored in a database. Each planogram may describe a desired placement of products on shelves of a retail store during a time period. The plurality of planograms may further include at least a first planogram and a second planogram. The method may also include receiving a first set of images captured at a first time and depicting a first plurality of products displayed on at least one of the shelves of the retail store. The method may further include analyzing the first set of images to determine an actual placement of the first plurality of products displayed on the shelves of the retail store at the first time. The method may also include identifying a deviation of an actual placement of at least some of the first plurality of products from the desired placement of products associated with the first planogram. The method may further include issuing a first user-notification associated with the deviation of the actual placement of the at least some of the first plurality of products from the desired placement of products associated with the first planogram. The method may also include after issuing the first user-notification, receiving a second set of images captured at a second time and depicting a second plurality of products displayed on the at least one of the shelves of the retail store. The method may further include analyzing the second set of images to determine an actual placement of the second plurality of products displayed on the shelves of the retail store at the second time. The method may also include identifying a deviation of the actual placement of at least some of the second plurality of products from the desired placement of products associated with the first planogram. The method may further include using the second planogram to determine whether an arrangement associated with the second plurality of products conforms to the second planogram rather than to the first planogram. The method may also include when the arrangement associated with the second plurality of products conforms to the second planogram, withholding issuance of a second user-notification indicating a deviation relative to the first planogram.

In an embodiment, an apparatus may secure a camera to a retail shelving unit. The apparatus may include: a pair of opposing securing surfaces for securing the apparatus to a support element of a retail shelving unit, wherein the pair of opposing securing surfaces forms a gap between the pair of opposing securing surfaces, wherein the gap is configured to accept the support element of the retail shelving unit; and an arm extending from one of the pair of opposing securing surfaces and having a distal end, the distal end including a camera support area including at least one opening.

In an embodiment, a system may monitor planogram compliance in a retail store. The system may include: a plurality of cameras configured to capture images depicting a plurality of products displayed in the retail store, wherein each camera is mountable to a retail shelving unit using an apparatus including: a pair of opposing securing surfaces for securing the apparatus to a support element of the retail shelving unit, wherein the pair of opposing securing surfaces forms a gap between the pair of opposing securing surfaces, and wherein the gap is configured to accept the support element of the retail shelving unit; and an arm extending from one of the pair of opposing securing surfaces and having a distal end, the distal end including a camera support area including a least one opening; a data interface configured to receive image data from the plurality of cameras; and at least one processor for monitoring planogram compliance using the received image data.

In an embodiment, a system may process images captured in a retail store and automatically determining relationships between products and shelf labels. The system may include at least one processor configured to: receive images of at least one store shelf captured over a period of time by one or more image sensors, wherein the images depict a plurality of shelf labels and groups of products associated with different product types placed on the at least one store shelf; analyze the images to identify temporal changes in an arrangement of the groups of products over the period of time, wherein at a first point in time the groups of products are arranged on the least one store shelf in a first manner and at a second point in time the groups of products are arranged on the least one store shelf in a second manner; analyze the images to identify temporal changes in display of the plurality of shelf labels over the period of time, wherein at the first point in time the plurality of shelf labels are displayed on the least one store shelf in a first manner and at the second point in time the plurality of shelf labels are displayed on the least one store shelf in a second manner; determine a relationship between a specific group of products and a specific shelf label based on the identified temporal changes in the arrangement of the groups of products and the identified temporal changes in the display of the plurality of shelf labels; and initiate an action based on the determined relationship.

In an embodiment, a computer program product may process images captured in a retail store and automatically determine relationships between products and shelf labels. The computer program product may be embodied in a non-transitory computer-readable medium and may include instructions for causing at least one processor to execute a method. The method may include: receiving images of at least one store shelf captured over a period of time by one or more image sensors, wherein the images depict a plurality of shelf labels and groups of products associated with different product types placed on the at least one store shelf; analyzing the images to identify temporal changes in arrangement of the groups of products over the period of time, wherein at a first point in time the groups of products are arranged on the least one store shelf in a first manner and at a second point in time the groups of products are arranged on the least one store shelf in a second manner; analyzing the images to identify temporal changes in display of the plurality of shelf labels over the period of time, wherein at the first point in time the plurality of shelf labels are displayed on the least one store shelf in a first manner and at the second point in time the plurality of shelf labels are displayed on the least one store shelf in a second manner; determining a relationship between a specific group of products placed on the at least one store shelf and a specific shelf label based on the identified temporal changes in the arrangement of the groups of products and the identified temporal changes in the display of the plurality of shelf labels; and initiating an action based on the determined relationship.

In an embodiment, a method may process images captured in a retail store and automatically determine relationships between products and shelf labels. The method may include: receiving images of at least one store shelf captured over a period of time by one or more image sensors, wherein the images depict a plurality of shelf labels and groups of products associated with different product types placed on the at least one store shelf; analyzing the images to identify temporal changes in arrangement of the groups of products over the period of time, wherein at a first point in time the groups of products are arranged on the least one store shelf in a first manner and at a second point in time the groups of products are arranged on the least one store shelf in a second manner; analyzing the images to identify temporal changes in display of the plurality of shelf labels over the period of time, wherein at the first point in time the plurality of shelf labels are displayed on the least one store shelf in a first manner and at the second point in time the plurality of shelf labels are displayed on the least one store shelf in a second manner; determining a relationship between a specific group of products placed on the at least one store shelf and a specific shelf label based on the identified temporal changes in the arrangement of the groups of products and the identified temporal changes in the display of the plurality of shelf labels; and initiating an action based on the determined relationship.

In an embodiment, a system may process images captured in a retail store and automatically identify situations to withhold planogram incompliance notifications. The system may include at least one processor configured to: receive image data from a plurality of image sensors mounted in the retail store, wherein the image data depicts a plurality of products displayed on at least one store shelf; analyze the image data to identify at least one product type associated with the plurality of products displayed on at least one store shelf and to determine a placement of products of the at least one product type on the at least one store shelf; access at least one planogram describing a desired placement of products of the at least one product type on shelves of a retail store; identify, based on the at least one planogram, a discrepancy between the determined placement of products associated with the identified at least one product type and the desired placement of products associated with the identified at least one product type; and determine whether a notice-override condition exists relative to the identified at least one product type due to misidentification of the product. If a notice-override condition exists relative to the identified at least one product type, the at least one processor may be configured to withhold issuance of a user-notification associated with the identified discrepancy between the determined placement of products and the desired placement of products. If a notice-override condition is not determined to exist relative to the identified at least one product type, the at least one processor may be configured to issue a user-notification associated with the identified discrepancy between the determined placement of products and the desired placement of products.

In an embodiment, a computer program product may process images captured in a retail store and automatically withhold false planogram incompliance notifications. The computer program product may be embodied in a non-transitory computer-readable medium and including instructions for causing at least one processor to execute a method. The method may include: receiving image data from a plurality of image sensors mounted in the retail store, wherein the image data depicts a plurality of products displayed on at least one store shelf; analyzing the image data to identify at least one product type associated with the plurality of products displayed on at least one store shelf and to determine a placement of products of the at least one product type on the at least one store shelf; accessing at least one planogram describing a desired placement of products of the at least one product type on shelves of a retail store; identifying, based on the at least one planogram, a discrepancy between the determined placement of products associated with the identified at least one product type and the desired placement of products associated with the identified at least one product type; and determining whether a notice-override condition exists relative to the identified at least one product type due to misidentification of the product. If a notice-override condition exists relative to the identified at least one product type, the method may include withholding issuance of a user-notification associated with the identified discrepancy between the determined placement of products and the desired placement of products. If a notice-override condition is not determined to exist relative to the identified at least one product type, the method may include issuing a user-notification associated with the identified discrepancy between the determined placement of products and the desired placement of products.

In an embodiment, a method may process images captured in a retail store and automatically identify situations to withhold planogram incompliance notifications. The method may include: receiving image data from a plurality of image sensors mounted in the retail store, wherein the image data depicts a plurality of products displayed on at least one store shelf; analyzing the image data to identify at least one product type associated with the plurality of products displayed on at least one store shelf and to determine a placement of products of the at least one product type on the at least one store shelf; accessing at least one planogram describing a desired placement of products of the at least one product type on shelves of a retail store; identifying, based on the at least one planogram, a discrepancy between the determined placement of products associated with the identified at least one product type and the desired placement of products associated with the identified at least one product type; and determining whether a notice-override condition exists relative to the identified at least one product type due to misidentification of the product. If a notice-override condition exists relative to the identified at least one product type, the method may include withholding issuance of a user-notification associated with the identified discrepancy between the determined placement of products and the desired placement of products. If a notice-override condition is not determined to exist relative to the identified at least one product type, the method may include issuing a user-notification associated with the identified discrepancy between the determined placement of products and the desired placement of products.

In an embodiment, a mobile power source may comprise a housing configured to retain at least one battery. The housing may include a first guiding channel located on a first side of the housing and a second guiding channel located on a second side of the housing opposite to the first side of the housing. The first and second guiding channels may be configured to engage with a track associated with a retail shelving unit in order to secure the housing to the retail shelving unit. The mobile power source may further comprise a first electrical connector associated with the housing. The first connector may be configured to electrically connect the mobile power source to a control unit for at least one image capture device. The mobile power source may further comprise a second electrical connector associated with the housing. The second electrical connector may be configured to electrically connect the mobile power source to at least one of an additional mobile power source or a power grid. The mobile power source may also comprise circuitry configured to convey power from the additional mobile power source to the at least one image capture device when the mobile power source is connected to the additional mobile power source, and to convey power from the power grid to the at least one image capture device when the mobile power source is connected to the power grid.

In an embodiment, a control unit for a plurality of image capture devices may comprise a housing including a first guiding channel located on a first side of the housing and a second guiding channel located on a second side of the housing opposite to the first side of the housing. The first and second guiding channels may be configured to slidably engage with a track associated with a retail shelving unit. The control unit may further comprise a plurality of connectors located on a first end of the housing. Each connector may be configured to enable a connection for transferring power to and for receiving data from a separate image capture device fixedly mounted to the retail shelving unit. The control unit may further comprise a power port on a second end of the housing opposite to the first end of the housing. The power port may be configured to enable an electrical connection for receiving power from at least one mobile power source.

In an embodiment, an apparatus for slidably securing a selectable number of mobile power sources to a retail shelving unit for supplying power to at least one image capture device may comprise a base configured to be mounted on a first surface of the retail shelving unit opposite to a second surface of the retail shelving unit designated for placement of retail products. The apparatus may comprise a first rail arm extending from the base. The first rail arm may include a first rail protruding from the first rail arm and extending in a longitudinal direction along the first rail arm. The apparatus may also comprise a second rail arm extending from the base. The second rail arm may include a second rail protruding from the second rail arm in a direction toward the first rail arm and extending in a longitudinal direction along the second rail arm. The first and second rails may be configured to engage with corresponding grooves of one or more mobile power sources to slidably secure the one or more power sources to the retail shelving unit.

In an embodiment, a system for processing images captured in multiple retail stores and automatically coordinating actions across two or more retail stores may comprise at least one processor. The at least one processor may be configured to receive first image data captured from an environment of a first retail store depicting products displayed on shelves of the first retail store and analyze the first image data to identify a first planogram incompliance event associated with at least one shelf of the first retail store. The at least one processor may then generate an instruction for an employee of the first retail store to perform a remedial action in response to the identified first planogram incompliance event and acquire and store feedback from the employee of the first retail store regarding the first planogram incompliance event. The at least one processor may further receive second image data captured from an environment of a second retail store depicting products displayed on shelves of the second retail store and analyze the second image data to identify a second planogram incompliance event associated with at least one shelf of the second retail store. The at least one processor may determine that the at least one shelf of the second retail store is related to the at least one shelf of the first retail store, access the feedback from the employee of the first retail store regarding the first planogram incompliance event associated with the at least one shelf of the first retail store, and use the feedback from the employee in determining what action to take in response to the second planogram incompliance event associated with at least one shelf of the second retail store. The at least one processor may then initiate an action based on the determination.

In an embodiment, a computer program product for processing images captured in multiple retail stores and automatically coordinating actions across two or more retail stores may be embodied in a non-transitory computer-readable medium and may include instructions for causing at least one processor to execute a method. The method may comprise receiving first image data captured from an environment of a first retail store depicting products displayed on shelves of the first retail store and analyzing the first image data to identify a first planogram incompliance event associated with at least one shelf of the first retail store. The method may further comprise generating an instruction for an employee of the first retail store to perform a remedial action in response to the identified first planogram incompliance event and acquiring and storing feedback from the employee of the first retail store regarding the first planogram incompliance event. The method may comprise receiving second image data captured from an environment of a second retail store depicting products displayed on shelves of the second retail store and determining that the at least one shelf of the second retail store is related to at least one shelf of the first retail store. The method may further comprise determining that the at least one shelf of the second retail store is related to at least one shelf of the first retail store, accessing the feedback from the employee of the first retail store regarding the first planogram incompliance event associated with the at least one shelf of the first retail store, and using the feedback from the employee of the first retail store in determining what action to take in response to the second planogram incompliance event associated with at least one shelf of the second retail store. The method may then comprise initiating an action based on the determination.

In an embodiment, a method for processing images captured in multiple retail stores and automatically coordinating actions across two or more retail stores may comprise receiving first image data captured from an environment of a first retail store depicting products displayed on shelves of the first retail store and analyzing the first image data to identify a first planogram incompliance event associated with at least one shelf of the first retail store. The method may further comprise generating an instruction for an employee of the first retail store to perform a remedial action in response to the identified first planogram incompliance event and acquiring and storing feedback from the employee of the first retail store regarding the first planogram incompliance event. The method may comprise receiving second image data captured from an environment of a second retail store depicting products displayed on shelves of the second retail store and determining that the at least one shelf of the second retail store is related to at least one shelf of the first retail store. The method may further comprise determining that the at least one shelf of the second retail store is related to at least one shelf of the first retail store, accessing the feedback from the employee of the first retail store regarding the first planogram incompliance event associated with the at least one shelf of the first retail store, and using the feedback from the employee of the first retail store in determining what action to take in response to the second planogram incompliance event associated with at least one shelf of the second retail store. The method may then comprise initiating an action based on the determination.

In an embodiment, a system processing images captured in a retail store and automatically determining options for store execution based on shelf capacity may comprise at least one processor. The at least one processor may be configured to receive a set of images captured during a period of time, wherein the set of images depict a first plurality of products from a particular product type displayed on a shelving unit in a retail store, and analyze the set of images to identify a portion of the shelving unit associated with the particular product type. The at least one processor may further determine a product capacity for the portion of the shelving unit dedicated to the particular product type, wherein the determined product capacity is greater than a number of the first plurality of products depicted in the set of images and access stored data about a second plurality of products from the particular product type, wherein each of the second plurality of products is located separately from the shelving unit when the period of time ends. The at least one processor may then use the product capacity for the portion of the shelving unit dedicated to the particular product type and the accessed data to generate at least one suggestion for improving store execution and provide the at least one suggestion for improving store execution.

In an embodiment, a computer program product for processing images captured in a retail store and automatically determining options for store execution based on shelf capacity may be embodied in a non-transitory computer-readable medium and may include instructions for causing at least one processor to execute a method. The method may comprise receiving a set of images captured during a period of time, wherein the set of images depicts a first plurality of products from a particular product type displayed on a shelving unit in a retail store, and analyzing the set of images to identify a portion of the shelving unit dedicated to the particular product type. The method may further comprise determining a product capacity for the portion of the shelving unit dedicated to the particular product type, wherein the determined product capacity is greater than a number of the first plurality of products depicted in the set of images, and accessing stored data about a second plurality of products from the particular product type, wherein each of the second plurality of products is located separately from the shelving unit when the period of time ends. The method may then comprise using the determined product capacity and the accessed data to generate at least one suggestion for improving store execution and providing the at least one suggestion for improving store execution.

In an embodiment, a method for processing images captured in a retail store and automatically determining options for store execution based on shelf capacity may comprise receiving a set of images captured during a period of time, wherein the set of images depicts a first plurality of products from a particular product type displayed on a shelving unit in a retail store, and analyzing the set of images to identify a portion of the shelving unit dedicated to the particular product type. The method may further comprise determining a product capacity for the portion of the shelving unit dedicated to the particular product type, wherein the determined product capacity is greater than a number of the first plurality of products depicted in the set of images, and accessing stored data about a second plurality of products from the particular product type, wherein each of the second plurality of products is located separately from the shelving unit when the period of time ends. The method may then comprise using the determined product capacity and the accessed data to generate at least one suggestion for improving store execution and providing the at least one suggestion for improving store execution.

In an embodiment, a system may process images captured in a retail store and automatically generate low-stock alerts. The system may include at least one processor configured to receive image data associated with images captured during a first period of time by one or more image capturing devices mounted in the retail store. The image data may depict inventory changes in at least a portion of a retail shelving unit dedicated to products from a specific product type. The at least one processor may analyze the image data to identify a restocking event associated with the at least a portion of the retail shelving unit. The at least one processor may also analyze the image data to identify at least one facing event associated with the at least a portion of the retail shelving unit, wherein the at least one facing event occurs after the restocking event. The at least one processor may further analyze the image data to identify a low-stock event associated with the at least a portion of the retail shelving unit, wherein the low-stock event occurs after the at least one facing event. Thereafter, the at least one processor may further determine a demand pattern for products from the specific product type based on the identified restocking event, the at least one facing event, and the low-stock event. The at least one processor may further receive additional image data associated with images captured during a second period of time, subsequent to the low-stock event, by the plurality of image capturing devices. The additional image data may depict additional inventory changes in the at least a portion of the retail shelving unit. Subsequently, the at least one processor may predict when a next low-stock event will occur based on the additional image data and the determined demand pattern, and generate an alert associated with the predicted next low-stock event.

In an embodiment, a computer program product for processing images captured in a retail store may automatically generate low-stock alerts. The computer program product may be embodied in a non-transitory computer-readable medium and include instructions for causing at least one processor to execute a method comprising: receiving image data associated with images captured during a first period of time by one or more image capturing devices mounted in the retail store, wherein the captured data depicts inventory changes in at least a portion of a retail shelving unit dedicated to products from a specific product type; analyzing the image data to identify a restocking event associated with the at least a portion of the retail shelving unit; analyzing the image data to identify at least one facing event associated with the at least a portion of the retail shelving unit, wherein the at least one facing event occurs after the restocking event; analyzing the image data to identify a low-stock event associated with the at least a portion of the retail helving unit, wherein the low-stock event occurs after the at least one facing event; determining a demand pattern for products from the specific product type based on the identified restocking event, the at least one facing event, and the low-stock event; receiving additional image data associated with images captured during a second period of time subsequent to the low-stock event by the plurality of image capturing devices, wherein the additional image data depicts additional inventory changes in the at least a portion of the retail shelving unit; based on the additional image data and the determined demand pattern, predicting when a next low-stock event will occur; and generating an alert associated with the predicted next low-stock event.

In an embodiment, a method may process images captured in a retail store and automatically generate low-stock alerts. The method may comprise: receiving image data associated with images captured during a first period of time by one or more image capturing devices mounted in the retail store, wherein the captured data depicts inventory changes in at least a portion of a retail shelving unit dedicated to products from a specific product type; analyzing the image data to identify a restocking event associated with the at least a portion of the retail shelving unit; analyzing the image data to identify at least one facing event associated with the at least a portion of the retail shelving unit, wherein the at least one facing event occurs after the restocking event; analyzing the image data to identify a low-stock event associated with the at least a portion of the retail shelving unit, wherein the low-stock event occurs after the at least one facing event; determining a demand pattern for products from the specific product type based on the identified restocking event, the at least one facing event, and the low-stock event; receiving additional image data associated with images captured during a second period of time subsequent to the low-stock event by the plurality of image capturing devices, wherein the additional image data depicts additional inventory changes in the at least a portion of the retail shelving unit; based on the additional image data and the determined demand pattern, predicting when a next low-stock event will occur; and generating an alert associated with the predicted next low-stock event.

In an embodiment, a system for processing images captured in a retail store and automatically identifying products displayed on shelving units may include at least one processor configured to receive a first image depicting a shelving unit with a plurality of products of differing product types displayed thereon and a first plurality of labels coupled to the shelving unit. Each label depiction in the first image may have at most a first image resolution. The at least one processor may also be configured to receive a set of second images depicting a second plurality of labels. Each label depiction in the set of second images may have at least a second image resolution greater than the first image resolution. The at least one processor may also be configured to correlate a first label depiction of a specific label included in the first image to a second label depiction of the same specific label included in a second image. The second image may be included in the set of second images. The at least one processor may also be configured to use information derived from the second label depiction to determine a type of products displayed in the first image in proximity to the specific label, and initiate an action based on the determined type of products displayed in proximity to the specific label.

In an embodiment, a computer program product for processing images captured in a retail store and automatically identifying products displayed on shelving units is provided. The computer program product may be embodied in a non-transitory computer-readable medium and including instructions for causing at least one processor to execute a method include receiving a first image depicting a shelving unit with a plurality of products of differing product types displayed thereon and a first plurality of labels coupled to the shelving unit. Each label depiction in the first image has at most a first image resolution. The method may also include receiving a set of second images depicting a second plurality of labels. Each label depiction in the set of second images has at least a second image resolution greater than the first image resolution. The method may also include correlating a first label depiction of a specific label included in the first image to a second label depiction of the same specific label included in a second image. The second image may be included in the set of second images. The method may also include using information derived from the second label depiction to determine a type of products displayed in the first image in proximity to the specific label, and initiating an action based on the determined type of products displayed in proximity to the specific label.

In an embodiment, a method for processing images captured in a retail store and automatically identifying products displayed on shelving units may include receiving a first image depicting a shelving unit with a plurality of products of differing product types displayed thereon and a first plurality of labels coupled to the shelving unit. Each label depiction in the first image may have at most a first image resolution. The method may also include receiving a set of second images depicting a second plurality of labels. Each label depiction in the set of second images may have at least a second image resolution greater than the first image resolution. The method may also include correlating a first label depiction of a specific label included in the first image to a second label depiction of the same specific label included in a second image. The second image may be included in the set of second images. The method may further include using information derived from the second label depiction to determine a type of products displayed in the first image in proximity to the specific label, and initiating an action based on the determined type of products displayed in proximity to the specific label.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 11D is a schematic illustration of two examples outputs for an employee of the retail store, consistent with the present disclosure.

FIG. 14 is a flowchart of a method for determining tasks for non-employee individuals, consistent with the present disclosure.

FIG. 17 is a flowchart of a method for generating an offer relating to an identified product, consistent with the present disclosure.

FIG. 20A is a flowchart of an exemplary method for issuing a notification of planogram deviation, consistent with the present disclosure.

FIG. 34 illustrates an example scenario for coordinating actions taken in response to identified incompliance events, consistent with the present disclosure.

DETAILED DESCRIPTION

Figure 1:
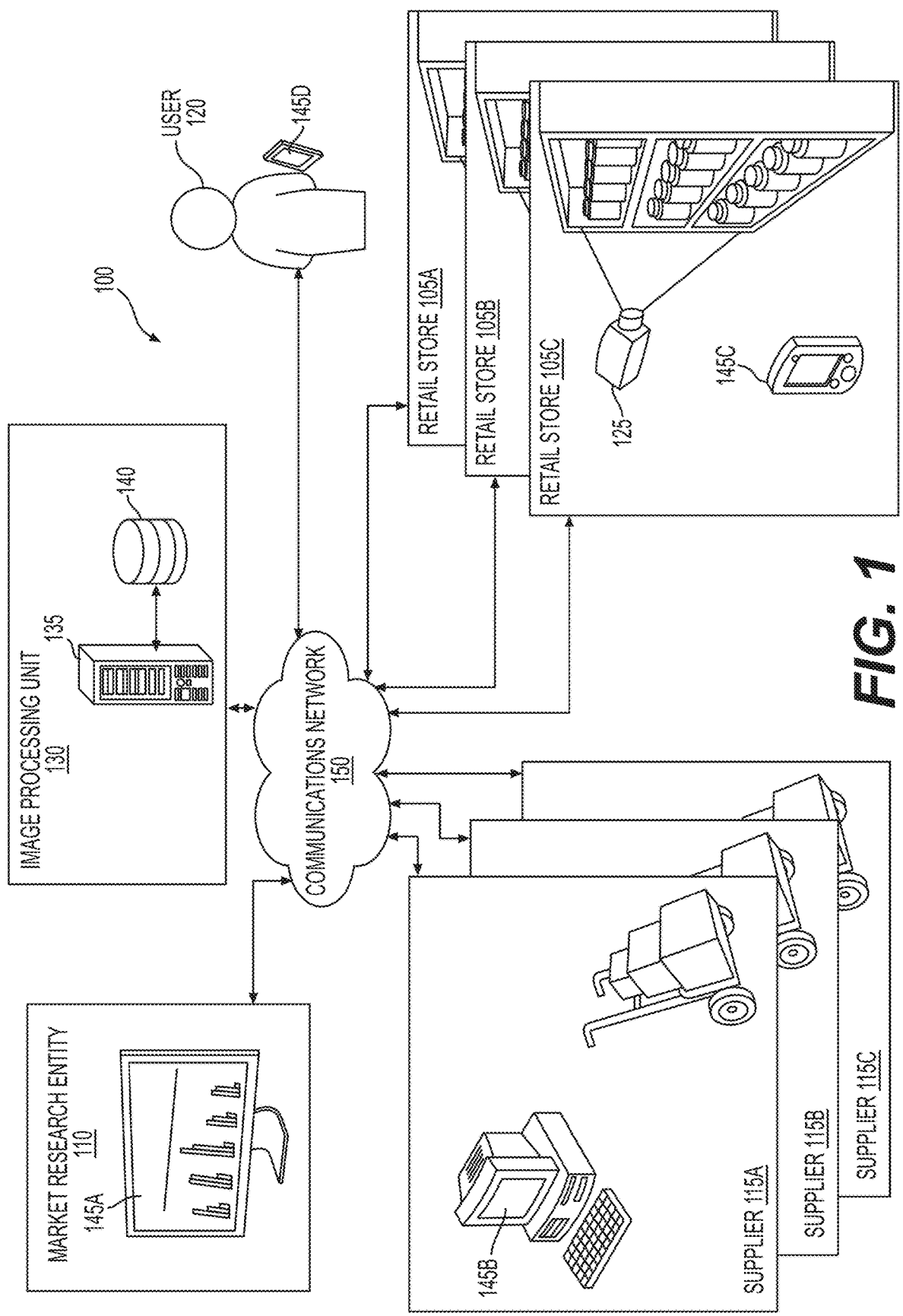
FIG. 1 is an illustration of an exemplary system for analyzing information collected from a retail store.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The present disclosure is directed to systems and methods for processing images captured in a retail store. As used herein, the term "retail store" or simply "store" refers to an establishment offering products for sale by direct selection by customers physically or virtually shopping within the establishment. The retail store may be an establishment operated by a single retailer (e.g., supermarket) or an establishment that includes stores operated by multiple retailers (e.g., a shopping mall). Embodiments of the present disclosure include receiving an image depicting a store shelf having at least one product displayed thereon. As used herein, the term "store shelf" or simply "shelf" refers to any suitable physical structure which may be used for displaying products in a retail environment. In one embodiment the store shelf may be part of a shelving unit including a number of individual store shelves. In another embodiment, the store shelf may include a display unit having a single-level or multi-level surfaces.

Consistent with the present disclosure, the system may process images and image data acquired by a capturing device to determine information associated with products displayed in the retail store. The term "capturing device" refers to any device configured to acquire image data representative of products displayed in the retail store. Examples of capturing devices may include a digital camera, a time-of-flight camera, a stereo camera, an active stereo camera, a depth camera, a Lidar system, a laser scanner, CCD based devices, or any other sensor based system capable of converting received light into electric signals. The term "image data" refers to any form of data generated based on optical signals in the near-infrared, infrared, visible, and ultraviolet spectrums (or any other suitable radiation frequency range). Consistent with the present disclosure, the image data may include pixel data streams, digital images, digital video streams, data derived from captured images, and data that may be used to construct a 3D image. The image data acquired by a capturing device may be transmitted by wired or wireless transmission to a remote server. In one embodiment, the capturing device may include a stationary camera with communication layers (e.g., a dedicated camera fixed to a store shelf, a security camera, etc.). Such an embodiment is described in greater detail below with reference to FIG. 4A. In another embodiment, the capturing device may include a handheld device (e.g., a smartphone, a tablet, a mobile station, a personal digital assistant, a laptop, and more) or a wearable device (e.g., smart glasses, a smartwatch, a clip-on camera). Such an embodiment is described in greater detail below with reference to FIG. 4B. In another embodiment, the capturing device may include a robotic device with one or more cameras operated remotely or autonomously (e.g., an autonomous robotic device, a drone, a robot on a track, and more). Such an embodiment is described in greater detail below with reference to FIG. 4C.

In some embodiments, the capturing device may include one or more image sensors. The term "image sensor" refers to a device capable of detecting and converting optical signals in the near-infrared, infrared, visible, and ultraviolet spectrums into electrical signals. The electrical signals may be used to form image data (e.g., an image or a video stream)

based on the detected signal. Examples of image sensors may include semiconductor charge-coupled devices (CCD), active pixel sensors in complementary metal-oxide-semiconductor (CMOS), or N-type metal-oxide-semiconductors (NMOS, Live MOS). In some cases, the image sensor may be part of a camera included in the capturing device.

Embodiments of the present disclosure further include analyzing images to detect and identify different products. As used herein, the term "detecting a product" may broadly refer to determining an existence of the product. For example, the system may determine the existence of a plurality of distinct products displayed on a store shelf. By detecting the plurality of products, the system may acquire different details relative to the plurality of products (e.g., how many products on a store shelf are associated with a same product type), but it does not necessarily gain knowledge of the type of product. In contrast, the term "identifying a product" may refer to determining a unique identifier associated with a specific type of product that allows inventory managers to uniquely refer to each product type in a product catalogue. Additionally or alternatively, the term "identifying a product" may refer to determining a unique identifier associated with a specific brand of products that allows inventory managers to uniquely refer to products, e.g., based on a specific brand in a product catalogue. Additionally or alternatively, the term "identifying a product" may refer to determining a unique identifier associated with a specific category of products that allows inventory managers to uniquely refer to products, e.g., based on a specific category in a product catalogue. In some embodiments, the identification may be made based at least in part on visual characteristics of the product (e.g., size, shape, logo, text, color, etc.). The unique identifier may include any codes that may be used to search a catalog, such as a series of digits, letters, symbols, or any combinations of digits, letters, and symbols. Consistent with the present disclosure, the terms "determining a type of a product" and "determining a product type" may also be used interchangeably in this disclosure with reference to the term "identifying a product."

Embodiments of the present disclosure further include determining at least one characteristic of the product for determining the type of the product. As used herein, the term "characteristic of the product" refers to one or more visually discernable features attributed to the product. Consistent with the present disclosure, the characteristic of the product may assist in classifying and identifying the product. For example, the characteristic of the product may be associated with the ornamental design of the product, the size of the product, the shape of the product, the colors of the product, the brand of the product, a logo or text associated with the product (e.g., on a product label), and more. In addition, embodiments of the present disclosure further include determining a confidence level associated with the determined type of the product. The term "confidence level" refers to any indication, numeric or otherwise, of a level (e.g., within a predetermined range) indicative of an amount of confidence the system has that the determined type of the product is the actual type of the product. For example, the confidence level may have a value between 1 and 10, alternatively, the confidence level may be expressed as a percentage.

In some cases, the system may compare the confidence level to a threshold. The term "threshold" as used herein denotes a reference value, a level, a point, or a range of values, for which, when the confidence level is above it (or below it depending on a particular use case), the system may follow a first course of action and, when the confidence level is below it (or above it depending on a particular use case), the system may follow a second course of action. The value of the threshold may be predetermined for each type of product or may be dynamically selected based on different considerations. In one embodiment, when the confidence level associated with a certain product is below a threshold, the system may obtain contextual information to increase the confidence level. As used herein, the term "contextual information" (or "context") refers to any information having a direct or indirect relationship with a product displayed on a store shelf. In some embodiments, the system may retrieve different types of contextual information from captured image data and/or from other data sources. In some cases, contextual information may include recognized types of products adjacent to the product under examination. In other cases, contextual information may include text appearing on the product, especially where that text may be recognized (e.g., via OCR) and associated with a particular meaning. Other examples of types of contextual information may include logos appearing on the product, a location of the product in the retail store, a brand name of the product, a price of the product, product information collected from multiple retail stores, product information retrieved from a catalog associated with a retail store, etc.

Reference is now made to FIG. 1, which shows an example of a system 100 for analyzing information collected from retail stores 105 (for example, retail store 105A, retail store 105B, and retail store 105C). In one embodiment, system 100 may represent a computer-based system that may include computer system components, desktop computers, workstations, tablets, handheld computing devices, memory devices, and/or internal network(s) connecting the components. System 100 may include or be connected to various network computing resources (e.g., servers, routers, switches, network connections, storage devices, etc.) necessary to support the services provided by system 100. In one embodiment, system 100 may enable identification of products in retail stores 105 based on analysis of captured images. In another embodiment, system 100 may enable a supply of information based on analysis of captured images to a market research entity 110 and to different suppliers 115 of the identified products in retail stores 105 (for example, supplier 115A, supplier 115B, and supplier 115C). In another embodiment, system 100 may communicate with a user 120 (sometimes referred to herein as a customer, but which may include individuals associated with a retail environment other than customers, such as store employee, data collection agent, etc.) about different products in retail stores 105. In one example, system 100 may receive images of products captured by user 120. In another example, system 100 may provide to user 120 information determined based on automatic machine analysis of images captured by one or more capturing devices 125 associated with retail stores 105.

System 100 may also include an image processing unit 130 to execute the analysis of images captured by the one or more capturing devices 125. Image processing unit 130 may include a server 135 operatively connected to a database 140. Image processing unit 130 may include one or more servers connected by a communication network, a cloud platform, and so forth. Consistent with the present disclosure, image processing unit 130 may receive raw or processed data from capturing device 125 via respective communication links, and provide information to different system components using a network 150. Specifically, image processing unit 130 may use any suitable image analysis technique including, for example, object recognition, object detection, image segmentation, feature extraction, optical character recognition (OCR), object-based image analysis, shape region techniques, edge detection techniques, pixel-based detection, artificial neural networks, convolutional neural networks, etc. In addition, image processing unit 130 may use classification algorithms to distinguish between the different products in the retail store. In some embodiments, image processing unit 130 may utilize suitably trained machine learning algorithms and models to perform the product identification. Network 150 may facilitate communications and data exchange between different system components when these components are coupled to network 150 to enable output of data derived from the images captured by the one or more capturing devices 125. In some examples, the types of outputs that image processing unit 130 can generate may include identification of products, indicators of product quantity, indicators of planogram compliance, indicators of service-improvement events (e.g., a cleaning event, a restocking event, a rearrangement event, etc.), and various reports indicative of the performances of retail stores 105. Additional examples of the different outputs enabled by image processing unit 130 are described below with reference to FIGS. 11A-11E and throughout the disclosure.

Consistent with the present disclosure, network 150 may be any type of network (including infrastructure) that provides communications, exchanges information, and/or facilitates the exchange of information between the components of system 100. For example, network 150 may include or be part of the Internet, a Local Area Network, wireless network (e.g., a Wi-Fi/302.11 network), or other suitable connections. In other embodiments, one or more components of system 100 may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), and so forth.

In one example configuration, server 135 may be a cloud server that processes images received directly (or indirectly) from one or more capturing device 125 and processes the images to detect and/or identify at least some of the plurality of products in the image based on visual characteristics of the plurality of products. The term "cloud server" refers to a computer platform that provides services via a network, such as the Internet. In this example configuration, server 135 may use virtual machines that may not correspond to individual hardware. For example, computational and/or storage capabilities may be implemented by allocating appropriate portions of desirable computation/storage power from a scalable repository, such as a data center or a distributed computing environment. In one example, server 135 may implement the methods described herein using customized hard-wired logic, one or more Application Specific Integrated Circuits (ASICs) or Field Programmable Gate Arrays (FPGAs), firmware, and/or program logic which, in combination with the computer system, cause server 135 to be a special-purpose machine.

In another example configuration, server 135 may be part of a system associated with a retail store that communicates with capturing device 125 using a wireless local area network (WLAN) and may provide similar functionality as a cloud server. In this example configuration, server 135 may communicate with an associated cloud server (not shown) and cloud database (not shown). The communications between the store server and the cloud server may be used in a quality enforcement process, for upgrading the recognition engine and the software from time to time, for extracting information from the store level to other data users, and so forth. Consistent with another embodiment, the communications between the store server and the cloud server may be discontinuous (purposely or unintentional) and the store server may be configured to operate independently from the cloud server. For example, the store server may be configured to generate a record indicative of changes in product placement that occurred when there was a limited connection (or no connection) between the store server and the cloud server, and to forward the record to the cloud server once connection is reestablished.

As depicted in FIG. 1, server 135 may be coupled to one or more physical or virtual storage devices such as database 140. Server 135 may access database 140 to detect and/or identify products. The detection may occur through analysis of features in the image using an algorithm and stored data. The identification may occur through analysis of product features in the image according to stored product models. Consistent with the present embodiment, the term "product model" refers to any type of algorithm or stored product data that a processor may access or execute to enable the identification of a particular product associated with the product model. For example, the product model may include a description of visual and contextual properties of the particular product (e.g., the shape, the size, the colors, the texture, the brand name, the price, the logo, text appearing on the particular product, the shelf associated with the particular product, adjacent products in a planogram, the location within the retail store, etc.). In some embodiments, a single product model may be used by server 135 to identify more than one type of products, such as, when two or more product models are used in combination to enable identification of a product. For example, in some cases, a first product model may be used by server 135 to identify a product category (such models may apply to multiple product types, e.g., shampoo, soft drinks, etc.), and a second product model may be used by server 135 to identify the product type, product identity, or other characteristics associated with a product. In some cases, such product models may be applied together (e.g., in series, in parallel, in a cascade fashion, in a decision tree fashion, etc.) to reach a product identification. In other embodiments, a single product model may be used by server 135 to identify a particular product type (e.g., 6-pack of 16 oz Coca-Cola Zero).

Database 140 may be included on a volatile or non-volatile, magnetic, semiconductor, tape, optical, removable, non-removable, or other type of storage device or tangible or non-transitory computer-readable medium. Database 140 may also be part of server 135 or separate from server 135. When database 140 is not part of server 135, server 135 may exchange data with database 140 via a communication link. Database 140 may include one or more memory devices that store data and instructions used to perform one or more features of the disclosed embodiments. In one embodiment, database 140 may include any suitable databases, ranging from small databases hosted on a work station to large databases distributed among data centers. Database 140 may also include any combination of one or more databases controlled by memory controller devices (e.g., server(s), etc.) or software. For example, database 140 may include document management systems, Microsoft SQL databases, SharePoint databases, Oracle™ databases, Sybase™ databases, other relational databases, or non-relational databases, such as mongo and others.

Consistent with the present disclosure, image processing unit 130 may communicate with output devices 145 to present information derived based on processing of image data acquired by capturing devices 125. The term "output device" is intended to include all possible types of devices capable of outputting information from server 135 to users or other computer systems (e.g., a display screen, a speaker, a desktop computer, a laptop computer, mobile device, tablet, a PDA, etc.), such as 145A, 145B, 145C and 145D. In one embodiment each of the different system components (i.e., retail stores 105, market research entity 110, suppliers 115, and users 120) may be associated with an output device 145, and each system component may be configured to present different information on the output device 145. In one example, server 135 may analyze acquired images including representations of shelf spaces. Based on this analysis, server 135 may compare shelf spaces associated with different products, and output device 145A may present market research entity 110 with information about the shelf spaces associated with different products. The shelf spaces may also be compared with sales data, expired products data, and more. Consistent with the present disclosure, market research entity 110 may be a part of (or may work with) supplier 115. In another example, server 135 may determine product compliance to a predetermined planogram, and output device 145B may present to supplier 115 information about the level of product compliance at one or more retail stores 105 (for example in a specific retail store 105, in a group of retail stores 105 associated with supplier 115, in all retail stores 105, and so forth). The predetermined planogram may be associated with contractual obligations and/or other preferences related to the retailer methodology for placement of products on the store shelves. In another example, server 135 may determine that a specific store shelf has a type of fault in the product placement, and output device 145C may present to a manager of retail store 105 a user-notification that may include information about a correct display location of a misplaced product, information about a store shelf associated with the misplaced product, information about a type of the misplaced product, and/or a visual depiction of the misplaced product. In another example, server 135 may identify which products are available on the shelf and output device 145D may present to user 120 an updated list of products.

The components and arrangements shown in FIG. 1 are not intended to limit the disclosed embodiments, as the system components used to implement the disclosed processes and features may vary. In one embodiment, system 100 may include multiple servers 135, and each server 135 may host a certain type of service. For example, a first server may process images received from capturing devices 125 to identify at least some of the plurality of products in the image, and a second server may determine from the identified products in retail stores 105 compliance with contractual obligations between retail stores 105 and suppliers 115. In another embodiment, system 100 may include multiple servers 135, a first type of servers 135 that may process information from specific capturing devices 125 (e.g., handheld devices of data collection agents) or from specific retail stores 105 (e.g., a server dedicated to a specific retail store 105 may be placed in or near the store). System 100 may further include a second type of servers 135 that collect and process information from the first type of servers 135.

Figure 2:
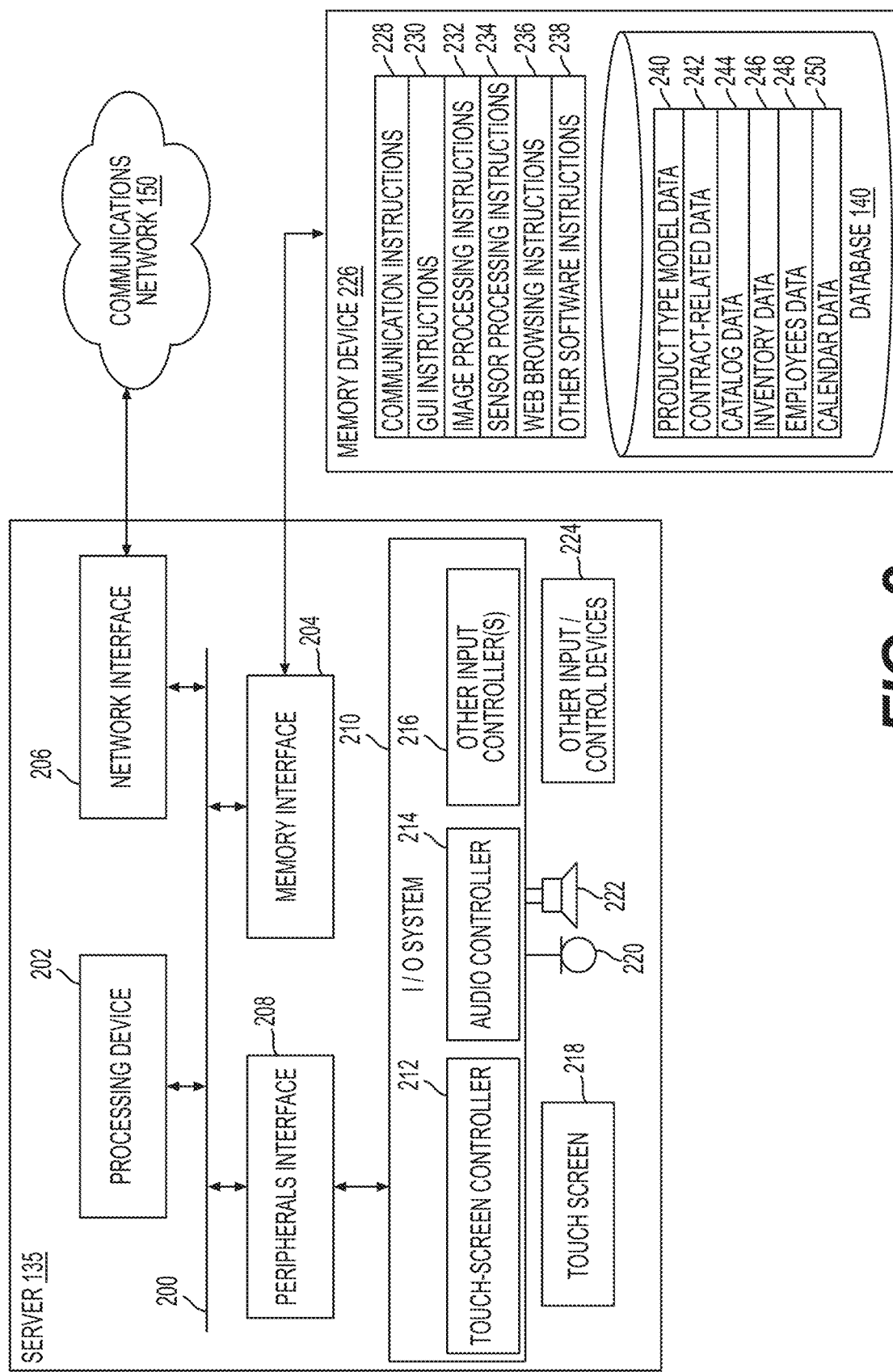
FIG. 2 is a block diagram that illustrates some of the components of an image processing system, consistent with the present disclosure.

FIG. 2 is a block diagram representative of an example configuration of server 135. In one embodiment, server 135 may include a bus 200 (or any other communication mechanism) that interconnects subsystems and components for transferring information within server 135. For example, bus 200 may interconnect a processing device 202, a memory interface 204, a network interface 206, and a peripherals interface 208 connected to an I/O system 210.

Processing device 202, shown in FIG. 2, may include at least one processor configured to execute computer programs, applications, methods, processes, or other software to execute particular instructions associated with embodiments described in the present disclosure. The term "processing device" refers to any physical device having an electric circuit that performs a logic operation. For example, processing device 202 may include one or more processors, integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. Processing device 202 may include at least one processor configured to perform functions of the disclosed methods such as a microprocessor manufactured by Intel™, Nvidia™, manufactured by AMD™, and so forth. Processing device 202 may include a single core or multiple core processors executing parallel processes simultaneously. In one example, processing device 202 may be a single core processor configured with virtual processing technologies. Processing device 202 may implement virtual machine technologies or other technologies to provide the ability to execute, control, run, manipulate, store, etc., multiple software processes, applications, programs, etc. In another example, processing device 202 may include a multiple-core processor arrangement (e.g., dual, quad core, etc.) configured to provide parallel processing functionalities to allow a device associated with processing device 202 to execute multiple processes simultaneously. It is appreciated that other types of processor arrangements could be implemented to provide the capabilities disclosed herein.

Consistent with the present disclosure, the methods and processes disclosed herein may be performed by server 135 as a result of processing device 202 executing one or more sequences of one or more instructions contained in a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within server 135, or at a remote location. Additionally, one or more computer-readable storage mediums can be utilized in implementing a computer-implemented method. The term "computer-readable storage medium" should be understood to include tangible items and exclude carrier waves and transient signals.

According to one embodiment, server 135 may include network interface 206 (which may also be any communications interface) coupled to bus 200. Network interface 206 may provide one-way or two-way data communication to a local network, such as network 150. Network interface 206 may include an integrated services digital network (ISDN) card, cable modem, satellite modem, or a modem to provide a data communication connection to a corresponding type of telephone line. As another example, network interface 206 may include a local area network (LAN) card to provide a data communication connection to a compatible LAN. In another embodiment, network interface 206 may include an Ethernet port connected to radio frequency receivers and transmitters and/or optical (e.g., infrared) receivers and transmitters. The specific design and implementation of network interface 206 depends on the communications network(s) over which server 135 is intended to operate. As described above, server 135 may be a cloud server or a local server associated with retail store 105. In any such implementation, network interface 206 may be configured to send and receive electrical, electromagnetic, or optical signals, through wires or wirelessly, that may carry analog or digital data streams representing various types of information. In another example, the implementation of network interface 206 may be similar or identical to the implementation described below for network interface 306.

Server 135 may also include peripherals interface 208 coupled to bus 200. Peripherals interface 208 may be connected to sensors, devices, and subsystems to facilitate multiple functionalities. In one embodiment, peripherals interface 208 may be connected to I/O system 210 configured to receive signals or input from devices and provide signals or output to one or more devices that allow data to be received and/or transmitted by server 135. In one embodiment I/O system 210 may include or be associated with output device 145. For example, I/O system 210 may include a touch screen controller 212, an audio controller 214, and/or other input controller(s) 216. Touch screen controller 212 may be coupled to a touch screen 218. Touch screen 218 and touch screen controller 212 can, for example, detect contact, movement, or break thereof using any of a plurality of touch sensitivity technologies, including but not limited to capacitive, resistive, infrared, and surface acoustic wave technologies as well as other proximity sensor arrays or other elements for determining one or more points of contact with touch screen 218. Touch screen 218 may also, for example, be used to implement virtual or soft buttons and/or a keyboard. In addition to or instead of touch screen 218, I/O system 210 may include a display screen (e.g., CRT, LCD, etc.), virtual reality device, augmented reality device, and so forth. Specifically, touch screen controller 212 (or display screen controller) and touch screen 218 (or any of the alternatives mentioned above) may facilitate visual output from server 135. Audio controller 214 may be coupled to a microphone 220 and a speaker 222 to facilitate voice-enabled functions, such as voice recognition, voice replication, digital recording, and telephony functions. Specifically, audio controller 214 and speaker 222 may facilitate audio output from server 135. The other input controller(s) 216 may be coupled to other input/control devices 224, such as one or more buttons, keyboards, rocker switches, thumb-wheel, infrared port, USB port, image sensors, motion sensors, depth sensors, and/or a pointer device such as a computer mouse or a stylus.

In some embodiments, processing device 202 may use memory interface 204 to access data and a software product stored on a memory device 226. Memory device 226 may include operating system programs for server 135 that perform operating system functions when executed by the processing device. By way of example, the operating system programs may include Microsoft Windows™, Unix™ Linux™, Apple™ operating systems, personal digital assistant (PDA) type operating systems such as Apple iOS, Google Android, Blackberry OS, or other types of operating systems.

Memory device 226 may also store communication instructions 228 to facilitate communicating with one or more additional devices (e.g., capturing device 125), one or more computers (e.g., output devices 145A-145D) and/or one or more servers. Memory device 226 may include graphical user interface instructions 230 to facilitate graphic user interface processing; image processing instructions 232 to facilitate image data processing-related processes and functions; sensor processing instructions 234 to facilitate sensor-related processing and functions; web browsing instructions 236 to facilitate web browsing-related processes and functions; and other software instructions 238 to facilitate other processes and functions. Each of the above identified instructions and applications may correspond to a set of instructions for performing one or more functions described above. These instructions need not be implemented as separate software programs, procedures, or modules. Memory device 226 may include additional instructions or fewer instructions. Furthermore, various functions of server 135 may be implemented in hardware and/or in software, including in one or more signal processing and/or application specific integrated circuits. For example, server 135 may execute an image processing algorithm to identify in received images one or more products and/or obstacles, such as shopping carts, people, and more.

In one embodiment, memory device 226 may store database 140. Database 140 may include product type model data 240 (e.g., an image representation, a list of features, a model obtained by training machine learning algorithm using training examples, an artificial neural network, and more) that may be used to identify products in received images; contract-related data 242 (e.g., planograms, promotions data, etc.) that may be used to determine if the placement of products on the store shelves and/or the promotion execution are consistent with obligations of retail store 105; catalog data 244 (e.g., retail store chain's catalog, retail store's master file, etc.) that may be used to check if all product types that should be offered in retail store 105 are in fact in the store, if the correct price is displayed next to an identified product, etc.; inventory data 246 that may be used to determine if additional products should be ordered from suppliers 115; employee data 248 (e.g., attendance data, records of training provided, evaluation and other performance-related communications, productivity information, etc.) that may be used to assign specific employees to certain tasks; and calendar data 250 (e.g., holidays, national days, international events, etc.) that may be used to determine if a possible change in a product model is associated with a certain event. In other embodiments of the disclosure, database 140 may store additional types of data or fewer types of data. Furthermore, various types of data may be stored in one or more memory devices other than memory device 226.

The components and arrangements shown in FIG. 2 are not intended to limit the disclosed embodiments. As will be appreciated by a person skilled in the art having the benefit of this disclosure, numerous variations and/or modifications may be made to the depicted configuration of server 135. For example, not all components may be essential for the operation of server 135 in all cases. Any component may be located in any appropriate part of server 135, and the components may be rearranged into a variety of configurations while providing the functionality of the disclosed embodiments. For example, some servers may not include some of the elements shown in I/O system 215.

Figure 3:
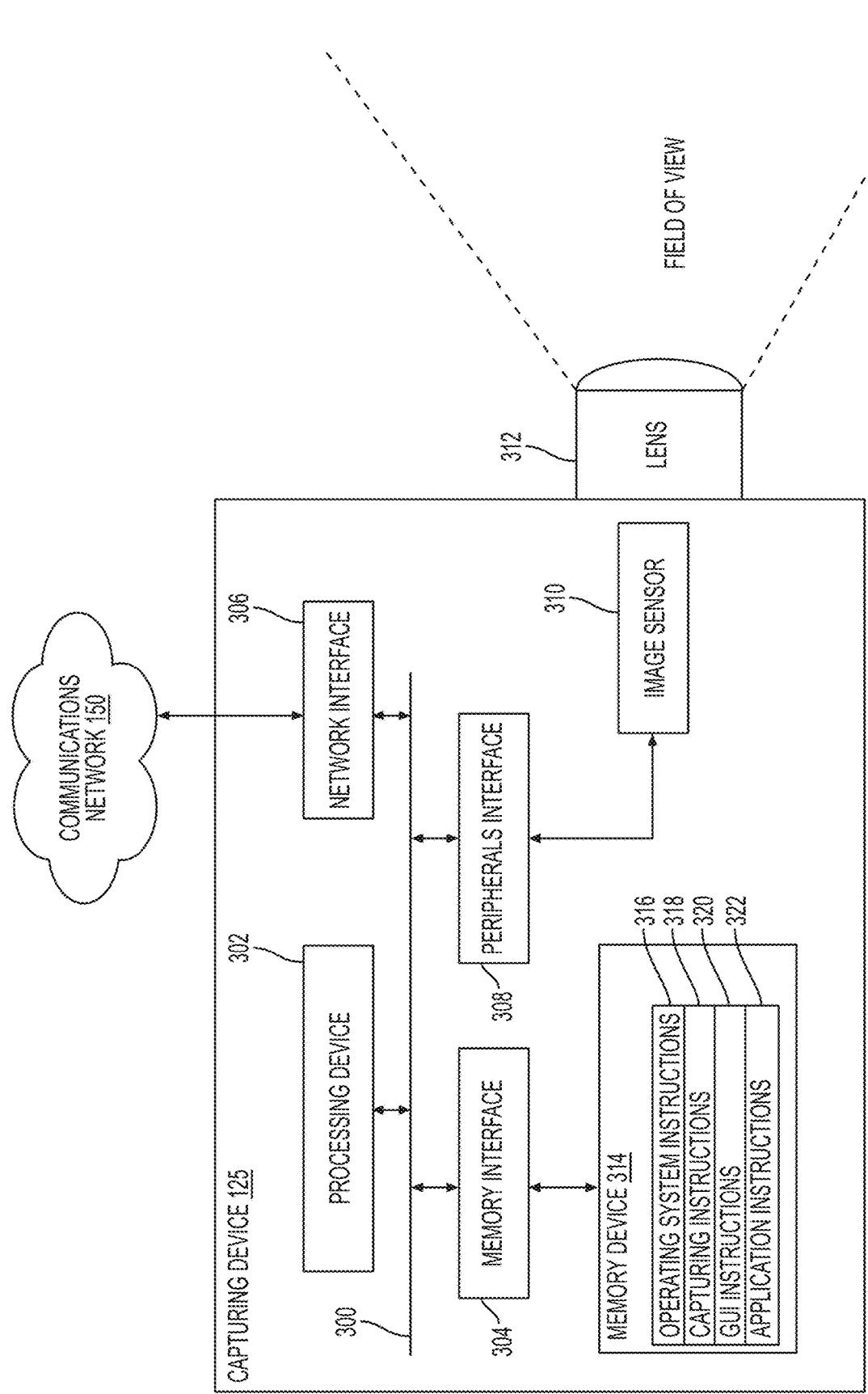
FIG. 3 is a block diagram that illustrates an exemplary embodiment of a capturing device, consistent with the present disclosure.

FIG. 3 is a block diagram representation of an example configuration of capturing device 125. In one embodiment, capturing device 125 may include a processing device 302, a memory interface 304, a network interface 306, and a peripherals interface 308 connected to image sensor 310. These components can be separated or can be integrated in one or more integrated circuits. The various components in capturing device 125 can be coupled by one or more communication buses or signal lines (e.g., bus 300). Different aspects of the functionalities of the various components in capturing device 125 may be understood from the description above regarding components of server 135 having similar functionality.

According to one embodiment, network interface 306 may be used to facilitate communication with server 135. Network interface 306 may be an Ethernet port connected to radio frequency receivers and transmitters and/or optical receivers and transmitters. The specific design and implementation of network interface 306 depends on the communications network(s) over which capturing device 125 is intended to operate. For example, in some embodiments, capturing device 125 may include a network interface 306 designed to operate over a GSM network, a GPRS network, an EDGE network, a Wi-Fi or WiMax network, a Bluetooth® network, etc. In another example, the implementation of network interface 306 may be similar or identical to the implementation described above for network interface 206.

In the example illustrated in FIG. 3, peripherals interface 308 of capturing device 125 may be connected to at least one image sensor 310 associated with at least one lens 312 for capturing image data in an associated field of view. In some configurations, capturing device 125 may include a plurality of image sensors associated with a plurality of lenses 312. In other configurations, image sensor 310 may be part of a camera included in capturing device 125. According to some embodiments, peripherals interface 308 may also be connected to other sensors (not shown), such as a motion sensor, a light sensor, infrared sensor, sound sensor, a proximity sensor, a temperature sensor, a biometric sensor, or other sensing devices to facilitate related functionalities. In addition, a positioning sensor may also be integrated with, or connected to, capturing device 125. For example, such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. For example, the positioning sensor may be built into mobile capturing device 125, such as smartphone devices. In another example, position software may allow mobile capturing devices to use internal or external positioning sensors (e.g., connecting via a serial port or Bluetooth).

Consistent with the present disclosure, capturing device 125 may include digital components that collect data from image sensor 310, transform it into an image, and store the image on a memory device 314 and/or transmit the image using network interface 306. In one embodiment, capturing device 125 may be fixedly mountable to a store shelf or to other objects in the retail store (such as walls, ceilings, floors, refrigerators, checkout stations, displays, dispensers, rods which may be connected to other objects in the retail store, and so forth). In one embodiment, capturing device 125 may be split into at least two housings such that only image sensor 310 and lens 312 may be visible on the store shelf, and the rest of the digital components may be located in a separate housing. An example of this type of capturing device is described below with reference to FIGS. 5-7.

Consistent with the present disclosure, capturing device 125 may use memory interface 304 to access memory device 314. Memory device 314 may include high-speed, random access memory and/or non-volatile memory such as one or more magnetic disk storage devices, one or more optical storage devices, and/or flash memory (e.g., NAND, NOR) to store captured image data. Memory device 314 may store operating system instructions 316, such as DARWIN, RTXC, LINUX, iOS, UNIX, LINUX, OS X, WINDOWS, or an embedded operating system such as VXWorkS. Operating system 316 can include instructions for handling basic system services and for performing hardware dependent tasks. In some implementations, operating system 316 may include a kernel (e.g., UNIX kernel, LINUX kernel, etc.). In addition, memory device 314 may store capturing instructions 318 to facilitate processes and functions related to image sensor 310; graphical user interface instructions 320 that enables a user associated with capturing device 125 to control the capturing device and/or to acquire images of an area-of-interest in a retail establishment; and application instructions 322 to facilitate a process for monitoring compliance of product placement or other processes.

The components and arrangements shown in FIG. 3 are not intended to limit the disclosed embodiments. As will be appreciated by a person skilled in the art having the benefit of this disclosure, numerous variations and/or modifications may be made to the depicted configuration of capturing device 125. For example, not all components are essential for the operation of capturing device 125 in all cases. Any component may be located in any appropriate part of capturing device 125, and the components may be rearranged into a variety of configurations while providing the functionality of the disclosed embodiments. For example, some capturing devices may not have lenses, and other capturing devices may include an external memory device instead of memory device 314.

Figure 4A:
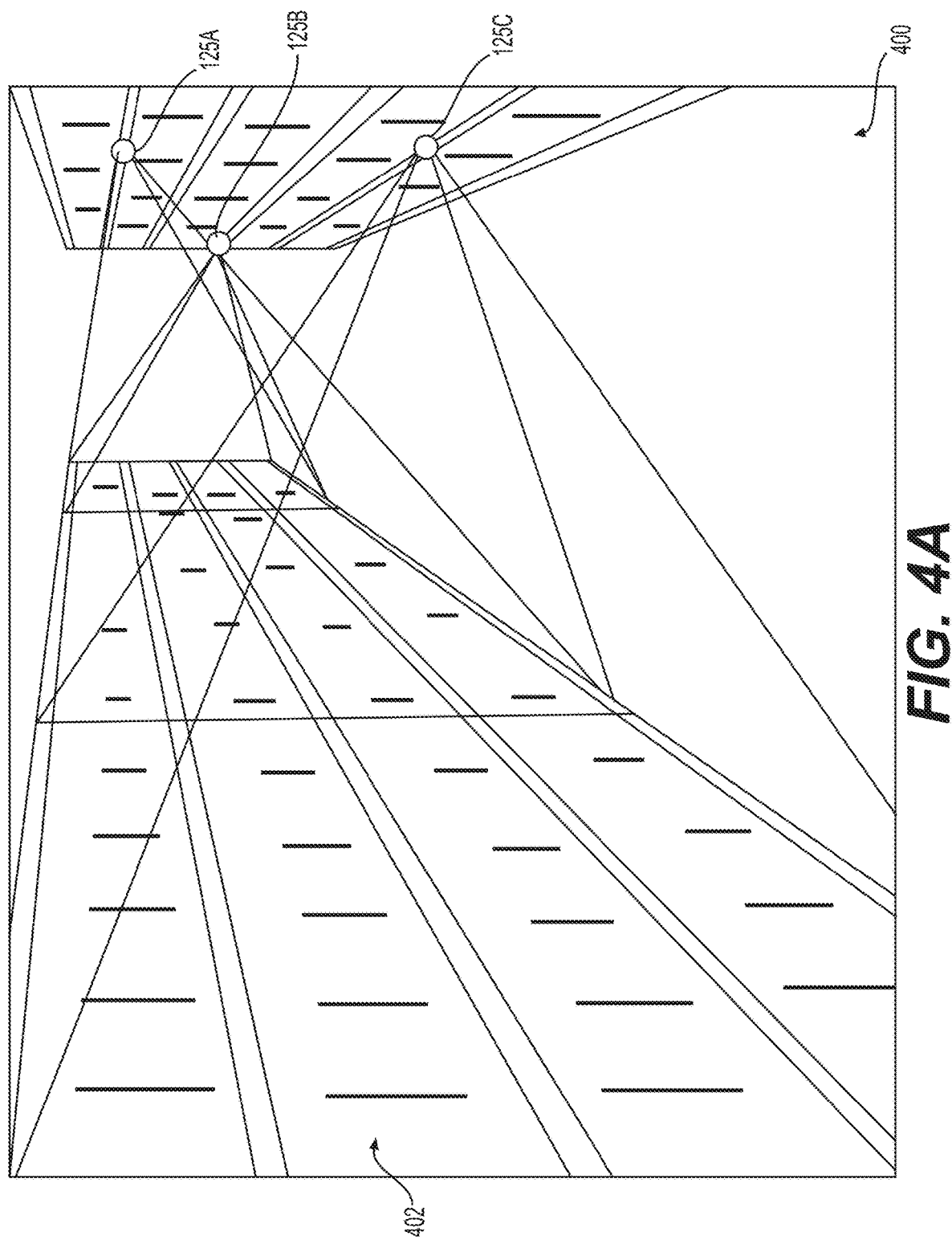
FIG. 4A is a schematic illustration of an example configuration for capturing image data in a retail store, consistent with the present disclosure.
Figure 4B:
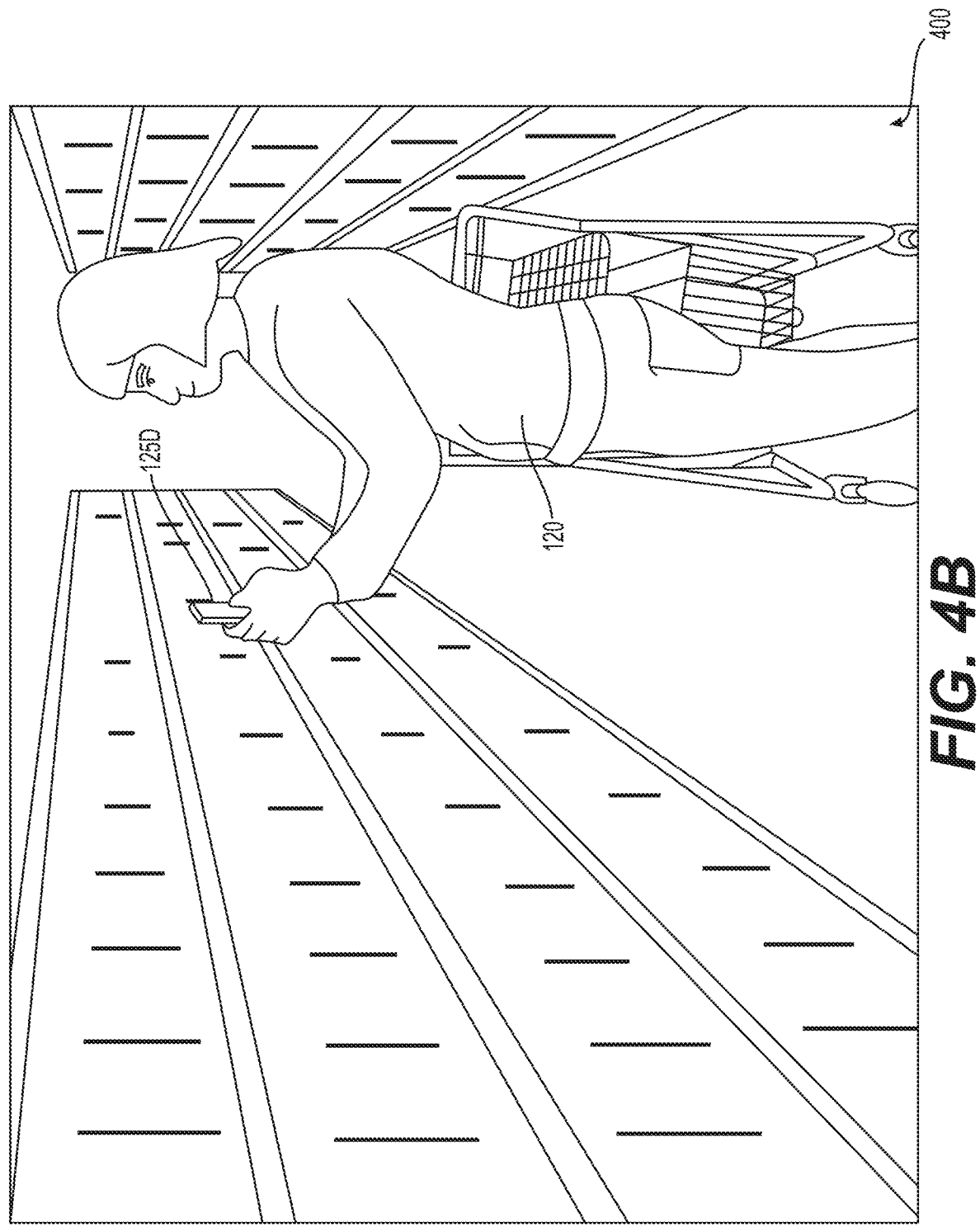
FIG. 4B is a schematic illustration of another example configuration for capturing image data in a retail store, consistent with the present disclosure.
Figure 4C:
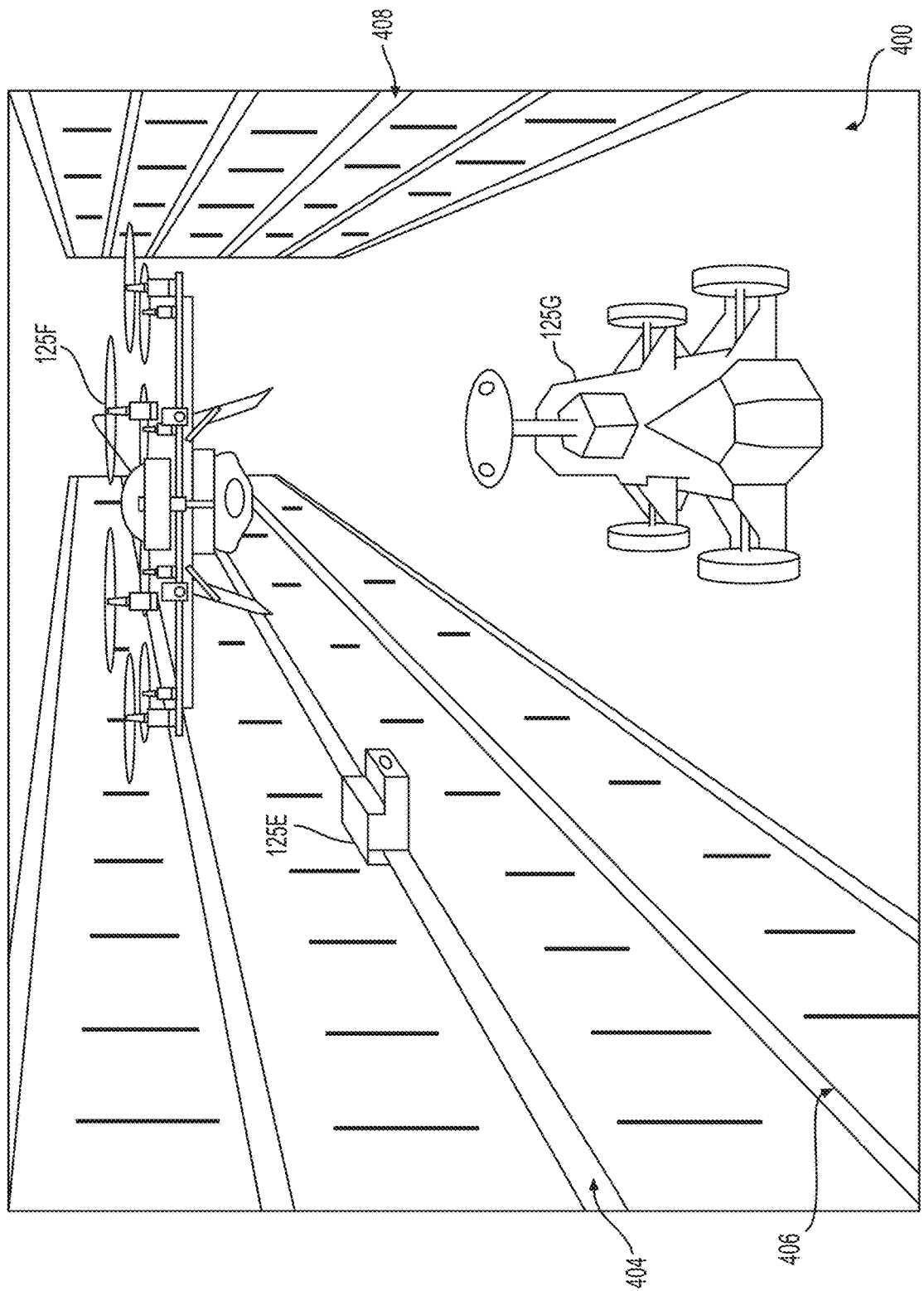
FIG. 4C is a schematic illustration of another example configuration for capturing image data in a retail store, consistent with the present disclosure.

FIGS. 4A-4C illustrate example configurations for capturing image data in retail store 105 according to disclosed embodiments. FIG. 4A illustrates how an aisle 400 of retail store 105 may be imaged using a plurality of capturing devices 125 fixedly connected to store shelves. FIG. 4B illustrates how aisle 400 of retail store 105 may be imaged using a handheld communication device. FIG. 4C illustrates how aisle 400 of retail store 105 may be imaged by robotic devices equipped with cameras.

With reference to FIG. 4A and consistent with the present disclosure, retail store 105 may include a plurality of capturing devices 125 fixedly mounted (for example, to store shelves, walls, ceilings, floors, refrigerators, checkout stations, displays, dispensers, rods which may be connected to other objects in the retail store, and so forth) and configured to collect image data. As depicted, one side of an aisle 400 may include a plurality of capturing devices 125 (e.g., 125A, 125B, and 125C) fixedly mounted thereon and directed such that they may capture images of an opposing side of aisle 400. The plurality of capturing devices 125 may be connected to an associated mobile power source (e.g., one or more batteries), to an external power supply (e.g., a power grid), obtain electrical power from a wireless power transmission system, and so forth. As depicted in FIG. 4A, the plurality of capturing devices 125 may be placed at different heights and at least their vertical fields of view may be adjustable. Generally, both sides of aisle 400 may include capturing devices 125 in order to cover both sides of aisle 400.

Differing numbers of capturing devices 125 may be used to cover shelving unit 402. In addition, there may be an overlap region in the horizontal field of views of some of capturing devices 125. For example, the horizontal fields of view of capturing devices (e.g., adjacent capturing devices) may at least partially overlap with one another. In another example, one capturing device may have a lower field of view than the field of view of a second capturing device, and the two capturing devices may have at least partially overlapping fields of view. According to one embodiment, each capturing device 125 may be equipped with network interface 306 for communicating with server 135. In one embodiment, the plurality of capturing devices 125 in retail store 105 may be connected to server 135 via a single WLAN. Network interface 306 may transmit information associated with a plurality of images captured by the plurality of capturing devices 125 for analysis purposes. In one example, server 135 may determine an existence of an occlusion event (such as, by a person, by store equipment, such as a ladder, cart, etc.) and may provide a notification to resolve the occlusion event. In another example, server 135 may determine if a disparity exists between at least one contractual obligation and product placement as determined based on automatic analysis of the plurality of images. The transmitted information may include raw images, cropped images, processed image data, data about products identified in the images, and so forth. Network interface 306 may also transmit information identifying the location of the plurality capturing devices 125 in retail store 105.

With reference to FIG. 4B and consistent with the present disclosure, server 135 may receive image data captured by users 120. In a first embodiment, server 135 may receive image data acquired by store employees. In one implementation, a handheld device of a store employee (e.g., capturing device 125D) may display a real-time video stream captured by the image sensor of the handheld device. The real-time video stream may be augmented with markings identifying to the store employee an area-of-interest that needs manual capturing of images. One of the situations in which manual image capture may be desirable may occur where the area-of-interest is outside the fields of view of a plurality of cameras fixedly connected to store shelves in aisle 400. In other situations, manual capturing of images of an area-of-interest may be desirable when a current set of acquired images is out of date (e.g., obsolete in at least one respect) or of poor quality (e.g., lacking focus, obstacles, lesser resolution, lack of light, etc.). Additional details of this embodiment are described in Applicant's International Patent Application No. PCT/IB2018/001107, which is incorporated herein by reference.

In a second embodiment, server 135 may receive image data acquired by crowd sourcing. In one exemplary implementation, server 135 may provide a request to a detected mobile device for an updated image of the area-of-interest in aisle 400. The request may include an incentive (e.g., $2 discount) to user 120 for acquiring the image. In response to the request, user 120 may acquire and transmit an up-to-date image of the area-of-interest. After receiving the image from user 120, server 135 may transmit the accepted incentive or agreed upon reward to user 120. The incentive may comprise a text notification and a redeemable coupon. In some embodiments, the incentive may include a redeemable coupon for a product associated with the area-of-interest. Server 135 may generate image-related data based on aggregation of data from images received from crowd sourcing and from images received from a plurality of cameras fixedly connected to store shelves. Additional details of this embodiment are described in Applicant's International Patent Application No. PCT/IB2017/000919, which is incorporated herein by reference.

With reference to FIG. 4C and consistent with the present disclosure, server 135 may receive image data captured by robotic devices with cameras traversing in aisle 400. The present disclosure is not limited to the type of robotic devices used to capture images of retail store 105. In some embodiments, the robotic devices may include a robot on a track (e.g., a Cartesian robot configured to move along an edge of a shelf or in parallel to a shelf, such as capturing device 125E), a drone (e.g., capturing device 125F), and/or a robot that may move on the floor of the retail store (e.g., a wheeled robot such as capturing device 125G, a legged robot, a snake-like robot, etc.). The robotic devices may be controlled by server 135 and may be operated remotely or autonomously. In one example, server 135 may instruct capturing device 125E to perform periodic scans at times when no customers or other obstructions are identified in aisle 400. Specifically, capturing device 125E may be configured to move along store shelf 404 and to capture images of products placed on store shelf 404, products placed on store shelf 406, or products located on shelves opposite store shelf (e.g., store shelf 408). In another example, server 135 may instruct capturing device 125F to perform a scan of all the area of retail store 105 before the opening hour. In another example, server 135 may instruct capturing device 125G to capture a specific area-of-interest, similar as described above with reference to receiving images acquired by the store employees. In some embodiments, robotic capturing devices (such as 125F and 125G) may include an internal processing unit that may allow them to navigate autonomously within retail store 105. For example, the robotic capturing devices may use input from sensors (e.g., image sensors, depth sensors, proximity sensors, etc.), to avoid collision with objects or people, and to complete the scan of the desired area of retail store 105.

As discussed above with reference to FIG. 4A, the image data representative of products displayed on store shelves may be acquired by a plurality of stationary capturing devices 125 fixedly mounted in the retail store. One advantage of having stationary image capturing devices spread throughout retail store 105 is the potential for acquiring product images from set locations and on an ongoing basis such that up-to-date product status may be determined for products throughout a retail store at any desired periodicity (e.g., in contrast to a moving camera system that may acquire product images more infrequently). However, there may be certain challenges in this approach. The distances and angles of the image capturing devices relative to the captured products should be selected such as to enable adequate product identification, especially when considered in view of image sensor resolution and/or optics specifications. For example, a capturing device placed on the ceiling of retail store 105 may have sufficient resolutions and optics to enable identification of large products (e.g., a pack of toilet paper), but may be insufficient for identifying smaller products (e.g., deodorant packages). The image capturing devices should not occupy shelf space that is reserved for products for sale. The image capturing devices should not be positioned in places where there is a likelihood that their fields of view will be regularly blocked by different objects. The image capturing devices should be able to function for long periods of time with minimum maintenance. For example, a requirement for frequent replacement of batteries may render certain image acquisition systems cumbersome to use, especially where many image acquisition devices are in use throughout multiple locations in a retail store and across multiple retail stores. The image capturing devices should also include processing capabilities and transmission capabilities for providing real time or near real time image data about products. The disclosed image acquisition systems address these challenges.

Figure 5A:
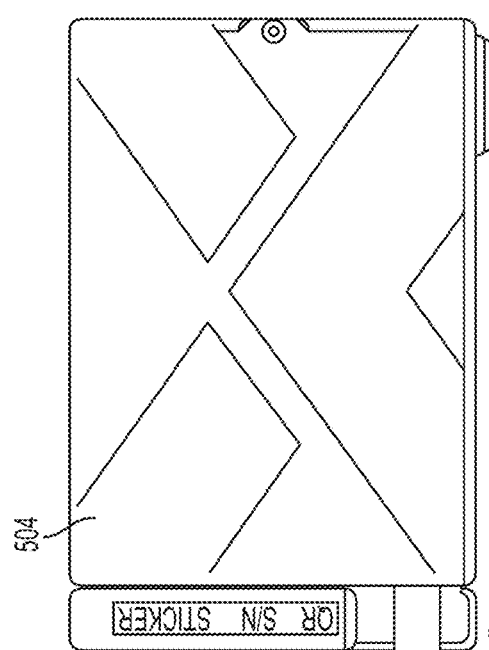
FIG. 5A is an illustration of an example system for acquiring images of products in a retail store, consistent with the present disclosure.

FIG. 5A illustrates an example of a system 500 for acquiring images of products in retail store 105. Throughout the disclosure, capturing device 125 may refer to a system, such as system 500 shown in FIG. 5A. As shown, system 500 may include a first housing 502 configured for location on a retail shelving unit (e.g., as illustrated in FIG. 5B), and a second housing 504 configured for location on the retail shelving unit separate from first housing 502. The first and the second housing may be configured for mounting on the retail shelving unit in any suitable way (e.g., screws, bolts, clamps, adhesives, magnets, mechanical means, chemical means, etc.). In some embodiments, first housing 502 may include an image capture device 506 (e.g., a camera module that may include image sensor 310) and second housing 504 may include at least one processor (e.g., processing device 302) configured to control image capture device 506 and also to control a network interface (e.g., network interface 306) for communicating with a remote server (e.g., server 135).

System 500 may also include a data conduit 508 extending between first housing 502 and second housing 504. Data conduit 508 may be configured to enable transfer of control signals from the at least one processor to image capture device 506 and to enable collection of image data acquired by image capture device 506 for transmission by the network interface. Consistent with the present disclosure, the term "data conduit" may refer to a communications channel that may include either a physical transmission medium such as a wire or a logical connection over a multiplexed medium such as a radio channel. In some embodiments, data conduit 508 may be used for conveying image data from image capture device 506 to at least one processor located in second housing 504. Consistent with one implementation of system 500, data conduit 508 may include flexible printed circuits and may have a length of at least about 5 cm, at least about 10 cm, at least about 15 cm, etc. The length of data conduit 508 may be adjustable to enable placement of first housing 502 separately from second housing 504. For example, in some embodiments, data conduit may be retractable within second housing 504 such that the length of data conduit exposed between first housing 502 and second housing 504 may be selectively adjusted.

In one embodiment, the length of data conduit 508 may enable first housing 502 to be mounted on a first side of a horizontal store shelf facing the aisle (e.g., store shelf 510 illustrated in FIG. 5B) and second housing 504 to be mounted on a second side of store shelf 510 that faces the direction of the ground (e.g., an underside of a store shelf). In this embodiment, data conduit 508 may be configured to bend around an edge of store shelf 510 or otherwise adhere/follow contours of the shelving unit. For example, a first portion of data conduit 508 may be configured for location on the first side of store shelf 510 (e.g., a side facing an opposing retail shelving unit across an aisle) and a second portion of data conduit 508 may be configured for location on a second side of store shelf 510 (e.g., an underside of the shelf, which in some cases may be orthogonal to the first side). The second portion of data conduit 508 may be longer than the first portion of data conduit 508. Consistent with another embodiment, data conduit 508 may be configured for location within an envelope of a store shelf. For example, the envelope may include the outer boundaries of a channel located within a store shelf, a region on an underside of an L-shaped store shelf, a region between two store shelves, etc. Consistent with another implementation of system 500 discussed below, data conduit 508 may include a virtual conduit associated with a wireless communications link between first housing 502 and second housing 504.

FIG. 5B illustrates an exemplary configuration for mounting first housing 502 on store shelf 510. Consistent with the present disclosure, first housing 502 may be placed on store shelf 510, next to or embedded in a plastic cover that may be used for displaying prices. Alternatively, first housing 502 may be placed or mounted on any other location in retail store 105. For example, first housing 502 may be placed or mounted on the walls, on the ceiling, on refrigerator units, on display units, and more. The location and/or orientation of first housing 502 may be selected such that a field of view of image capture device 506 may cover at least a portion of an opposing retail shelving unit. Consistent with the present disclosure, image capture device 506 may have a view angle of between 50 and 80 degrees, about 62 degrees, about 67 degrees, or about 75 degrees. Consistent with the present disclosure, image capture device 506 may include an image sensor having sufficient image resolution to enable detection of text associated with labels on an opposing retail shelving unit. In one embodiment, the image sensor may include m*n pixels. For example, image capture device 506 may have an 8 MP image sensor that includes an array of 3280*2464 pixels. Each pixel may include at least one photo-voltaic cell that converts the photons of the incident light to an electric signal. The electrical signal may be converted to digital data by an A/D converter and processed by the image processor (ISP). In one embodiment, the image sensor of image capture device 506 may be associated with a pixel size of between $1.1 \times 1.1$ um$^2$ and $1.7 \times 1.7$ um$^2$, for example, $1.4 \times 1.4$ um$^2$.

Figure 6A:
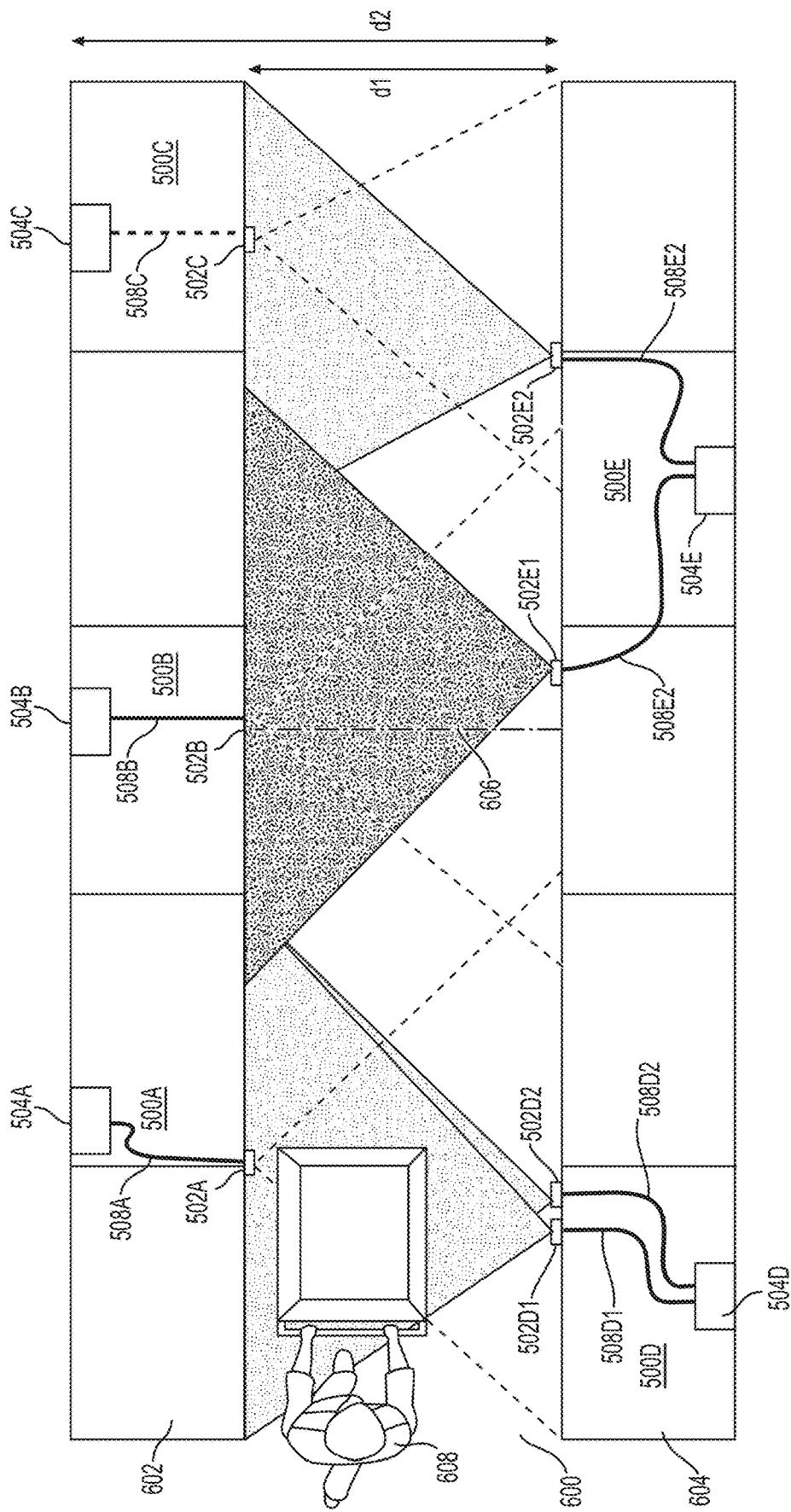
FIG. 6A is a top view representation of an aisle in a retail store with multiple image acquisition systems deployed thereon for acquiring images of products, consistent with the present disclosure.

Consistent with the present disclosure, image capture device 506 may be associated with a lens (e.g., lens 312) having a fixed focal length selected according to a distance expected to be encountered between retail shelving units on opposite sides of an aisle (e.g., distance d1 shown in FIG. 6A) and/or according to a distance expected to be encountered between a side of a shelving unit facing the aisle on one side of an aisle and a side of a shelving unit facing away of the aisle on the other side of the aisle (e.g., distance d2 shown in FIG. 6A). The focal length may also be based on any other expected distance between the image acquisition device and products to be imaged. As used herein, the term "focal length" refers to the distance from the optical center of the lens to a point where objects located at the point are substantially brought into focus. In contrast to zoom lenses, in fixed lenses the focus is not adjustable. The focus is typically set at the time of lens design and remains fixed. In one embodiment, the focal length of lens 312 may be selected based on the distance between two sides of aisles in the retail store (e.g., distance d1, distance d2, and so forth). In some embodiments, image capture device 506 may include a lens with a fixed focal length having a fixed value between 2.5 mm and 4.5 mm, such as about 3.1 mm, about 3.4 mm, about 3.7 mm. For example, when distance d1 between two opposing retail shelving units is about 2 meters, the focal length of the lens may be about 3.6 mm. Unless indicated otherwise, the term "about" with regards to a numeric value is defined as a variance of up to 5% with respect to the stated value. Of course, image capture devices having non-fixed focal lengths may also be used depending on the requirements of certain imaging environments, the power and space resources available, etc.

Figure 5C:
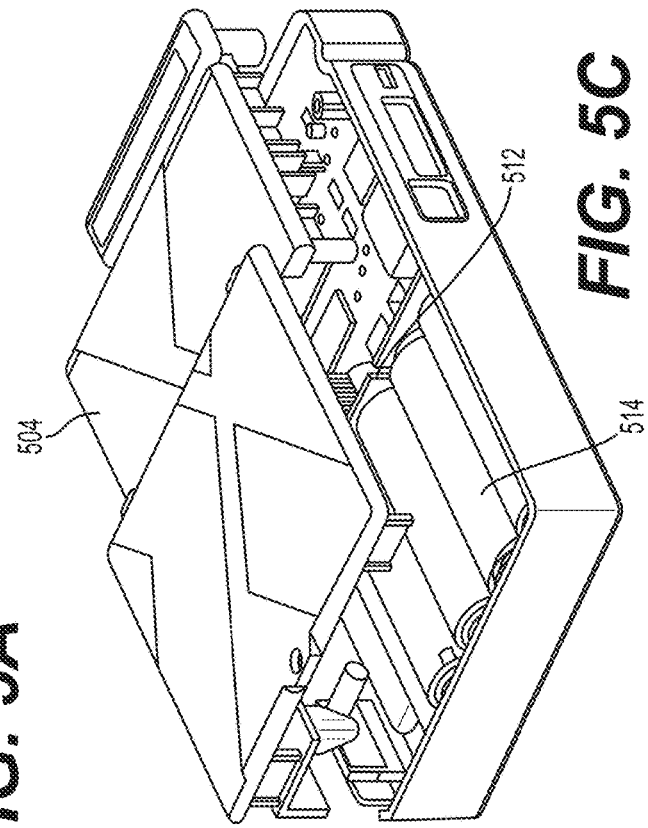
FIG. 5C is an exploded view illustration of a processing unit included in a second housing of the example system of FIG. 5A, consistent with the present disclosure.
Figure 5B:
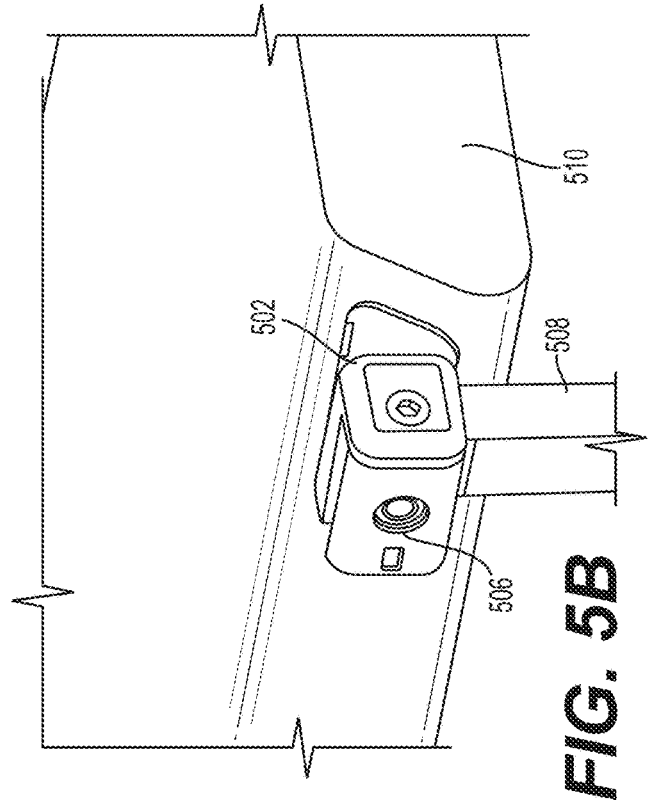
FIG. 5B is an illustration of a shelf-mounted camera unit included in a first housing of the example system of FIG. 5A, consistent with the present disclosure.

FIG. 5C illustrates an exploded view of second housing 504. In some embodiments, the network interface located in second housing 504 (e.g., network interface 306) may be configured to transmit to server 135 information associated with a plurality of images captured by image capture device 506. For example, the transmitted information may be used to determine if a disparity exists between at least one contractual obligation (e.g. planogram) and product placement. In one example, the network interface may support transmission speeds of 0.5 Mb/s, 1 Mb/s, 5 Mb/s, or more. Consistent with the present disclosure, the network interface may allow different modes of operations to be selected, such as: high-speed, slope-control, or standby. In high-speed mode, associated output drivers may have fast output rise and fall times to support high-speed bus rates; in slope-control, the electromagnetic interference may be reduced and the slope (i.e., the change of voltage per unit of time) may be proportional to the current output; and in standby mode, the transmitter may be switched off and the receiver may operate at a lower current.

Figure 6B:
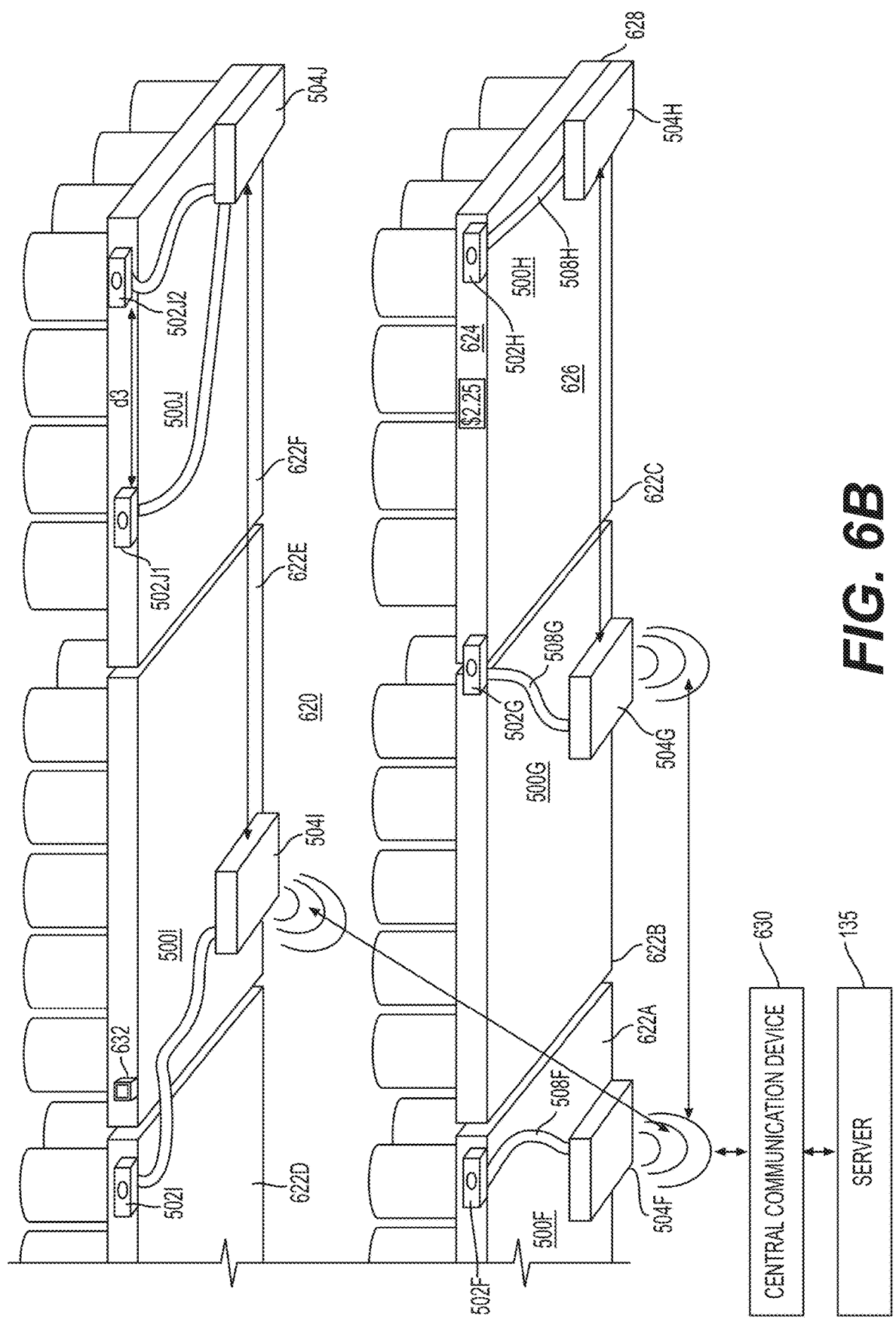
FIG. 6B is a perspective view representation of part of a retail shelving unit with multiple image acquisition systems deployed thereon for acquiring images of products, consistent with the present disclosure.

Consistent with the present disclosure, second housing 504 may include a power port 512 for conveying energy from a power source to first housing 502. In one embodiment, second housing 504 may include a section for at least one mobile power source 514 (e.g., in the depicted configuration the section is configured to house four batteries). The at least one mobile power source may provide sufficient power to enable image capture device 506 to acquire more than 1,000 pictures, more than 5,000 pictures, more than 10,000 pictures, or more than 15,000 pictures, and to transmit them to server 135. In one embodiment, mobile power source 514 located in a single second housing 504 may power two or more image capture devices 506 mounted on the store shelf. For example, as depicted in FIGS. 6A and 6B, a single second housing 504 may be connected to a plurality of first housings 502 with a plurality of image capture devices 506 covering different (overlapping or non-overlapping) fields of view. Accordingly, the two or more image capture devices 506 may be powered by a single mobile power source 514 and/or the data captured by two or more image capture devices 506 may be processed to generate a panoramic image by a single processing device located in second housing 504. In addition to mobile power source 514 or as an alternative to mobile power source 514, second housing 504 may also be connected to an external power source. For example, second housing 504 may be mounted to a store shelf and connected to an electric power grid. In this example, power port 512 may be connected to the store shelf through a wire for providing electrical power to image capture device 506. In another example, a retail shelving unit or retail store 105 may include a wireless power transmission system, and power port 512 may be connected to a device configured to obtain electrical power from the wireless power transmission system. In addition, as discussed below, system 500 may use power management policies to reduce the power consumption. For example, system 500 may use selective image capturing and/or selective transmission of images to reduce the power consumption or conserve power.

FIG. 6A illustrates a schematic diagram of a top view of aisle 600 in retail store 105 with multiple image acquisition systems 500 (e.g., 500A, 500B, 500C, 500D, and 500E) deployed thereon for acquiring images of products. Aisle 600 may include a first retail shelving unit 602 and a second retail shelving unit 604 that opposes first retail shelving unit 602. In some embodiments, different numbers of systems 500 may be mounted on opposing retail shelving units. For example, system 500A (including first housing 502A, second housing 504A, and data conduit 508A), system 500B (including first housing 502B second housing 504B, and data conduit 508B), and system 500C (including first housing 502C, second housing 504C, and data conduit 508C) may be mounted on first retail shelving unit 602; and system 500D (including first housing 502D1, first housing 502D2, second housing 504D, and data conduits 508D1 and 508D2) and system 500E (including first housing 502E1, first housing 502E2, second housing 504E, and data conduits 508E1 and 508E2) may be mounted on second retail shelving unit 604. Consistent with the present disclosure, image capture device 506 may be configured relative to first housing 502 such that an optical axis of image capture device 506 is directed toward an opposing retail shelving unit when first housing 502 is fixedly mounted on a retail shelving unit. For example, optical axis 606 of the image capture device associated with first housing 502B may be directed towards second retail shelving unit 604 when first housing 502B is fixedly mounted on first retail shelving unit 602. A single retail shelving unit may hold a number of systems 500 that include a plurality of image capturing devices. Each of the image capturing devices may be associated with a different field of view directed toward the opposing retail shelving unit. Different vantage points of differently located image capture devices may enable image acquisition relative to different sections of a retail shelf. For example, at least some of the plurality of image capturing devices may be fixedly mounted on shelves at different heights. Examples of such a deployment are illustrated in FIGS. 4A and 6B.

As shown in FIG. 6A each first housing 502 may be associated with a data conduit 508 that enables exchanging of information (e.g., image data, control signals, etc.) between the at least one processor located in second housing 504 and image capture device 506 located in first housing 502. In some embodiments, data conduit 508 may include a wired connection that supports data-transfer and may be used to power image capture device 506 (e.g., data conduit 508A, data conduit 508B, data conduit 508D1, data conduit 508D2, data conduit 508E1, and data conduit 508E2). Consistent with these embodiments, data conduit 508 may comply with a wired standard such as USB, Micro-USB, HDMI, Micro-HDMI, Firewire, Apple, etc. In other embodiments, data conduit 508 may be a wireless connection, such as a dedicated communications channel between the at least one processor located in second housing 504 and image capture device 506 located in first housing 502 (e.g., data conduit 508C). In one example, the communications channel may be established by two Near Field Communication (NFC) transceivers. In other examples, first housing 502 and second housing 504 may include interface circuits that comply with other short-range wireless standards such as Bluetooth, WiFi, ZigBee, etc.

In some embodiments of the disclosure, the at least one processor of system 500 may cause at least one image capture device 506 to periodically capture images of products located on an opposing retail shelving unit (e.g., images of products located on a shelf across an aisle from the shelf on which first housing 502 is mounted). The term "periodically capturing images" includes capturing an image or images at predetermined time intervals (e.g., every minute, every 30 minutes, every 150 minutes, every 300 minutes, etc.), capturing video, capturing an image every time a status request is received, and/or capturing an image subsequent to receiving input from an additional sensor, for example, an associated proximity sensor. Images may also be captured based on various other triggers or in response to various other detected events. In some embodiments, system 500 may receive an output signal from at least one sensor located on an opposing retail shelving unit. For example, system 500B may receive output signals from a sensing system located on second retail shelving unit 604. The output signals may be indicative of a sensed lifting of a product from second retail shelving unit 604 or a sensed positioning of a product on second retail shelving unit 604. In response to receiving the output signal from the at least one sensor located on second retail shelving unit 604, system 500B may cause image capture device 506 to capture one or more images of second retail shelving unit 604. Additional details on a sensing system, including the at least one sensor that generates output signals indicative of a sensed lifting of a product from an opposing retail shelving unit, is discussed below with reference to FIGS. 8-10.

Consistent with embodiments of the disclosure, system 500 may detect an object 608 in a selected area between first retail shelving unit 602 and second retail shelving unit 604. Such detection may be based on the output of one or more dedicated sensors (e.g., motion detectors, etc.) and/or may be based on image analysis of one or more images acquired by an image acquisition device. Such images, for example, may include a representation of a person or other object recognizable through various image analysis techniques (e.g., trained neural networks, Fourier transform analysis, edge detection, filters, face recognition, etc.). The selected area may be associated with distance d1 between first retail shelving unit 602 and second retail shelving unit 604. The selected area may be within the field of view of image capture device 506 or an area where the object causes an occlusion of a region of interest (such as a shelf, a portion of a shelf being monitored, and more). Upon detecting object 608, system 500 may cause image capture device 506 to forgo image acquisition while object 608 is within the selected area. In one example, object 608 may be an individual, such as a customer or a store employee. In another example, detected object 608 may be an inanimate object, such as a cart, box, carton, one or more products, cleaning robots, etc. In the example illustrated in FIG. 6A, system 500A may detect that object 608 has entered into its associated field of view (e.g., using a proximity sensor) and may instruct image capturing device 506 to forgo image acquisition. In alternative embodiments, system 500 may analyze a plurality of images acquired by image capture device 506 and identify at least one image of the plurality of images that includes a representation of object 608. Thereafter, system 500 may avoid transmission of at least part of the at least one identified image and/or information based on the at least one identified image to server 135.

As shown in FIG. 6A, the at least one processor contained in a second housing 504 may control a plurality of image capture devices 506 contained in a plurality of first housings 502 (e.g., systems 500D and 500E). Controlling image capturing device 506 may include instructing image capturing device 506 to capture an image and/or transmit captured images to a remote server (e.g., server 135). In some cases, each of the plurality of image capture devices 506 may have a field of view that at least partially overlaps with a field of view of at least one other image capture device 506 from among plurality of image capture devices 506. In one embodiment, the plurality of image capture devices 506 may be configured for location on one or more horizontal shelves and may be directed to substantially different areas of the opposing first retail shelving unit. In this embodiment, the at least one processor may control the plurality of image capture devices such that each of the plurality of image capture devices may capture an image at a different time. For example, system 500E may have a second housing 504E with at least one processor that may instruct a first image capturing device contained in first housing 502E1 to capture an image at a first time and may instruct a second image capturing device contained in first housing 502E2 to capture an image at a second time which differs from the first time. Capturing images in different times (or forwarding them to the at least one processor at different times) may assist in processing the images and writing the images in the memory associated with the at least one processor.

FIG. 6B illustrates a perspective view assembly diagram depicting a portion of a retail shelving unit 620 with multiple systems 500 (e.g., 500F, 500G, 500H, 500I, and 500J) deployed thereon for acquiring images of products. Retail shelving unit 620 may include horizontal shelves at different heights. For example, horizontal shelves 622A, 622B, and 622C are located below horizontal shelves 622D, 622E, and 622F. In some embodiments, a different number of systems 500 may be mounted on shelves at different heights. For example, system 500F (including first housing 502F and second housing 504F), system 500G (including first housing 502G and second housing 504G), and system 500H (including first housing 502H and second housing 504H) may be mounted on horizontal shelves associated with a first height; and system 500I (including first housing 502I, second housing 504I, and a projector 632) and system 500J (including first housing 502J1, first housing 502J2, and second housing 504J) may be mounted on horizontal shelves associated with a second height. In some embodiments, retail shelving unit 620 may include a horizontal shelf with at least one designated place (not shown) for mounting a housing of image capturing device 506. The at least one designated place may be associated with connectors such that first housing 502 may be fixedly mounted on a side of horizontal shelf 622 facing an opposing retail shelving unit using the connectors.

Consistent with the present disclosure, system 500 may be mounted on a retail shelving unit that includes at least two adjacent horizontal shelves (e.g., shelves 622A and 622B) forming a substantially continuous surface for product placement. The store shelves may include standard store shelves or customized store shelves. A length of each store shelf 622 may be at least 50 cm, less than 200 cm, or between 75 cm to 175 cm. In one embodiment, first housing 502 may be fixedly mounted on the retail shelving unit in a slit between two adjacent horizontal shelves. For example, first housing 502G may be fixedly mounted on retail shelving unit 620 in a slit between horizontal shelf 622B and horizontal shelf 622C. In another embodiment, first housing 502 may be fixedly mounted on a first shelf and second housing 504 may be fixedly mounted on a second shelf. For example, first housing 502I may be mounted on horizontal shelf 622D and second housing 504I may be mounted on horizontal shelf 622E. In another embodiment, first housing 502 may be fixedly mounted on a retail shelving unit on a first side of a horizontal shelf facing the opposing retail shelving unit and second housing 504 may be fixedly mounted on retail shelving unit 620 on a second side of the horizontal shelf orthogonal to the first side. For example, first housing 502H may be mounted on a first side 624 of horizontal shelf 622C next to a label and second housing 504H may be mounted on a second side 626 of horizontal shelf 622C that faces down (e.g., towards the ground or towards a lower shelf). In another embodiment, second housing 504 may be mounted closer to the back of the horizontal shelf than to the front of the horizontal shelf. For example, second housing 504H may be fixedly mounted on horizontal shelf 622C on second side 626 closer to third side 628 of the horizontal shelf 622C than to first side 624. Third side 628 may be parallel to first side 624. As mentioned above, data conduit 508 (e.g., data conduit 508H) may have an adjustable or selectable length for extending between first housing 502 and second housing 504. In one embodiment, when first housing 502H is fixedly mounted on first side 624, the length of data conduit 508H may enable second housing 604H to be fixedly mounted on second side 626 closer to third side 628 than to first side 624.

As mentioned above, at least one processor contained in a single second housing 504 may control a plurality of image capture devices 506 contained in a plurality of first housings 502 (e.g., system 500J). In some embodiments, the plurality of image capture devices 506 may be configured for location on a single horizontal shelf and may be directed to substantially the same area of the opposing first retail shelving unit (e.g., system 500D in FIG. 6A). In these embodiments, the image data acquired by the first image capture device and the second image capture device may enable a calculation of depth information (e.g., based on image parallax information) associated with at least one product positioned on an opposing retail shelving unit. For example, system 500J may have single second housing 504J with at least one processor that may control a first image capturing device contained in first housing 502J1 and a second image capturing device contained in first housing 502J2. The distance d3 between the first image capture device contained in first housing 502J1 and the second image capture device contained in first housing 502J2 may be selected based on the distance between retail shelving unit 620 and the opposing retail shelving unit (e.g., similar to d1 and/or d2). For example, distance d3 may be at least 5 cm, at least 10 cm, at least 15 cm, less than 40 cm, less than 30 cm, between about 5 cm to about 20 cm, or between about 10 cm to about 15 cm. In another example, d3 may be a function of d1 and/or d2, a linear function of d1 and/or d2, a function of $d1*\log(d1)$ and/or $d2*\log(d2)$ such as $a1*d1*\log(d1)$ for some constant a1, and so forth. The data from the first image capturing device contained in first housing 502J1 and the second image capturing device contained in first housing 502J2 may be used to estimate the number of products on a store shelf of retail shelving unit 602. In related embodiments, system 500 may control a projector (e.g., projector 632) and image capture device 506 that are configured for location on a single store shelf or on two separate store shelves. For example, projector 632 may be mounted on horizontal shelf 622E and image capture device 5061 may be mounted on horizontal shelf 622D. The image data acquired by image capture device 506 (e.g., included in first housing 502I) may include reflections of light patterns projected from projector 632 on the at least one product and/or the opposing retail shelving unit and may enable a calculation of depth information associated with at least one product positioned on the opposing retail shelving unit. The distance between projector 632 and the image capture device contained in first housing 502I may be selected based on the distance between retail shelving unit 620 and the opposing retail shelving unit (e.g., similar to d1 and/or d2). For example, the distance between the projector and the image capture device may be at least 5 cm, at least 10 cm, at least 15 cm, less than 40 cm, less than 30 cm, between about 5 cm to about 20 cm, or between about 10 cm to about 15 cm. In another example, the distance between the projector and the image capture device may be a function of d1 and/or d2, a linear function of d1 and/or d2, a function of $d1*\log(d1)$ and/or $d2*\log(d2)$ such as $a1*d1*\log(d1)$ for some constant a1, and so forth.

Consistent with the present disclosure, a central communication device 630 may be located in retail store 105 and may be configured to communicate with server 135 (e.g., via an Internet connection). The central communication device may also communicate with a plurality of systems 500 (for example, less than ten, ten, eleven, twelve, more than twelve, and so forth). In some cases, at least one system of the plurality of systems 500 may be located in proximity to central communication device 630. In the illustrated example, system 500F may be located in proximity to central communication device 630. In some embodiments, at least some of systems 500 may communicate directly with at least one other system 500. The communications between some of the plurality of systems 500 may happen via a wired connection, such as the communications between system 500J and system 500I and the communications between system 500H and system 500G. Additionally or alternatively, the communications between some of the plurality of systems 500 may occur via a wireless connection, such as the communications between system 500G and system 500F and the communications between system 500I and system 500F. In some examples, at least one system 500 may be configured to transmit captured image data (or information derived from the captured image data) to central communication device 630 via at least two mediating systems 500, at least three mediating systems 500, at least four mediating systems 500, or more. For example, system 500J may convey captured image data to central communication device 630 via system 500I and system 500F.

Consistent with the present disclosure, two (or more) systems 500 may share information to improve image acquisition. For example, system 500J may be configured to receive from a neighboring system 500I information associated with an event that system 500I had identified, and control image capture device 506 based on the received information. For example, system 500J may forgo image acquisition based on an indication from system 500I that an object has entered or is about to enter its field of view. Systems 500I and 500J may have overlapping fields of view or non-overlapping fields of view. In addition, system 500J may also receive (from system 500I) information that originates from central communication device 630 and control image capture device 506 based on the received information. For example, system 500I may receive instructions from central communication device 630 to capture an image when supplier 115 inquiries about a specific product that is placed in a retail unit opposing system 500I. In some embodiments, a plurality of systems 500 may communicate with central communication device 630. In order to reduce or avoid network congestion, each system 500 may identify an available transmission time slot. Thereafter, each system 500 may determine a default time slot for future transmissions based on the identified transmission time slot.

Figure 6C:
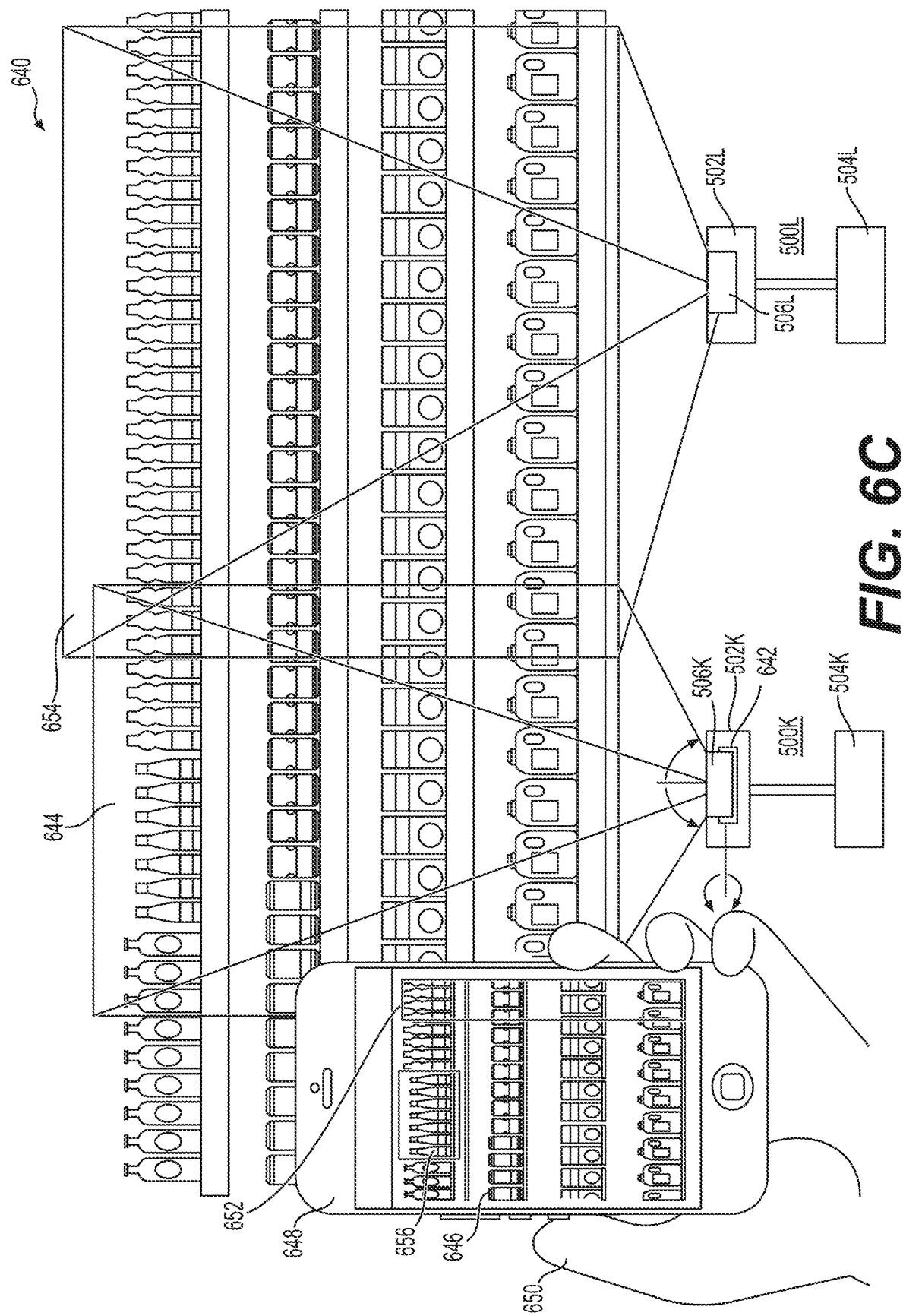
FIG. 6C provides a diagrammatic representation of how the exemplary disclosed image acquisition systems may be positioned relative to retail shelving to acquire product images, consistent with the present disclosure.

FIG. 6C provides a diagrammatic representation of a retail shelving unit 640 being captured by multiple systems 500 (e.g., system 500K and system 500L) deployed on an opposing retail shelving unit (not shown). FIG. 6C illustrates embodiments associated with the process of installing systems 500 in retail store 105. To facilitate the installation of system 500, each first housing 502 (e.g., first housing 502K) may include an adjustment mechanism 642 for setting a field of view 644 of image capture device 506K such that the field of view 644 will at least partially encompass products placed both on a bottom shelf of retail shelving unit 640 and on a top shelf of retail shelving unit 640. For example, adjustment mechanism 642 may enable setting the position of image capture device 506K relative to first housing 502K. Adjustment mechanism 642 may have at least two degrees of freedom to separately adjust manually (or automatically) the vertical field of view and the horizontal field of view of image capture device 506K. In one embodiment, the angle of image capture device 506K may be measured using position sensors associated with adjustment mechanism 642, and the measured orientation may be used to determine if image capture device 506K is positioned in the right direction. In one example, the output of the position sensors may be displayed on a handheld device of an employee installing image capturing device 506K. Such an arrangement may provide the employee/installer with real time visual feedback representative of the field of view of an image acquisition device being installed.

In addition to adjustment mechanism 642, first housing 502 may include a first physical adapter (not shown) configured to operate with multiple types of image capture device 506 and a second physical adapter (not shown) configured to operate with multiple types of lenses. During installation, the first physical adapter may be used to connect a suitable image capture device 506 to system 500 according to the level of recognition requested (e.g., detecting a barcode from products, detecting text and price from labels, detecting different categories of products, etc.). Similarly, during installation, the second physical adapter may be used to associate a suitable lens to image capture device 506 according to the physical conditions at the store (e.g., the distance between the aisles, the horizontal field of view required from image capture device 506, and/or the vertical field of view required from image capture device 506). The second physical adapter provides the employee/installer the ability to select the focal length of lens 312 during installation according to the distance between retail shelving units on opposite sides of an aisle (e.g., distance d1 and/or distance d2 shown in FIG. 6A). In some embodiments, adjustment mechanism 642 may include a locking mechanism to reduce the likelihood of unintentional changes in the field of view of image capture device 506. Additionally or alternatively, the at least one processor contained in second housing 504 may detect changes in the field of view of image capture device 506 and issue a warning when a change is detected, when a change larger than a selected threshold is detected, when a change is detected for a duration longer than a selected threshold, and so forth.

In addition to adjustment mechanism 642 and the different physical adapters, system 500 may modify the image data acquired by image capture device 506 based on at least one attribute associated with opposing retail shelving unit 640. Consistent with the present disclosure, the at least one attribute associated with retail shelving unit 640 may include a lighting condition, the dimensions of opposing retail shelving unit 640, the size of products displayed on opposing retail shelving unit 640, the type of labels used on opposing retail shelving unit 640, and more. In some embodiments, the attribute may be determined, based on analysis of one or more acquired images, by at least one processor contained in second housing 504. Alternatively, the attribute may be automatically sensed and conveyed to the at least one processor contained in second housing 504. In one example, the at least one processor may change the brightness of captured images based on the detected light conditions. In another example, the at least one processor may modify the image data by cropping the image such that it will include only the products on retail shelving unit (e.g., not to include the floor or the ceiling), only area of the shelving unit relevant to a selected task (such as planogram compliance check), and so forth.

Consistent with the present disclosure, during installation, system 500 may enable real-time display 646 of field of view 644 on a handheld device 648 of a user 650 installing image capturing device 506K. In one embodiment, real-time display 646 of field of view 644 may include augmented markings 652 indicating a location of a field of view 654 of an adjacent image capture device 506L. In another embodiment, real-time display 646 of field of view 644 may include augmented markings 656 indicating a region of interest in opposing retail shelving unit 640. The region of interest may be determined based on a planogram, identified product type, and/or part of retail shelving unit 640. For example, the region of interest may include products with a greater likelihood of planogram incompliance. In addition, system 500K may analyze acquired images to determine if field of view 644 includes the area that image capturing device 506K is supposed to monitor (for example, from labels on opposing retail shelving unit 640, products on opposing retail shelving unit 640, images captured from other image capturing devices that may capture other parts of opposing retail shelving unit 640 or capture the same part of opposing retail shelving unit 640 but in a lower resolution or at a lower frequency, and so forth). In additional embodiments, system 500 may further comprise an indoor location sensor which may help determine if the system 500 is positioned at the right location in retail store 105.

In some embodiments, an anti-theft device may be located in at least one of first housing 502 and second housing 504. For example, the anti-theft device may include a specific RF label or a pin-tag radio-frequency identification device, which may be the same or similar to a type of anti-theft device that is used by retail store 105 in which system 500 is located. The RF label or the pin-tag may be incorporated within the body of first housing 502 and second housing 504 and may not be visible. In another example, the anti-theft device may include a motion sensor whose output may be used to trigger an alarm in the case of motion or disturbance, in case of motion that is above a selected threshold, and so forth.

Figure 7A:
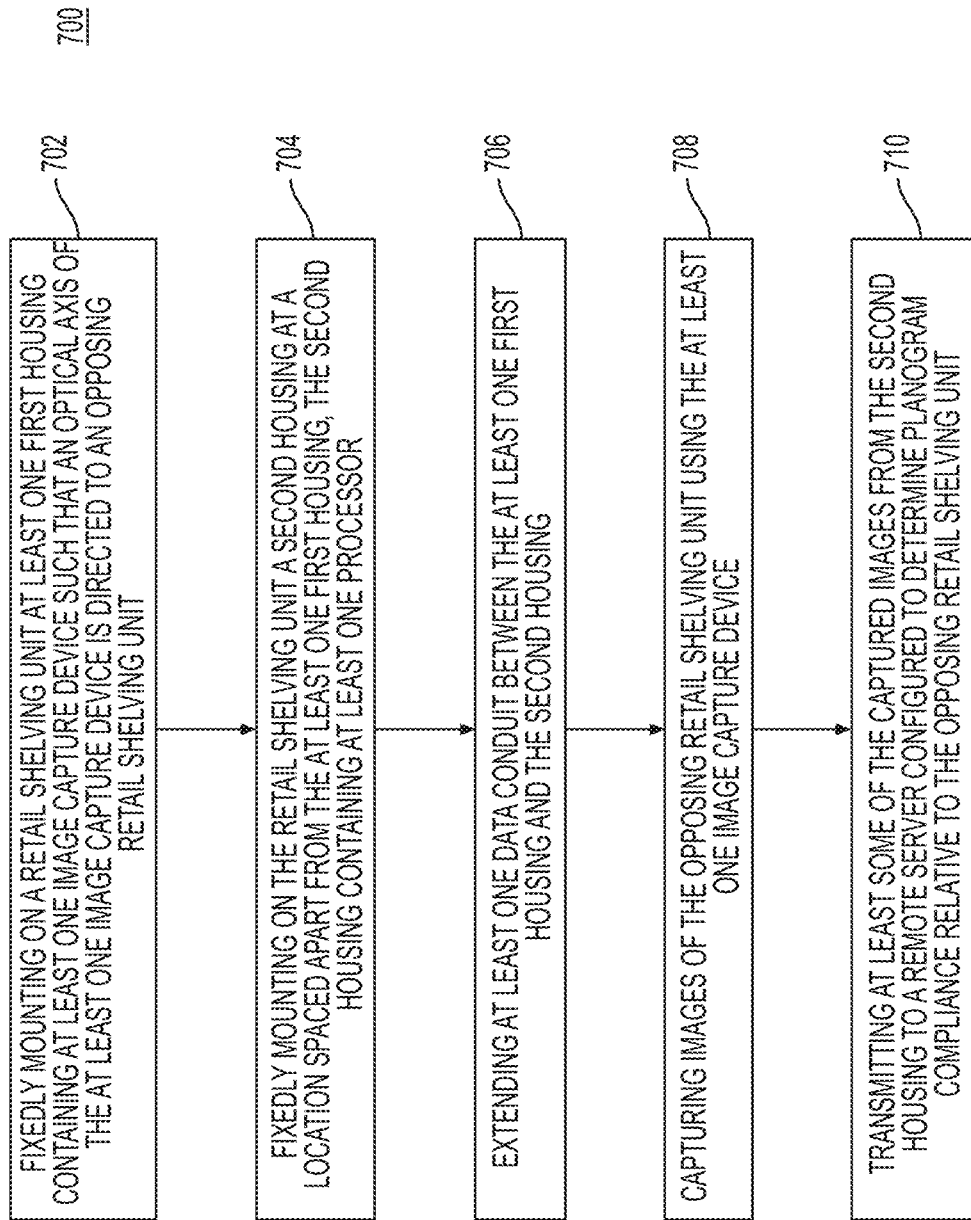
FIG. 7A provides a flowchart of an exemplary method for acquiring images of products in retail store, consistent with the present disclosure.

FIG. 7A includes a flowchart representing an exemplary method 700 for acquiring images of products in retail store 105 in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method can be altered to modify the order of steps, delete steps, or further include additional steps.

At step 702, the method includes fixedly mounting on first retail shelving unit 602 at least one first housing 502 containing at least one image capture device 506 such that an optical axis (e.g., optical axis 606) of at least one image capture device 506 is directed to second retail shelving unit 604. In one embodiment, fixedly mounting first housing 502 on first retail shelving unit 602 may include placing first housing 502 on a side of store shelf 622 facing second retail shelving unit 604. In another embodiment, fixedly mounting first housing 502 on retail shelving unit 602 may include placing first housing 502 in a slit between two adjacent horizontal shelves. In some embodiments, the method may further include fixedly mounting on first retail shelving unit 602 at least one projector (such as projector 632) such that light patterns projected by the at least one projector are directed to second retail shelving unit 604. In one embodiment, the method may include mounting the at least one projector to first retail shelving unit 602 at a selected distance to first housing 502 with image capture device 506. In one embodiment, the selected distance may be at least 5 cm, at least 10 cm, at least 15 cm, less than 40 cm, less than 30 cm, between about 5 cm to about 20 cm, or between about 10 cm to about 15 cm. In one embodiment, the selected distance may be calculated according to a distance between to first retail shelving unit 602 and second retail shelving unit 604, such as d1 and/or d2, for example selecting the distance to be a function of d1 and/or d2, a linear function of d1 and/or d2, a function of d1*log(d1) and/or d2*log(d2) such as a1*d1*log(d1) for some constant a1, and so forth.

At step 704, the method includes fixedly mounting on first retail shelving unit 602 second housing 504 at a location spaced apart from the at least one first housing 502, second housing 504 may include at least one processor (e.g., processing device 302). In one embodiment, fixedly mounting second housing 504 on the retail shelving unit may include placing second housing 504 on a different side of store shelf 622 than the side first housing 502 is mounted on.

At step 706, the method includes extending at least one data conduit 508 between at least one first housing 502 and second housing 504. In one embodiment, extending at least one data conduit 508 between at least one first housing 502 and second housing 504 may include adjusting the length of data conduit 508 to enable first housing 502 to be mounted separately from second housing 504. At step 708, the method includes capturing images of second retail shelving unit 604 using at least one image capture device 506 contained in at least one first housing 502 (e.g., first housing 502A, first housing 502B, or first housing 502C). In one embodiment, the method further includes periodically capturing images of products located on second retail shelving unit 604. In another embodiment the method includes capturing images of second retail shelving unit 604 after receiving a trigger from at least one additional sensor in communication with system 500 (wireless or wired).

At step 710, the method includes transmitting at least some of the captured images from second housing 504 to a remote server (e.g., server 135) configured to determine planogram compliance relative to second retail shelving unit 604. In some embodiments, determining planogram compliance relative to second retail shelving unit 604 may include determining at least one characteristic of planogram compliance based on detected differences between the at least one planogram and the actual placement of the plurality of product types on second retail shelving unit 604. Consistent with the present disclosure, the characteristic of planogram compliance may include at least one of: product facing, product placement, planogram compatibility, price correlation, promotion execution, product homogeneity, restocking rate, and planogram compliance of adjacent products.

Figure 7B:
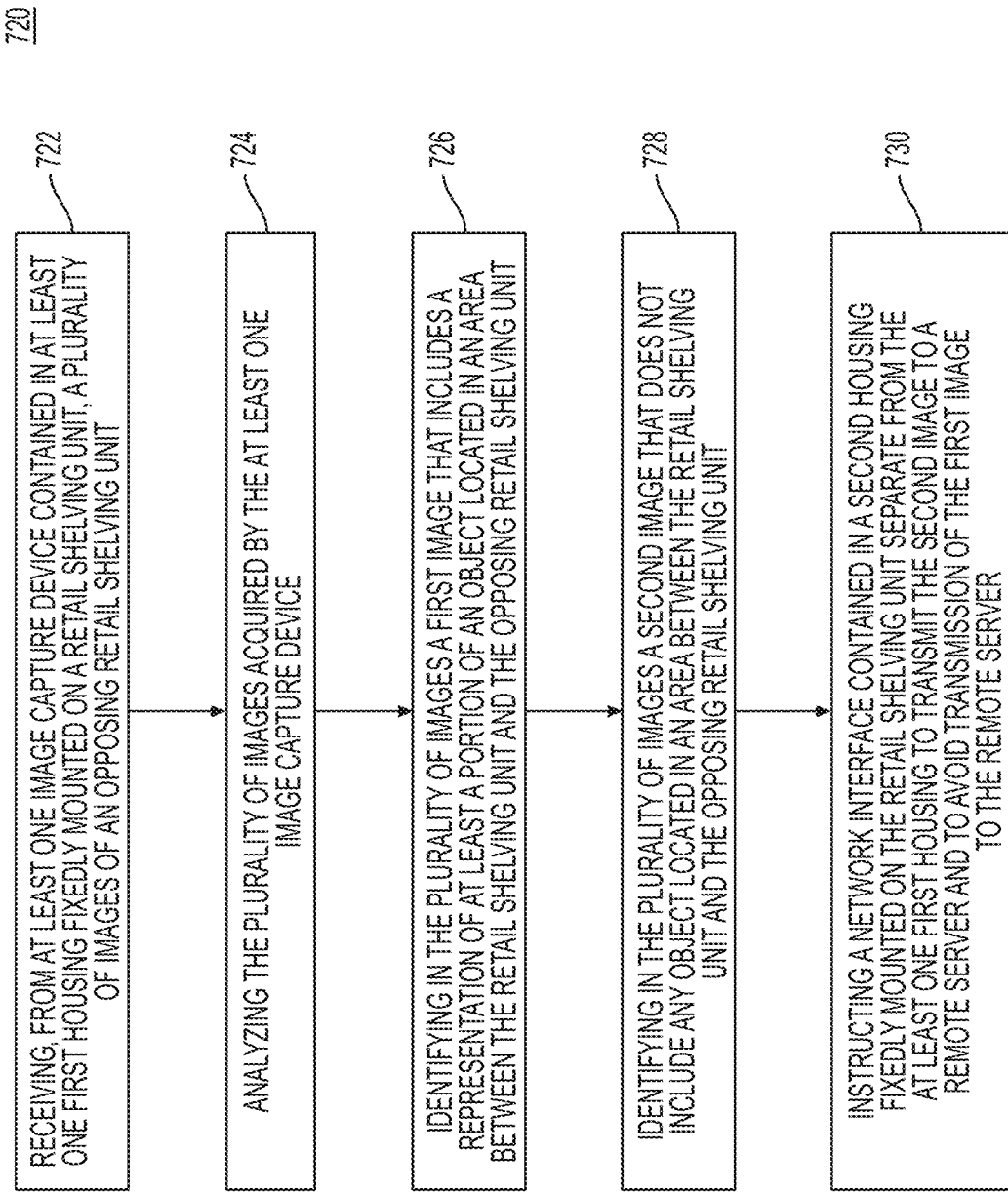
FIG. 7B provides a flowchart of a method for acquiring images of products in retail store, consistent with the present disclosure.

FIG. 7B provides a flowchart representing an exemplary method 720 for acquiring images of products in retail store 105, in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method can be altered to modify the order of steps, delete steps, or further include additional steps.

At step 722, at least one processor contained in a second housing may receive from at least one image capture device contained in at least one first housing fixedly mounted on a retail shelving unit a plurality of images of an opposing retail shelving unit. For example, at least one processor contained in second housing 504A may receive from at least one image capture device 506 contained in first housing 502A (fixedly mounted on first retail shelving unit 602) a plurality of images of second retail shelving unit 604. The plurality of images may be captured and collected during a period of time (e.g., a minute, an hour, six hours, a day, a week, or more).

At step 724, the at least one processor contained in the second housing may analyze the plurality of images acquired by the at least one image capture device. In one embodiment, at least one processor contained in second housing 504A may use any suitable image analysis technique (for example, object recognition, object detection, image segmentation, feature extraction, optical character recognition (OCR), object-based image analysis, shape region techniques, edge detection techniques, pixel-based detection, artificial neural networks, convolutional neural networks, etc.) to identify objects in the plurality of images. In one example, the at least one processor contained in second housing 504A may determine the number of products located in second retail shelving unit 604. In another example, the at least one processor contained in second housing 504A may detect one or more objects in an area between first retail shelving unit 602 and second retail shelving unit 604.

At step 726, the at least one processor contained in the second housing may identify in the plurality of images a first image that includes a representation of at least a portion of an object located in an area between the retail shelving unit and the opposing retail shelving unit. In step 728, the at least one processor contained in the second housing may identify in the plurality of images a second image that does not include any object located in an area between the retail shelving unit and the opposing retail shelving unit. In one example, the object in the first image may be an individual, such as a customer or a store employee. In another example, the object in the first image may be an inanimate object, such as carts, boxes, products, etc.

At step 730, the at least one processor contained in the second housing may instruct a network interface contained in the second housing, fixedly mounted on the retail shelving unit separate from the at least one first housing, to transmit the second image to a remote server and to avoid transmission of the first image to the remote server. In addition, the at least one processor may issue a notification when an object blocks the field of view of the image capturing device for more than a predefined period of time (e.g., at least 30 minutes, at least 75 minutes, at least 150 minutes).

Embodiments of the present disclosure may automatically assess compliance of one or more store shelves with a planogram. For example, embodiments of the present disclosure may use signals from one or more sensors to determine placement of one or more products on store shelves. The disclosed embodiments may also use one or more sensors to determine empty spaces on the store shelves. The placements and empty spaces may be automatically assessed against a digitally encoded planogram. A planogram refers to any data structure or specification that defines at least one product characteristic relative to a display structure associated with a retail environment (such as store shelf or area of one or more shelves). Such product characteristics may include, among other things, quantities of products with respect to areas of the shelves, product configurations or product shapes with respect to areas of the shelves, product arrangements with respect to areas of the shelves, product density with respect to areas of the shelves, product combinations with respect to areas of the shelves, etc. Although described with reference to store shelves, embodiments of the present disclosure may also be applied to end caps or other displays; bins, shelves, or other organizers associated with a refrigerator or freezer units; or any other display structure associated with a retail environment.

The embodiments disclosed herein may use any sensors configured to detect one or more parameters associated with products (or a lack thereof). For example, embodiments may use one or more of pressure sensors, weight sensors, light sensors, resistive sensors, capacitive sensors, inductive sensors, vacuum pressure sensors, high pressure sensors, conductive pressure sensors, infrared sensors, photo-resistor sensors, photo-transistor sensors, photo-diodes sensors, ultrasonic sensors, or the like. Some embodiments may use a plurality of different kinds of sensors, for example, associated with the same or overlapping areas of the shelves and/or associated with different areas of the shelves. Some embodiments may use a plurality of sensors configured to be placed adjacent a store shelf, configured for location on the store shelf, configured to be attached to, or configured to be integrated with the store shelf. In some cases, at least part of the plurality of sensors may be configured to be placed next to a surface of a store shelf configured to hold products. For example, the at least part of the plurality of sensors may be configured to be placed relative to a part of a store shelf such that the at least part of the plurality of sensors may be positioned between the part of a store shelf and products placed on the part of the shelf. In another embodiment, the at least part of the plurality of sensors may be configured to be placed above and/or within and/or under the part of the shelf.

In one example, the plurality of sensors may include light detectors configured to be located such that a product placed on the part of the shelf may block at least some of the ambient light from reaching the light detectors. The data received from the light detectors may be analyzed to detect a product or to identify a product based on the shape of a product placed on the part of the shelf. In one example, the system may identify the product placed above the light detectors based on data received from the light detectors that may be indicative of at least part of the ambient light being blocked from reaching the light detectors. Further, the data received from the light detectors may be analyzed to detect vacant spaces on the store shelf. For example, the system may detect vacant spaces on the store shelf based on the received data that may be indicative of no product being placed on a part of the shelf. In another example, the plurality of sensors may include pressure sensors configured to be located such that a product placed on the part of the shelf may apply detectable pressure on the pressure sensors. Further, the data received from the pressure sensors may be analyzed to detect a product or to identify a product based on the shape of a product placed on the part of the shelf. In one example, the system may identify the product placed above the pressure sensors based on data received from the pressure sensors being indicative of pressure being applied on the pressure sensors. In addition, the data from the pressure sensors may be analyzed to detect vacant spaces on the store shelf, for example based on the readings being indicative of no product being placed on a part of the shelf, for example, when the pressure readings are below a selected threshold. Consistent with the present disclosure, inputs from different types of sensors (such as pressure sensors, light detectors, etc.) may be combined and analyzed together, for example to detect products placed on a store shelf, to identify shapes of products placed on a store shelf, to identify types of products placed on a store shelf, to identify vacant spaces on a store shelf, and so forth.

Figure 8A:
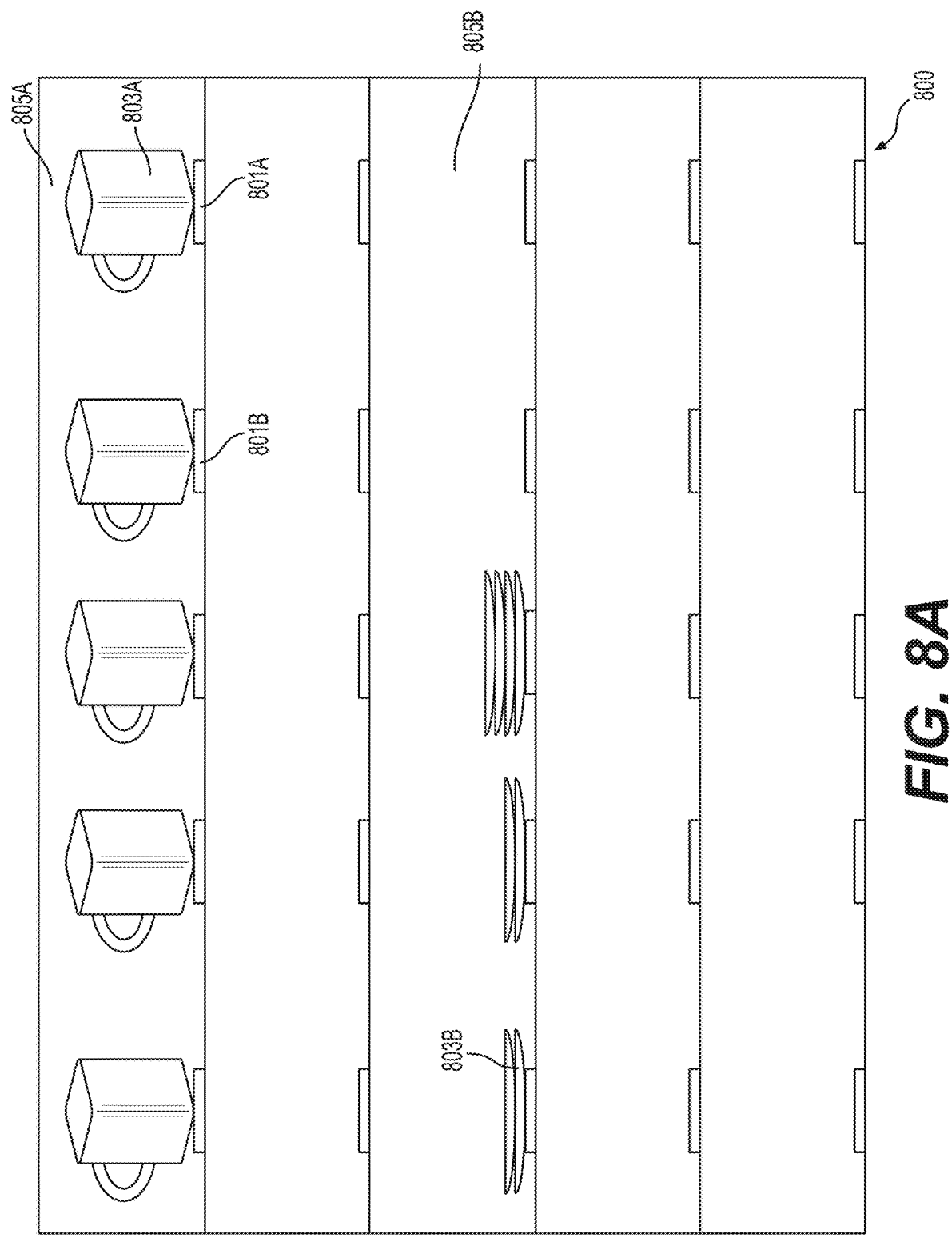
FIG. 8A is a schematic illustration of an example configuration for detecting products and empty spaces on a store shelf, consistent with the present disclosure.

With reference to FIG. 8A and consistent with the present disclosure, a store shelf 800 may include a plurality of detection elements, e.g., detection elements 801A and 801B. In the example of FIG. 8A, detection elements 801A and 801B may comprise pressure sensors and/or other type of sensors for measuring one or more parameters (such as resistance, capacitance, or the like) based on physical contact (or lack thereof) with products, e.g., product 803A and product 803B. Additionally or alternatively, detection elements configured to measure one or more parameters (such as current induction, magnetic induction, visual or other electromagnetic reflectance, visual or other electromagnetic emittance, or the like) may be included to detect products based on physical proximity (or lack thereof) to products. Consistent with the present disclosure, the plurality of detection elements may be configured for location on shelf 800. The plurality of detection elements may be configured to detect placement of products when the products are placed above at least part of the plurality of detection elements. Some embodiments of the disclosure, however, may be performed when at least some of the detection elements may be located next to shelf 800 (e.g., for magnetometers or the like), across from shelf 800 (e.g., for image sensors or other light sensors, light detection and ranging (LIDAR) sensors, radio detection and ranging (RADAR) sensors, or the like), above shelf 800 (e.g., for acoustic sensors or the like), below shelf 800 (e.g., for pressure sensors or the like), or any other appropriate spatial arrangement. Although depicted as standalone units in the example of FIG. 8A, the plurality of detection elements may form part of a fabric (e.g., a smart fabric or the like), and the fabric may be positioned on a shelf to take measurements. For example, two or more detection elements may be integrated together into a single structure (e.g., disposed within a common housing, integrated together within a fabric or mat, etc.). In some examples, detection elements (such as detection elements 801A and 801B) may be placed adjacent to (or placed on) store shelves as described above. Some examples of detection elements may include pressure sensors and/or light detectors configured to be placed above and/or within and/or under a store shelf as described above.

Detection elements associated with shelf 800 may be associated with different areas of shelf 800. For example, detection elements 801A and 801B are associated with area 805A while other detection elements are associated with area 805B. Although depicted as rows, areas 805A and 805B may comprise any areas of shelf 800, whether contiguous (e.g., a square, a rectangular, or other regular or irregular shape) or not (e.g., a plurality of rectangles or other regular and/or irregular shapes). Such areas may also include horizontal regions between shelves (as shown in FIG. 8A) or may include vertical regions that include area of multiple different shelves (e.g., columnar regions spanning over several different horizontally arranged shelves). In some examples, the areas may be part of a single plane. In some examples, each area may be part of a different plane. In some examples, a single area may be part of a single plane or be divided across multiple planes.

One or more processors (e.g., processing device 202) configured to communicate with the detection elements (e.g., detection elements 801A and 801B) may detect first signals associated with a first area (e.g., areas 805A and/or 805B) and second signals associated with a second area. In some embodiments, the first area may, in part, overlap with the second area. For example, one or more detection elements may be associated with the first area as well as the second area and/or one or more detection elements of a first type may be associated with the first area while one or more detection elements of a second type may be associated with the second area overlapping, at least in part, the first area. In other embodiments, the first area and the second area may be spatially separate from each other.

The one or more processors may, using the first and second signals, determine that one or more products have been placed in the first area while the second area includes at least one empty area. For example, if the detection elements include pressure sensors, the first signals may include weight signals that match profiles of particular products (such as the mugs or plates depicted in the example of FIG. 8A), and the second signals may include weight signals indicative of the absence of products (e.g., by being equal to or within a threshold of a default value such as atmospheric pressure or the like). The disclosed weight signals may be representative of actual weight values associated with a particular product type or, alternatively, may be associated with a relative weight value sufficient to identify the product and/or to identify the presence of a product. In some cases, the weight signal may be suitable for verifying the presence of a product regardless of whether the signal is also sufficient for product identification. In another example, if the detection elements include light detectors (as described above), the first signals may include light signals that match profiles of particular products (such as the mugs or plates depicted in the example of FIG. 8A), and the second signals may include light signals indicative of the absence of products (e.g., by being equal to or within a threshold of a default value such as values corresponding to ambient light or the like). For example, the first light signals may be indicative of ambient light being blocked by particular products, while the second light signals may be indicative of no product blocking the ambient light. The disclosed light signals may be representative of actual light patterns associated with a particular product type or, alternatively, may be associated with light patterns sufficient to identify the product and/or to identify the presence of a product.

The one or more processors may similarly process signals from other types of sensors. For example, if the detection elements include resistive or inductive sensors, the first signals may include resistances, voltages, and/or currents that match profiles of particular products (such as the mugs or plates depicted in the example of FIG. 8A or elements associated with the products, such as tags, etc.), and the second signals may include resistances, voltages, and/or currents indicative of the absence of products (e.g., by being equal to or within a threshold of a default value such as atmospheric resistance, a default voltage, a default current, corresponding to ambient light, or the like). In another example, if the detection elements include acoustics, LIDAR, RADAR, or other reflective sensors, the first signals may include patterns of returning waves (whether sound, visible light, infrared light, radio, or the like) that match profiles of particular products (such as the mugs or plates depicted in the example of FIG. 8A), and the second signals may include patterns of returning waves (whether sound, visible light, infrared light, radio, or the like) indicative of the absence of products (e.g., by being equal to or within a threshold of a pattern associated with an empty shelf or the like).

Any of the profile matching described above may include direct matching of a subject to a threshold. For example, direct matching may include testing one or more measured values against the profile value(s) within a margin of error; mapping a received pattern onto a profile pattern with a residual having a maximum, minimum, integral, or the like within the margin of error; performing an autocorrelation, Fourier transform, convolution, or other operation on received measurements or a received pattern and comparing the resultant values or function against the profile within a margin of error; or the like. Additionally or alternatively, profile matching may include fuzzy matching between measured values and/or patterns and a database of profiles such that a profile with a highest level of confidence according to the fuzzy search. Moreover, as depicted in the example of FIG. 8A, products, such as product 803B, may be stacked and thus associated with a different profile when stacked than when standalone.

Any of the profile matching described above may include use of one or more machine learning techniques. For example, one or more artificial neural networks, random forest models, or other models trained on measurements annotated with product identifiers may process the measurements from the detection elements and identify products therefrom. In such embodiments, the one or more models may use additional or alternative input, such as images of the shelf (e.g., from capturing devices 125 of FIGS. 4A-4C explained above) or the like.

Based on detected products and/or empty spaces, determined using the first signals and second signals, the one or more processors may determine one or more aspects of planogram compliance. For example, the one or more processors may identify products and their locations on the shelves, determine quantities of products within particular areas (e.g., identifying stacked or clustered products), identify facing directions associated with the products (e.g., whether a product is outward facing, inward facing, askew, or the like), or the like. Identification of the products may include identifying a product type (e.g., a bottle of soda, a loaf of broad, a notepad, or the like) and/or a product brand (e.g., a Coca-Cola® bottle instead of a Sprite® bottle, a Starbucks® coffee tumbler instead of a Tervis® coffee tumbler, or the like). Product facing direction and/or orientation, for example, may be determined based on a detected orientation of an asymmetric shape of a product base using pressure sensitive pads, detected density of products, etc. For example, the product facing may be determined based on locations of detected product bases relative to certain areas of a shelf (e.g., along a front edge of a shelf), etc. Product facing may also be determined using image sensors, light sensors, or any other sensor suitable for detecting product orientation.

The one or more processors may generate one or more indicators of the one or more aspects of planogram compliance. For example, an indicator may comprise a data packet, a data file, or any other data structure indicating any variations from a planogram, e.g., with respect to product placement such as encoding intended coordinates of a product and actual coordinates on the shelf, with respect to product facing direction and/or orientation such as encoding indicators of locations that have products not facing a correct direction and/or in an undesired orientation, or the like.

In addition to or as an alternative to determining planogram compliance, the one or more processors may detect a change in measurements from one or more detection elements. Such measurement changes may trigger a response. For example, a change of a first type may trigger capture of at least one image of the shelf (e.g., using capturing devices 125 of FIGS. 4A-4C explained above) while a detected change of a second type may cause the at least one processor to forgo such capture. A first type of change may, for example, indicate the moving of a product from one location on the shelf to another location such that planogram compliance may be implicated. In such cases, it may be desired to capture an image of the product rearrangement in order to assess or reassess product planogram compliance. In another example, a first type of change may indicate the removal of a product from the shelf, e.g., by an employee due to damage, by a customer to purchase, or the like. On the other hand, a second type of change may, for example, indicate the removal and replacement of a product to the same (within a margin of error) location on the shelf, e.g., by a customer to inspect the item. In cases where products are removed from a shelf, but then replaced on the shelf (e.g., within a particular time window), the system may forgo a new image capture, especially if the replaced product is detected in a location similar to or the same as its recent, original position.

Figure 8B:
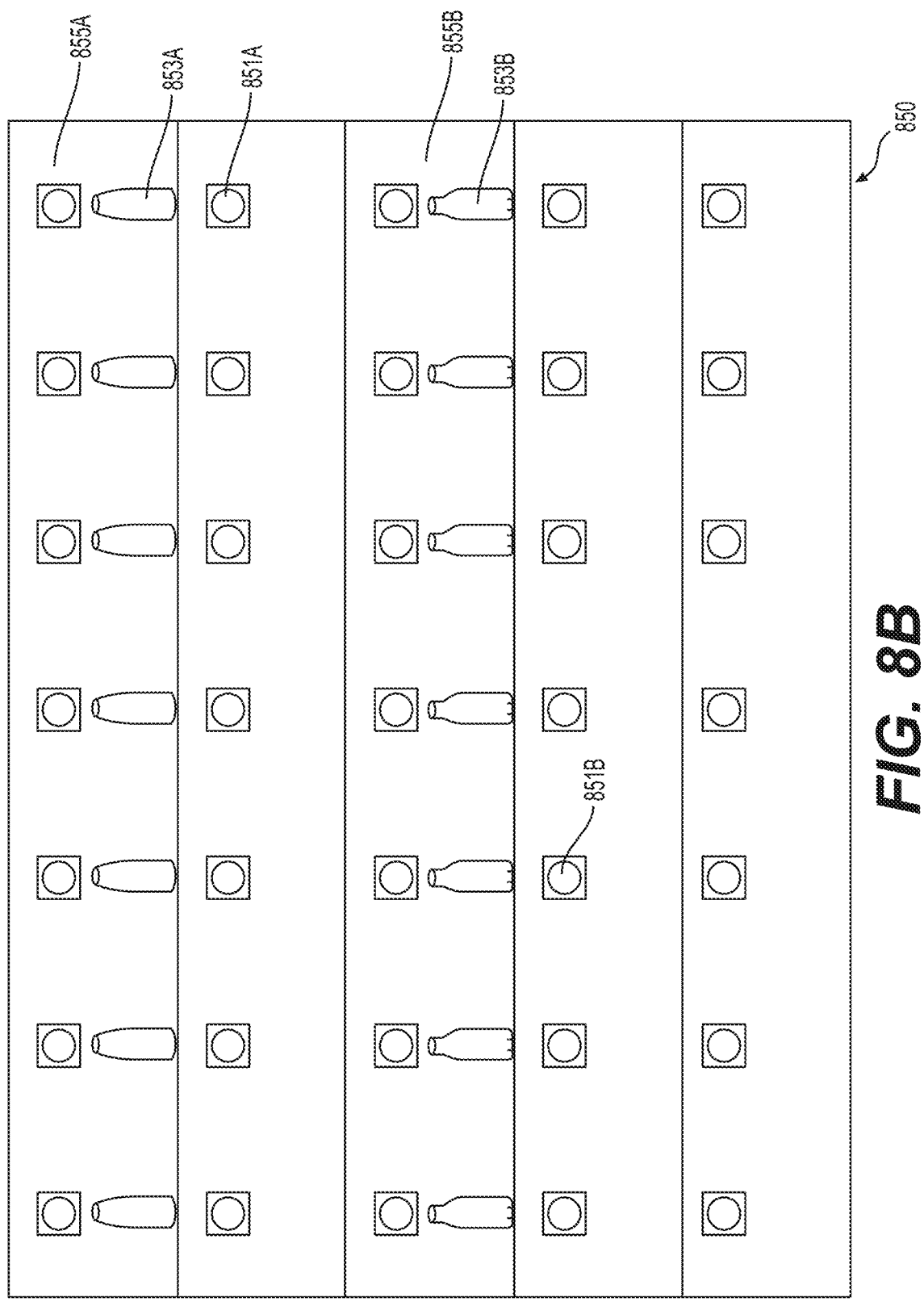
FIG. 8B is a schematic illustration of another example configuration for detecting products and empty spaces on a store shelf, consistent with the present disclosure.

With reference to FIG. 8B and consistent with the present disclosure, a store shelf 850 may include a plurality of detection elements, e.g., detection elements 851A and 851B. In the example of FIG. 8B, detection elements 851A and 851B may comprise light sensors and/or other sensors measuring one or more parameters (such as visual or other electromagnetic reflectance, visual or other electromagnetic emittance, or the like) based on electromagnetic waves from products, e.g., product 853A and product 853B. Additionally or alternatively, as explained above with respect to FIG. 8B, detection elements 851A and 851B may comprise pressure sensors, other sensors measuring one or more parameters (such as resistance, capacitance, or the like) based on physical contact (or lack thereof) with the products, and/or other sensors that measure one or more parameters (such as current induction, magnetic induction, visual or other electromagnetic reflectance, visual or other electromagnetic emittance, or the like) based on physical proximity (or lack thereof) to products.

Moreover, although depicted as located on shelf 850, some detection elements may be located next to shelf 850 (e.g., for magnetometers or the like), across from shelf 850 (e.g., for image sensors or other light sensors, light detection and ranging (LIDAR) sensors, radio detection and ranging (RADAR) sensors, or the like), above shelf 850 (e.g., for acoustic sensors or the like), below shelf 850 (e.g., for pressure sensors, light detectors, or the like), or any other appropriate spatial arrangement. Further, although depicted as standalone in the example of FIG. 8B, the plurality of detection elements may form part of a fabric (e.g., a smart fabric or the like), and the fabric may be positioned on a shelf to take measurements.

Detection elements associated with shelf 850 may be associated with different areas of shelf 850, e.g., area 855A, area 855B, or the like. Although depicted as rows, areas 855A and 855B may comprise any areas of shelf 850, whether contiguous (e.g., a square, a rectangular, or other regular or irregular shape) or not (e.g., a plurality of rectangles or other regular and/or irregular shapes).

One or more processors (e.g., processing device 202) in communication with the detection elements (e.g., detection elements 851A and 851B) may detect first signals associated with a first area and second signals associated with a second area. Any of the processing of the first and second signals described above with respect to FIG. 8A may similarly be performed for the configuration of FIG. 8B.

In both FIGS. 8A and 8B, the detection elements may be integral to the shelf, part of a fabric or other surface configured for positioning on the shelf, or the like. Power and/or data cables may form part of the shelf, the fabric, the surface, or be otherwise connected to the detection elements. Additionally or alternatively, as depicted in FIGS. 8A and 8B, individual sensors may be positioned on the shelf. For example, the power and/or data cables may be positioned under the shelf and connected through the shelf to the detection elements. In another example, power and/or data may be transmitted wirelessly to the detection elements (e.g., to wireless network interface controllers forming part of the detection elements). In yet another example, the detection elements may include internal power sources (such as batteries or fuel cells).

Figure 9:
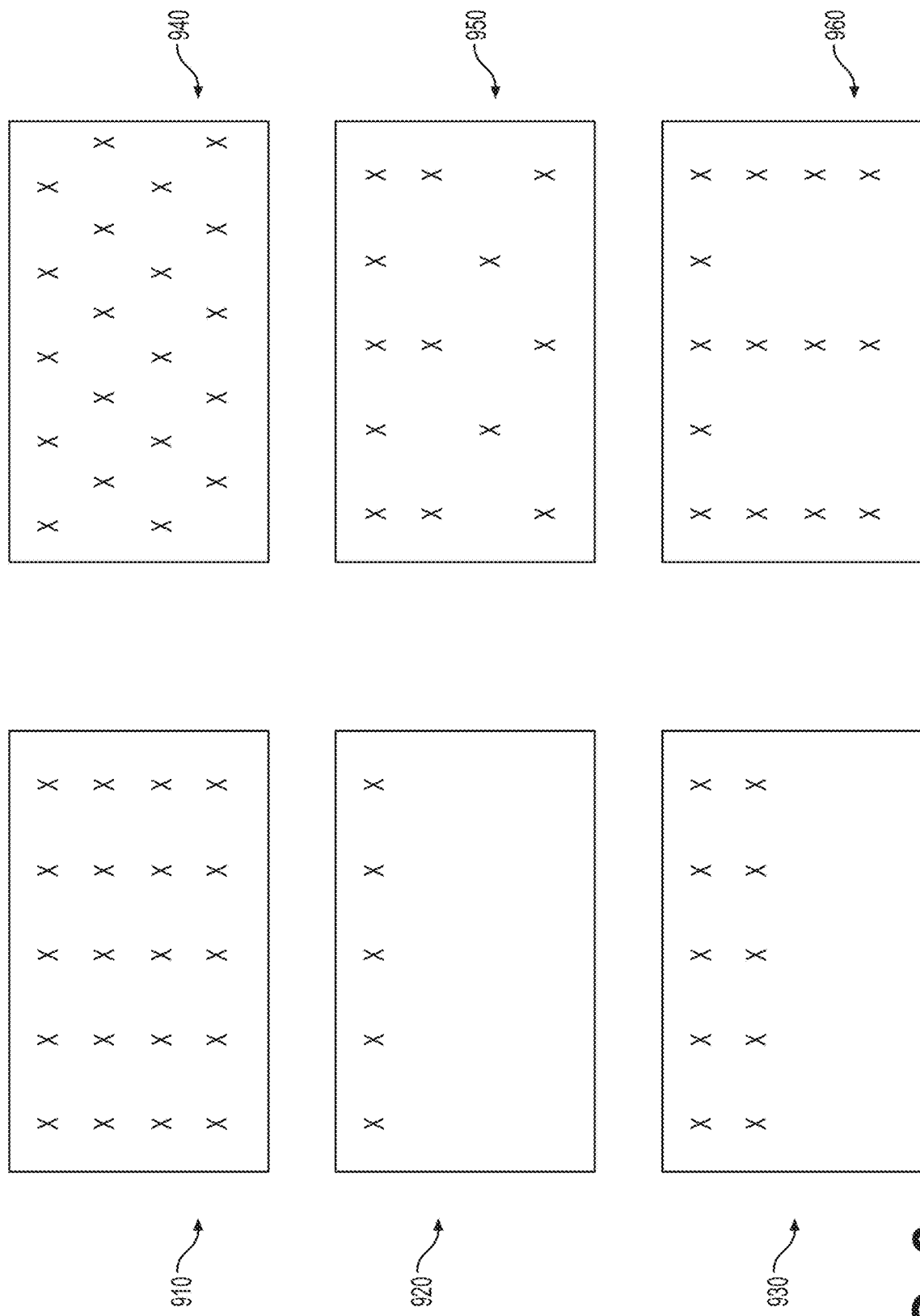
FIG. 9 is a schematic illustration of example configurations for detection elements on store shelves, consistent with the present disclosure.

With reference to FIG. 9 and consistent with the present disclosure, the detection elements described above with reference to FIGS. 8A and 8B may be arranged on rows of the shelf in any appropriate configuration. All of the arrangements of FIG. 9 are shown as a top-down view of a row (e.g., area 805A, area 805B, area 855A, area 855B, or the like) on the shelf. For example, arrangements 910 and 940 are both uniform distributions of detection elements within a row. However, arrangement 910 is also uniform throughout the depth of the row while arrangement 940 is staggered. Both arrangements may provide signals that represent products on the shelf in accordance with spatially uniform measurement locations. As further shown in FIG. 9, arrangements 920, 930, 950, and 960 cluster detection elements near the front (e.g., a facing portion) of the row. Arrangement 920 includes detection elements at a front portion while arrangement 930 includes defection elements in a larger portion of the front of the shelf. Such arrangements may save power and processing cycles by having fewer detection elements on a back portion of the shelf. Arrangements 950 and 960 include some detection elements in a back portion of the shelf but these elements are arranged less dense than detection elements in the front. Such arrangements may allow for detections in the back of the shelf (e.g., a need to restock products, a disruption to products in the back by a customer or employee, or the like) while still using less power and fewer processing cycles than arrangements 910 and 940. And, such arrangements may include a higher density of detection elements in regions of the shelf (e.g., a front edge of the shelf) where product turnover rates may be higher than in other regions (e.g., at areas deeper into a shelf), and/or in regions of the shelf where planogram compliance is especially important.

Figure 10A:
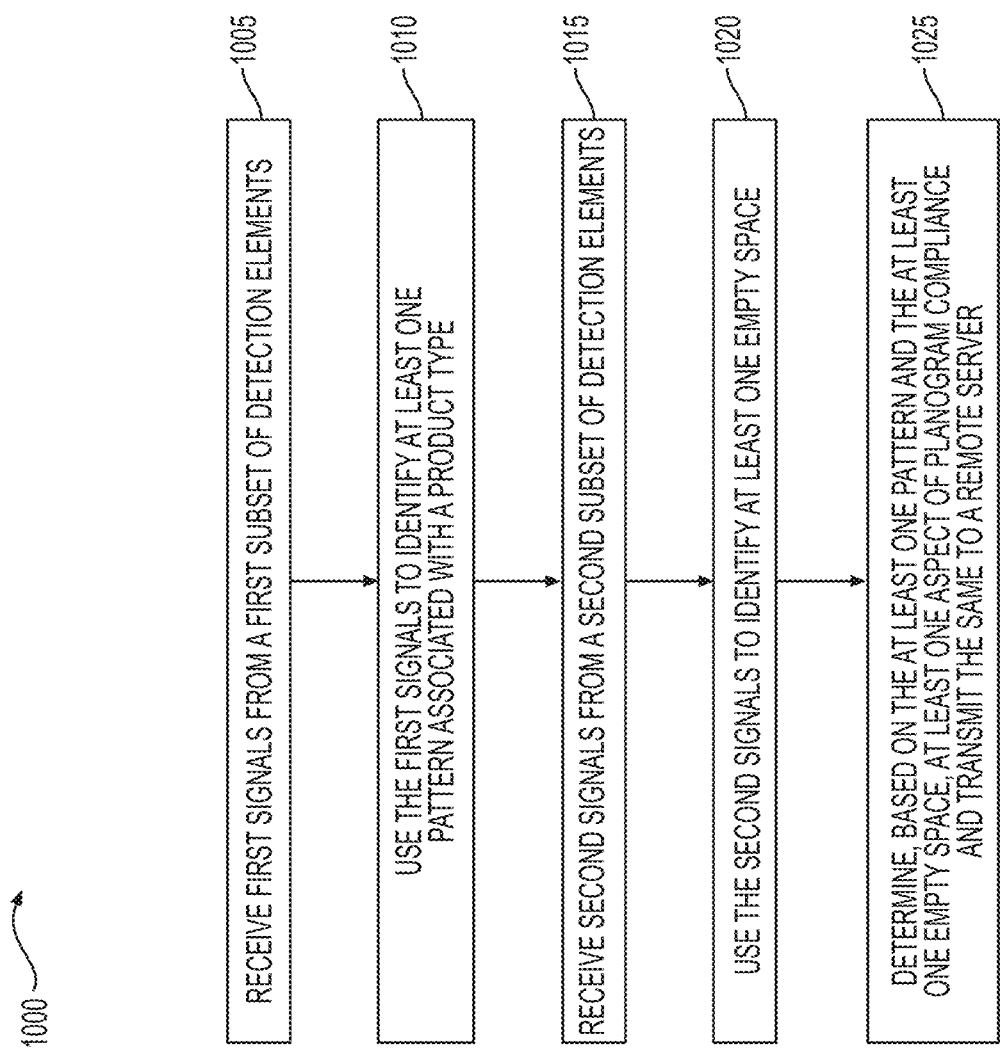
FIG. 10A illustrates an exemplary method for monitoring planogram compliance on a store shelf, consistent with the present disclosure.

FIG. 10A is a flow chart, illustrating an exemplary method 1000 for monitoring planogram compliance on a store shelf, in accordance with the presently disclosed subject matter. It is contemplated that method 1000 may be used with any of the detection element arrays discussed above with reference to, for example, FIGS. 8A, 8B and 9. The order and arrangement of steps in method 1000 is provided for purposes of illustration. As will be appreciated from this disclosure, modifications may be made to process 1000, for example, adding, combining, removing, and/or rearranging one or more steps of process 1000.

Method 1000 may include a step 1005 of receiving first signals from a first subset of detection elements (e.g., detection elements 801A and 801B of FIG. 8A) from among the plurality of detection elements after one or more of a plurality of products (e.g., products 803A and 803B) are placed on at least one area of the store shelf associated with the first subset of detection elements. As explained above with respect to FIGS. 8A and 8B, the plurality of detection elements may be embedded into a fabric configured to be positioned on the store shelf. Additionally or alternatively, the plurality of detection elements may be configured to be integrated with the store shelf. For example, an array of pressure sensitive elements (or any other type of detector) may be fabricated as part of the store shelf. In some examples, the plurality of detection elements may be configured to placed adjacent to (or located on) store shelves, as described above.

As described above with respect to arrangements 910 and 940 of FIG. 9, the plurality of detection elements may be substantially uniformly distributed across the store shelf. Alternatively, as described above with respect to arrangements 920, 930, 950, and 960 of FIG. 9, the plurality of detection elements may be distributed relative to the store shelf such that a first area of the store shelf has a higher density of detection elements than a second area of the store shelf. For example, the first area may comprise a front portion of the shelf, and the second area may comprise a back portion of the shelf.

In some embodiments, such as those including pressure sensors or other contact sensors as depicted in the example of FIG. 8A, step 1005 may include receiving the first signals from the first subset of detection elements as the plurality of products are placed above the first subset of detection elements. In some embodiments where the plurality of detection elements includes pressure detectors, the first signals may be indicative of pressure levels detected by pressure detectors corresponding to the first subset of detection elements after one or more of the plurality of products are placed on the at least one area of the store shelf associated with the first subset of detection elements. For example, the first signals may be indicative of pressure levels detected by pressure detectors corresponding to the first subset of detection elements after stocking at least one additional product above a product previously positioned on the shelf, removal of a product from the shelf, or the like. In other embodiments where the plurality of detection elements includes light detectors, the first signals may be indicative of light measurements made with respect to one or more of the plurality of products placed on the at least one area of the store shelf associated with the first subset of detection elements. Specifically, the first signals may be indicative of at least part of the ambient light being blocked from reaching the light detectors by the one or more of the plurality of products.

In embodiments including proximity sensors as depicted in the example of FIG. 8B, step 1005 may include receiving the first signals from the first subset of detection elements as the plurality of products are placed below the first subset of detection elements. In embodiments where the plurality of detection elements include proximity detectors, the first signals may be indicative of proximity measurements made with respect to one or more of the plurality of products placed on the at least one area of the store shelf associated with the first subset of detection elements.

Method 1000 may include step 1010 of using the first signals to identify at least one pattern associated with a product type of the plurality of products. For example, any of the pattern matching techniques described above with respect to FIGS. 8A and 8B may be used for identification. A pattern associated with a product type may include a pattern (e.g., a continuous ring, a discontinuous ring of a certain number of points, a certain shape, etc.) associated with a base of a single product. The pattern associated with a product type may also be formed by a group of products. For example, a six pack of soda cans may be associated with a pattern including a 2×3 array of continuous rings associated with the six cans of that product type. Additionally, a grouping of two liter bottles may form a detectable pattern including an array (whether uniform, irregular, or random) of discontinuous rings of pressure points, where the rings have a diameter associated with a particular 2-liter product. Various other types of patterns may also be detected (e.g., patterns associated with different product types arranged adjacent to one another, patterns associated with solid shapes (such as a rectangle of a boxed product), etc.). In another example, an artificial neural network configured to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements). In yet another example, a machine learning algorithm trained using training examples to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements).

In some embodiments, step 1010 may further include accessing a memory storing data (e.g., memory device 226 of FIG. 2 and/or memory device 314 of FIG. 3A) associated with patterns of different types of products. In such embodiments, step 1010 may include using the first signals to identify at least one product of a first type using a first pattern (or a first product model) and at least one product of a second type using a second pattern (or a second product model). For example, the first type may include one brand (such as Coca-Cola® or Folgers®) while the second type may include another brand (such as Pepsi® or Maxwell House®). In this example, a size, shape, point spacing, weight, resistance or other property of the first brand may be different from that of the second brand such that the detection elements may differentiate the brands. Such characteristics may also be used to differentiate like-branded, but different products from one another (e.g., a 12-ounce can of Coca Cola, versus a 16 oz bottle of Coca Cola, versus a 2-liter bottle of Coca Cola). For example, a soda may have a base detectable by a pressure sensitive pad as a continuous ring. Further, the can of soda may be associated with a first weight signal having a value recognizable as associated with such a product. A 16 ounce bottle of soda may be associated with a base having four or five pressure points, which a pressure sensitive pad may detect as arranged in a pattern associated with a diameter typical of such a product. The 16 ounce bottle of soda may also be associated with a second weight signal having a value higher than the weight signal associated with the 12 ounce can of soda. Further still, a 2 liter bottle of soda may be associated with a base having a ring, four or five pressure points, etc. that a pressure sensitive pad may detect as arranged in a pattern associated with a diameter typical of such a product. The 2 liter bottle of soda may be associated with a weight signal having a value higher than the weight signal associated with the 12 ounce can of soda and 16 ounce bottle of soda.

In the example of FIG. 8B, the different bottoms of product 853A and product 853B may be used to differentiate the products from each other. For example, detection elements such as pressure sensitive pads may be used to detect a product base shape and size (e.g., ring, pattern of points, asymmetric shape, base dimensions, etc.). Such a base shape and size may be used (optionally, together with one or more weight signals) to identify a particular product. The signals may also be used to identify and/or distinguish product types from one another. For example, a first type may include one category of product (such as soda cans) while a second type may include a different category of product (such as notepads). In another example, detection elements such as light detectors may be used to detect a product based on a pattern of light readings indicative of a product blocking at least part of the ambient light from reaching the light detectors. Such pattern of light readings may be used to identify product type and/or product category and/or product shape. For example, products of a first type may block a first subset of light frequencies of the ambient light from reaching the light detectors, while products of a second type may block a second subset of light frequencies of the ambient light from reaching the light detectors (the first subset and second subset may differ). In this case the type of the products may be determined based on the light frequencies reaching the light detectors. In another example, products of a first type may have a first shape of shades and therefore may block ambient light from reaching light detectors arranged in one shape, while products of a second type may have a second shape of shades and therefore may block ambient light from reaching light detectors arranged in another shape. In this case the type of the products may be determined based on the shape of blocked ambient light. Any of the pattern matching techniques described above may be used for the identification.

Additionally or alternatively, step 1010 may include using the at least one pattern to determine a number of products placed on the at least one area of the store shelf associated with the first subset of detection elements. For example, any of the pattern matching techniques described above may be used to identify the presence of one or more product types and then to determine the number of products of each product type (e.g., by detecting a number of similarly sized and shaped product bases and optionally by detecting weight signals associated with each detected base). In another example, an artificial neural network configured to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). In yet another example, a machine learning algorithm trained using training examples to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). Additionally or alternatively, step 1010 may include extrapolating from a stored pattern associated with a single product (or type of product) to determine the number of products matching the first signals. In such embodiments, step 1010 may further include determining, for example based on product dimension data stored in a memory, a number of additional products that can be placed on the at least one area of the store shelf associated with the second subset of detection elements. For example, step 1010 may include extrapolating based on stored dimensions of each product and stored dimensions of the shelf area to determine an area and/or volume available for additional products. Step 1010 may further include extrapolation of the number of additional products based on the stored dimensions of each product and determined available area and/or volume.

Method 1000 may include step 1015 of receiving second signals from a second subset of detection elements (e.g., detection elements 851A and 851B of FIG. 8B) from among the plurality of detection elements, the second signals being indicative of no products being placed on at least one area of the store shelf associated with the second subset of detection elements. Using this information, method 1000 may include step 1020 of using the second signals to determine at least one empty space on the store shelf. For example, any of the pattern matching techniques described above may be used to determine that the second signals include default values or other values indicative of a lack of product in certain areas associated with a retail store shelf. A default value may be include, for example, a pressure signal associated with an un-loaded pressure sensor or pressure sensitive mat, indicating that no product is located in a certain region of a shelf. In another example, a default value may include signals from light detectors corresponding to ambient light, indicating that no product is located in a certain region of a shelf.

Method 1000 may include step 1025 of determining, based on the at least one pattern associated with a detected product and the at least one empty space, at least one aspect of planogram compliance. As explained above with respect to FIGS. 8A and 8B, the aspect of planogram compliance may include the presence or absence of particular products (or brands), locations of products on the shelves, quantities of products within particular areas (e.g., identifying stacked or clustered products), facing directions associated with the products (e.g., whether a product is outward facing, inward facing, askew, or the like), or the like. A planogram compliance determination may be made, for example, by determining a number of empty spaces on a shelf and determining a location of the empty spaces on a shelf. The planogram determination may also include determining weight signal magnitudes associated with detected products at the various detected non-empty locations. This information may be used by the one or more processors in determining whether a product facing specification has been satisfied (e.g., whether a front edge of a shelf has a suitable number of products or suitable density of products), whether a specified stacking density has been achieved (e.g., by determining a pattern of detected products and weight signals of the detected products to determine how many products are stacked at each location), whether a product density specification has been achieved (e.g., by determining a ratio of empty locations to product-present locations), whether products of a selected product type are located in a selected area of the shelf, whether all products located in a selected area of the shelf are of a selected product type, whether a selected number of products (or a selected number of products of a selected product type) are located in a selected area of the shelf, whether products located in a selected area of a shelf are positioned in a selected orientation, or whether any other aspect of one or more planograms has been achieved.

For example, the at least one aspect may include product homogeneity, and step 1025 may further include counting occurrences where a product of the second type is placed on an area of the store shelf associated with the first type of product. For example, by accessing a memory including base patterns (or any other type of pattern associated with product types, such as product models), the at least one processor may detect different products and product types. A product of a first type may be recognized based on a first pattern, and product of a second type may be recognized based on a second, different pattern (optionally also based on weight signal information to aid in differentiating between products). Such information may be used, for example, to monitor whether a certain region of a shelf includes an appropriate or intended product or product type. Such information may also be useful in determining whether products or product types have been mixed (e.g., product homogeneity). Regarding planogram compliance, detection of different products and their relative locations on a shelf may aid in determining whether a product homogeneity value, ratio, etc. has been achieved. For example, the at least one processor may count occurrences where a product of a second type is placed on an area of the store shelf associated with a product of a first type.

Additionally or alternatively, the at least one aspect of planogram compliance may include a restocking rate, and step 1025 may further include determining the restocking rate based on a sensed rate at which products are added to the at least one area of the store shelf associated with the second subset of detection elements. Restocking rate may be determined, for example, by monitoring a rate at which detection element signals change as products are added to a shelf (e.g., when areas of a pressure sensitive pad change from a default value to a product-present value).

Additionally or alternatively, the at least one aspect of planogram compliance may include product facing, and step 1025 may further include determining the product facing based on a number of products determined to be placed on a selected area of the store shelf at a front of the store shelf. Such product facing may be determined by determining a number of products along a certain length of a front edge of a store shelf and determining whether the number of products complies with, for example, a specified density of products, a specified number of products, and so forth.

Step 1025 may further include transmitting an indicator of the at least one aspect of planogram compliance to a remote server. For example, as explained above with respect to FIGS. 8A and 8B, the indicator may comprise a data packet, a data file, or any other data structure indicating any variations from a planogram, e.g., with respect to product (or brand) placement, product facing direction, or the like. The remote server may include one or more computers associated with a retail store (e.g., so planogram compliance may be determined on a local basis within a particular store), one or more computers associated with a retail store evaluation body (e.g., so planogram compliance may be determined across a plurality of retail stores), one or more computers associated with a product manufacturer, one or more computers associated with a supplier (such as supplier 115), one or more computers associated with a market research entity (such as market research entity 110), etc.

Method 1000 may further include additional steps. For example, method 1000 may include identifying a change in at least one characteristic associated with one or more of the first signals (e.g., signals from a first group or type of detection elements), and in response to the identified change, triggering an acquisition of at least one image of the store shelf. The acquisition may be implemented by activating one or more of capturing devices 125 of FIGS. 4A-4C, as explained above. For example, the change in at least one characteristic associated with one or more of the first signals may be indicative of removal of at least one product from a location associated with the at least one area of the store shelf associated with the first subset of detection elements. Accordingly, method 1000 may include triggering the acquisition to determine whether restocking, reorganizing, or other intervention is required, e.g., to improve planogram compliance. Thus, method 1000 may include identifying a change in at least one characteristic associated with one or more of the first signals; and in response to the identified change, trigger a product-related task for an employee of the retail store.

Additionally or alternatively, method 1000 may be combined with method 1050 of FIG. 10B, described below, such that step 1055 is performed any time after step 1005.

Figure 10B:
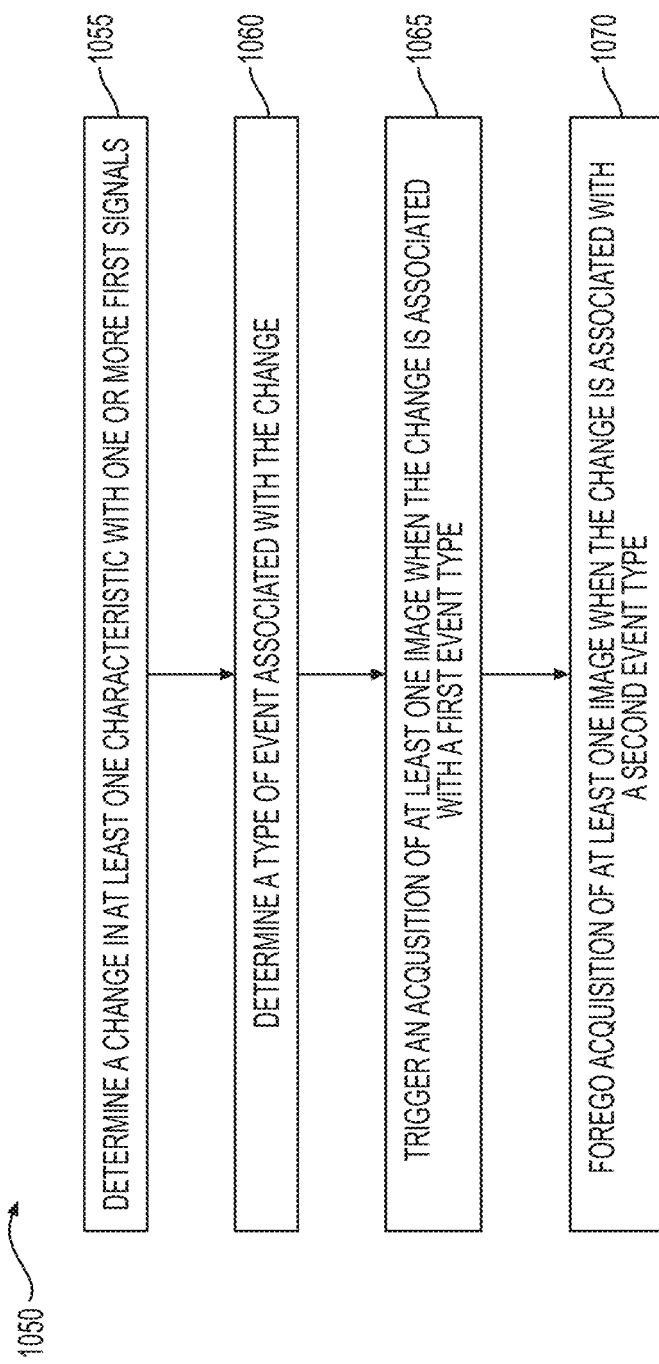
FIG. 10B is illustrates an exemplary method for triggering image acquisition based on product events on a store shelf, consistent with the present disclosure.

FIG. 10B is a flow chart, illustrating an exemplary method 1050 for triggering image capture of a store shelf, in accordance with the presently disclosed subject matter. It is contemplated that method 1050 may be used in conjunction with any of the detection element arrays discussed above with reference to, for example, FIGS. 8A, 8B and 9. The order and arrangement of steps in method 1050 is provided for purposes of illustration. As will be appreciated from this disclosure, modifications may be made to process 1050, for example, adding, combining, removing, and/or rearranging one or more steps of process 1050.

Method 1050 may include a step 1055 of determining a change in at least one characteristic associated with one or more first signals. For example, the first signals may have been captured as part of method 1000 of FIG. 10A, described above. For example, the first signals may include pressure readings when the plurality of detection elements includes pressure sensors, contact information when the plurality of detection elements includes contact sensors, light readings when the plurality of detection elements includes light detectors (for example, from light detectors configured to be placed adjacent to (or located on) a surface of a store shelf configured to hold products, as described above), and so forth.

Method 1050 may include step 1060 of using the first signals to identify at least one pattern associated with a product type of the plurality of products. For example, any of the pattern matching techniques described above with respect to FIGS. 8A, 8B, and step 1010 may be used for identification.

Method 1050 may include step 1065 of determining a type of event associated with the change. For example, a type of event may include a product removal, a product placement, movement of a product, or the like.

Method 1050 may include step 1070 of triggering an acquisition of at least one image of the store shelf when the change is associated with a first event type. For example, a first event type may include removal of a product, moving of a product, or the like, such that the first event type may trigger a product-related task for an employee of the retail store depending on analysis of the at least one image. The acquisition may be implemented by activating one or more of capturing devices 125 of FIGS. 4A-4C, as explained above. In some examples, the triggered acquisition may include an activation of at least one projector (such as projector 632). In some examples, the triggered acquisition may include acquisition of color images, depth images, stereo images, active stereo images, time of flight images, LIDAR images, RADAR images, and so forth.

Method 1050 may include a step (not shown) of forgoing the acquisition of at least one image of the store shelf when the change is associated with a second event type. For example, a second event type may include replacement of a removed product by a customer, stocking of a shelf by an employee, or the like. As another example, a second event type may include removal, placement, or movement of a product that is detected within a margin of error of the detection elements and/or detected within a threshold (e.g., removal of only one or two products; movement of a product by less than 5 cm, 20 cm, or the like; moving of a facing direction by less than 10 degrees; or the like), such that no image acquisition is required.

Figure 11A:
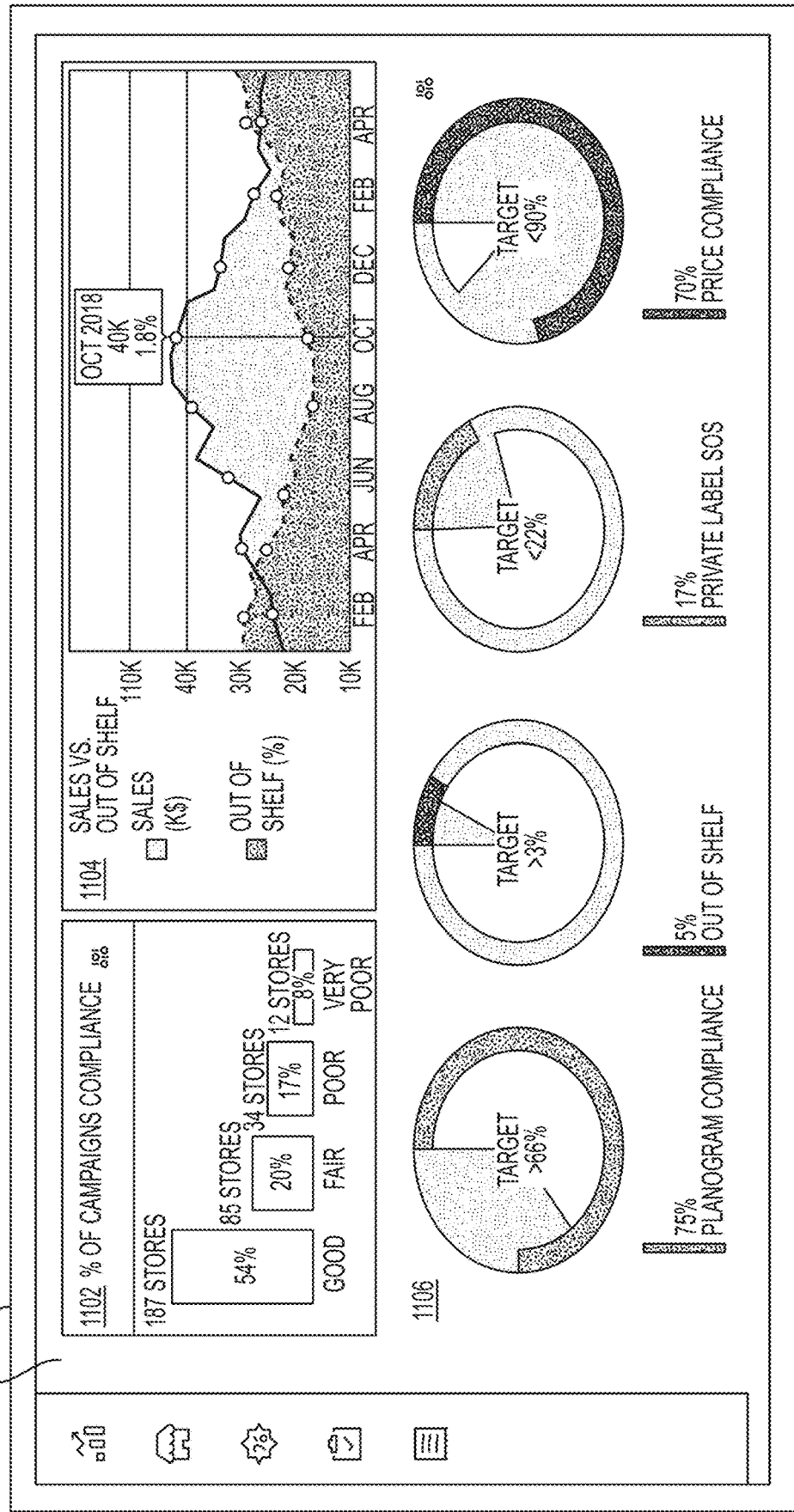
FIG. 11A is a schematic illustration of an example output for a market research entity associated with the retail store, consistent with the present disclosure.
Figure 11B:
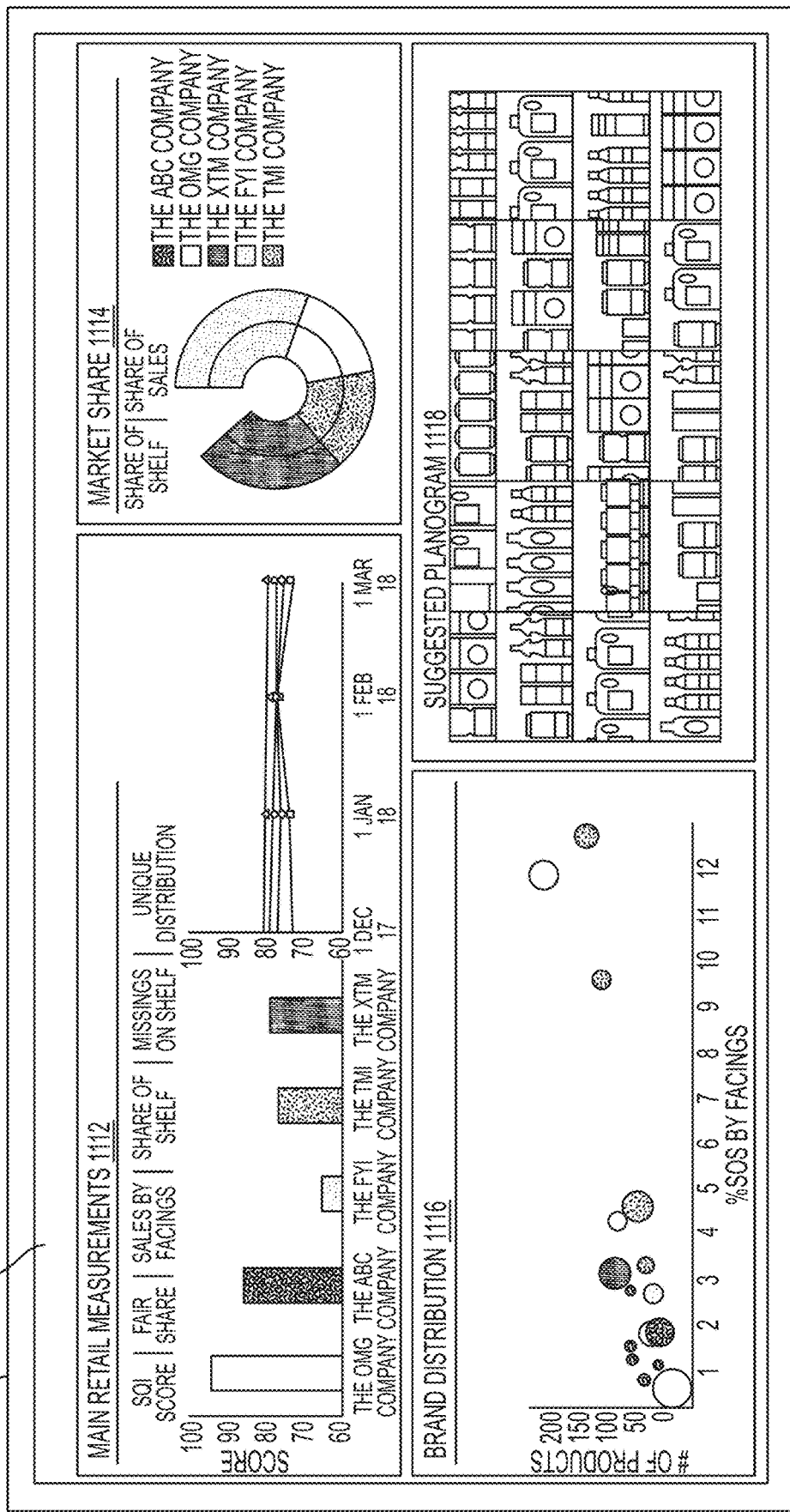
FIG. 11B is a schematic illustration of an example output for a supplier of the retail store, consistent with the present disclosure.
Figure 11C:
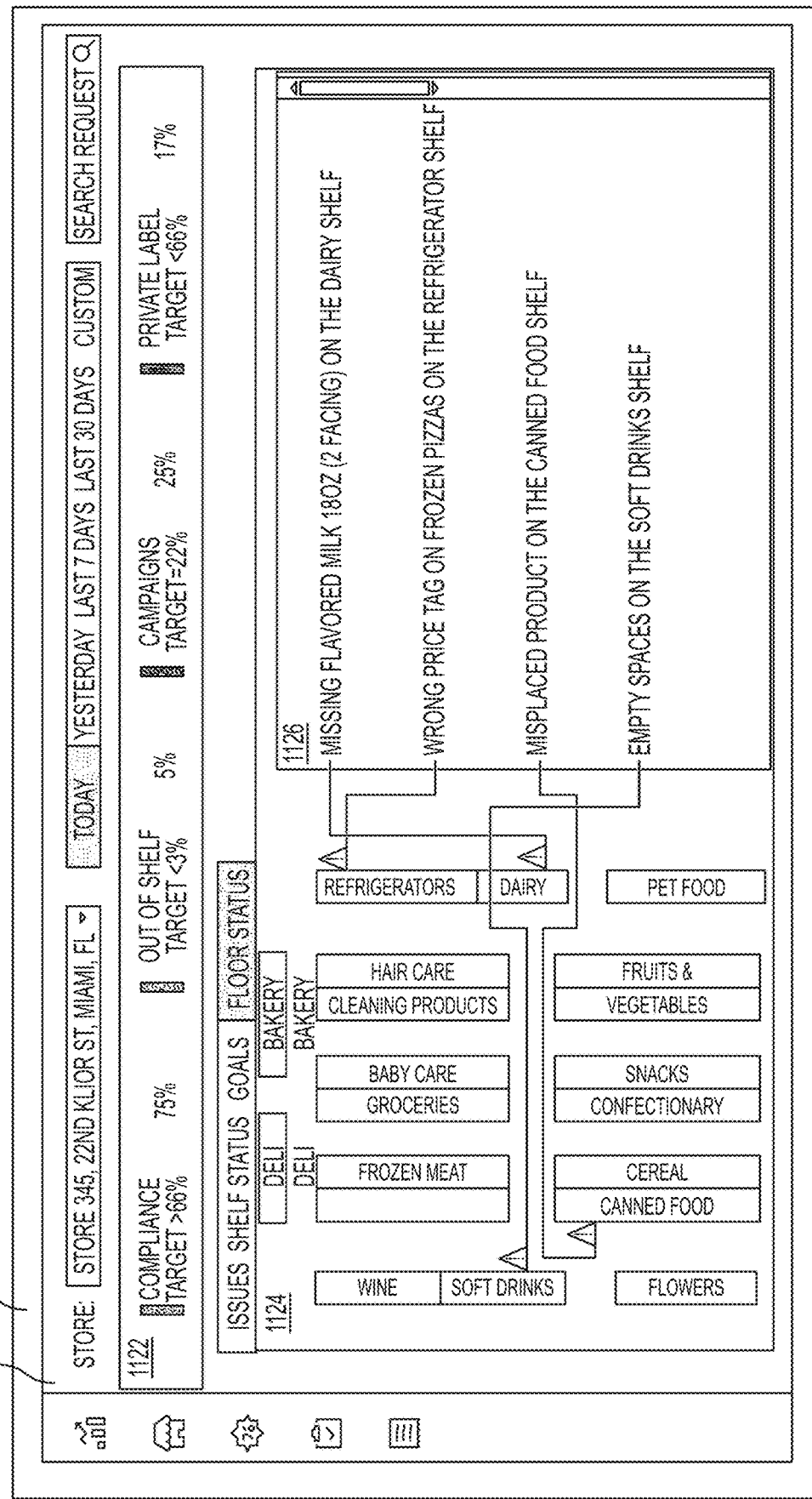
FIG. 11C is a schematic illustration of an example output for a manager of the retail store, consistent with the present disclosure.
Figure 11E:
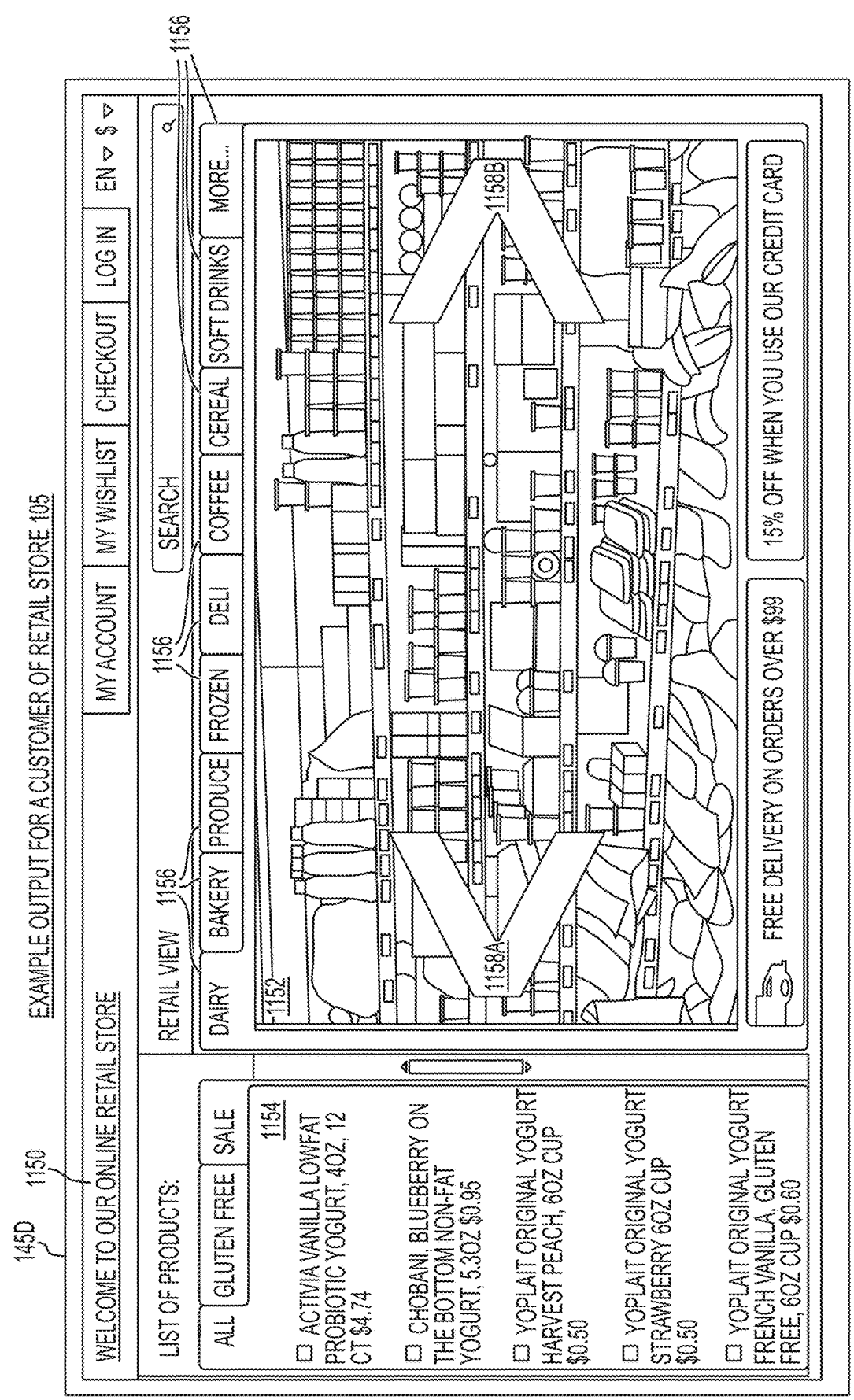
FIG. 11E is a schematic illustration of an example output for an online customer of the retail store, consistent with the present disclosure.

FIGS. 11A-11E illustrate example outputs based on data automatically derived from machine processing and analysis of images captured in retail store 105 according to disclosed embodiments. FIG. 11A illustrates an optional output for market research entity 110. FIG. 11B illustrates an optional output for supplier 115. FIGS. 11C and 11D illustrate optional outputs for employees of retail store 105. And FIG. 11E illustrates optional outputs for user 120.

FIG. 11A illustrates an example graphical user interface (GUI) 500 for output device 145A, representative of a GUI that may be used by market research entity 110. Consistent with the present disclosure, market research entity 110 may assist supplier 115 and other stakeholders in identifying emerging trends, launching new products, and/or developing merchandising and distribution plans across a large number of retail stores 105. By doing so, market research entity 110 may assist supplier 115 in growing product presence and maximizing or increasing new product sales. As mentioned above, market research entity 110 may be separated from or part of supplier 115. To successfully launch a new product, supplier 115 may use information about what really happens in retail store 105. For example, supplier 115 may want to monitor how marketing plans are being executed and to learn what other competitors are doing relative to certain products or product types. Embodiments of the present disclosure may allow market research entity 110 and suppliers 115 to continuously monitor product-related activities at retail stores 105 (e.g., using system 100 to generate various metrics or information based on automated analysis of actual, timely images acquired from the retail stores). For example, in some embodiments, market research entity 110 may track how quickly or at what rate new products are introduced to retail store shelves, identify new products introduced by various entities, assess a supplier's brand presence across different retail stores 105, among many other potential metrics.

In some embodiments, server 135 may provide market research entity 110 with information including shelf organization, analysis of skew productivity trends, and various reports aggregating information on products appearing across large numbers of retail stores 105. For example, as shown in FIG. 11A, GUI 1100 may include a first display area 1102 for showing a percentage of promotion campaign compliance in different retail stores 105. GUI 1100 may also include a second display area 1104 showing a graph illustrating sales of a certain product relative to the percentage of out of shelf. GUI 1100 may also include a third display area 1106 showing actual measurements of different factors relative to target goals (e.g., planogram compliance, restocking rate, price compliance, and other metrics). The provided information may enable market research entity 110 to give supplier 115 informed shelving recommendations and fine-tune promotional strategies according to in-store marketing trends, to provide store managers with a comparison of store performances in comparison to a group of retail stores 105 or industry wide performances, and so forth.

FIG. 11B illustrates an example GUI 1110 for output device 145B used by supplier 115. Consistent with the present disclosure, server 135 may use data derived from images captured in a plurality of retail stores 105 to recommend a planogram, which often determines sales success of different products. Using various analytics and planogram productivity measures, server 135 may help supplier 115 to determine an effective planogram with assurances that most if not all retail stores 105 can execute the plan. For example, the determined planogram may increase the probability that inventory is available for each retail store 105 and may be designed to decrease costs or to keep costs within a budget (such as inventory costs, restocking costs, shelf space costs, etc.). Server 135 may also provide pricing recommendations based on the goals of supplier 115 and other factors. In other words, server 135 may help supplier 115 understand how much room to reserve for different products and how to make them available for favorable sales and profit impact (for example, by choosing the size of the shelf dedicated to a selected product, the location of the shelf, the height of the shelf, the neighboring products, and so forth). In addition, server 135 may monitor near real-time data from retail stores 105 to determine or confirm that retail stores 105 are compliant with the determined planogram of supplier 115. As used herein, the term "near real-time data," in the context of this disclosure, refers to data acquired or generated, etc., based on sensor readings and other inputs (such as data from image sensors, audio sensors, pressure sensors, checkout stations, etc.) from retail store 105 received by system 100 within a predefined period of time (such as time periods having durations of less than a second, less than a minute, less than an hour, less than a day, less than a week, etc.).

In some embodiments, server 135 may generate reports that summarize performance of the current assortment and the planogram compliance. These reports may advise supplier 115 of the category and the item performance based on individual SKU, sub segments of the category, vendor, and region. In addition, server 135 may provide suggestions or information upon which decisions may be made regarding how or when to remove markdowns and when to replace underperforming products. For example, as shown in FIG. 11B, GUI 1110 may include a first display area 1112 for showing different scores of supplier 115 relative to scores associated with its competitors. GUI 1110 may also include a second display area 1114 showing the market share of each competitor. GUI 1110 may also include a third display area 1116 showing retail measurements and distribution of brands. GUI 1110 may also include a fourth display area 1118 showing a suggested planogram. The provided information may help supplier 115 to select preferred planograms based on projected or observed profitability, etc., and to ensure that retail stores 105 are following the determined planogram.

FIGS. 11C and 11D illustrate example GUIs for output devices 145C, which may be used by employees of retail store 105. FIG. 11C depicts a GUI 1120 for a manager of retail store 105 designed for a desktop computer, and FIG. 11D depicts GUI 1130 and 1140 for store staff designed for a handheld device. In-store execution is one of the challenges retail stores 105 have in creating a positive customer experience. Typical in-store execution may involve dealing with ongoing service events, such as a cleaning event, a restocking event, a rearrangement event, and more. In some embodiments, system 100 may improve in-store execution by providing adequate visibility to ensure that the right products are located at preferred locations on the shelf. For example, using near real-time data (e.g., captured images of store shelves) server 135 may generate customized online reports. Store managers and regional managers, as well as other stakeholders, may access custom dashboards and online reports to see how in-store conditions (such as, planogram compliance, promotion compliance, price compliance, etc.) are affecting sales. This way, system 100 may enable managers of retail stores 105 to stay on top of burning issues across the floor and assign employees to address issues that may negatively impact the customer experience.

In some embodiments, server 135 may cause real-time automated alerts when products are out of shelf (or near out of shelf), when pricing is inaccurate, when intended promotions are absent, and/or when there are issues with planogram compliance, among others. In the example shown in FIG. 11C, GUI 1120 may include a first display area 1122 for showing the average scores (for certain metrics) of a specific retail store 105 over a selected period of time. GUI 1120 may also include a second display area 1124 for showing a map of the specific retail store 105 with real-time indications of selected in-store execution events that require attention, and a third display area 1126 for showing a list of the selected in-store execution events that require attention. In another example, shown in FIG. 11D, GUI 1130 may include a first display area 1132 for showing a list of notifications or text messages indicating selected in-store execution events that require attention. The notifications or text messages may include a link to an image (or the image itself) of the specific aisle with the in-store execution event. In another example, shown in FIG. 11D, GUI 1140 may include a first display area 1142 for showing a display of a video stream captured by output device 145C (e.g., a real-time display or a near real-time display) with augmented markings indicting a status of planogram compliance for each product (e.g., correct place, misplaced, not in planogram, empty, and so forth). GUI 1140 may also include a second display area 1144 for showing a summary of the planogram compliance for all the products identified in the video stream captured by output device 145C. Consistent with the present disclosure, server 135 may generate within minutes actionable tasks to improve store execution. These tasks may help employees of retail store 105 to quickly address situations that can negatively impact revenue and customer experience in the retail store 105.

FIG. 11E illustrates an example GUI 1150 for output device 145D used by an online customer of retail store 105. Traditional online shopping systems present online customers with a list of products. Products selected for purchase may be placed into a virtual shopping cart until the customers complete their virtual shopping trip. Virtual shopping carts may be examined at any time, and their contents can be edited or deleted. However, common problems of traditional online shopping systems arise when the list of products on the website does not correspond with the actual products on the shelf. For example, an online customer may order a favorite cookie brand without knowing that the cookie brand is out-of-stock. Consistent with some embodiments, system 100 may use image data acquired by capturing devices 125 to provide the online customer with a near real-time display of the retail store and a list of the actual products on the shelf based on near real-time data. In one embodiment, server 135 may select images without occlusions in the field of view (e.g., without other customers, carts, etc.) for the near real-time display. In one embodiment, server 135 may blur or erase depictions of customers and other people from the near real-time display. As used herein, the term "near real-time display," in the context of this disclosure, refers to image data captured in retail store 105 that was obtained by system 100 within a predefined period of time (such as less than a second, less than a minute, less than about 30 minutes, less than an hour, less than 3 hours, or less than 12 hours) from the time the image data was captured.

Consistent with the present disclosure, the near real-time display of retail store 105 may be presented to the online customer in a manner enabling easy virtual navigation in retail store 105. For example, as shown in FIG. 11E, GUI 1150 may include a first display area 1152 for showing the near real-time display and a second display area 1154 for showing a product list including products identified in the near real-time display. In some embodiments, first display area 1152 may include different GUI features (e.g., tabs 1156) associated with different locations or departments of retail store 105. By selecting each of the GUI features, the online customer can virtually jump to different locations or departments in retail store 105. For example, upon selecting the "bakery" tab, GUI 1150 may present a near real-time display of the bakery of retail store 105. In addition, first display area 1152 may include one or more navigational features (e.g., arrows 1158A and 1158B) for enabling the online customer to virtually move within a selected department and/or virtually walk through retail store 105. Server 135 may be configured to update the near real-time display and the product list upon determining that the online customer wants to virtually move within retail store 105. For example, after identifying a selection of arrow 1158B, server 135 may present a different section of the dairy department and may update the product list accordingly. In another example, server 135 may update the near-real time display and the product list in response to new captured images and new information received from retail store 105. Using GUI 1150, the online customer may have the closest shopping experience without actually being in retail store 105. For example, an online customer can visit the vegetable department and decide not to buy tomatoes after seeing that they are not ripe enough.

Embodiments of the present disclosure may allow for a system for providing incentives to individuals (such as non-employee individuals, employee individuals, etc.) to complete tasks associated with a retail store. For example, the system may receive an image of a store shelf in the store. The system may analyze the image and determine that the store shelf does not comply with a planogram (e.g., there is an expired promotional sign attached to the store shelf). The system may also determine a task associated with the planogram incompliance (e.g., removing the expired promotional sign). The system may further provide an offer to an individual (for example to a non-employee individual, such as a customer in the store, etc.) for completing the task in exchange for a reward.

Figure 12:
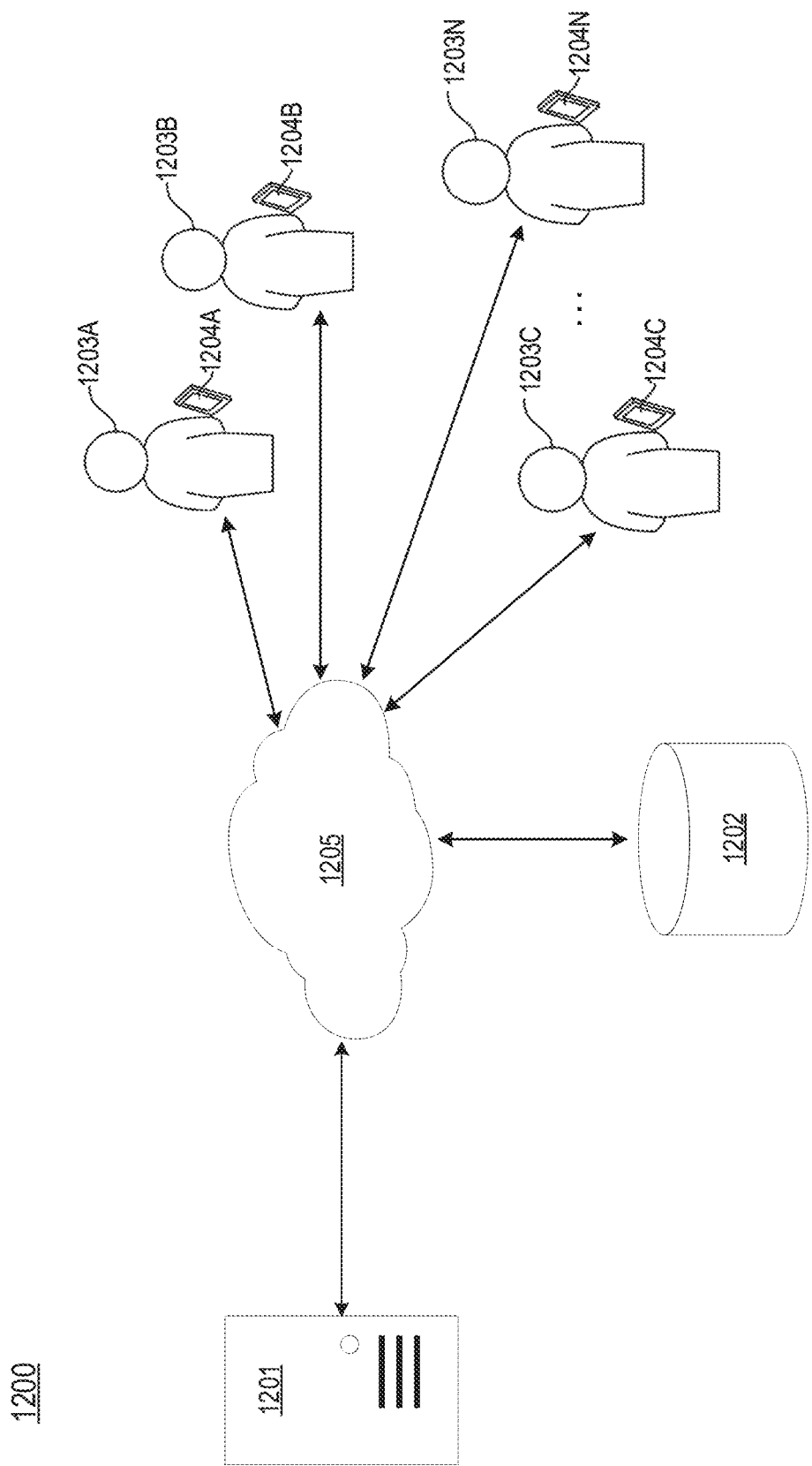
FIG. 12 is a schematic illustration of an example system for determining tasks for non-employee individuals associated with a retail store, consistent with the present disclosure.

FIG. 12 is a schematic illustration of an example system 1200 for providing offers to non-employee individuals for completing tasks associated with a retail store in exchange for rewards, consistent with the present disclosure. As illustrated in FIG. 12, system 1200 may include a computing device 1201, database 1202, one or more user devices 1204A, 1204B, 1204C, ..., 1204N (or user device 1204, collectively) associated with non-employee individuals 1203A, 1203B, 1203C, ..., 1203N, and database 1202.

Computing device 1201 may be configured to analyze one or more images to determine a task associated with a store shelf. Computing device 1201 may also be configured to determine an incentive for an individual (such as a non-employee individual, employee individual, etc.) to complete the task. A non-employee individual referred to herein is an individual who is not employed by the retail store. It is to be understood that although non-employees are used as example individuals, the systems and methods disclosed herein are not limited to non-employees, and may be equally implemented for other individuals, such as employees of the retail stores. Computing device 1201 may further be configured to provide an offer to the non-employee individual to complete the task and provide the incentive to the non-employee individual if he or she completes the task. In some embodiments, computing device 1201 may include image processing unit 130.

Database 1202 may be configured to store information and/or data for one or more components of system 1200. For example, database 1202 may be configured to store one or more images captured by capturing device 125. Computing device 1201 may access the one or more images stored in database 1202. As another example, database 1202 may store information relating to a retail store, information relating to one or more store shelves of a retail store, information relating to one or more non-employee individuals, or the like, or a combination thereof. Computing device 1201 may access information stored in database 1202. For example, computing device 1201 may access information relating to one or more properties of a store shelf, the physical location of the store shelves, one or more products associated with the store shelf.

Network 1205 may be configured to facilitate the communication between the components of system 1200. For example, computing device 1201 may send to and receive from user device 1204 information and/or data via network 1205. Network 1205 may include a local area network (LAN), a wide area network (WAN), portions of the Internet, an Intranet, a cellular network, a short-ranged network (e.g., a Bluetooth™ based network), or the like, or a combination thereof.

User device 1204 may be configured to receive information and/or data from computing device 1201. For example, user device 1204 may be configured to receive a notification indicating an offer from computing device 1201 for completing a task associated with a store shelf. User device 1204 may include an output device (e.g., a display) configured to provide the user with a graphical user interface (GUI) including the notification. User device 1204 may also include an input device (e.g., a touch screen, button, etc.) configured to receive input from the user. For example, user device 1204 may receive user input from the user via the input device indicating that the user accepts the offer received from computing device 1201.

Figure 13B:
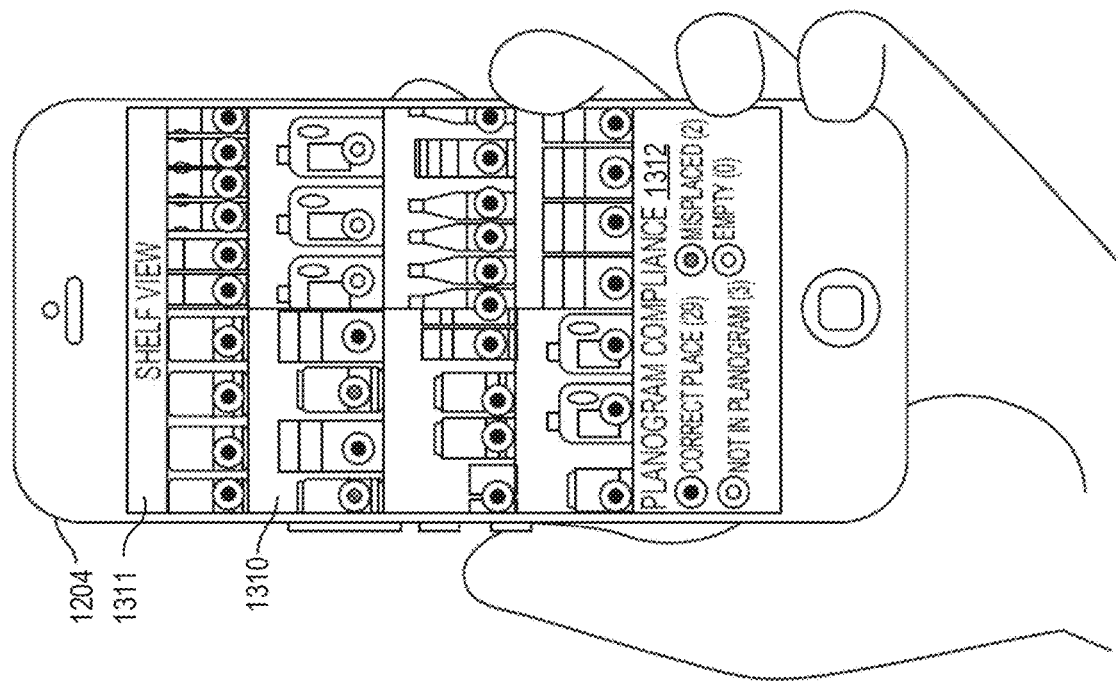
FIGS. 13A and 13B are two example outputs for a non-employee of the retail store, consistent with the present disclosure.
Figure 13A:
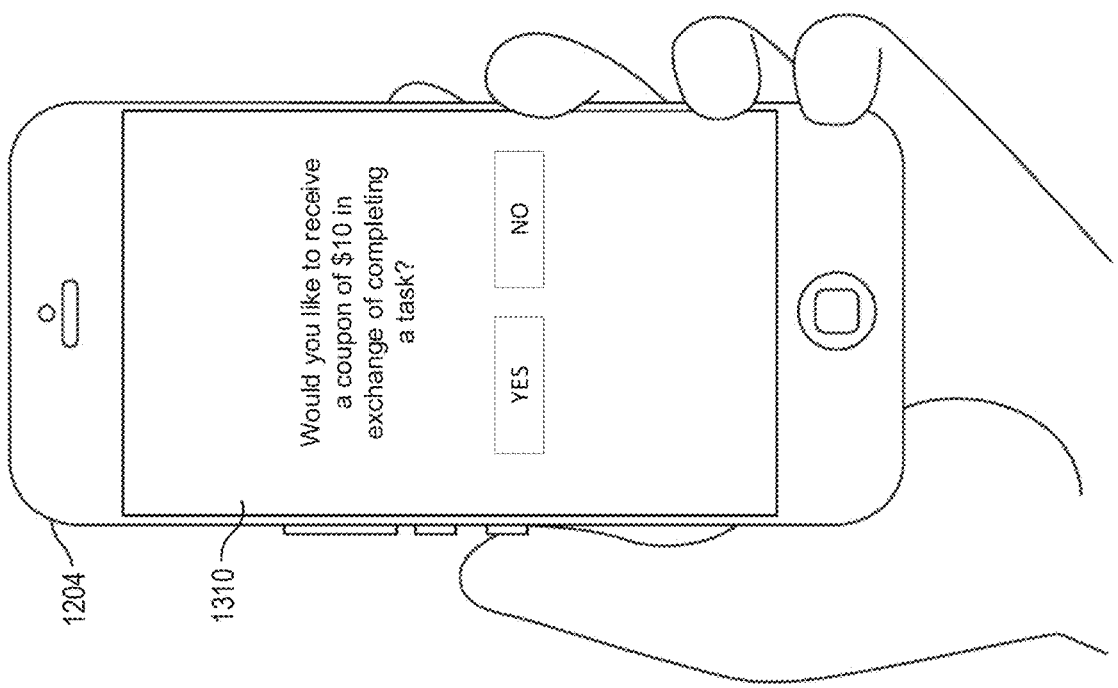

FIGS. 13A and 13B illustrate an example GUI 1310 displayed on user device 1204, which may be used by a non-employee individual of retail store 105. User device 1204 may receive a notification representing an offer for the non-employee individual associated with user device 1204 to complete a task from computing device 1201. User device 1204 may display the notification relating to the offer in GUI 1310. The notification may ask the non-employee individual associated with the user device 1301 whether he or she would accept an offer to receive a coupon (e.g., a coupon of $10) in exchange for completing a task. GUI 1310 may also be configured to receive user input from the non-employee individual indicating the non-employee individual's acceptance or decline of the offer. In some embodiments, GUI 1310 may also include more detailed information relating to the incentive and/or task. In some embodiments, if the non-employee individual accepts the offer (by, e.g., selecting the "YES" button illustrated in FIG. 13A on a touch screen), and GUI 1310 may display information relating to the performance of the task. For example, as illustrated in FIG. 13B, GUI 1310 may display may include a first display area 1311 for showing a display of an image of the store shelf (e.g., a real-time display or a near real-time display captured by a capturing device) with augmented markings indicting a status of planogram compliance for each product (e.g., correct place, misplaced, not in planogram, empty, and so forth). In some embodiments, GUI 1310 may also include a second display area 1312 for showing a summary of the planogram compliance for all the products identified in the image. The information displayed in GUI 1310 may help the non-employee individual complete the task (e.g., rearranging the products placed on the store shelf, restocking certain products, etc.). Computing device 1201 may further determine whether the task has been completed. For example, computing device 1201 may obtain one or more images of the store shelf (by, e.g., requesting the non-employee individual capture and upload an image of the store shelf) and determine whether the task is completed based on the analysis of the one or more images. If computing device 1201 determines that the task is completed, computing device 1201 may provide the reward to the non-employee individual. For example, computing device 1201 may transmit a digital coupon corresponding to the incentive to user device 1301, to another device of the individual, and/or to an email address associated with individual.

FIG. 14 is a flowchart representing an exemplary method 1400 for determining tasks for non-employee individuals in retail store 105 in accordance with example embodiments of the present disclosure. For purposes of illustration, in the following description, reference is made to certain components of system 1200 as deployed in the configuration depicted in FIG. 12. For example, one or more steps of method 1400 may be performed by computing device 1201. It will be appreciated, however, that other implementations are possible and that other configurations may be utilized to implement the exemplary method. It will also be readily appreciated that the illustrated method can be altered to modify the order of steps, delete steps, or further include additional steps.

At step 1401, the method may include receiving one or more images captured in a retail store and depicting a plurality of products displayed on at least one store shelf.

For example, computing device 1201 may receive one or more images captured in a retail store by one or more capturing device 125 as described elsewhere in this disclosure. By way of example, computing device 1201 may receive one or more images captured in the retail store by a handheld device of a store employee (e.g., capturing device 125D), which may depict a shelf and one or more products placed thereon. Alternatively or additionally, computing device 1201 may receive one or more images captured by crowd sourcing (e.g., by user devices 1204A-N associated with non-employee individuals in the retail store), as described elsewhere in this disclosure. Alternatively or additionally, computing device 1201 may receive one or more images captured by cameras mounted in the retail store, as described elsewhere in this disclosure.

At step 1403, the method may include analyzing the one or more images to determine at least one task associated with a store shelf. For example, computing device 1201 may analyze the one or more images and determine a task associated with a store shelf based on the image analysis. Exemplary tasks associated with a store shelf may include at least one of capturing at least one image of the store shelf, removing a label associated with the store shelf, attaching a label to the store shelf, modifying a label associated with the store shelf, removing a promotional sign associated with the store shelf, placing a promotional sign next to the store shelf, modifying a promotional sign associated with the store shelf, entering information related to products placed on the store shelf (such as name of a product, type of a product, category of a product, size of a product, brand of a product, amount of products, etc.), removing a product from the store shelf (for example, returning a misplaced product to a correct shelf, moving the product to another shelf, moving the product to a stockroom, etc.), placing a product on the store shelf (for example, returning a misplaced product from an incorrect shelf, moving the product from another shelf, moving the product from a stockroom, etc.), and so forth.

For example, a machine learning model may be trained using training examples to determine tasks associated with store shelves from images and/or videos, and step 1403 may use the trained machine learning model to analyze the one or more images received using step 1401 to determine the at least one task associated with a store shelf. An example of such training may include an image and/or a video of a store shelf, together with a label indicating one or more tasks associated with the store shelf. In some examples, computing device 1201 may analyze the one or more images depicting a store shelf to determine planogram compliance relative to the store shelf, as described elsewhere in this disclosure. By way of example, computing device 1201 may analyze an image of a store shelf and determine at least one characteristic of planogram compliance based on detected differences between the at least one planogram and the actual placement of the products on the store shelf based on the image analysis. Exemplary characteristics of planogram compliance may include at least one of: product facing, product placement, planogram compatibility, price correlation, promotion execution, product homogeneity, restocking rate, and planogram compliance of adjacent products. Computing device 1201 may also determine a task of rearranging the products on the store shelf to meet the planogram compliance based on the characteristic of planogram compliance.

A task may include a task relating to an area of the retail store (e.g., a store shelf). For example, a task may include taking one or more additional images of a store shelf, providing information relating to the store shelf, and changing the position of the store shelf (e.g., the height of the store shelf). By way of example, computing device 1201 may determine that the one or more images relating to a store shelf are out of date (e.g., the time since the last image of the store shelf exceeds a threshold) based on the analysis of the image data and determine a task for taking one or more additional images of the store shelf.

Alternatively or additionally, a task may include a task relating to one or more characteristics of planogram compliance. For example, computing device 1201 may analyze the one or more images to determine at least one task for maintaining planogram compliance, which may be based on at least one of: product facing, product placement, planogram compatibility, price correlation, promotion execution, and product homogeneity, restocking rate, planogram compliance of adjacent products, or the like, or a combination thereof. By way of example, computing device 1201 may analyze the one or more images and determine a task for maintaining planogram compliance of the store shelf including at least one of removing a product from the store shelf, removing a label attached to with the store shelf, removing a promotional sign associated with the store shelf, or rearranging products to change product facing, or the like, or a combination thereof. Alternatively or additionally, computing device 1201 may analyze the one or more images and identify a misplaced product on the store shelf in the one or more images. Computing device 1201 may also determine a task for removing the misplaced product from the store shelf. Alternatively or additionally, computing device 1201 may determine a task for placing (or returning) the misplaced product to another store shelf (e.g., a store shelf remote from the store shelf associated with the one or more images). Alternatively or additionally, computing device 1201 may identify an expired promotional sign associated with the store shelf in the one or more images, and determine a task for removing the expired promotional sign. Alternatively or additionally, computing device 1201 may identify an unrecognized product placed on the store shelf identified in the one or more images, and determine a task for providing information regarding the unrecognized product. Alternatively or additionally, computing device 1201 may identify an incorrect label attached to the at least one store shelf in the one or more images, and determine a task for removing the incorrect label. Alternatively or additionally, computing device 1201 may determine that a restocking of one or more products associated with a store shelf based on the image analysis is needed, and determine a task for restocking the store shelf with products from a particular storage area.

In some embodiments, a task may be determined based on a comparison between a planogram and one or more images. For example, computing device 1201 may analyze the one or more images to determine an actual placement of products on the store shelf. Computing device 1201 may also access at least one planogram describing a desired placement of products on the store shelf and determine a task based on detected differences between the desired placement and the actual placement of products on the store shelf. Alternatively or additionally, computing device 1201 may access at least one image depicting previous placement of products on the store shelf, and determine the task based on detected differences between the previous placement and the current placement of products on the store shelf.

In some embodiments, computing device 1201 may receive data related to a task associated with a store shelf. For example, computing device 1201 may receive the data related to the task from memory, a database (e.g., database 1202), a blockchain, an external device over a communication network using a communication device, or the like, or a combination thereof.

At step 1405, the method may include determining an incentive for completing the at least one task based on a property of the store shelf, wherein the incentive is intended for a non-employee individual associated with the retail store. For example, computing device 1201 may determine an incentive for a non-employee individual (e.g., a customer in the retail store) for completing the task determined at step 1403. Exemplary incentives may include at least one of a discount, a monetary incentive, a coupon, an award, a free product, or the like, or a combination thereof. By way of example, computing device 1201 may determine a coupon of $10 to be used in the retail store for rearranging the products on a store shelf according to a planogram. In some examples, a machine learning model may be trained using training examples to determine incentives for completing tasks associated with store shelves from properties of the store shelves, and step 1405 may use the trained machine learning model to analyze the property of the store shelf and determine the incentive for completing the at least one task. An example of such training example may include properties of a store shelf and/or an indication of a task to be completed, together with a label indicating a desired incentive for completing the task. In some examples, a machine learning model may be trained using training examples to determine incentives for completing tasks associated with store shelves from images and/or videos of the store shelves, and step 1405 may use the trained machine learning model to analyze the one or more images received using step 1401 and determine the incentive for completing the at least one task. An example of such training example may include an image and/or a video of a store shelf, for example with an indication of a task to be completed, together with a label indicating a desired incentive for completing the task.

In some embodiments, an incentive may be determined based on a property of the store shelf, type of products placed on the store shelf, a property of the storage area for storing one or more products associated with the store shelf, emergency level of the task, or the like, or a combination thereof. For example, computing device 1201 may determine an incentive for completing a task associated with a store shelf (for example, for completing a task for maintaining planogram compliance of the store shelf) and determine an incentive for completing the task based on the property of the store shelf associated with a physical location of the store shelf (e.g., a remote area in the retail store, being close to or far away from the entrance and/or exit of the retail store, being close to or far away from the non-employee individual, being at an eye level of an individual, the top or the bottom of the store shelf, or the like, or a combination thereof). As another example, the task may include a task for returning a misplaced product from the store shelf to a remote store shelf. Computing device 1201 may determine an incentive for completing the task based on a property of the store shelf and/or a property of the remote store shelf. By way of example, computing device 1201 may determine a type of the misplaced product based on, for example, the analysis one or more images of the misplaced product. Computing device 1201 may also determine a remote store shelf on which the misplaced product should be placed based on the type of the misplaced product. Computing device 1201 may further determine an incentive for completing the task (including removing the misplaced products from the previous store shelf and placing the misplaced product on the remote store shelf) based on a property of the remote store shelf (e.g., a distance from the previous store shelf on which the misplaced product is placed) and/or the property of the previous store shelf. In one example, properties of the remote store shelf may be determined by analyzing images of the remote store shelf (for example, as described herein with respect to the store shelf). In one example, properties of the remote store shelf may be received from a data structure including information related to store shelves, such as a floor plan of the retail store, a database of the retail store, and so forth.

In some embodiments, an incentive may be determined based on a property of the store shelf. Exemplary properties of a store shelf may include information related to at least one of products placed on the at least one store shelf, empty spaces on the store shelf, a label attached to the store shelf, a promotional sign associated with the store shelf, a height of the store shelf, a type of the store shelf, a location of the store shelf within the retail store, a rate of customers passing in a vicinity of the store shelf, or the like, or a combination thereof. For example, any of the properties mentioned above may be used to determine the incentive for the task. Some possible examples of such incentives may include at least one of a discount, a monetary incentive, a coupon, an award, a free product, and so forth.

In some example, the at least one property of the at least one store shelf may be used to select the at least one user of a plurality of alternative users. For example, any of the properties mentioned above may be used to select the at least one user of the plurality of alternative users. For example, users compatibility to shelves with different properties may be obtained (for example, based on past performances, based on past training, based on past responsiveness, etc.), and the obtained compatibility to shelves may be used to select the more compatible users to the at least one property of the at least one store shelf from the plurality of alternative users as the at least one user. In another example, a machine learning model may be trained using training examples to select users based on properties of shelves, and the trained machine learning model may be used to select the at least one user based on the at least one property of the at least one store shelf. In yet another example, an artificial neural network may be configured to select users according to properties of shelves, and the artificial neural network may be used to select the at least one user according to the at least one property of the at least one store shelf.

In some embodiments, the property of the store shelf may be determined based on an analysis of the one or more images. For example, computing device 1201 may analyze the one or more images and determine the location of the store shelf based on the image analysis. For example, a machine learning model trained using training examples to identify one or more properties of store shelves from images and/or videos of the store shelf, and the image data may be analyzed using the trained machine learning model to identify one or more properties of a store shelf. An example of such training example may include an image and/or a video of a store shelf, together with a label indicating one or more properties of the store shelf. Alternatively or additionally, an artificial neural network may be configured to identify one or more properties of a store shelf from images and/or videos of the store shelf, and the image data may be analyzed using the artificial neural network to identify one or more properties. Alternatively or additionally, computing device 1201 may receive information relating to the property of the store shelf from memory, a database (e.g., database 1202), a blockchain, an external device over a communication network using a communication device, or the like, or a combination thereof. Alternatively or additionally, computing device 1201 may determine the property of the store shelf based on the information obtained from another sensor (e.g., indoor positioning sensors).

Alternatively or additionally, an incentive may be determined based on a property of the store shelf associated with a type of products placed on the store shelf. For example, computing device 1201 may determine a more significant incentive for completing a task associated with a type of products that may be more difficult to handle. By way of example, computing device 1201 may determine a more significant incentive for completing a task associated with frozen food than for completing tasks associated with canned food. Alternatively or additionally, computing device 1201 may determine a more significant incentive for completing tasks associated with heavy products (e.g., a product having a weight heavier than 2 kilograms) than for completing tasks associated with light products (e.g., a product having a weight lighter than 1 kilogram).

Alternatively or additionally, an incentive may be determined based on a property of the storage area for storing one or more products associated with the store shelf. For example, the task may include a task for restocking the store shelf with products from a particular storage area, and computing device 1201 may determine an incentive for completing the task based on a property of the particular storage area. Exemplary properties of the particular storage area may include a distance of the store shelf from the particular storage area, a height of the particular storage area, a location of the particular storage area, or the like, or a combination thereof. In one example, properties of the storage area may be determined by analyzing images of the storage area (for example, to determine properties of the storage area, to determine inventory levels of the storage area, using a machine learning model, using an artificial neural network, and so forth). In one example, properties of the storage area may be received from a data structure including information related to storage areas, such as a floor plan of the retail store, a database of the retail store, and so forth.

Alternatively or additionally, an incentive may be determined based on an importance or emergency level of the task. For example, computing device 1201 may determine the importance or emergency level of a task based on a characteristic of the task. By way of example, computing device 1201 may determine a low (or non) urgent level for restocking mostly full shelf, placing promotion sign, and/or relocating of a misplaced product (non-frozen). Alternatively or additionally, computing device 1201 may determine a medium urgency level for a task for product facing. Alternatively or additionally, computing device 1201 may determine a high urgency level for a task for correcting an incorrect label, restocking empty shelf, relocating frozen or refrigerated products that have been placed in a non-frozen or non-refrigerated area, or the like, or a combination thereof. Computing device 1201 may also determine a more significant incentive for completing urgent tasks than to complete less urgent tasks.

In some embodiments, computing device 1201 may determine a more significant (or less significant) incentive based on a property of the store shelf, type of products placed on the store shelf, a property of the storage area for storing one or more products associated with the store shelf, emergency level of the task, or the like, or a combination thereof. For example, computing device 1201 may determine a more significant incentive for completing a task that is associated with store shelves located in less-visited areas of the retail store than for completing similar tasks associated with store shelves located in well-visited areas. As another example, computing device 1201 may determine an incentive with less value (e.g., a coupon having a less discount) for completing a task that is associated with shelves close to one or more cashiers. Alternatively or additionally, computing device 1201 may determine a more significant incentive for completing tasks associated with bottom (or top) store shelves than for completing similar tasks associated with store shelves located at eye level.

In some embodiments, the incentive may be determined based on one or more models, which may include one or more machine learning models, one or more regression models, one or more artificial neural networks, or the like, or a combination thereof. For example, computing device 1201 may determine an amount associated with the incentive for the task from the property of the store shelf using a regression model. Alternatively or additionally, computing device 1201 may determine an incentive for the task based on a training deep learning model. By way of example, computing device 1201 may obtain a deep learning model for determining an incentive that has been trained based on a plurality of training samples. The deep learning model may have been trained using a plurality of positive training samples (e.g., samples for which an offer having an incentive for completing a task was accepted by a non-employee individual) and/or a plurality of negative training samples (e.g., samples for which an offer of an incentive for completing a task was not accepted by a non-employee individual). Computing device 1201 may also input the data relating to the task and/or the property of the retail store into the deep learning model, which may output the results for determining an incentive (e.g., the type, value, or the like, or a combination thereof). Alternatively or additionally, computing device 1201 may use an artificial neural network may be used to determine the incentive for the task according to the property of the store shelf.

At step 1407, the method may include providing an offer to at least one individual non-employee individuals associated with the retail store. The offer may include receiving the incentive in response to completing the at least one task.

For example, computing device 1201 may generate an offer to a non-employee individual for completing a task in exchange for receiving the incentive determined at step 1405. Computing device 1201 may also provide the offer to a user device associated with the non-employee individual. By way of example, computing device 1201 may provide a non-employee individual an offer associated with a task of removing a misplaced product (if a misplaced product has been identified), removing an expired promotional sign (if an expired promotional sign has been identified), providing information regarding an unrecognized product (if an unrecognized product has been identified), removing an incorrect label (if an incorrect label has been identified), capturing an additional image of the store shelf (if the one or more images are determined to be out of date), or the like, or a combination thereof.

In some embodiments, computing device 1201 may transmit (or push) a notification representing an offer to user device 1301 (as illustrated in FIG. 13A), which may be displayed in GUI 1310 of user device 1301. The notification may ask the non-employee individual associated with the user device 1301 whether he or she would accept an offer to receive a coupon of $10 in exchange for completing a task. GUI 1310 may also be configured to receive user input from the non-employee individual indicating the non-employee individual's acceptance or decline of the offer. In some embodiments, GUI 1310 may also include more detailed information relating to the incentive and/or task. In some embodiments, if the non-employee individual accepts the offer (by, e.g., selecting the "YES" button illustrated in FIG. 13A), and GUI 1310 may display information relating to the performance of the task. For example, as illustrated in FIG. 13B, GUI 1310 may display may include a first display area 1311 for showing a display of an image of the store shelf (e.g., a real-time display or a near real-time display captured by a capturing device) with augmented markings indicting a status of planogram compliance for each product (e.g., correct place, misplaced, not in planogram, empty, and so forth). In some embodiments, GUI 1310 may also include a second display area 1312 for showing a summary of the planogram compliance for all the products identified in the image. The information displayed in GUI 1310 may help the non-employee individual to complete the task (e.g., rearranging the products placed on the store shelf, restocking certain products, etc.). Computing device 1201 may further determine whether the task has been completed. For example, computing device 1201 may obtain one or more images of the store shelf (by, e.g., requesting the non-employee individual capture and upload an image of the store shelf) and determine whether the task is completed based on the analysis of the one or more images. If computing device 1201 that the task is completed, computing device 1201 may provide the reward to the non-employee individual. For example, computing device 1201 may transmit a digital coupon corresponding to the incentive to user device 1301.

In some embodiments, the offer may be provided to two or more non-employee individuals, and the individual who accepts the offer first may be offered the task. For example, computing device 1201 may provide the offer to two or more non-employee individuals and determine one of the non-employee individuals who accepts the offer first based on the time of acceptance by the individual. Computing device 1201 may also rescind the offer to other individual(s) by sending a notification indicating the withdrawal of the offer to the user device associated with the individual(s) who did not get the offer.

In some embodiments, a non-employee individual among a plurality of non-employee individuals may be selected for receiving the offer to complete the task based on a property of the non-employee individuals (e.g., the height, physical strength, past behavior, level of familiarity with the store, etc., a property of the store shelf, type of products placed on the store shelf, a property of the storage area for storing one or more products associated with the store shelf, emergency level of the task, or the like, or a combination thereof. For example, computing device 1201 may select the at least one individual out of a plurality of alternative individuals using a property of the store shelf. By way of example, for a task for rearranging the products on a top shelf, computing device 1201 may select a relatively tall non-employee individual. As another example, computing device 1201 may select a more muscular individual for completing a task involving moving a heavy product.

In some embodiments, computing device 1201 may select a non-employee individual among a plurality of non-employee individuals to receive the offer to complete the task based on one or more properties of the store shelf. Exemplary properties of a store shelf may include information related to at least one of products placed on the at least one store shelf, empty spaces on the store shelf, a label attached to the store shelf, a promotional sign associated with the store shelf, a height of the store shelf, a type of the store shelf, a location of the store shelf within the retail store, a rate of customers passing in a vicinity of the store shelf, or the like, or a combination thereof. In some embodiments, any of the properties mentioned above may be used to select a non-employee individual among a plurality of alternative non-employee individual. For example, users compatibility to the store shelf with different properties may be obtained (for example, based on past performances, based on past training, based on past responsiveness, etc.), and the obtained compatibility to the store shelf may be used to select the more compatible non-employee individuals from the plurality of alternative non-employee individual as the non-employee individual to receive the offer. In some embodiments, a machine learning model may be trained using training examples to select non-employee individuals based on properties of shelves, and computing device 1201 may use the trained machine learning model to select the non-employee individual based on the property of the store shelf. Alternatively or additionally, computing device 1201 may use an artificial neural network to a non-employee individual according to the property of the store shelf.

In some embodiments, the task may still be pending after a selected time duration after the information related to the task and the incentive are offered to the non-employee individual. For example, computing device 1201 may receive at least one additional image captured after the offer was provided to the at least one individual. By way of example, computing device 1201 may receive one or more images of the store shelf associated with the task from a capturing device (as described elsewhere in this disclosure) after the offer was provided to the individual. Computing device 1201 may also analyze the at least one additional image to determine that the task is still pending (e.g., incomplete). In some embodiments, computing device 1201 may update the offer if the offer is declined by the non-employee individual (or no non-employee individual accepts the offer). Computing device 1201 may update the incentive for the task based on the determination that the at least one task is still pending. For example, the incentive may include a discount, a coupon, an award, a free product, or the like, or a combination thereof. Computing device 1201 may update the incentive based on a property of the store shelf according to a type and/or level of the incentive. For example, computing device 1201 may escalate an incentive as time passes by updating an incentive of $1 discount to an incentive of $2 discount. In some embodiments, any of the properties of a store shelf disclosed elsewhere in this application may be used to determine the updated incentive for the task. For example, the increase of the incentive may be greater if the store shelf is located in a more remote area of the retail store. For example, computing device 1201 may update an incentive of $1 discount to an incentive of $3 if the store shelf is more remote. In some embodiments, computing device 1201 may use a regression model may be used to calculate an updated amount associated with the updated incentive for the task from the property of the store shelf. As another example, computing device 1201 may update the original incentive for the task (using the property of the store shelf as described above) by increasing the original incentive based on the time passed since the information related to the task and the incentive was offered to the at least one user, based on vicinity of users to the at least one store shelf, or the like, or a combination thereof.

Alternatively or additionally, computing device 1201 may provide an additional offer to at least one additional non-employee individual associated with the retail store based on the determination that the at least one task is still pending. For example, if computing device 1201 determines that the task is still pending, computing device 1201 may provide the offer that is equal to the original offer to a second non-employee individual. Alternatively, computing device 1201 may determine an updated offer (as described elsewhere in this disclosure) and provide the updated offer to the second non-employee individual. In some embodiments, if computing device 1201 determines that the task is still pending, computing device 1201 may cancel the offer provided to the non-employee individual. For example, computing device 1201 may determine that the task has not completed in a period of time and may cancel the offer by sending a notification to the user device associated with the non-employee individual who was rewarded the offer. In some embodiments, computing device 1201 may cancel the original offer after receiving an acceptance of the offer (an updated offer or an offer having the same terms as the original offer) rewarded to the second person.

In some embodiments, information relating to the non-employee individual may be updated based on the performance (or non-performance) of the non-employee individual. For example, computing device 1201 may determine that the task has been completed and update a record of the non-employee individual.

In some embodiments, computing device 1201 may obtain an update to the property of the store shelf. For example, the update to the property of the store shelf may be read from memory, retrieved from a database, retrieved from a blockchain, received from an external device over a communication network using a communication device, or the like, or a combination thereof. Alternatively or additionally, computing device 1201 may determine an update to the property of the store shelf from an analysis of image data of the store shelf captured after the information related to the task and the incentive are offered to the non-employee individual. For example, the image data captured after the information related to the task and the incentive is offered to the non-employee individual may be analyzed as described above to determine updated property of the store shelf. In some embodiments, computing device 1201 may also update the incentive and the offer for the task based on the updated property of the store shelf. For example, computing device 1201 may determine an updated incentive and offer based on the updated property of the store shelf, as described elsewhere in this disclosure. In some embodiments, computing device 1201 may further transmit an updated offer having the updated incentive to the non-employee individual as described elsewhere in this disclosure.

Embodiments of the present disclosure may provide a system for identifying products in a retail store based on the image analysis of one or more images depicting the products and automatically generating an offer (e.g., a coupon) relating to the identified products. For example, the system may receive one or more images from an image capturing device attached to a store shelf, which may depict one or more products. The system may analyze the images and determine a quantity of the products. The system may also automatically generate a coupon (e.g., $1 off the price of one item of the products) based on the determined quantity and transmit the coupon to a user device associated with one or more customers. Although perishable products are used as example products to be identified, the systems and methods disclosed herein are not limited to perishable products and may be implemented for other types of products, such as non-perishable products.

Figure 15:
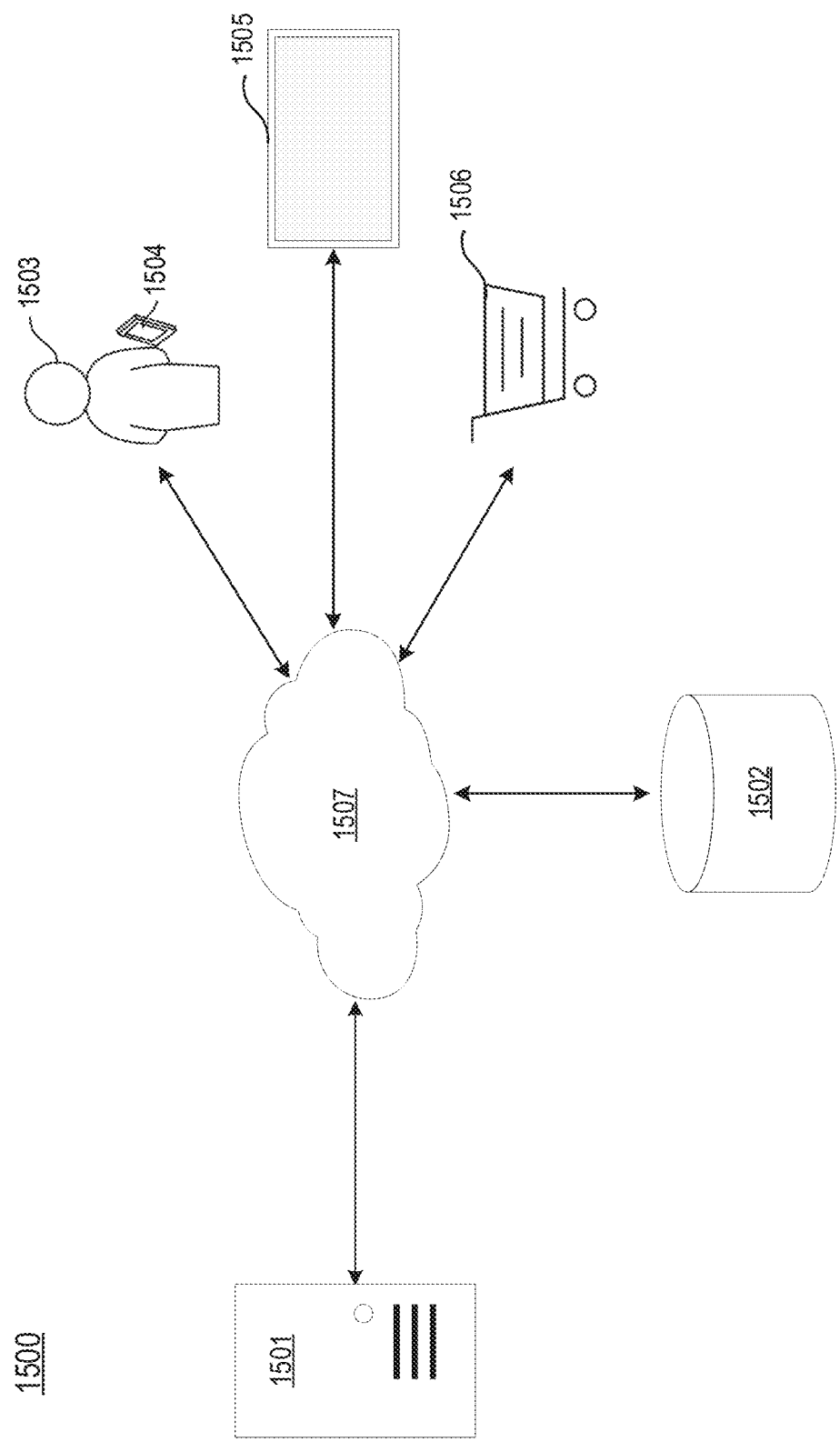
FIG. 15 is a schematic illustration of an example system for generating offers relating to identified products, consistent with the present disclosure.

FIG. 15 illustrates an example system 1500 for generating offers relating to identified products, consistent with the present disclosure. As illustrated in FIG. 15, system 1500 may include a computing device 1501, database 1502, one or more user devices 1504 associated with one or more customers 1503, one or more displays 1505, one or more shopping carts 1506, and a network 1507.

Computing device 1501 may be configured to obtain a set of images depicting a store shelf having a plurality of perishable products displayed thereon. Computing device 1501 may also be configured to analyze the set of images and determine information about the displayed inventory of the perishable products based on the analysis of the images. Computing device 1501 may further configured to obtain the information about the product type and determine at least one offer associated with the product type using the information about the displayed inventory and the information about the product type. Computing device 1501 may also be configured to provide the offer to one or more customers. In some embodiments, user device 1504 may be configured to receive one or more offers relating to a product type from computing device 1501. For example, computing device 1501 may generate a coupon associated with a particular product and transmit an offer to user device 1504. Alternatively or additionally, computing device 1501 may cause display 1505 and/or a display attached to cart 1506 to display the generated coupon.

Database 1502 may be configured to store information and/or data for one or more components of system 1500. For example, database 1502 may be configured to store one or more images captured by capturing device 155. Computing device 1501 may access the one or more images stored in database 1502. As another example, database 1502 may store information relating to a retail store, information relating to one or more store shelves of a retail store, information relating to one or more customers, information about one or more product types, or the like, or a combination thereof. Computing device 1501 may access information stored in database 1502. For example, computing device 1501 may access information about a particular product type (e.g., inventory information of a particular product type).

Network 1507 may be configured to facilitate the communication between the components of system 1500. For example, computing device 1501 may send to and receive from user device 1504 information and/or data via network 1507. Network 1507 may include a local area network (LAN), a wide area network (WAN), portions of the Internet, an Intranet, a cellular network, a short-ranged network (e.g., a Bluetooth™ based network), or the like, or a combination thereof.

Figure 16:
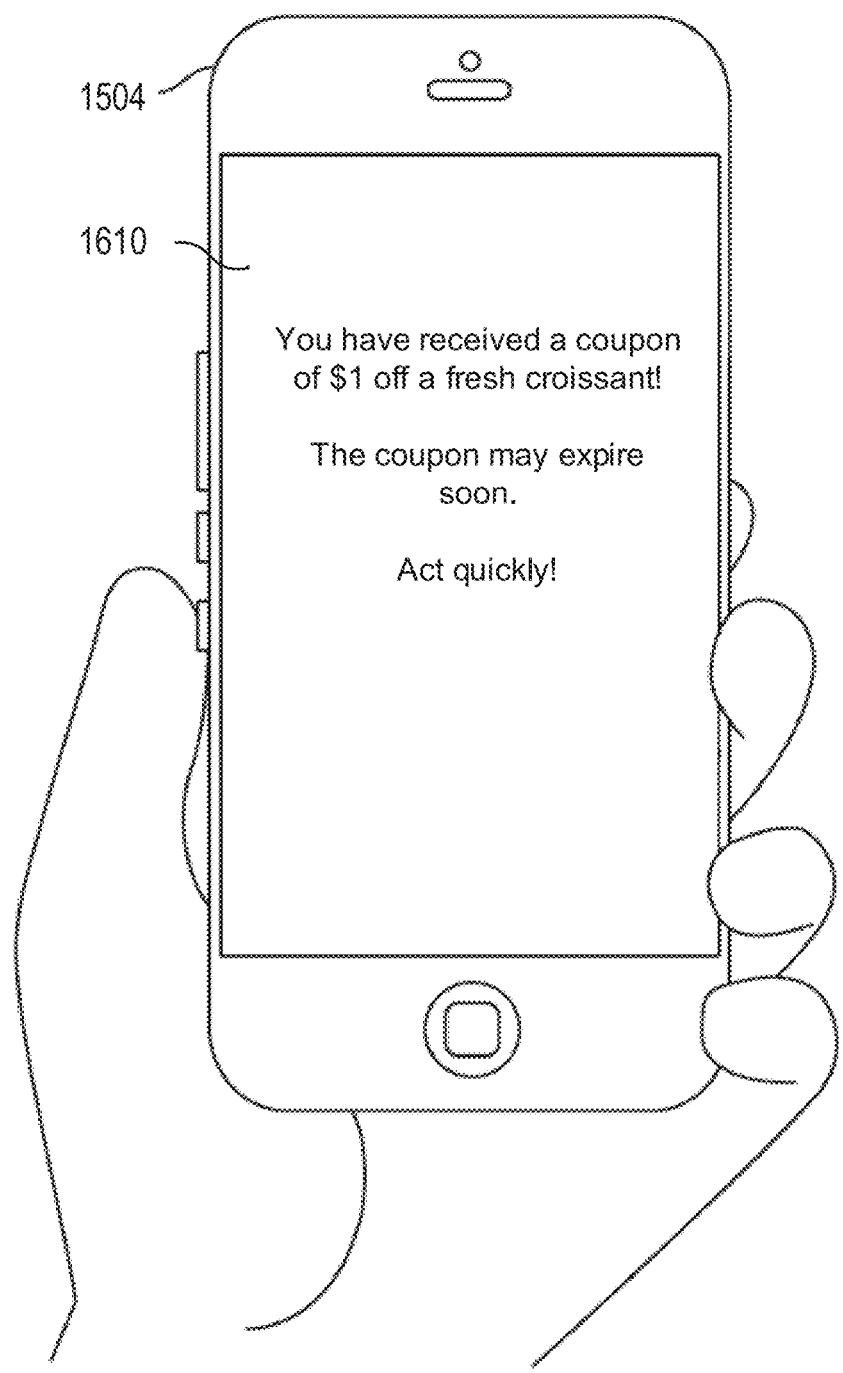
FIG. 16 is an example output for displaying an offer relating to a product, consistent with the present disclosure.

FIG. 16 is an example display showing an offer relating to a product, consistent with the present disclosure. As illustrated in FIG. 16, GUI 1610 of user device 1504 may display a notification representing an offer received from computing device 1501. In some embodiments, GUI 1610 may also include the details of the offer (e.g., the discount, the price, the location of the products associated with the offer, the time period of the offer, or the like, or a combination thereof). Optionally, GUI 1610 may also include a map showing the location of the products associated with the offer or provide directions to the user to travel to the location of the products associated with the offer (e.g., "proceed to end of aisle ten, then turn right," etc.).

In some embodiments, user device 1504 may receive an updated offer from computing device 1501, and GUI 1610 may display information relating to the updated offer. For example, user device 1504 may receive a notification from computing device 1501 indicating that the previous offer has expired, and GUI 1610 may display the information of cancellation of the offer. As another example, user device 1504 may receive an updated offer including a coupon of a discount increased from $1 to $2, and GUI 1610 may display the information relating to the updated offer.

FIG. 17 is a flowchart representing an exemplary method 1700 for identifying perishable products in retail store 105 based on analysis of image data and for automatically generating offers relating to the identified products in accordance with example embodiments of the present disclosure. For purposes of illustration, in the following description, reference is made to certain components of system 1500 as deployed in the configuration depicted in FIG. 15. For example, one or more steps of method 1700 may be performed by computing device 1501. It will be appreciated, however, that other implementations are possible and that other configurations may be utilized to implement the exemplary method. It will also be readily appreciated that the illustrated method can be altered to modify the order of steps, delete steps, or further include additional steps.

At step 1701, a set of images depicting a plurality of perishable products of at least one product type displayed on at least one shelving unit in a retail store may be received. For example, computing device 1501 may obtain a set of images depicting a store shelf having a plurality of perishable products displayed thereon. The one or more images may be captured by a capturing device as described elsewhere in this disclosure. For example, the set of images may be acquired by a plurality of image sensors fixedly mounted in retail store 105. Details of the image capturing devices mounted in retail store 105 and configured to acquire the set of images are described with references to FIGS. 5A-5C. The set of images may be used to derive image data such as processed images (e.g., cropped images, video streams, and more) or information derived from the captured images (e.g., data about products identified in captured images, data that may be used to construct a 3D image, and more). In one embodiment, the processing device may periodically receive a set of images that corresponds with the current inventory of the perishable products on the shelf. In this disclosure, the term "set of images" refers to one or more images. For example, the processing device may receive a set of images at predetermined time intervals (e.g., every minute, every 5 minutes, every 15 minutes, every 30 minutes, etc.). In another embodiment, the computing device may receive the set of images in response to a detection of a certain identified event. In one example, the processing device may receive the set of images after an event, such as a detected lifting of a perishable product from the shelving unit. For example, computing device 1501 may obtain the one or more images from a memory device, a database (e.g., database 1502), an external device, or the like, or a combination thereof, via a wired or wireless connection (e.g., network 1507).

At step 1703, the set of images may be analyzed to determine information about the displayed inventory of the plurality of perishable products. In some embodiments, computing device 1501 may analyze the set of images and determine information about the displayed inventory of the perishable products based on the analysis of the images. Exemplary information about the displayed inventory of the perishable products may include the information relating to products availability of at least one type of the perishable products, the information relating to the quality of at least one of the perishable products, or the like, or a combination thereof.

The information relating to products availability of the perishable products may include an estimated current quantity of the perishable products, a predicted quantity of the perishable products at a selected time in the future, an estimated period during which the perishable products will not be nearly out of stock, or the like, or a combination thereof. Alternatively or additionally, the information relating to products availability of the perishable products may include an indicator indicating the quantity of the perishable products. For example, computing device 1501 may determine a "few" indicator indicating that there are less than five products based on the image analysis. As another example, computing device 1501 may determine a "moderate" indicator indicating that there are greater than five and less than 20 products, based on the image analysis. Alternatively or additionally, the information relating to products availability of the perishable products may include an indicator indicating the demand of the perishable products.

The information relating to the quality of the perishable products may include an indication that the perishable products are currently in a good condition, a predicted quality condition of the perishable products at a selected time in the future (e.g., good, average, or bad), a predicted period during which the perishable products will remain in a quality condition, or the like, or a combination thereof. Alternatively or additionally, the information relating to the quality of the perishable products may include an indicator indicating the quality of at least one of the perishable products. For example, computing device 1501 may determine a "good" indicator indicating that a first perishable product has a good (or fresh) condition and determine an "average" indicator indicating that a second perishable product has a not-so-good condition, based on the image analysis.

In some embodiments, one or more models may be used to determine information about the displayed inventory of the perishable products. For example, computing device 1501 may obtain a trained machine learning model that was trained using training examples to determine products availability data from images and/or videos. An example of such training example may include an image and/or a video of perishable products, together with a label indicating the desired information to be determined about the perishable products. Computing device 1501 may determine the products availability data of at least one type of the perishable products using the trained machine learning model based on the set of images. Alternatively or additionally, computing device 1501 may obtain an artificial neural network configured to determine products availability data from images and/or videos, and determine the products availability data of at least one type of the perishable products using the artificial neural network based on the set of images. Alternatively or additionally, computing device 1501 may obtain a trained machine learning model that was trained using training examples to determine information relating to the quality of perishable products from images and/or videos. Computing device 1501 may determine the information relating to the quality of at least one of the perishable products using the trained machine learning model based on the set of images. Alternatively or additionally, computing device 1501 may obtain an artificial neural network configured to determine the quality of perishable products from images and/or videos, and determine the information relating to the quality of at least one of the perishable products using the artificial neural network based on the set of images.

In some embodiments, information about the displayed inventory of the perishable products may be derived from data received from other non-imaging sensors. For example, a weight sensor, which may be installed under (or integrated into) the store shelf, configured to determine the weight of the perishable products. Computing device 1501 may receive the weight data from the weight sensor and determine the information about the displayed inventory of the perishable products based on the weight data (e.g., the quantity of at least one type of the perishable products).

At step 1705, the information about the product type may be obtained or determined. For example, computing device 1501 may obtain the information about the product type from a memory device, a database (e.g., database 1502), an external device, or the like, or a combination thereof, via a wired or wireless connection (e.g., network 1507). Alternatively or additionally, the processing device may analyze the set of images to determine one or more indicators associated with one or more types of perishable products in retail store 105. The one or more types may include, for example, more than 25 types of perishable products, more than 50 types of perishable products, more than 100 types of perishable products, etc. In one embodiment, the processing device may determine the information about the displayed inventory of the plurality of perishable products using a combination of image data derived from the received set of images and/or data from one or more additional sensors configured to detect properties of perishable products placed on a store shelf. For example, the one or more additional sensors may include weight sensors, pressure sensors, touch sensors, light sensors, odors sensors, and detection elements as described in relation to FIGS. 8A, 8B and 9, and so forth. Such sensors may be used alone or in combination with image capturing devices 125. For example, the processing device may analyze the data received from odors sensors alone or in combination with images captured from the retail store, to estimate the condition or the ripeness level of perishable products placed on a store shelving unit.

In some embodiments, analyzing the set of images to determine information about a displayed inventory of the plurality of perishable products may further comprise preprocessing the image data. In some examples, the image data may be preprocessed by transforming the image data using a transformation function to obtain a transformed image data, and the preprocessed image data may include the transformed image data. For example, the transformation function may comprise convolutions, visual filters (such as low-pass filters, high-pass filters, band-pass filters, all-pass filters, etc.), nonlinear functions, and so forth. In some examples, the image data may be preprocessed by smoothing the image data, for example, by using Gaussian convolution, using a median filter, and so forth. In some examples, the image data may be preprocessed to obtain a different representation of the image data. For example, the preprocessed image data may include: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy compression representation of at least part of the image data; a lossless compression representation of at least part of the image data; a time order series of any of the above; any combination of the above; and so forth. In some examples, the image data may be preprocessed to extract edges, and the preprocessed image data may include information based on and/or related to the extracted edges. In some examples, the image data may be preprocessed to extract visual features from the image data. Some examples of such visual features include edges, corners, blobs, ridges, Scale Invariant Feature Transform (SIFT) features, temporal features, and so forth. One of ordinary skill in the art will recognize that the image data may be preprocessed using other kinds of preprocessing methods.

The information about the product type may include the information about the product type, information about the inventory of the products of the product type, information about the costs associated with the product type, information about previous sales of the product type, information about one or more related products or one or more related product types, or the like, or a combination thereof. For example, computing device 1501 may obtain information about the product type, including, for example, the shelf life of the product type.

The information about the inventory of the products of the product type may include the current inventory at the retail store, predicted inventory at the retail store at a selected time in the future, the current inventory at another retail store, predicted inventory at another retail store at a selected time in the future. For example, computing device 1501 may obtain information about additional perishable products from the product type available in a storage area of the retail store. As another example, computing device 1501 may obtain the information about additional perishable products from the product type scheduled to be delivered to the retail store. By way of example, computing device 1501 may obtain or determine an estimated arrival time of the additional perishable products. Alternatively or additionally, computing device 1501 may obtain or determine an estimated time to produce additional perishable products (e.g., baked products).

The information about the costs associated with the product type may include a current price of the product type, an estimated cost if a portion or all of the perishable products are discarded, or the like, or a combination thereof.

The information about one or more previous sales of the product type may include the information of at least one previous sale of products of the product type, including, for example, the time of the sale (e.g., minute, hour, day, month, etc.), the discount of the sale, the on-sale price of the sale, the time period of the sale, the quantity sold during the sale, or the like, or a combination thereof. Alternatively or additionally, the information about one or more previous sales of the product type may include the information relating to the demographic characteristic of customers that bought, including, for example, age, age group, gender, residence, or the like, or a combination thereof.

The information about one or more related products or one or more related product types may include the information of one or more other product types that a customer is also likely to buy if he or she buys the product type. For example, computing device 1501 may obtain (or determine) the information about nachos (i.e., the product type) and also the information about a related product type (e.g., avocados). In some embodiments, the information about one or more related products or one or more related product types may be determined based on cashier data of past sales associated with one or more customers. Alternatively or additionally, the information about one or more related products or one or more related product types may be determined based on the image analysis of one or more images depicting the products found in a cart of one or more customers. For example, one or more images may be captured by a built-in camera of a cart, a camera attached to a card, or a stationary camera, or the like, or a combination thereof. Computing device 1501 may analyze the one or more images and determine the information based on the image analysis.

Alternatively or additionally, the processing device may obtain information about additional perishable products scheduled to be displayed on the at least one shelving unit. Consistent with the present disclosure, the processing device may analyze scheduling data to determine one or more indicators associated with one or more types of perishable products scheduled to be delivered to retail store 105. The information about additional perishable products may include at least one of: a schedule of arrivals of the additional products (e.g., dates, times, updates from a supplier, etc.), known orders of the additional products (e.g., quantity of scheduled products), delivery records (e.g., the reports on the delivery progress of the additional products), cost data (e.g., the different costs associated with the additional products), calendar data (e.g., holidays, sport games, etc.), historical product turnover data (e.g., the amount of avocados sold per last April), average turnover (e.g., per hour in a day, per day in a week, per special events), and more. In one embodiment, the information about the additional perishable products may be obtained from multiple sources (e.g., market research entity 110, supplier 115, and multiple retail stores 105) and may include different types of parameters. In some embodiments, the obtained information about the additional perishable products may be stored digitally in memory device 226, stored in database 140, received using network interface 206 through communication network 150, received from a user, determined by processing device 202, and so forth.

At step 1707, the information about the displayed inventory and the information about the product type may be used to determine at least one offer associated with the product type. For example, computing device 1501 may determine at least one offer associated with the product type using the information about the displayed inventory (described elsewhere in this disclosure) and the information about the product type (described elsewhere in this disclosure). In some embodiments, computing device 1501 may determine the terms of an offer, including, for example, one or more products associated with the offer, a discount associated with the offer, a price of the product type(s), a time period of the offer, one or more customers who are to receive the offer, the quantity of the products associated with the offer, one or more restrictions associated with the offer (e.g., the quantity of the products that one customer can purchase), or the like, or a combination thereof.

For example, the information about the displayed inventory may include quality indicators for the plurality of perishable products. Computing device 1501 may determine the quality indicators for the plurality of perishable products based on an analysis of the set of images and use the determined quality indicators for the plurality of perishable products to determine the offer associated with the product type (e.g., a sale for croissants). Optionally, computing device 1501 may also use the determined quality indicators to determine a shelf-life estimation of the plurality of perishable products, and to determine the offer associated with the product type based on shelf-life estimation of the plurality of perishable products. For example, computing device 1501 may determine that a shelf-life estimation of croissants is 45 minutes and determine a sale of croissants starting in 10 minutes. Alternatively or additionally, computing device 1501 may obtain information about additional perishable products from the product type available in a storage area of the retail store. Computing device 1501 may also use the information about the displayed inventory and the information about the additional perishable products available in the storage area to determine the offer associated with the product type. By way of example, computing device 1501 may determine that there is a large quantity of avocados in the storage based on the obtained information and determine a sale of avocados at a discount. Alternatively or additionally, computing device 1501 may obtain the information about additional perishable products from the product type scheduled to be delivered to the retail store and use the information about the displayed inventory and the information about the additional perishable products scheduled to be delivered to the retail store to determine the offer associated with the product type. Alternatively or additionally, computing device 1501 may obtain information about costs associated with the product type and use the information about the displayed inventory and the costs associated with the product type to determine the offer associated with the product type. Alternatively or additionally, computing device 1501 may obtain a current price for the product type and use the information about the displayed inventory and the current price for the product to determine the offer associated with the product type. Alternatively or additionally, computing device 1501 may obtain the details of at least one previous sale of products from the product type and use the information about the displayed inventory and the details of the previous sale to determine the offer associated with the product type. By way of example, computing device 1501 may obtain the details of at least one previous sale including at least one demographic characteristic of customers that bought the product type. Computing device 1501 may determine an offer to at least one customer of the retail store based on a predetermined demographic characteristic associated with the customer (e.g., sending a coupon of pizza to young people, but not to older people).

In some embodiments, the determination of an offer may be further based on the information relating to a particular customer. For example, computing device 1501 may obtain (or determine) information indicative of products from multiple product types that a customer is likely to buy (described elsewhere in this disclosure), and use the information about the displayed inventory, the stored information about the product type, and the information indicative of products that the customer is likely to buy to determine a personalized offer for the customer. In some embodiments, computing device 1501 may obtain the information relating to a particular customer from a memory device, a database (e.g., database 1502), an external device, or the like, or a combination thereof, via a wired or wireless connection (e.g., network 1507).

In some embodiments, the information relating to a particular customer used for generating an offer to a customer may include a personalized profile of the customer. The personalized profile of the customer may include information based on past purchases of the customer, and the information based on past purchases of the customer and/or the image-based products availability data may be used to generate an offer to the customer (e.g., a coupon). Alternatively or additionally, the personalized profile of the customer may include levels of association of the customer to a plurality of retail stores (e.g., based on past purchases, based on past geo-location information related to the user, etc.). In some embodiments, the image-based products availability data may include image-based products availability records related to the plurality of retail stores, and the levels of association of the customer to the plurality of retail stores and/or the image-based products availability records related to the plurality of retail stores may be used to generate an offer. Alternatively or additionally, the personalized profile of the customer may include an indication that the customer is near a retail store. In some embodiments, the image-based products availability data may include image-based products availability records related to the retail store, and the indication that the customer is near the retail store and/or the image-based products availability records related to the retail store may be used to generate an offer. Alternatively or additionally, the personalized profile of the customer may include a current location of the customer within a retail store. In some embodiments, the image-based products availability data may include image-based products availability record related to the retail store, and the current location of the customer within the retail store and/or the image-based products availability record related to the retail store may be used to generate an offer. Alternatively or additionally, the personalized profile of the customer may include information related to times of shopping events related to the customer. The information related to times of shopping events related to the customer may be used to predict a time of a future shopping event of the customer. In some embodiments, the image-based products availability data may be used to predict future products availability data related to the predicted time of the future shopping event of the customer. The predicted future products availability data may be used to generate an offer.

In some embodiments, computing device 1501 may be configured to identify a specific customer that will likely to be interested in discounted products from the product type. For example, computing device 1501 may identify the specific customer based on a personalized profile of the customer may be accessed (described elsewhere in this disclosure) and other information. Computing device 1501 may also determine an offer for this customer based on the information about the displayed inventory and the information about the product type may be used to determine at least one offer associated with the product type as described elsewhere in this disclosure.

At step 1709, the offer may be provided to one or more individuals. For example, computing device 1501 may obtain the information relating to the offer and transmit the offer to user device 1504 associated with customer 1503.

In some embodiments, information related to an offer (e.g., a generated coupon) may be stored in memory or a database (e.g., database 1502). Alternatively or additionally, a generated offer may be transmitted through a communication network using a communication device to, for example, an external device, a user device associated with one or more customers, a computer associated with the retail store, one or more displays in the retail store, a computer associated with one or more other retail stores, one or more displays associated with one or more other retail stores, or the like, or a combination thereof. For example, a generated coupon may be provided to the customer, for example, using a mobile device associated with the customer (such as a cell phone, smart glasses, tablet, display on a cart associated with the customer, etc.), through a dedicated application, through a website, through an email, through mail, or the like, or a combination thereof. By way of example, computing device 1501 may transmit a message to a mobile communication device associated with the customer to display information related to the offer (e.g., a notification illustrated in GUI 1610 shown in FIG. 16). Alternatively or additionally, computing device 1501 may cause an augmented reality system associated with the customer to display information related to the offer. Alternatively or additionally, computing device 1501 may transmit information relating to the offer to one or more displays in the retail store for displaying the offer. By way of example, computing device 1501 may cause a display attached to a cart associated with the customer to display information related to the offer. In some embodiments, the display may also display information related to the generated offer.

In some embodiments, computing device 1501 may generate a customized offer for a particular customer as described elsewhere in this disclosure. Computing device 1501 may provide the customized offer to the customer by, for example, transmitting the offer to a user device associated with the customer.

In some embodiments, an offer may be modified or canceled. For example, computing device 1501 may receive one or more additional images depicting the shelving unit in the retail store after the offer was provided to at least one customer. Computing device 1501 may also analyze the one or more additional images to determine current inventory of products from the product type as described elsewhere in this disclosure. When the current inventory of products from the product type is less than a threshold, computing device 1501 may modify or cancel the offer. For example, computing device 1501 may inform one or more customers that the offer is expired. Alternatively or additionally, computing device 1501 may use the current inventory of products of the product type and the stored information to determine at least one updated offer associated with the product type. Computing device 1501 may update the offer by modifying one or more products specified in the offer, a discount, a price, a quantity that a customer can buy, the time period of the offer, or the like, or a combination thereof. Computing device 1501 may also transmit the updated offer to an external device, a user device associated with one or more customers, a computer associated with the retail store, one or more displays in the retail store, a computer associated with one or more other retail stores, one or more displays associated with one or more other retail stores, or the like, or a combination thereof.

Embodiments of the present disclosure may provide a system for dynamically identifying a deviation of the actual placement of products on a store shelf from a current planogram based on the analysis of images. The system may be configured to dynamically select, among a plurality of planograms, a planogram for determining whether the products placed on the store shelf conform to the identified planogram. For example, a planogram may be used for determining the compliance of the produced placed on the store shelf during a certain period of time of a day (e.g., 8:00 to 11:00 a.m.). The system may receive a set of images depicting products on the store shelf and select the planogram based on the time when the first set of images are captured. The system may also be configured to analyze the images and determine whether the products on the store shelf conform with the planogram.

Figure 18:
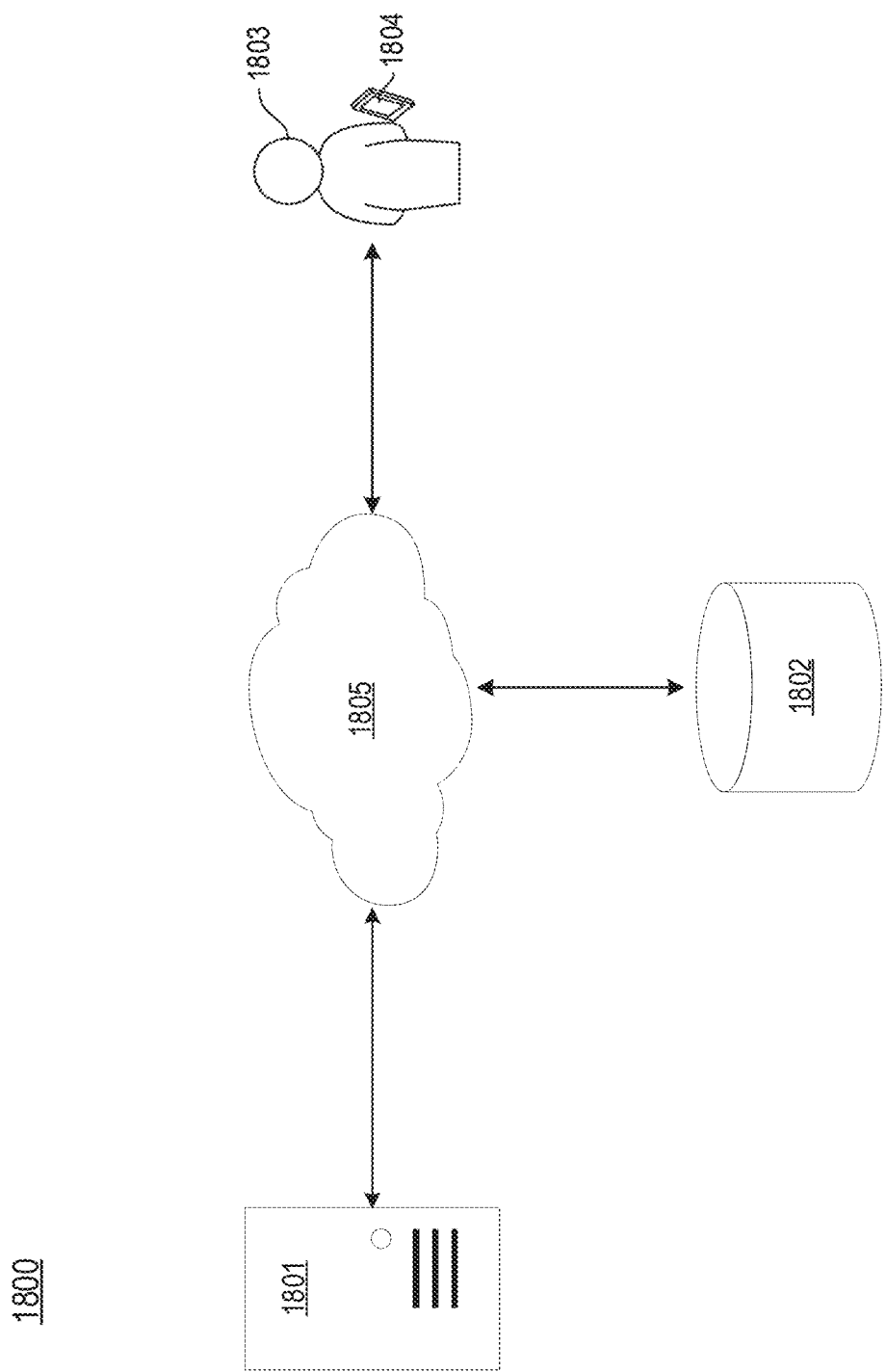
FIG. 18 is a schematic illustration of an example system for identifying changes in planograms, consistent with the present disclosure.

FIG. 18 is a schematic illustration of an example system for identifying changes in planograms, consistent with the present disclosure. FIG. 18 illustrates an example system 1800 for generating offers relating to identified products, consistent with the present disclosure. As illustrated in FIG. 18, system 1800 may include a computing device 1801, database 1802, one or more user devices 1804 associated with one or more employees 1803 of a retail store, and a network 1805.

Computing device 1801 may be configured to obtain a first planogram and receive a first set of images depicting a first plurality of products on a shelving unit (or a store shelf). Computing device 1801 may also be configured to analyze the first set of images to determine an actual placement of at least portion of the first plurality of products displayed on the shelves of the retail store at the first time. Computing device 1801 may further be configured to identify a deviation of an actual placement of at least some of the first plurality of products from the desired placement of products associated with the first planogram, based on the first planogram and the determined actual placement of at least some of the first plurality of products displayed on the store shelf. Computing device 1801 may also be configured to generate a first user-notification associated with the deviation of the actual placement of the at least some of the first plurality of products from the desired placement of products associated with the first planogram. Computing device 1801 may further be configured to receive a second set of images captured at a second time and depicting a second plurality of products displayed on the at least one of the shelves of the retail store. Computing device 1801 may also be configured to analyze the second set of images to determine an actual placement of the second plurality of products displayed on the shelves of the retail store at the second time. Computing device 1801 may further be configured to access a rule specifying which planogram (e.g., the first planogram, the second planogram, or anther planogram) is to be used for determining whether an arrangement associated with the second plurality of products are in planogram compliance.

Computing device 1801 may also be configured to analyze the second set of images to determine whether an arrangement associated with the second plurality of products conforms to the particular planogram (e.g., the second planogram) rather than the first planogram may be determined. If computing device 1801 determines that an arrangement associated with the second plurality of products conforms to the second planogram, computing device 1801 may withhold the issuance of a second notification indicating the deviation associated with the first planogram.

User device 1804 may be configured to receive information from computing device 1801 via, for example, network 1805. For example, user device 1804 may be configured to receive a notification associated with a deviation of the actual placement of products on a store shelf from computing device 1801. In some embodiments, user device 1804 may include an output device to show the notification received from computing device 1801. For example, user device 1804 may include a display configured to provide a GUI showing the notification associated with the deviation.

Database 1802 may be configured to store information and/or data for one or more components of system 1800. For example, database 1802 may be configured to store one or more images captured by capturing device 185 (not shown) as described elsewhere in this disclosure. Computing device 1801 may access the one or more images stored in database 1802. As another example, database 1802 may store one or more planograms. A planogram may describe or specify a desired placement of products on shelves of a retail store during a time period, as described elsewhere in this disclosure.

Network 1805 may be configured to facilitate the communication between the components of system 1800. For example, computing device 1801 may send to and receive from user device 1804 information and/or data via network 1805. Network 1805 may include a local area network (LAN), a wide area network (WAN), portions of the Internet, an Intranet, a cellular network, a short-ranged network (e.g., a Bluetooth™ based network), or the like, or a combination thereof.

Figure 19:
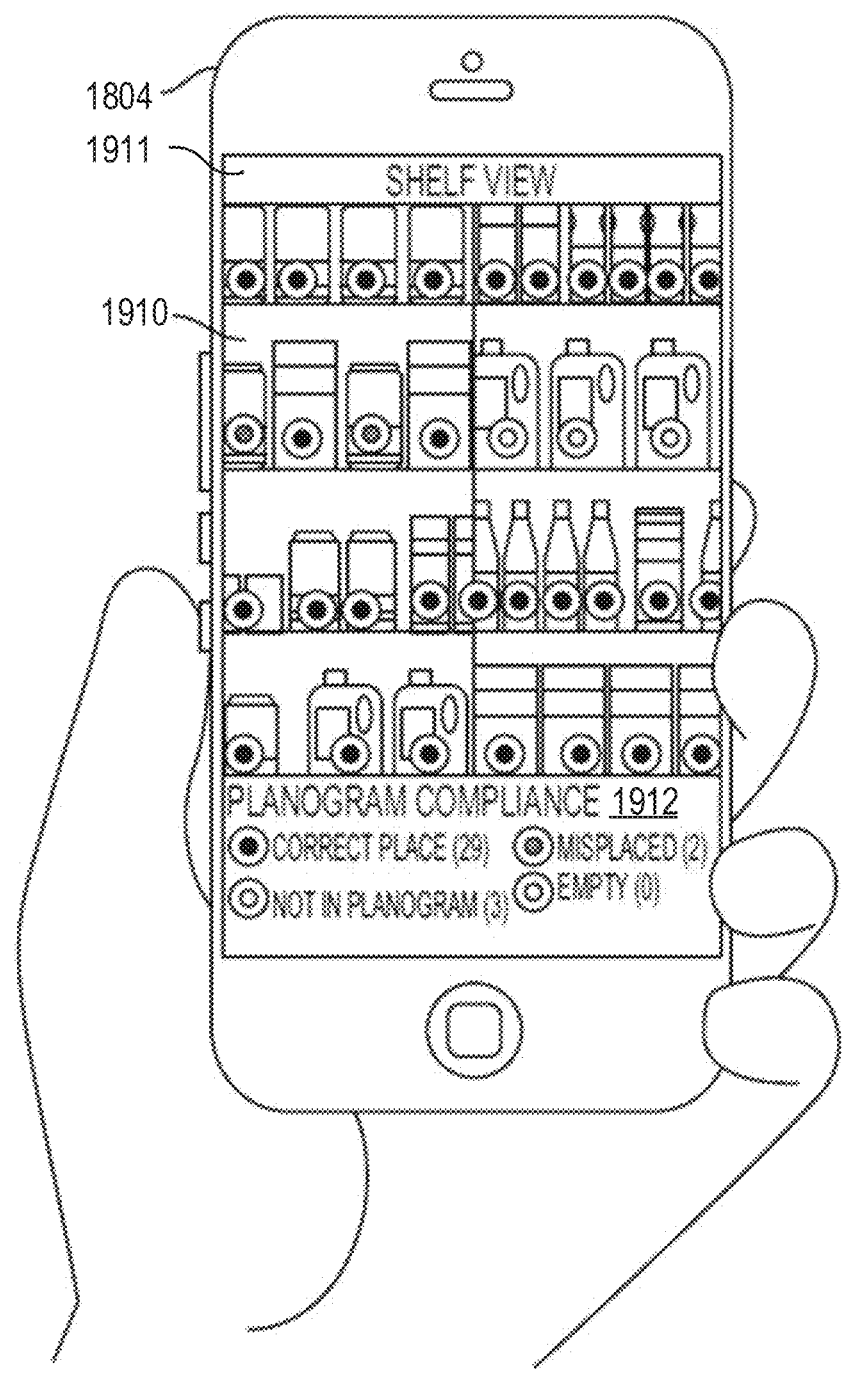
FIG. 19 is an example output for monitoring planogram compliance on a store shelf, consistent with the present disclosure.

FIG. 19 is an example output for displaying a deviation of an actual placement of products displayed on a store shelf from the desired placement of products associated with a planogram. For example, computing device 1801 may be configured to transmit a notification associated with a deviation to user device 1804 associated with employee 1803 illustrated in FIG. 18. An output device of user device 1804 (e.g., a display) may display a GUI 1910 showing the notification associated with the deviation, as illustrated in FIG. 19. In some embodiments, GUI 1910 may include a first display area 1911 for showing a display of one or more images depicting a store shelf with augmented markings indicting the deviation (e.g., correct place, misplaced, not in planogram, empty, and so forth). GUI 1910 may also include a second display area 1912 for showing a summary of the deviation.

Figure 20B:
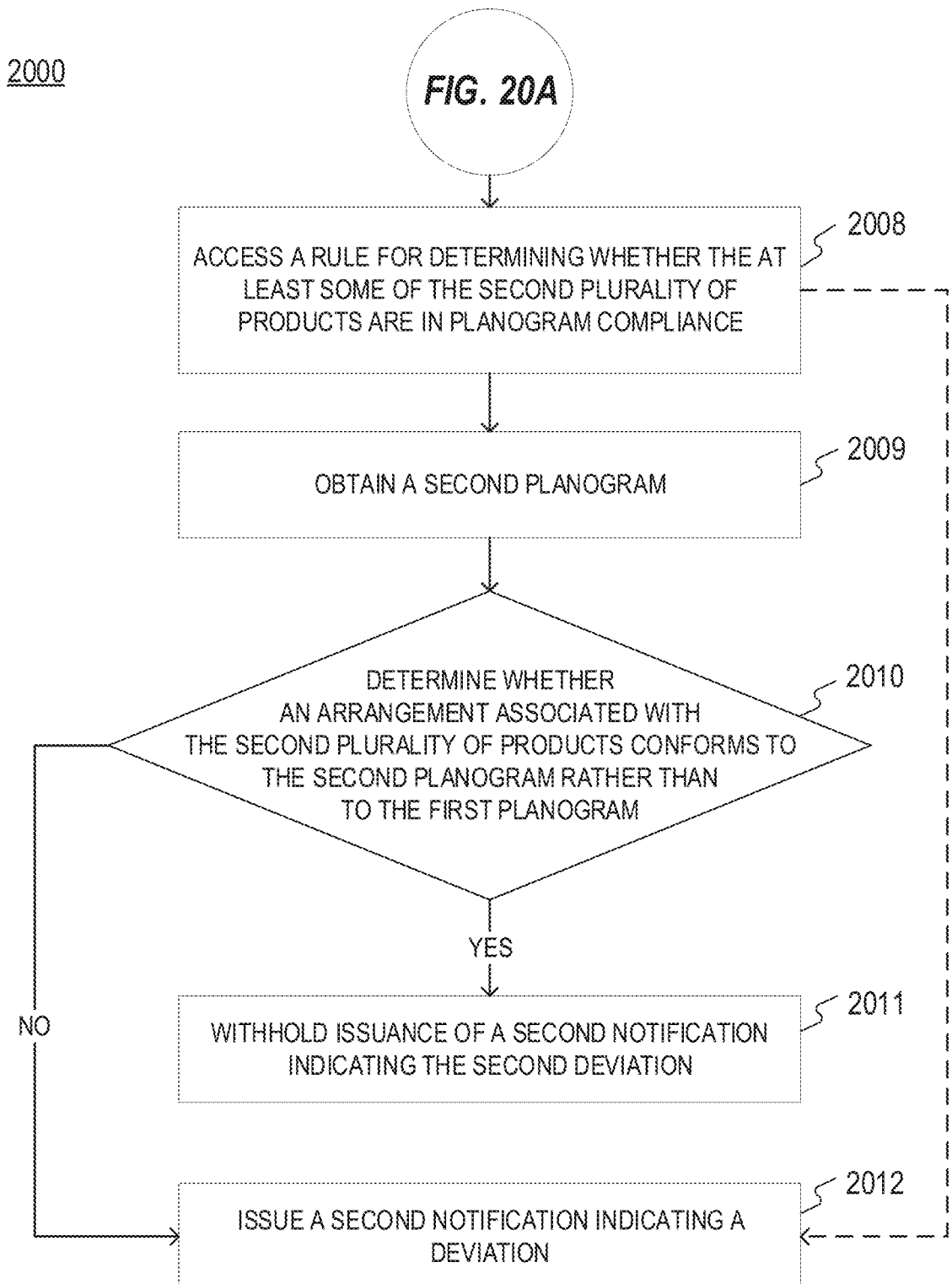
FIG. 20B is a flowchart of an exemplary method for issuing a notification of planogram deviation, consistent with the present disclosure.

FIGS. 20A and 20B show a flowchart of an exemplary method 2000 for issuing a notification of planogram deviation, consistent with the present disclosure. At step 2001, a first planogram may be obtained. For example, computing device 1801 may obtain a first planogram from a memory device, a database (e.g., database 1502), an external device, or the like, or a combination thereof, via a wired or wireless connection (e.g., network 1507). A planogram may describe a desired placement of products on shelves of a retail store during a time period, as described elsewhere in this disclosure. In some embodiments, computing device 1801 may be configured to access a plurality of planograms stored in a database (e.g., database 1802). The planograms may include a first planogram and a second planogram. In some embodiments, the planograms accessed by computing device 1801 may include three or more planograms. In some embodiments, the plurality of planograms may be indicative of the desired placement of products on shelves of the retail store at different times of a day. For example, the first planogram may be associated with a first time period and the second planogram may be associated with a second time period subsequent to the first time period. By way of example, the first planogram may be associated with a first time period between 08:00 to 16:00, and the second planogram may be associated with a second time period between 16:00 to 22:00. In some embodiments, one or more planograms obtained by computing device 1801 may be indicative of the desired placement of products on shelves of the retail store at different times (or time periods) of a day, different days of a week, different weeks of a month, different months of a year, different years, or the like, or a combination thereof. Alternatively or additionally, at least one of the planograms may be received from another retail store. For example, computing device 1801 may receive a planogram from a computing device associated with another retail store. The planogram from another retail store may be more updated or recent. Alternatively or additionally, computing device 1801 may receive one or more images depicting one or more shelves in another retail store and determine a planogram (as one of the planograms described above) based on the analysis of the one or more images received. For example, computing device 1801 may determine an actual arrangement of the products on the one or more shelves in the retail store based on the image analysis, determine a planogram based on the actual arrangement of the products. In some embodiments, computing device 1801 may also determine a time period associated with the determined planogram.

At step 2002, a first set of images captured at a first time and depicting a first plurality of products displayed on at least one of the shelves of the retail store may be received. For example, a first set of images depicting a first plurality of products displayed on at least one of the shelves of the retail store may be captured by a capturing device (e.g., capturing device 155) at a first time. Computing device 1801 may receive the first set of images from a capturing device, a memory device, a database (e.g., database 1502), an external device, or the like, or a combination thereof, via a wired or wireless connection (e.g., network 1507). By way of example, computing device 1801 may include a data interface configured to receive the first set (and/or other set) of images from one or more image sensors fixedly mounted on the at least one retail shelving unit.

At step 2003, the first set of images may be analyzed to determine an actual placement of a first plurality of products. For example, computing device 1801 may be configured to analyze the first set of images to determine an actual placement of at least a portion of the first plurality of products displayed on the shelves of the retail store at the first time, as described elsewhere in this disclosure.

In some embodiments, one or more computer models or algorithms may be used to determine the actual placement of products on a store shelf. For example, computing device 1801 may obtain a trained machine learning model that was trained using training examples to determine the actual placement of products on a store shelf from images and/or videos. Computing device 1801 may determine the actual placement of the first plurality of products on the store shelf using the trained machine learning model based on the first set of images. Alternatively or additionally, computing device 1501 may obtain an artificial neural network configured to determine the actual placement of products on a store shelf from images and/or videos, and determine the actual placement of products on a store shelf using the artificial neural network based on the first set of images. Alternatively or additionally, computing device 1801 may use one or more computer vision algorithms to analyze the first set of images to determine the actual placement of the first plurality of products on the store shelf.

At step 2004, a first deviation of an actual placement of at least some of the first plurality of products may be determined. For example, computing device 1801 may be configured to identify a deviation of an actual placement of at least some of the first plurality of products from the desired placement of products associated with the first planogram, based on the first planogram and the determined actual placement of at least some of the first plurality of products displayed on the store shelf. By way of example, computing device 1801 may detect one or more deviations based on differences between the first planogram and the actual placement of the at least some of the plurality of products. In some embodiments, a deviation may relate to one or more characteristics of planogram compliance, which are described elsewhere in this disclosure. For example, a deviation may include product facing, product placement, planogram compatibility, price correlation, promotion execution, product homogeneity, restocking rate, and planogram compliance of adjacent products, or the like, or a combination thereof.

In some embodiments, if computing device 1801 does not identify any deviation, computing device 1801 may not issue any notification (e.g., a notification associated with a deviation as described elsewhere in this disclosure). Alternatively, computing device 1801 may issue a notification indicating that no deviation associated with the store shelf is found. For example, computing device 1801 may transmit a notification indicating that no deviation associated with the store shelf is found to a device associated with an employee of the retail store, a device associated with the retail store, or the like, or a combination thereof. Alternatively or additionally, computing device 1801 may store the information indicating no deviation was found at the first time.

At step 2005, a first notification associated with the first deviation may be issued. For example, computing device 1801 may be configured to generate a first user-notification associated with the deviation of the actual placement of the at least some of the first plurality of products from the desired placement of products associated with the first planogram. Computing device 1801 may also be configured to transmit the first user-notification to a handheld device associated with an employee. In some embodiments, the notification may also include details of the deviation of the actual placement of the at least some of the first plurality of products from the desired placement of products associated with the first planogram. By way of example, computing device 1801 may transmit a notification associated with the first deviation to user device 1804 associated with employee 1803 illustrated in FIG. 18. An output device of user device 1804 (e.g., a display) may display a GUI 1910 showing a first display area 1911 for showing a display of one or more images depicting a store shelf with augmented markings indicting the deviation (e.g., correct place, misplaced, not in planogram, empty, and so forth). GUI 1910 may also include a second display area 1912 for showing a summary of the deviation. Alternatively or additionally, computing device 1801 may be configured to transmit the first notification to a computer associated with the retail store, which may include an output device configured to display the notification.

At step 2006, after the first user-notification is issued, a second set of images captured at a second time and depicting a second plurality of products displayed on the at least one of the shelves of the retail store may be received. For example, a second set of images may be captured by a capturing device (e.g., capturing device 155) at a second time, which may depict a second plurality of products displayed on the at least one of the shelves of the retail store. Computing device 1801 may receive the second set of images from the capturing device, a memory device, a database (e.g., database 1502), an external device, or the like, or a combination thereof, via a wired or wireless connection (e.g., network 1507). In some embodiments, the second plurality of products may be the first plurality of products depicted in the first set of images. Alternatively, the second plurality of products may be different from the first plurality of products depicted in the first set of images In some embodiments, as described elsewhere in this disclosure, the first planogram may be associated with a first time period and the second planogram may be associated with a second time period subsequent to the first time period. The second time at which the second set of images are captured may be included in the first time period. By way of example, the first planogram may be associated with a first time period between 08:00 to 16:00, and the second planogram may be associated with a second time period between 16:00 to 22:00. The store employee may change the arrangement of the products according to the second planogram at 15:00. The capturing device may be configured to capture the second set of images at 15:05 (i.e., the second time).

In some embodiments, computing device 1801 may include a data interface configured to receive the second set (and/or the first set) of images from one or more image sensors fixedly mounted on the at least one retail shelving unit.

At step 2007, a second deviation of the actual placement of at least some of the second plurality of products from the desired placement of products associated with the first planogram may be determined. For example, computing device 1801 may be configured to analyze the second set of images to determine an actual placement of the second plurality of products displayed on the shelves of the retail store at the second time. Computing device 1801 may also be configured to identify a deviation of the actual placement of at least some of the second plurality of products from the desired placement of products associated with the first planogram, as described elsewhere in this disclosure (e.g., the description in connection with steps 2003 and 2004). By way of example, the first planogram may indicate that a group of first products are supposed to be placed on a shelving unit. Computing device 1801 may determine that a group of second products are placed on the shelving unit where a group of first products were supposed to be placed, and identify this deviation as a deviation of the actual placement of at least some of the second plurality of products from the desired placement of products associated with the first planogram. In some embodiments, a machine learning model may be trained using training examples to determine deviations of actual placements of products from planograms from images and/or videos, and from planograms. An example of such training example may include a planogram, and an image and/or a video depicting products on one or more retail shelves, together a label indicating a deviation of the placement of the products in the image and/or in the video from the planogram. Additionally or alternatively to step 2003 and/or step 2004, method 2000 may use the trained machine learning model to analyze the first set of images received by step 2002 and the first planogram received by step 2001 to determine the first deviation. Additionally or alternatively to step 2007, method 2000 may use the trained machine learning model to analyze the second set of images received by step 2006 and the first planogram received by step 2001 to determine the second deviation.

In some embodiments, computing device 1801 may be configured to determine the second time is during a transition period between the first planogram and a different planogram (e.g., the second planogram or a third planogram). In response to the determination that the second time is during the transition period, method 2000 may proceed to step 2011, at which computing device 1801 may withhold issuance of the second user-notification associated with the deviation of the actual placement of the at least some of the second plurality of products from the desired placement of products associated with the first planogram.

At step 2008, a rule for determining whether the at least some of the second plurality of products are in planogram compliance may be accessed. For example, computing device 1801 may be configured to access a rule specifying which planogram (e.g., the first planogram, the second planogram, the third planogram, or anther planogram) is to be used for determining whether an arrangement associated with the second plurality of products are in planogram compliance. By way of example, a rule may specify that, instead of the first planogram, the second planogram should be used for determining whether the second plurality of products are in planogram compliance. Computing device 1801 may be configured to use the second planogram to determine whether an arrangement associated with the second plurality of products conforms to the second planogram rather than to the first planogram. Alternatively, if the rule specifies that the first planogram should be used, method 2000 may proceed to step 2012 (the dashed line coming out of box 2008 and pointing to box 2012), and a second notification associated with the second deviation identified at step 2007 may be issued.

In some embodiments, computing device 1801 may receive the rule from a memory device, a database (e.g., database 1802), an external device, or the like, or a combination thereof, via a wired or wireless connection (e.g., network 1805).

In some embodiments, the rule may specify a particular planogram to use for determining whether at least some of the second plurality of products are in planogram compliance, based on the time of the second set of images being captured (i.e., the second time), the time elapsed since the first plurality of products were last arranged according to the first planogram, the data from another retail store indicative of a current planogram being used in the another retail store, or the like, or a combination thereof. Computing device 1801 may access the rule and select a particular planogram (e.g., among a group of possible of planograms) according to the rule. Computing device 1801 may also determine whether at least some of the second plurality of products are in planogram compliance according to the selected planogram, as described elsewhere in this disclosure. For example, the rule may specify the second planogram to use when it is the Christmas season, and computing device 1801 may select the second planogram to use for determining whether at least some of the second plurality of products are in planogram compliance if the second time is during the Christmas season or in December.

In some embodiments, the rule may be used to analyze the image data (e.g., the first set of images, the second set of images, or both) to determine whether to switch from the first planogram to the second planogram. For example, the image data may be analyzed (for example using a machine learning model trained using training examples, using an artificial neural network, using computer vision algorithms, etc.) to determine whether a trigger specified by the rule is detected and/or a condition specified by the rule is met. Alternatively or additionally, the image data may comprise a depiction of the specific area of the store shelf, and the rule may be based, at least in part, on a level of planogram compliance related to the specific area of the store shelf determined by analyzing the image data. Alternatively or additionally, the image data may comprise a depiction of the specific area of the store shelf, and the rule may be based, at least in part, on availability of products on the specific area of the store shelf determined by analyzing the image data. Alternatively or additionally, the image data may comprise a depiction of the specific area of the shelf, and the rule may be based, at least in part, on a flow of products corresponding to the specific area of the store shelf determined by analyzing the image data. Alternatively or additionally, the image data may comprise a depiction of customers entering the retail store, and the rule may be based, at least in part, on at least one property of the customers entering the retail store determined by analyzing the image data.

In some embodiments, when the rule for switching one planogram to another planogram is activated, computing device 1801 may transmit a notification indicating the switch of the planograms to, for example, a device associated with one or more employees, a device associated with the retail store, a device associated with a non-employee (e.g., a customer) or the like, or a combination thereof. For example, computing device 1801 may transmit a notification to user device 1804 indicating that the second planogram is in effect. In some embodiments, the notification may include at least one change to the products placed on the store shelf (e.g., at least one product is needed to be replaced on a specific area of the store shelf). Alternatively or additionally, the notification may include an instruction to move the store shelf (e.g., to be moved by automatically using a mechanical mechanism, by a store employee, by a non-employee, or the like, or a combination thereof).

In some embodiments, computing device 1801 may be configured to determine a likelihood of switching from the first planogram to another planogram (e.g., the second planogram). If computing device 1801 determines that the likelihood is smaller than threshold, computing device 1801 may issue a user-notification associated with a deviation of the actual placement of the at least some of the second plurality of products from the desired placement of products associated with the first planogram. On the other hand, if the likelihood is greater than the threshold, computing device 1801 may use the second planogram for determining whether the products conform to the second planogram (instead of the first planogram), as described elsewhere in this disclosure.

At step 2009, a particular planogram (e.g., the second planogram) may be obtained based on the rule. For example, computing device 1801 may obtain the second planogram based on the rule. Computing device 1801 may receive the second planogram from a memory device, a database (e.g., database 1802), an external device, or the like, or a combination thereof, via a wired or wireless connection (e.g., network 1805). Alternatively or additionally, step 2008 may be excluded from method 2000, and step 2009 may obtain the particular planogram (such as the second planogram, the third planogram, other planograms, and so forth), for example by reading the particular planogram from a memory device, by generating the particular planogram (for example, from a realogram, according to inputs from a user, by analyzing past image data, and so forth), from an external device (for example, through a communication device), by selecting the particular planogram of a plurality of alternative planograms, and so forth. In some embodiments, the first planogram may indicate of a group of first products are supposed to be placed on the shelving unit, and the second planogram may indicate that a group of second products are supposed to be placed on the shelving unit. Optionally, the group of second products may include more than five products from a same type. Alternatively or additionally, the group of second products may include products from at least two types of products.

At step 2010, whether an arrangement associated with the second plurality of products conforms to the particular planogram (e.g., the second planogram) rather than the first planogram may be determined. For example, computing device 1801 may be configured to analyze the second set of images to determine an actual placement of at least a portion of the second plurality of products displayed on the shelves of the retail store, as described elsewhere in this disclosure. Computing device 1801 may also be configured to determine whether an arrangement associated with the second plurality of products conforms to the second planogram, based on the actual placement of at least portion of the second plurality of products and the second planogram (as described elsewhere in this disclosure). For example, computing device 1801 may determine an arrangement associated with the second plurality of products conforms to the second planogram when the percent of the group of second products placed on the at least one of the shelves of the retail store conforms to the second planogram equals or exceeds a threshold (e.g., 90%). In some examples, a machine learning model may be trained using training examples to select most conforming planograms to actual arrangements of products of pluralities of alternative planograms. An example of such training example may include a plurality of alternative planograms (such as two planograms, three planograms, more than three planograms, etc.) and an indication of an actual arrangement of products, together with a label indicating the planogram of the plurality of alternative planograms that the actual placement of products is most conforming with, or together with a label indicating that the actual placement of products does no conform with any of planogram of the plurality of alternative planograms. Further, in one example, step 2010 may use the trained machine learning model to analyze the arrangement associated with the second plurality of products and determine whether the arrangement conforms with the first planogram, with the second planogram, with the third planogram, with another planogram, with no planogram, and so forth. In some examples, a machine learning model may be trained using training examples to select most conforming planograms to actual arrangements of products of pluralities of alternative planograms based on images and/or videos of the actual arrangements of products. An example of such training may include a plurality of alternative planograms (such as two planograms, three planograms, more than three planograms, etc.) and an image and/or a video of an actual arrangement of products, together with a label indicating the planogram of the plurality of alternative planograms that the depicted actual placement of products is most conforming with, or together with a label indicating that the depicted actual placement of products does no conform with any of planogram of the plurality of alternative planograms. Further, in one example, step 2010 may use the trained machine learning model to analyze the second set of images received by step 2006 and determine whether the arrangement conforms with the first planogram, with the second planogram, with the third planogram, with another planogram, with no planogram, and so forth. If computing device 1801 determines that an arrangement associated with the second plurality of products conforms to the second planogram, method 2000 may proceed to step 2011. At step 2011, computing device 1801 may withhold the issuance of a second notification indicating the deviation associated with the first planogram (identified at step 2007). On the other hand, if computing device 1801 determines that an arrangement associated with the second plurality of products does not conform to the second planogram, method 2000 may proceed to step 2012.

At step 2012, computing device 1801 may issue a second notification indicating a deviation associated with at least some products of the second plurality of products from the first planogram (e.g., a deviation identified at step 2007). Alternatively or additionally, computing device 1801 may issue a second notification indicating a deviation associated with at least some products of the second plurality of products from the second planogram, which may be identified based on the analysis of the second set of images as described elsewhere in this disclosure. For example, computing device 1801 may analyze the second set of images and determine an actual placement of at least some of the second plurality of products from the desired placement of products associated with the second planogram based on the image analysis. Computing device 1801 may also identify a deviation of the actual placement of at least some of the second plurality of products from the desired placement of products associated with the second planogram. By way of example, computing device 1801 may detect one or more deviations based on differences between the second planogram and the actual placement of the at least some of the second plurality of products.

In some embodiments, computing device 1801 may access a plurality of planograms (as described elsewhere in this disclosure), which may include at least three planograms (e.g., the first planogram, the second planogram, and a third planogram). Computing device 1801 may analyze the second set of images and the at least three planograms to determine which planogram was used for arranging the second plurality of products at a time between the first time and the second time, for example using a machine learning model as described above. In response to a determination that the second plurality of products were arranged according to the second planogram and that there is a deviation of the actual placement of the second plurality of products from the desired placement of products associated with the second planogram, computing device 1801 may issue a user-notification associated with the second planogram. Alternatively, in response to a determination that the second plurality of products were arranged according to another planogram and that there is a deviation of the actual placement of the second plurality of products from the desired placement of products associated with the another planogram, computing device 1801 may issue a user-notification associated with the another planogram.

In some embodiments, a third set of images may be captured at a third time after the determination of whether the arrangement associated with the second plurality of products conforms to the second planogram or another planogram (e.g., a third planogram). The images may be captured by a capturing device as described elsewhere in this disclosure. Computing device 1801 may be configured to receive the third set of images and analyze the third set of images to determine the actual place of products on the shelves of the retail store at the second time, as described elsewhere in this disclosure. Computing device 1801 may also be configured to determine a deviation (or no deviation) of an actual placement of at least one product from the desired placement of products associated with the second planogram is present, as described elsewhere in this disclosure. If computing device 1801 determines that a deviation of an actual placement of at least one product from the desired placement of products associated with the second planogram is present, computing device 1801 may issue a user-notification indicating the deviation (e.g., at least one product is located out of place), as described elsewhere in this disclosure.

In some embodiments, a third set of images may be captured at a third time after the determination of whether the arrangement associated with the second plurality of products conforms to the second planogram or another planogram (e.g., a third planogram). The images may be captured by a capturing device as described elsewhere in this disclosure. In some embodiments, the third set of images may depict a third plurality of products displayed on the shelves of the retail store. Computing device 1801 may be configured to receive the third set of images and analyze the third set of images to determine the actual place of products on the shelves of the retail store at the third time, as described elsewhere in this disclosure. Computing device 1801 may also be configured to determine a deviation (or no deviation) of an actual placement of at least one product from the desired placement of products associated with the second planogram or another planogram (e.g., a third planogram) is present, as described elsewhere in this disclosure. Computing device 1801 may further be configured to compare the actual placement of the third plurality of products as identified in the third set of images to a desired placement of products associated with the first planogram. Computing device 1801 may also be configured to determine whether an arrangement associated with the third plurality of products conforms to the first planogram based on the comparison. If computing device 1801 determines that the arrangement associated with the third plurality of products conforms to the first planogram, computing device 1801 may be configured to withholding issuance of a user-notification associated with the deviation of the actual placement of the at least one product from the desired placement of products associated with the second planogram.

An apparatus may be used to secure a camera, e.g., capturing device 125, to a retail shelving unit. The apparatus may enable traditional shelving units to be modified to support one or more capturing devices to implement the systems and methods described herein. For example, embodiments of the disclosed apparatus may be used to mount capturing devices to new or existing shelving units. Disclosed embodiments of the apparatus may be configured to be mounted on a support element of a horizontal shelf and may enable capturing devices to be mounted to horizontal shelves in a variety of configurations.

Figure 21A:
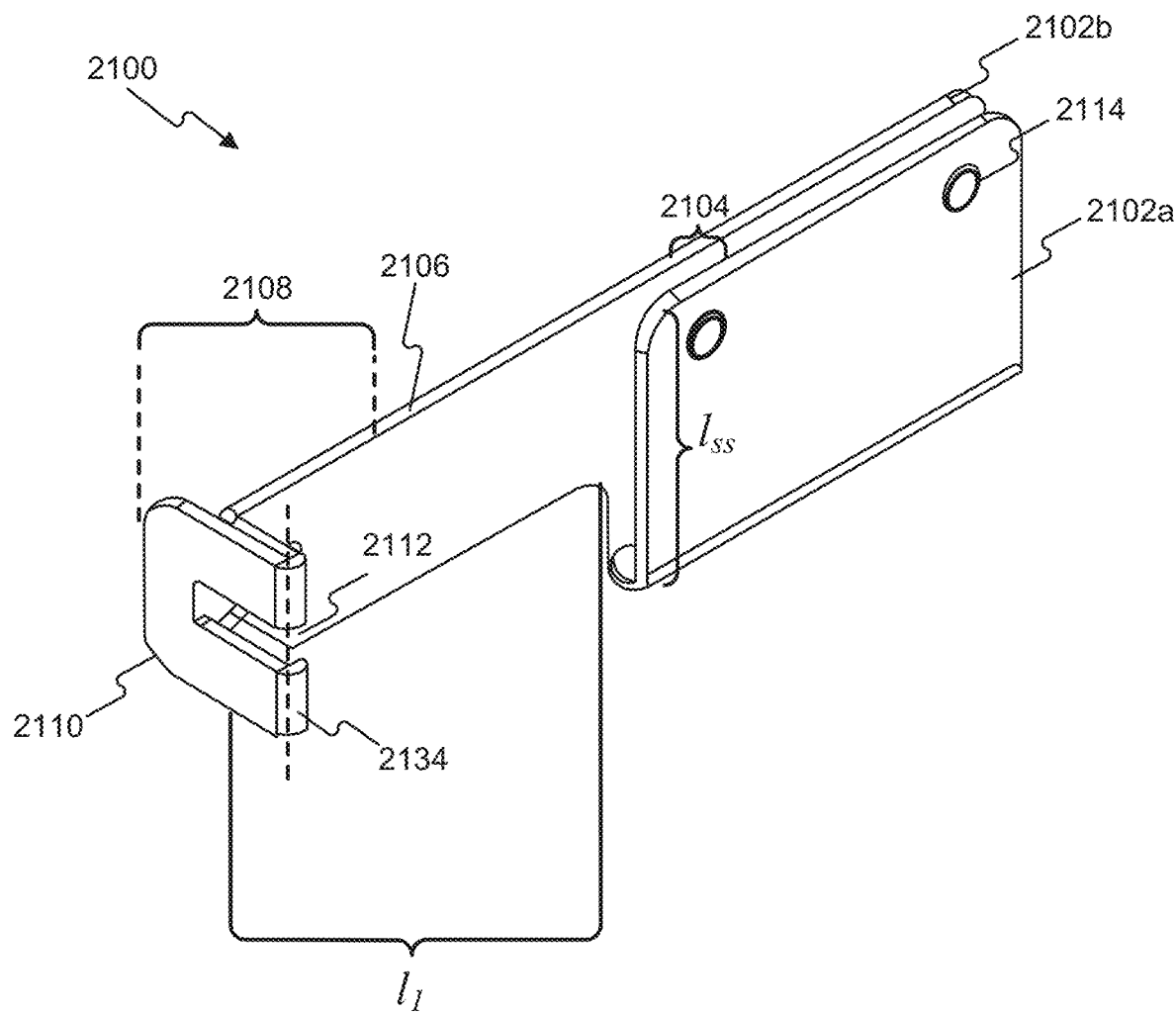
FIG. 21A is a perspective view of an exemplary apparatus, consistent with the present disclosure.
Figure 21B:
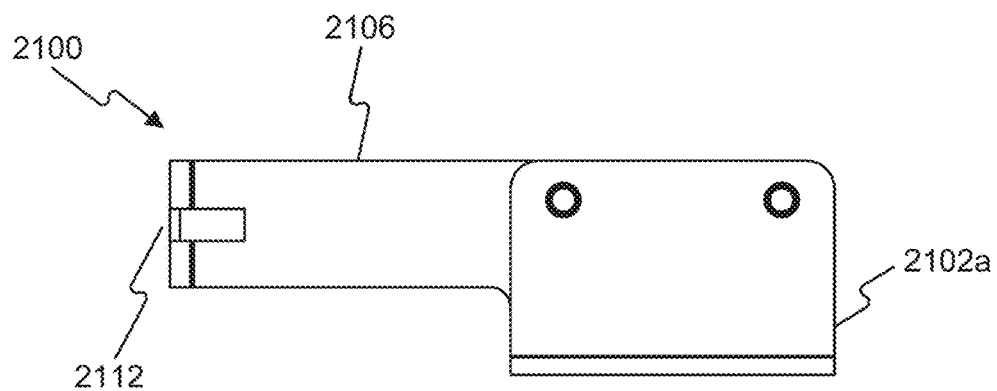
FIG. 21B is a side view of an exemplary apparatus, consistent with the present disclosure.

FIGS. 21A and 21B illustrate, in perspective view and side view, respectively, an embodiment of an exemplary apparatus 2100 for securing a camera to a retail shelving unit. The apparatus 2100 may include a pair of opposing securing surfaces 2102a and 2102b, where the pair of opposing securing surfaces form a gap 2104 between the pair of opposing securing surfaces. In one example, the width of the gap 2104 between the pair of opposing securing surfaces 2102a and 2102b may be between 1.5 mm to 8 mm. In one example, the width of the gap 2104 between the pair of opposing securing surfaces 2102a and 2102b may be less than 1.5 mm. In one example, the width of the gap 2104 between the pair of opposing securing surfaces 2102a and 2102b may be wider than 8 mm. The gap 2104 may be configured to accept the support element of a retail shelving unit, as described further below. In some embodiments, the width of gap 2104 may be similar to the width of the support element that the gap is configured to receive such that the support element fits snugly into the gap. In some examples, the width of gap 2104 may be wider (for example, less than 1 mm wider, between 1 mm and 4 mm wider, at least 4 mm wider, etc.) than the width of the support element that the gap is configured to receive.

In some embodiments, opposing securing surfaces 2102a and 2102b may further include one or more holes or openings 2114 configured to receive a fastener, e.g., a screw, nail, bolt, etc., for securing the apparatus 2100 to a support element of a shelving unit. For example, securing surface 2102a may include no such hole, exactly one such hole, exactly two such holes, at least three such holes, and so forth. In another example, securing surface 2102b may include no such hole, exactly one such hole, exactly two such holes, at least three such holes, and so forth. In one example, opposing securing surfaces 2102a and 2102b may include the same number of holes 2114. In another example, opposing securing surfaces 2102a and 2102b may include a different number of holes 2114. In some examples, opposing securing surfaces 2102a and 2102b may include opposing holes 2114. In some examples, opposing securing surfaces 2102a and 2102b may include holes not opposing each other. In other embodiments, securing surfaces 2102a and 2102b may be configured to snap-fit onto a support element.

Apparatus 2100 may further include an arm 2106 extending from one of the pair of opposing securing surfaces (e.g., surface 2102b). The arm 2106 may have a distal end 2108 including a camera support area 2110 including at least one opening 2112. Camera support area 2110 may be configured to receive a camera, e.g., capturing device 125. For example, camera support area 2110 may define a planar base against which a camera may be mounted. Camera support area 2110 may be positioned such that it forms an orthogonal angle with respect to securing surfaces 2102a and 2102b. For example, camera support area 2110 may be parallel with a side of a shelving unit facing an aisle.

In some embodiments, the camera support area 2110 may include a hole or opening 2112 for placement of a cable connecting a camera to a battery source. For example, opening 2112 may enable a power source to be connected to a camera with a power cord. Opening 2112 may be further configured to receive one or more cords or connections. The one or more cords may include, for example, a data conduit, e.g., data conduit 508 shown in FIG. 6B, an Ethernet cable, a power cord, etc. In another embodiment, opening 2112 may be configured to receive a fastener, e.g., screw, nail, bolt, etc. for securing the camera to the camera support area.

Figure 21C:
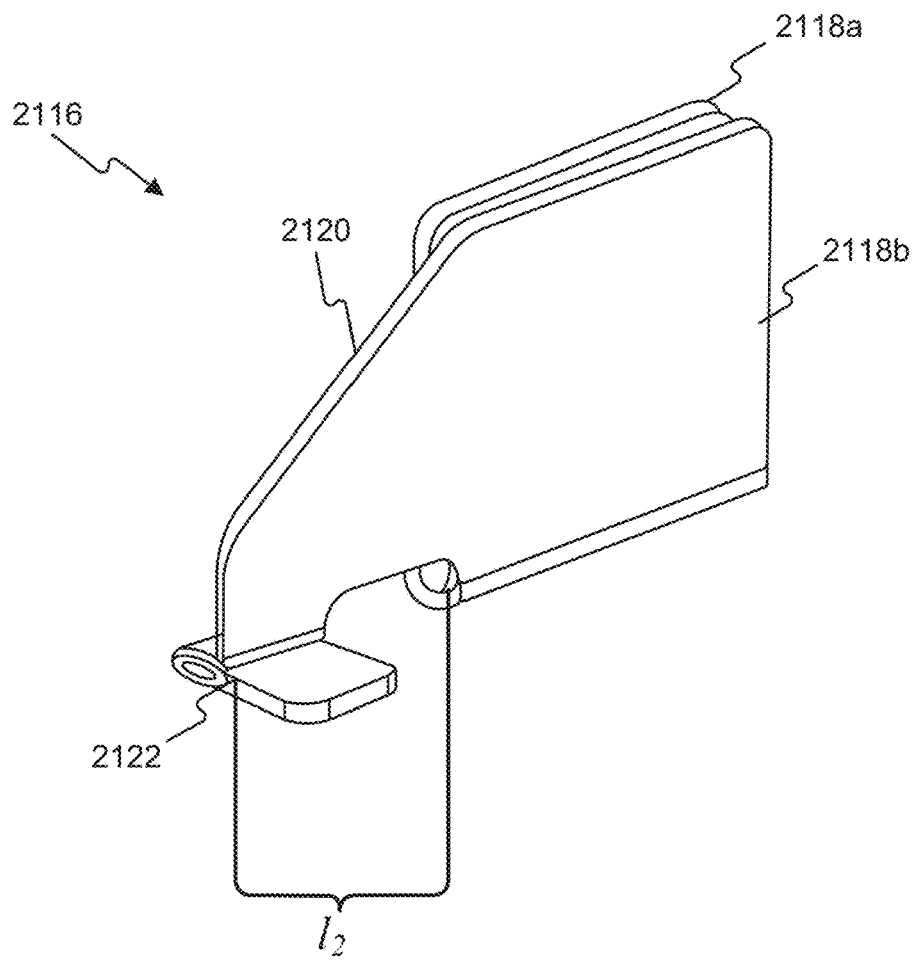
FIG. 21C is another exemplary apparatus, consistent with the present disclosure.

FIG. 21C illustrates another embodiment of an apparatus 2116. Apparatus 2116 may include opposing securing surfaces 2118a and 2118b. An arm 2120 may extend from a securing surface 2118b and may include a camera support area 2122. Camera support area 2122 may be positioned such that the plane defined by the camera support area is orthogonal to a plane defined by a front edge of a horizontal shelf. The plane defined by camera support area 2122 may also be orthogonal to a plane defined by securing surfaces 2118a and 2118b. In some embodiments, opposing securing surfaces 2118a and 2118b may further include one or more holes or openings configured to receive a fastener, e.g., a screw, nail, bolt, etc., for securing the apparatus 2116 to a support element of a shelving unit. For example, securing surface 2118a may include no such hole, exactly one such hole, exactly two such holes, at least three such holes, and so forth. In another example, securing surface 2118b may include no such hole, exactly one such hole, exactly two such holes, at least three such holes, and so forth. In one example, opposing securing surfaces 2118a and 2118b may include the same number of holes. In another example, opposing securing surfaces 2118a and 2118b may include a different number of holes. In some examples, opposing securing surfaces 2118a and 2118b may include opposing holes. In some examples, opposing securing surfaces 2118a and 2118b may include holes not opposing each other. In other embodiments, securing surfaces 2118a and 2118b may be configured to snap-fit onto a support element.

Figure 21D:
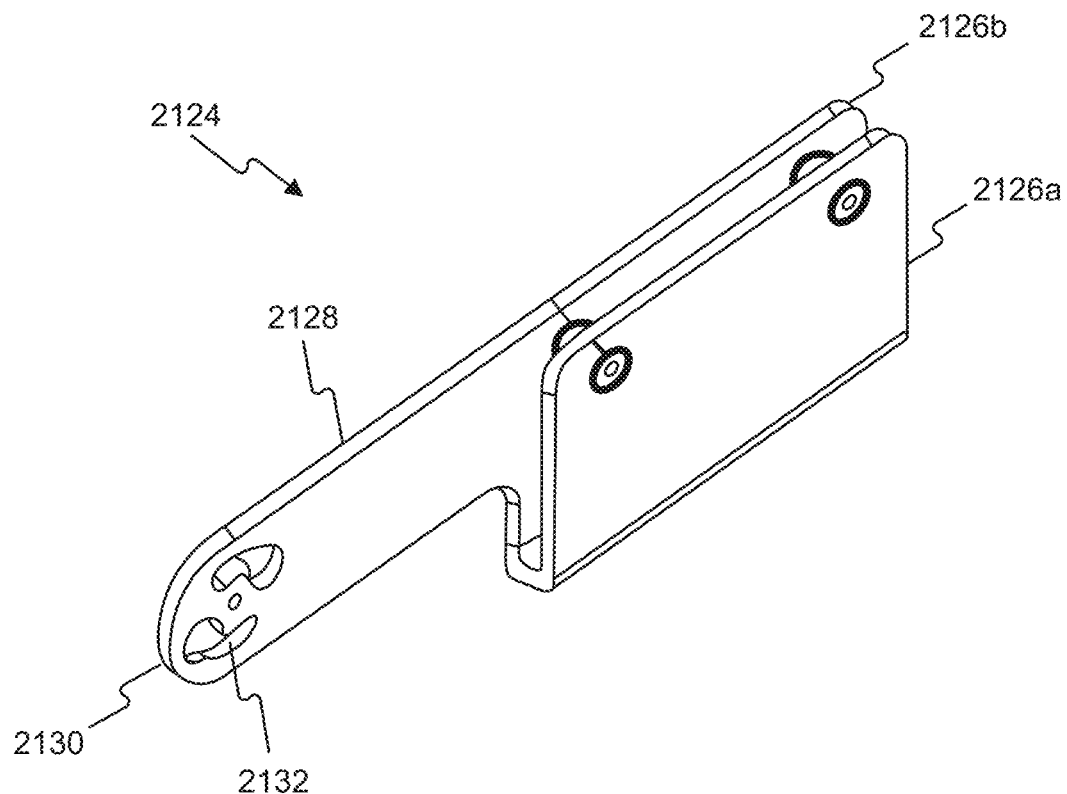
FIG. 21D is another exemplary apparatus, consistent with the present disclosure.

FIG. 21D is another embodiment of an apparatus 2124. Apparatus 2124 may include opposing securing surfaces 2126a and 2126b and an arm 2128 extending from securing surface 2126b. The arm 2128 may include a camera support area 2130, which is parallel to a direction of the securing surfaces 2126a and 2126b. Camera support area 2130 may include one or more openings 2132 configured to receive one or more cables for connecting a camera to an electronic component or power source. Openings 2132 may also be configured to receive a fastener to mount a camera to apparatus 2124.

The exemplary apparatuses, 2100, 2116, and 2124, shown in FIGS. 21A-21D may each be formed of a continuous, rigid material. For example, apparatus 2100 may be formed of a rigid plastic through an injection molding or 3D printing process. In another embodiment, the pair of opposing securing surfaces and the arm may be constructed from a single continuous galvanized metal sheet. In one example, the thickness of the continuous galvanized metal sheet may be between 1 mm and 3 mm. In one example, the thickness of the continuous galvanized metal sheet may be less than 1 mm. In one example, the thickness of the continuous galvanized metal sheet may be more than 3 mm. In some embodiments, as shown in FIG. 21A, the continuous galvanized metal sheet may include at least one bend 2134 greater than 90 degrees along at least one orthogonal rotation axis (for example, greater than 150 degrees, greater than 170 degrees, less than 180 degrees, less than 200 degrees, and so forth). The angle may be based on, for example, the desired area to be captured by the lens of capturing device 125. For example, as shown in FIGS. 21A, 21C, and 21D, different configurations may enable cameras mounted to each of apparatus 2100, 21146, and 2124 to capture different views of an aisle or horizontal shelf.

In some embodiments, as shown in FIGS. 21A and 21C, the at least one bend of the continuous galvanized metal sheet may form two u-shaped structures. These u-shaped structures may include a first u-shaped structure that is associated with the pair of opposing securing surfaces and a second u-shaped structure that is associated with a surface associated with the camera support area.

In some embodiments, a first type of apparatus (e.g., apparatus 2100) may have an arm 2106 associated with a first length, $l_1$, and a second type of apparatus (e.g., apparatus 2116) may have an arm 2120 associated with a second length, $l_2$. In some embodiments, the second length, $l_2$, may be greater than the first length, $l_1$. In other embodiments, $l_1$ and $l_2$ may be equal. In yet another embodiment, $l_1$ may be less than $l_2$. The length of arm 2106, extending from one of the pair of opposing securing surfaces, may be between 30 mm and 70 mm, may be less than 30 mm, may be more than 70 mm, and so forth. In some embodiments, the length, $l_{ss}$, of each securing surface may be between 30 mm and 70 mm, may be less than 30 mm, may be more than 70 mm, and so forth.

Figure 22A:
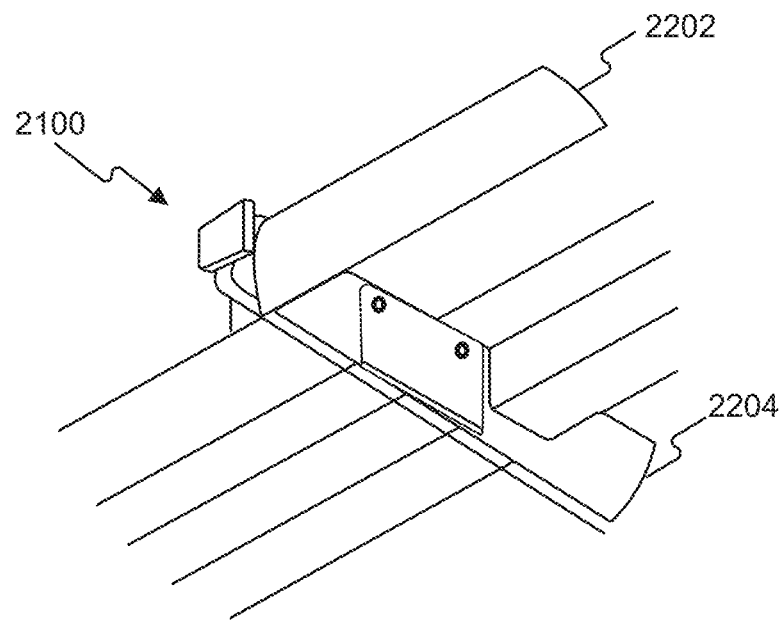
FIG. 22A is an illustration of an exemplary apparatus for securing a camera to a retail shelving unit, consistent with the present disclosure.

FIG. 22A illustrates a method for attaching an apparatus 2100 to a horizontal shelf 2202 of a retail shelving unit. Shelf 2202 may be supported by a support element 2204. In some embodiments, support element 2204 may be a rigid piece of metal or plastic configured to support horizontal shelf 2202. In one example, support element 2204 and shelf 2202 may form a continuous, rigid material, while in another example, support element 2204 and shelf 2202 may be separate parts, which in some examples may be connected together (for example, using glue, using fastener, using screws, using nails, using bolts, and so forth).

Apparatus 2100 may be joined to the retail shelving unit by inserting support element 2204 into the gap formed by the opposing securing surfaces. The pair of opposing securing surfaces may be configured to be fixedly mounted to the support element, wherein the support element includes a rigid structural element supporting a horizontal shelf of the retail shelving unit. In some embodiments, shelf support 2204 may fit snugly between opposing securing surfaces, e.g., surfaces 2102a and 2102b. In other embodiments, apparatus 2100 may be further joined to the shelving unit using a number of fastening methods including screws, nails, glue, etc., disposed in holes 2114.

Figure 22B:
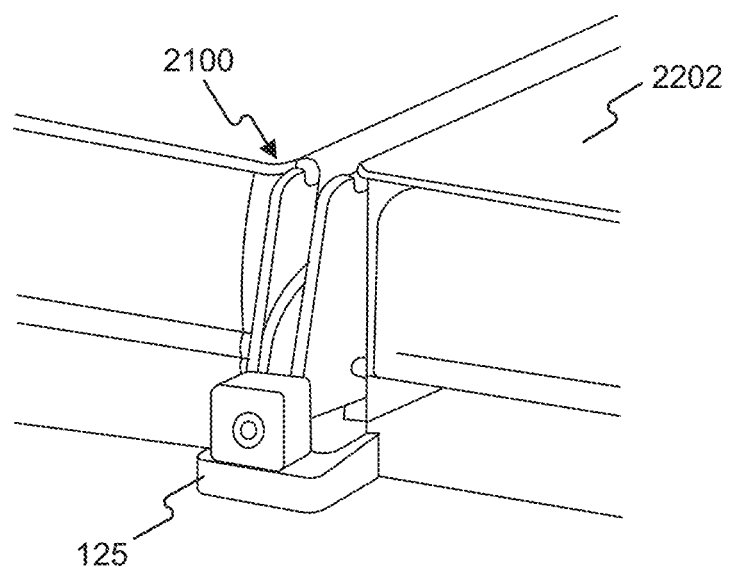
FIG. 22B is another illustration of an exemplary apparatus for securing a camera to a retail shelving unit, consistent with the present disclosure.

FIG. 22B illustrates a camera, e.g., capturing device 125, mounted on shelf 2202 using apparatus 2100. The camera may be mounted on camera support area 2110 and may be positioned such that a lens of the camera faces away from shelf 2202. In some embodiments, as shown in FIG. 22B, the apparatus is configured such that when the apparatus is fixedly mounted to the shelf, at least a portion of the apparatus is located between two horizontal shelves. In some embodiments, the apparatus may be configured such that when the apparatus is fixedly mounted to the shelf, at least a portion of the apparatus, e.g., one or the securing surfaces and/or arm, is located between two horizontal shelves. The width of the securing surface may be less than a space between the two horizontal shelves such that one of the securing surfaces fits between the shelves. In some embodiments, the width of the planar base, e.g., camera support area 2110 may be greater than a space between the two horizontal shelves.

Apparatuses 2100, 2116, and 2124 may be used to mount cameras as part of a system for monitoring one or more shelves and/or aisles, e.g., in a store such as a grocery store. In some embodiments, such a system may include a plurality of cameras, e.g., capturing devices 125, configured to capture images depicting a plurality of products displayed in the retail store. Each camera may be mountable to a retail shelving unit using an apparatus, e.g., apparatus 2100. As previously described, the apparatus may include a pair of opposing securing surfaces for securing the apparatus to a support element of the retail shelving unit and an arm extending from one of the pair of opposing securing surfaces and having a distal end. The distal end may include a camera support area including at least one opening. The system may further include a data interface configured to receive image data from the plurality of cameras and at least one processor for monitoring planogram compliance using the received image data. For example, as shown in FIGS. 1 and 2, image processing unit 130 may include a server 135 configured to communicate with one or more capturing devices 125 via network interface 206. Network 150 may facilitate data exchange between system components, e.g., image processing unit 130 and capturing device 125, thereby enabling capturing devices 125 to output image data to image processing unit 130. Image processing unit 130 may include a processor, e.g., processor 202, configured to execute instructions for monitoring planogram compliance using the received image data.

In some embodiments, the system may include a plurality of apparatuses that includes at least two types of apparatuses for mounting the plurality of cameras to a plurality of retail shelving units. An apparatus from a first type may be configured such that when it is fixedly mounted to a support element of a horizontal shelf, its camera support area is on a surface positioned substantially parallel to a side of the horizontal shelf facing an aisle. An apparatus from a second type may be configured such that when it is fixedly mounted to a support element of a horizontal shelf, its camera support area is on a surface positioned substantially orthogonal to the pair of opposing securing surfaces.

In some embodiments, the system may include a plurality of apparatuses that includes at least two types of apparatuses for mounting the plurality of cameras to a plurality of retail shelving units. The at least two types of apparatus may include a first type having an arm associated with a first length and a second type having an arm associated with a second length greater than the first length.

Figure 23:
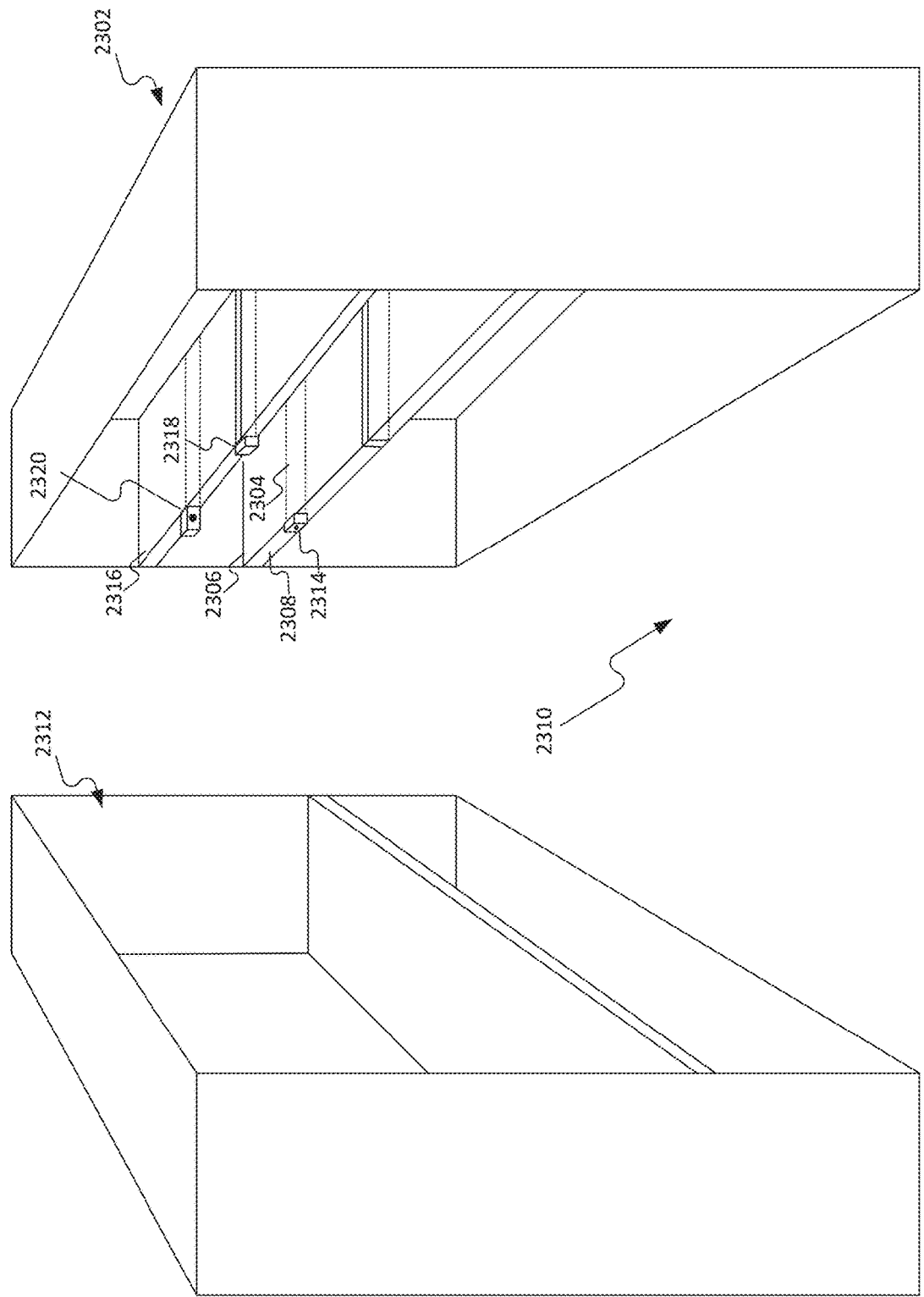
FIG. 23 is an illustration of a system for securing cameras to retail shelving units, consistent with the present disclosure.

FIG. 23 illustrates an exemplary system in which a number of image capture devices are mounted to retail shelving unit 2302. An apparatus of a first type (e.g., apparatus 2100) may be configured such that when it is fixedly mounted to a support element 2304 of a horizontal shelf 2306, its camera support area 2110 defines a surface positioned substantially parallel to a front side 2308 of the horizontal shelf facing an aisle 2310. For example, when a camera 2314 is mounted to support area 2110, it faces toward an opposite shelf 2312 across aisle 2310. Thus, the camera 2314 may capture images of shelf 2312 and/or products on shelf 2312. In some embodiments, camera support area 2110 may define a surface positioned parallel to a front side 2308 of the horizontal shelf. For example, the apparatus may be configured such that when the apparatus is fixedly mounted to a support element of a horizontal shelf, the planar base is positioned parallel or substantially parallel to a side of the horizontal shelf facing an aisle.

An apparatus of a second type (e.g., apparatus 2116) may be configured such that when it is fixedly mounted to a support element of a horizontal shelf 2316, its camera support area 2122 is on a surface positioned substantially orthogonal to the pair of opposing securing surfaces 2118a and 2118b. For example, camera 2318 may be mounted to shelf 2316 using apparatus 2116 such that camera 2318 is oriented to face downward. Thus, camera 2318 may be configured to capture images of the front of shelving unit 2302 or of items on lower shelf 2306. In some embodiments, camera support area 2122 may define a surface positioned orthogonal to the pair of opposing securing surfaces 2118a and 2118b.

An apparatus of a third type (e.g., apparatus 2124) may be configured such that when it is fixedly mounted to a support element of a horizontal shelf 2316, its camera support area 2130 is on a surface positioned substantially parallel to the pair of opposing securing surfaces 2126a and 2126b. In some embodiments, camera support area 2130 may be on a surface positioned parallel to the pair of opposing securing surfaces 2126a and 2126b. The apparatus 2100 may be configured such that when the apparatus is fixedly mounted to the support element of a horizontal shelf, the planar base, e.g., camera support area 2130, is positioned substantially orthogonal to a side of the horizontal shelf facing an aisle, e.g., aisle 2310. In some embodiments, camera support area 2130 may be positioned orthogonal to a side of the horizontal shelf facing an aisle.

For example, camera 2320 may be mounted to shelf 2316 using apparatus 2124 such that camera 2320 is oriented to face along the front of shelving unit 2302. Thus, camera 2320 may be configured to capture images of the aisle 2310 between shelving units 2302 and 2312.

In some embodiments, multiple apparatuses may be used to secure cameras to different shelves of different types. For example, the first apparatus may be attachable to a first horizontal shelf (e.g., shelf 2306) and the second apparatus may be attachable a second horizontal shelf (e.g., shelf 2316). The first horizontal shelf and the second horizontal shelf may be of different heights or the first horizontal shelf and the second horizontal shelf may of the same height. In another example, a first horizontal shelf may be attachable to a first horizontal shelf and a second apparatus may be attachable to a second horizontal shelf, and the first horizontal shelf and the second horizontal shelf may be of different sizes.

In some embodiments, e.g., as shown in FIGS. 6A and 6B, at least two of the plurality of cameras may be mountable on a single horizontal shelf and configured to be connected by a cable configured to covey power and image data. For example, a cable may extend between multiple capturing devices via opening 2112 in apparatus 2100. In some embodiments, the cable may be located behind a plastic piece configured to cover the edge of the shelf opposing the aisle. For example, the plastic piece may be mounted on front-facing surface 2308 of a shelf 2306.

The above described system 2300 may be configured to execute one or more methods or processes as described herein. For example, image capture devices mounted using apparatuses 2100, 2116, and 2124 may be used to capture data regarding customers and/or products in an environment of system 2300.

In some embodiments, a system may process images captured in a retail store and automatically determine relationships between products and shelf labels. The system may be a system, e.g., system 100, including at least one processor, e.g., image processing unit 130. The system may further include one or more image capture devices, e.g., capturing devices 125. In some examples, processing images from a single point in time may be insufficient to determine the relationships between products and shelf labels. In one example, the visual information on the shelf labels and/or product may be insufficient to determine the relationships (for example, the shelf label may include no visual identifier of the product). In one example, the product may be unfamiliar to the system (for example, new product, product with a new visual appearance, and so forth). In one example, the visual information in the images may be insufficient to determine the relationships between products and shelf labels, for example due to low pixel resolution, image blurring, occlusions, and so forth. In one example, the system product recognition engine and/or label recognition engine may lack the ability to recognize the product and/or the shelf label for various reasons, and as a result the system may be unable to determine the relationships between products and shelf labels from an analysis of the images from the single point in time. In some embodiments, analysis of movements of the locations of the product and/or the shelf label may be used to determine the relationship or the lack of relationship between the product and the shelf label.

In some examples, a shelf label may be positioned adjacent to two or more products (in this case, a product may refer to a plurality of product instances that have a common product type, the product type may be known or unknown) at a first point in time. Further, in some examples, the position of at least one of the two or more products may change between the first point in time and a second point in time. In one example, in response to a movement of the shelf label that is similar to the movement of a particular product (i.e., in the same direction, at the same time, to the same retail shelf, etc.) between the first point in time and the second point in time, it may be determined that the shelf label corresponds to the particular product. In one example, in response to no movement of the shelf label (or no significant movement, such as movement of a distance that is below a selected threshold, no movement between retail shelves, etc.) between the first point in time and the second point in time, it may be determined that the shelf label corresponds to a product of the two or more products that did not move (or did not have a significant change in position, such as movement of a distance that is below a selected threshold, no movement between retail shelves, etc.) between the first point in time and the second point in time. In one example, in response to a movement of the shelf label that is not similar to the movement of a particular product (i.e., in a different direction, at a different time, to a different retail shelf, etc.) between the first point in time and the second point in time, it may be determined that the shelf label does not correspond to the particular product.

In some examples, two or more shelf labels may be positioned adjacent to a product (in this case, a product may refer to a plurality of product instances that have a common product type, the product type may be known or unknown) at a first point in time. Further, in some examples, the position of at least one of the two or more shelf labels may change between the first point in time and a second point in time. In one example, in response to a movement of the product that is similar to the movement of a particular shelf label of the two or more shelf labels (i.e., in the same direction, at the same time, to the same retail shelf, etc.) between the first point in time and the second point in time, it may be determined that the product corresponds to the particular shelf label. In one example, in response to no movement of the product (or no significant movement, such as a movement of a distance that is below a selected threshold, no movement between retail shelves, etc.) between the first point in time and the second point in time, it may be determined that the product corresponds to a shelf label of the two or more products that did not move (or did not have a significant change in position, such as a movement of a distance that is below a selected threshold, no movement between retail shelves, etc.) between the first point in time and the second point in time. In one example, in response to a movement of the product that is not similar to the movement of a particular shelf label of the two or more shelf labels (i.e., in a different direction, at a different time, to a different retail shelf, etc.) between the first point in time and the second point in time, it may be determined that the product does not correspond to the particular shelf label.

In some examples, a shelf label may be positioned adjacent to a product (in this case, a product may refer to a plurality of product instances that have a common product type, the product type may be known or unknown) at a first point in time. In one example, in response to a movement of the product and the shelf label in a similar way (i.e., in the same direction, at the same time, to the same retail shelf, etc.) between the first point in time and a second point in time, it may be determined that the product corresponds to the particular shelf label. In on example, in response to a movement of the shelf label and no movement of the product (or in response to a movement of the shelf label and no significant movement of the product, such as a movement of a distance that is below a selected threshold, no movement between retail shelves, etc.) between the first point in time and the second point in time, it may be determined that the product does not correspond to the shelf label. In on example, in response to a movement of the product and no movement of the shelf label (or in response to a movement of the product and no significant movement of the shelf label, such as a movement of a distance that is below a selected threshold, no movement between retail shelves, etc.) between the first point in time and the second point in time, it may be determined that the product does not correspond to the shelf label. In one example, in response to a movement of the product that is not similar to the movement of the shelf label (for example in a different direction, at a different time, to a different retail shelf, etc.) between the first point in time and the second point in time, it may be determined that the product does not correspond to the shelf label.

In some example, analysis of movements of the locations of the product (in this case, a product may refer to a plurality of product instances that have a common product type, the product type may be known or unknown) and/or the shelf label may be combined together with other cues to determine the relationship or the lack of relationship between the product and the shelf label. Some non-limiting examples of such other cues may include information based on an analysis of the visual appearance of the shelf label and/or the product, information based on an analysis of textual information appearing on the shelf label (such as product name, product size, price, and so forth) and/or the product (such product name, product size, and so forth), information based on the locations of the product and the shelf label, and so forth. For example, analysis of the movement of the locations of the product and/or the shelf label may suggest a first confidence level associated with a relation of the product and the shelf label, other cues (for example, as described above) may suggest a second confidence level associated with the relation of the product and the shelf label, and the first and the second confidence levels may be combined to determine whether the product corresponds to the shelf label or not. For example, each one of the first confidence level and the second confidence level may include a numerical value, the two values may be combined using a mathematical function (such as sum, mean, median, non-linear function, and so forth), and the combination of the first and second values may be compared with a selected threshold to determine whether the product corresponds to the shelf label or not.

In some examples, a machine learning model may be trained using training examples to determine locations of shelf labels from images and/or videos, and the trained machine learning model may be used to analyze an image of a store shelf to determine position of shelf labels on the store shelf. An example of such training example may include an image and/or a video of the store shelf, together with a label indicating the location of shelf labels on the store shelf. In some examples, a machine learning model may be trained using training examples to determine locations of products from images and/or videos, and the trained machine learning model may be used to analyze an image of a store shelf to determine position of products on the store shelf. An example of such training example may include an image and/or a video of the store shelf, together with a label indicating the location of products on the store shelf. In some examples, images of at least one store shelf captured over a period of time by one or more image sensors may be analyzed, for example as described above, to identify positions of shelf labels and/or products on the store shelf at different point in time. In some examples, shelf labels and/or products identified on the store shelf at different points in time may be matched (for example, based on visual appearance, based on textual information appearing on the shelf labels and/or products, and so forth) to determine movement of shelf labels and/or products between different point in time (for example, between a first point in time and a second point in time). For example, shelf labels (or products) with the same particular text (such as a particular price, a particular product name, etc.) and/or the same particular logo may be identified in two different locations at the two points in time, and may be matched based on the particular text and/or the particular logo. In another example, a machine learning model may be trained using training examples to match shelf labels in pairs of images, and the trained machine learning model may be used to analyze an image of the store shelf at a first point in time and an image of the shelf at a second point in time to match shelf labels in the two images. An example of such training example may include a pair of images, together with a label indicating matches between shelf labels in the two images. In yet another example, a machine learning model may be trained using training examples to match products in pairs of images, and the trained machine learning model may be used to analyze an image of the store shelf at a first point in time and an image of the shelf at a second point in time to match products in the two images. An example of such training example may include a pair of images, together with a label indicating matches between products in the two images.

In some examples, the movements of the locations of the product (in this case, a product may refer to a plurality of product instances that have a common product type, the product type may be known or unknown) and/or the shelf label may be analyzed to determine the relationship or the lack of relationship between the product and the shelf label, and/or to determine a confidence level associated with the relationship. In one example, a movement may be represented as a mathematical vector (for example, by subtracting the location at the first point in time from the location at the second point in time, by embedding the movement in a mathematical space, etc.), a correlation between the vector representing the movement of the product and the vector representing the movement of the shelf label may be calculated, and the calculated correlation may be used to determine the relationship or the lack of relationship between the product and the shelf label, and/or to determine a confidence level associated with the relationship (for example, based on a comparison of the correlation with a selected threshold, by calculating a function of the correlation, and so forth). In another example, a machine learning model may be trained using training examples to determine the relationship or the lack of relationship between products and the shelf labels (and/or to determine confidence level associated with the relationships) from the movements of the locations of the products and/or the shelf labels, and the trained machine learning model may be used to analyze a determined movement of a particular shelf label and a determined movement of a particular label to determine a relationship or the lack of relationship between the particular product and the particular shelf label (and/or to determine confidence level associated with the relationship). An example of such training example may include an indication of a movement of a shelf label and an indication of a movement of a product, together with a label indicating whether the product correlates to the shelf label or not.

The system may be configured to receive images of at least one store shelf captured over a period of time by one or more image sensors. For example, image processing unit 130 may receive images and/or image data from capturing devices 125 that may be placed in any location in a retail location. As shown in FIG. 4A, a number of capturing devices 125 may be mounted on a retail shelving unit and be configured to capture images of an opposing shelving unit. For example, a capturing device 125 may be configured to collect images associated with products or labels on an opposing shelf. Thus, the collected images may depict a plurality of shelf labels and groups of products associated with different product types placed on the at least one store shelf.

The system may analyze the images to identify temporal changes in an arrangement of the groups of products over the period of time. For example, processing unit 130 may receive a time series of images captured during a period of time, e.g., over one minute, one hour, one day, etc. The images may depict, at a first point in time, the groups of products are arranged on the least one store shelf in a first manner. For example, the first time may be the time the retail location opens to customers. The group of products may be arranged on a shelf in an ordered manner. The images may also depict, at a second point in time, the groups of products are arranged on the least one store shelf in a second manner. For example, at a later time, the group of products may be scattered, e.g., after one or more customers have selected products from the shelf. In another example, one of the products may be placed in an incorrect location, e.g., near a label associated with a different product.

Processing unit 130 may also analyze the images to identify temporal changes in display of the plurality of shelf labels over the period of time. The images may depict, at the first point in time, the plurality of shelf labels are displayed on the least one store shelf in a first manner. The images may also depict, at the second point in time, the plurality of shelf labels are displayed on the least one store shelf in a second manner. For example, between the two points in time, the shelf may have been restocked or reorganized by an employee. Alternatively or additionally, shelf labels may have been moved inadvertently, or labels may have been added or removed according to stocking instructions.

Processing unit 130 may then determine a relationship between a specific group of products and a specific shelf label based on the identified temporal changes in the arrangement of the groups of products and the identified temporal changes in the display of the plurality of shelf labels. Based on this relationship, processing unit 130 may initiate an action based on the determined relationship.

In some embodiments, processing unit 130 may transmit information related to the action to a device associated with a retail store, supplier, or market research entity. For example, processing unit 130 may transmit instructions to a user device causing the user device to display the determined action. In another embodiment, processing unit 130 may transmit instructions to an autonomous robot configured to cause the robot to complete the action.

Figure 24:
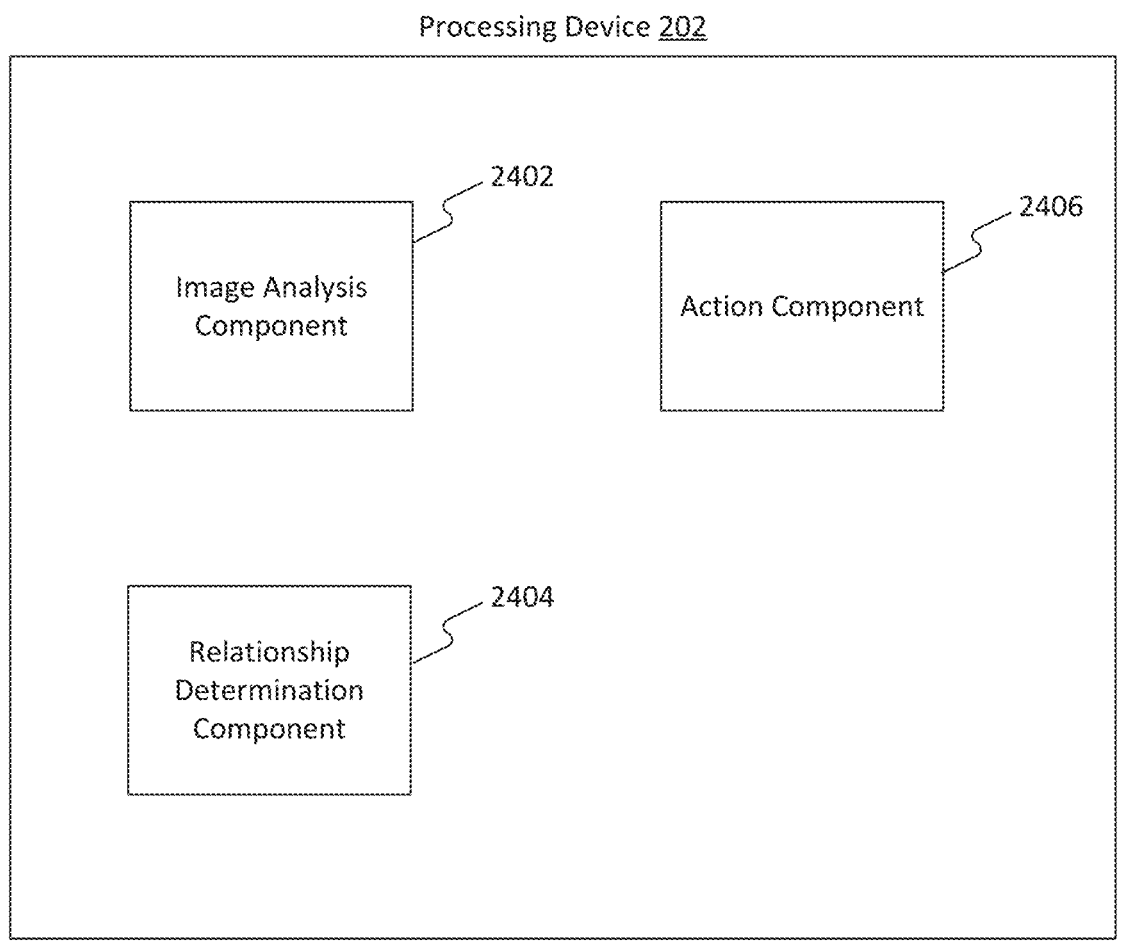
FIG. 24 is a block diagram of a system for processing images captured in a retail store and automatically determining relationships between products and shelf labels, consistent with the present disclosure.

FIG. 24 is a block diagram of a processing device 202 of system 100. Processing device 202 may include one or more components configured to cause the processing device 202 to process images captured in a retail store and automatically determine relationships between products and shelf labels. Processing device 202 may include an image analysis component 2402, a relationship determination component 2404, and an action component 2406.

Image analysis component 2402 may include a memory storing software instructions and/or modules configured to receive one or more images from capturing device 125 and analyze the images to determine arrangements of products and shelf labels on a retail shelving unit. Image analysis component 2402 may receive raw or processed data from capturing device 125 via respective communication links, and provide information to different system components using a network 150. Specifically, image analysis component 2402 may use any suitable image analysis technique including, for example, object recognition, object detection, image segmentation, feature extraction, optical character recognition (OCR), object-based image analysis, shape region techniques, edge detection techniques, pixel-based detection, artificial neural networks, convolutional neural networks, etc. In addition, image analysis component 2402 may use classification algorithms to distinguish between the different products or labels in the retail store. In some embodiments, image analysis component 2402 may utilize suitably trained machine learning algorithms and models to perform the product and/or label identification. In some embodiments, the products and/or labels may include scannable codes (e.g., barcodes or QR codes).

Figure 25A:
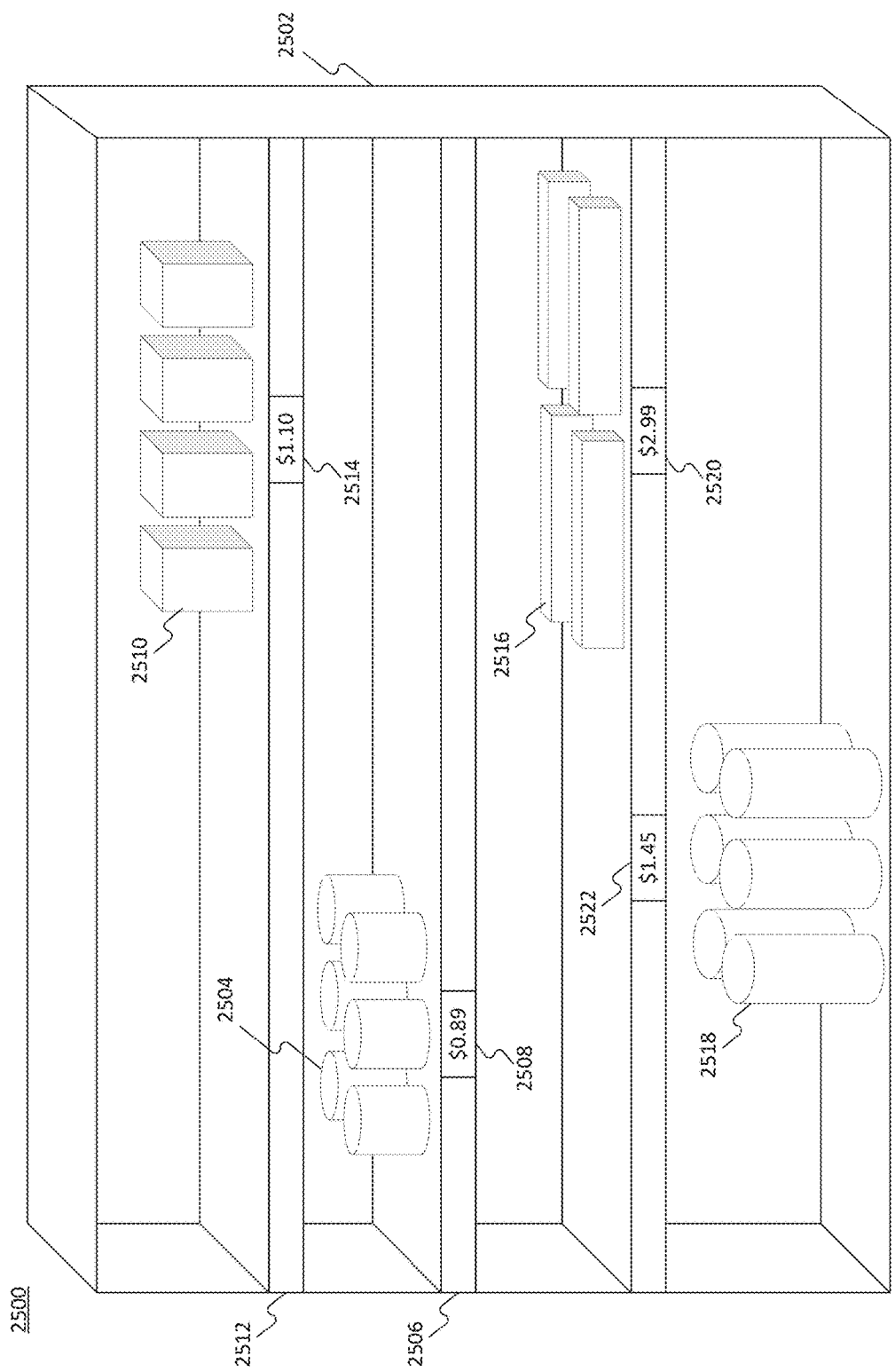
FIGS. 25A and 25B illustrate relationships between products and shelf labels, consistent with the present disclosure.

With reference to FIG. 25A, a camera, e.g., capturing device 125, may capture an image 2500 of a shelving unit 2502 at a first time, t1. Capturing device 125 may be fixedly mounted to a retail shelving unit opposing the at least one store shelf, e.g., shelf 2502, may be mounted elsewhere in the retail store, may be part of a mobile device, may be part of a robot configured to capture images, and so forth. Image analysis component 2402 may receive the image data from capturing device 125, e.g., via network 150, and may perform one or more image processing techniques to identify products and/or labels within the received image. For example, image analysis component 2402 may identify a first product 2504 arranged on a shelf 2506 above a first label 2508. Image analysis component 2402 may also identify a second product 2510 arranged on a shelf 2512 above a second label 2514. Image analysis component 2402 may further identify products 2516 and 2518, associated with labels 2520 and 2522, respectively.

Figure 25B:
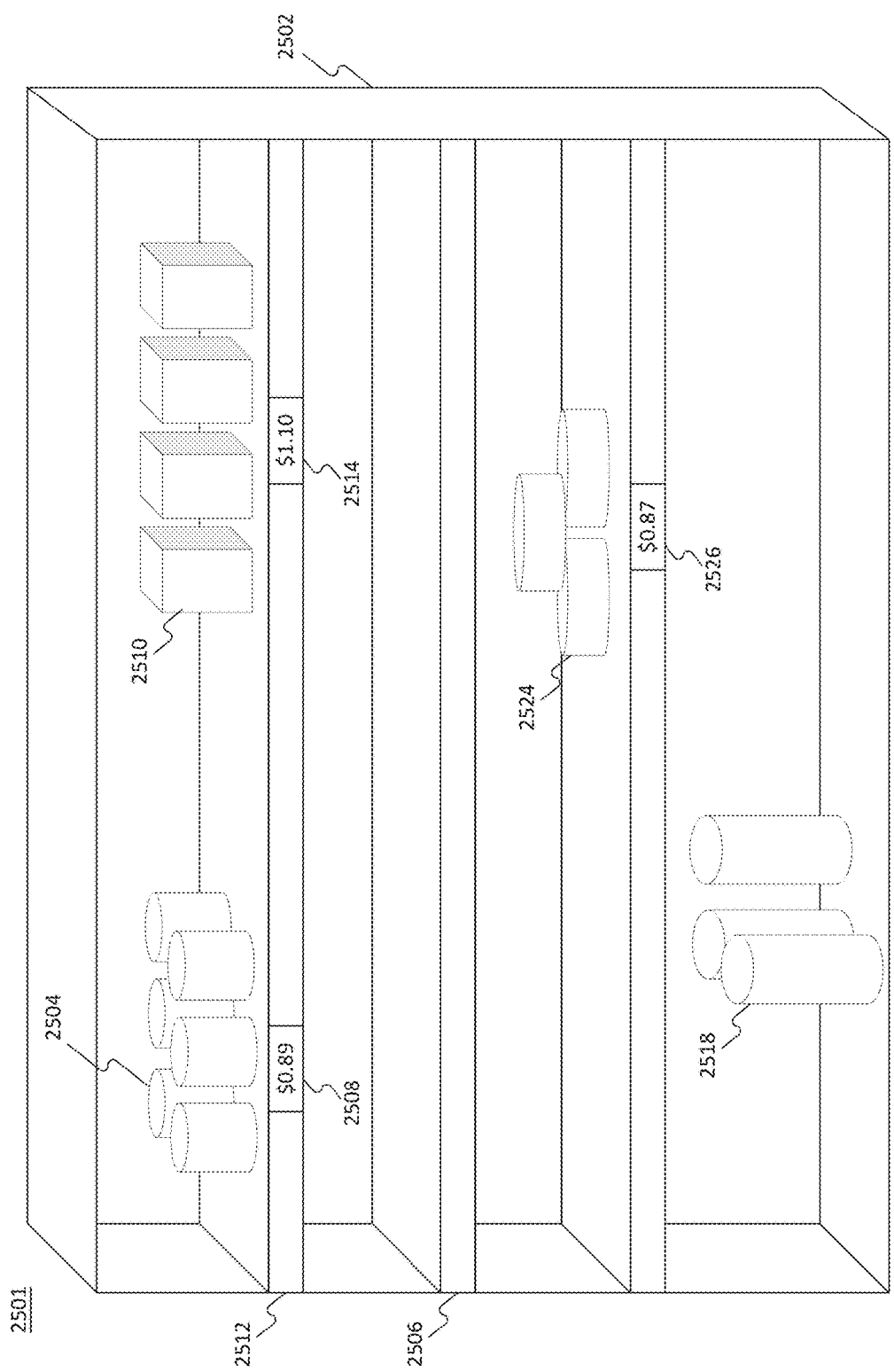

FIG. 25B is an illustration of a second image 2501 of shelf 2502 at a second time, t2. The second time may be at a point in time later than first time t1. In some embodiments, for example, the images of the at least one store shelf are captured over a period of time greater than a day, e.g., a week or month. Image analysis component 2402 may analyze image 2501 to identify an arrangement of the products at t2 and a placement of labels at t2. For example, image analysis component 2402 may analyze the images from multiple points in time, e.g., t1 and t2, and identify one or more temporal changes between the two images. The temporal changes may include rearrangement of products, depletion of products, addition of labels to the shelves, shift in product position on the shelf, etc.

In some embodiments, the temporal changes in the arrangement of the groups of products may include a depletion of products from the specific group of products from the at least one store shelf, and the temporal changes in the display of the plurality of shelf labels may include a removal of the specific shelf label from the at least one store shelf. For example, the temporal change between two time points may include a depletion of product 2518 and/or a removal of label 2522. In another example, the temporal changes in the arrangement of the groups of products may include an exhaustion of the specific group of products to the at least one store shelf. For example, a depletion or an exhaustion may occur if customers have purchased the product between the two time points and there has not yet been a restocking event. In yet another example, the temporal changes in the arrangement of the groups of products may include an addition of the specific group of products to the at least one store shelf, and/or the temporal changes in the display of the plurality of shelf labels may include an addition of the specific shelf label to the at least one store shelf.

In another example, the temporal changes in the arrangement of the groups of products may include a removal of the specific group of products from the at least one store shelf, and/or the temporal changes in the display of the plurality of shelf labels may include a removal of the specific shelf label from the at least one store shelf. For example, a store may sell out of product 2516, or the product may no longer be stocked by the store.

In another example, the temporal changes in the arrangement of the groups of products may include a reposition of the specific group of products to a different location on the at least one store shelf, and/or the temporal changes in the display of the plurality of shelf labels may include a reposition of the specific shelf label. For example, as shown in FIG. 25B, product 2504 and label 2508 have been relocated to a higher shelf.

In another example, the temporal change may include the addition of a group of products 2524 and/or an addition of label 2526. For example, between the two time points, a group of products may have been restocked on the shelf or may have been moved to the shelf from another location in the store.

Returning to FIG. 24, relationship determination component 2404 may include a memory storing software instructions and/or modules and may receive the analyzed image data and identified temporal changes from image analysis component 2402. Relationship determination component 2404 may determine a relationship between a group of products on the shelf and a label. For example, relationship determination component 2404 may determine, based on the product and label information from image analysis component 2402, that products 2504 are associated with label 2508. This determination may also be based on, for example, the distance of the product group relative to the label in one or both images. In some embodiments, the at least one processor is further configured to record the determined relationship between the specific group of products placed on the at least one store shelf and the specific shelf label for future use. For example, the system may store relationship information in database 140.

Relationship determination component 2404 may also, for example, identify a specific product type for the specific group of products placed on the at least one store shelf based on information depicted on the specific shelf label. For example, a product type may be determined based on text of the label, indicating a product name, on a scannable code (e.g., barcode) displayed on the label, on a price of the product, etc. Relationship determination component 2404 may determine the relationship between the specific group of products and the specific shelf label by recognizing products from the specific group of products as products of a specific product type identified in the specific shelf label.

In some embodiments, image analysis component 2402 may receive and analyze additional images captured at a time later than the time period, e.g., after t2. The additional images may depict additional products placed on the at least one store shelf. Image analysis component 2402 may analyze the additional images to identify an existence of the specific shelf label attached to the at least one store shelf. Based on the analysis, relationship determination component 2404 may recognize a group of the additional products as products from the specific product type based on the existence of the specific shelf label.

Action component 2406 may include a memory storing software instructions and/or modules configured to receive information from image analysis component 2402 and relationship determination component 2404 and determine whether or not to initiate an action. For example, if a product associated with a label is depleted, action component 2406 may initiate a restock of the product. In another example, the action may include issuing a user-notification about a misplaced shelf label to a store employee.

In some embodiments, the action may include updating a machine learning model for product recognition based on the determined relationship between the specific group of products placed on the at least one store shelf and the specific shelf label. For example, action component 2406 may initiate the addition of relationship information to a dataset. The information may be one or more images of products of the specific group of products with labels determined according to visual information on the specific label. The action may further include updating the machine learning model using the updated dataset. In another example, machine learning algorithms may use one or more images of products of the specific group of products with labels determined according to visual information on the specific label to update the machine learning model (e.g., without updating a dataset).

In some embodiments, action component 2406 may determine to forgo an action based on information received from image analysis component 2402 and relationship determination component 2404. For example, an action may be forgone if a label is placed in proximity to the specific group of products, or the addition of the specific group of products and the specific label occur at the same time or at close by times.

For example, the system may forgo initiating the action when the temporal changes in the display of the plurality of shelf labels includes repositioning of the specific shelf label, and the temporal changes in the arrangement of the groups of products do not include a repositioning of the specific group of products to a different location on the at least one store shelf.

In another example, when the temporal changes in the arrangement of the groups of products do not include running out of products from the specific group of products from the at least one store shelf, and the temporal changes in the display of the plurality of labels includes a removal of the specific label, action component 2406 may forgo initiating the action. In other cases, initiating an action may be forgone when the temporal changes in the arrangement of the groups of products includes running out of products from the specific group of products from the at least one store shelf, and the temporal changes in the display of the plurality of labels does not include a removal of the specific label.

In another example, the temporal changes in the arrangement of the groups of products does not include an addition of the specific group of products to the at least one store shelf, and the temporal changes in the display of the plurality of labels includes an addition of the specific label. Based on this temporal change, action component 2406 may determine to forgo initiating an action, e.g., if the added label is an indicator of a sale on a displayed product. In another example, no action may be initiated when the temporal changes in the arrangement of the groups of products include an addition of the specific group of products to the at least one store shelf, and the temporal changes in the display of the plurality of labels does not include an addition of the specific label. In this example, the shelf may have been restocked and no further action is required.

In another example, an action may not be initiated by action component 2406 when the temporal changes in the arrangement of the groups of products does not include a removal of the specific group of products from the at least one store shelf, and the temporal changes in the display of the plurality of labels includes a removal of the specific label. When the temporal changes in the arrangement of the groups of products includes a removal of the specific group of products from the at least one store shelf, and the temporal changes in the display of the plurality of labels does not include a removal of the specific label, action component 2406 may determine not to initiate an action.

In some embodiments, action component 2406 may determine at least one value associated with the determined relationship between the specific shelf label and the specific group of products placed on the at least one store shelf; and initiating the action when the at least one value is greater than a threshold. As previously described, relationship determination component 2404 may determine a spatial relationship of a product and its associated shelf label. Image analysis component 2402 may determine, for example, an increase in the space between the product and its shelf label. If this space increases beyond a threshold, e.g., six inches, set for the particular product, action component 2406 may initiate an action, e.g., reorganization of the shelf.

Thus, when the movement specific group of products has spatial correlation (e.g., same direction of movement, similar distance of movement) to the movement of the specific label beyond an elected threshold, in the system may initiate an action. In another example, if the spatial correlation is below a threshold, e.g., the label and product are less than one inch apart, action component 2406 may determine not to initiate an action.

In another example, no action may be initiated when the temporal changes in the arrangement of the groups of products includes a reposition of the specific group of products to a different location on the at least one store shelf and the temporal changes in the display of the plurality of labels does not include a reposition of the specific label. When the temporal changes in the arrangement of the groups of products does not include a reposition of the specific group of products to a different location on the at least one store shelf and the temporal changes in the display of the plurality of labels does not include a reposition of the specific label, action component 2406 may not initiate an action. In other cases, when the temporal changes in the arrangement of the groups of products does not include a reposition of the specific group of products to a different location on the at least one store shelf and the temporal changes in the display of the plurality of labels includes a reposition of the specific label, action component 2406 may not initiate an action.

In some embodiments, the system may analyze the images to identify temporal changes in placements of a plurality of promotions associated with the at least one store shelf over the period of time. For example, image analysis component 2402 may analyze one or more labels on a shelf to determine a particular label is associated with a promotion, e.g., based on the text of the label. Relationship determination component 2404 may determine a second relationship between the specific product type and a specific promotion based on the identified temporal changes in the placements of the plurality of promotions. Based on this second relationship, action component 2406 may initiate a second action. The second action may include, for example, recording the specific promotion in association with the specific product in a database, issuing a user-notification regarding another shelf associated with the specific product that do not have a promotion similar or identical to the specific promotion, issuing a user-notification that the specific promotion have to be removed as no promotion is planned for the specific product, and so forth.

Figure 26:
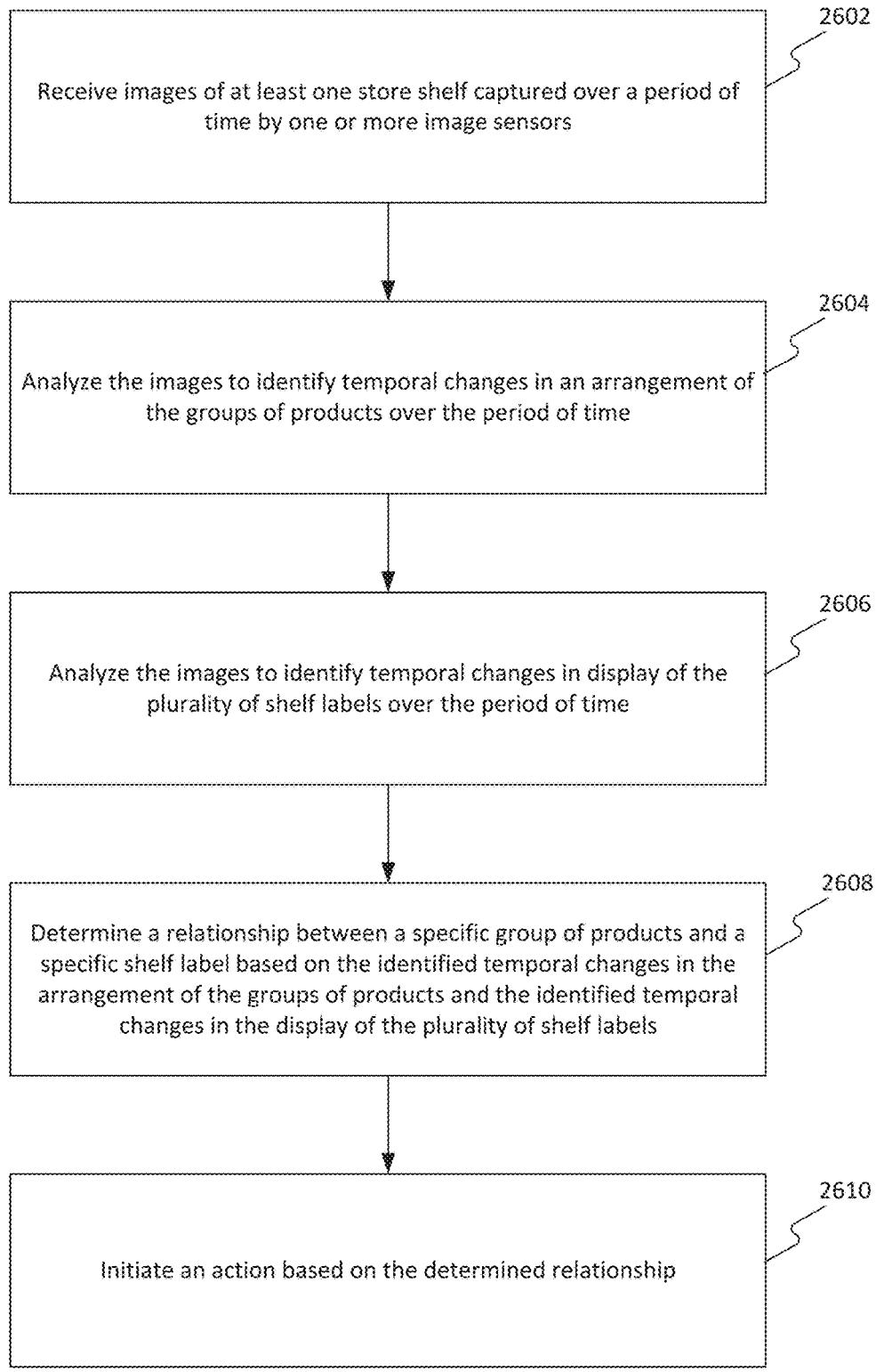
FIG. 26 illustrates a flowchart of an exemplary method for processing images captured in a retail store and automatically determining relationships between products and shelf labels, consistent with the present disclosure.

FIG. 26 is a flowchart of a method 2600 for processing images captured in a retail store and automatically determining relationships between products and shelf labels. Method 2600 may be implemented by a general-purpose computer or a special-purpose computer built according to embodiments of the present disclosure. For example, method 2600 may be executed by at least one processor, e.g., processing unit 130.

At step 2602, the system, e.g., image analysis component 2402, may receive images of at least one store shelf captured over a period of time by one or more image sensors. For example, image sensors may include capturing devices 125 which are mounted to a retail shelving unit and configured to capture images of opposing shelving units. The period of time may be one hour, one day, one week, etc.

At step 2604, image analysis component 2402 may analyze the images to identify temporal changes in arrangement of the groups of products over the period of time, wherein at a first point in time the groups of products are arranged on the least one store shelf in a first manner and at a second point in time the groups of products are arranged on the least one store shelf in a second manner.

At step 2606, image analysis component 2402 may analyze the images to identify temporal changes in display of the plurality of shelf labels over the period of time, wherein at the first point in time the plurality of shelf labels are displayed on the least one store shelf in a first manner and at the second point in time the plurality of shelf labels are displayed on the least one store shelf in a second manner.

For example, in steps 2604 and 2606, image analysis component 2402 may determine one or more temporal changes associated with the placement of products and/or labels. As shown in FIGS. 25A and 25B, temporal changes may include the removal of products, movement of products and/or labels, depletion of products, etc.

At step 2608, relationship determination component 2404 may determine a relationship between a specific group of products placed on the at least one store shelf and a specific shelf label based on the identified temporal changes in the arrangement of the groups of products and the identified temporal changes in the display of the plurality of shelf labels. For example, relationship determination component 2404 may determine if a product is associated with a particular label. In some embodiments, relationship determination component 2404 may determine whether a product is placed within a predetermined threshold distance of a label.

At step 2610, action component 2406 may initiate an action based on the determined relationship. As previously discussed, the action may be a restock or reorganization action. Instructions for the action may be transmitted to a device associated with a store employee or manager. In other embodiments, the action may be to alert a customer, via a user device of the customer, of a promotion associated with a product.

Method 2600 may further include determining a confidence level associated with the determined relationship between the specific shelf label and the specific group of products placed on the at least one store shelf. In some embodiments, when the confidence level is lower than or equal to a first threshold, action component 2406 may not initiate an action.

At a subsequent time, after forgoing initiating the action, image analysis component 2402 may receive additional images captured at a time later than the time period and may analyze the additional images to determine an updated confidence level associated with the determined relationship between the specific group of products and the specific shelf label. Based on the updated confidence level, action component 2406 may initiate the action when the updated confidence level is greater than a second threshold. In some embodiments, the action may be forgone if the updated confidence level is equal to the first confidence level.

In some embodiments, a system may process images captured in a retail store and automatically identify situations for which to withhold planogram incompliance notifications. The system may be a system, e.g., system 100, including at least one processor, e.g., image processing unit 130. The system may further include one or more image capture devices, e.g., capturing devices 125.

The system may be configured to receive image data from a plurality of image sensors mounted in the retail store, wherein the image data depicts a plurality of products displayed on at least one store shelf. For example, image processing unit 130 may receive images and/or image data from capturing devices 125 that may be placed throughout a retail location. As shown in FIG. 4A, a number of capturing devices 125 may be mounted on a retail shelving unit and be configured to capture images of an opposing shelving unit. For example, a capturing device 125 may be configured to collect images associated with products displayed on an opposing shelf.

Image processing unit 130 may analyze the image data to identify at least one product type associated with the plurality of products displayed on at least one store shelf and to determine a placement of products of the at least one product type on the at least one store shelf. For example, processing unit 130 may analyze the images captured by capturing device 125 to determine that a product belongs to a particular type of grouping. Exemplary product types may include perishables, non-perishables, produce, dry goods, etc.

The system may then access at least one planogram describing a desired placement of products of the at least one product type on shelves of a retail store. For example, the system may query a database, e.g., database 140, storing one or more planograms associated with shelving units of the retail store. The planogram may be a graphical depiction of the placement of items and shelf labels on a shelving unit. As previously described, a planogram may be associated with contractual obligations and/or other preferences related to the retailer methodology for placement of products on the store shelves. In some embodiments, the at least one planogram may be a realogram. The planogram may display or explain where the products for the identified product type should be located compared to other product types, on which store shelves the products should be places, in which area of the store the product should be placed, etc.

The system may identify, based on the at least one planogram, a discrepancy between the determined placement of products associated with the identified at least one product type and the desired placement of products associated with the identified at least one product type. For example, a discrepancy may be a product displayed on an incorrect shelf, a product displayed on a shelf having an incorrect label, etc. The discrepancy may further include a lack of product on the shelf, e.g., if the displayed product has sold out and requires restocking.

The system may determine whether a notice-override condition exists relative to the identified at least one product type due to misidentification of the product. For example, a depletion of product may trigger a restocking notice. In another example, if a product is misplaced, a notice may be triggered instructing a store employee or manager that a shelf needs reorganization. If a notice-override condition is not determined to exist relative to the identified at least one product type, the system may issue a user-notification associated with the identified discrepancy between the determined placement of products and the desired placement of products. For example, the notification may be transmitted, via network 150, to one or more user devices associated with the retail store. The notification may include instructions for remedying the discrepancy between the shelf image and the planogram.

In some embodiments, if a notice-override condition exists relative to the identified at least one product type, the system may withhold issuance of a user-notification associated with the identified discrepancy between the determined placement of products and the desired placement of products. For example, if a product of a certain type is sold out, a notification instructing an employee to restock a shelf may be overridden if a different product of the same product type is available within a threshold proximity of the sold out product.

Figure 27:
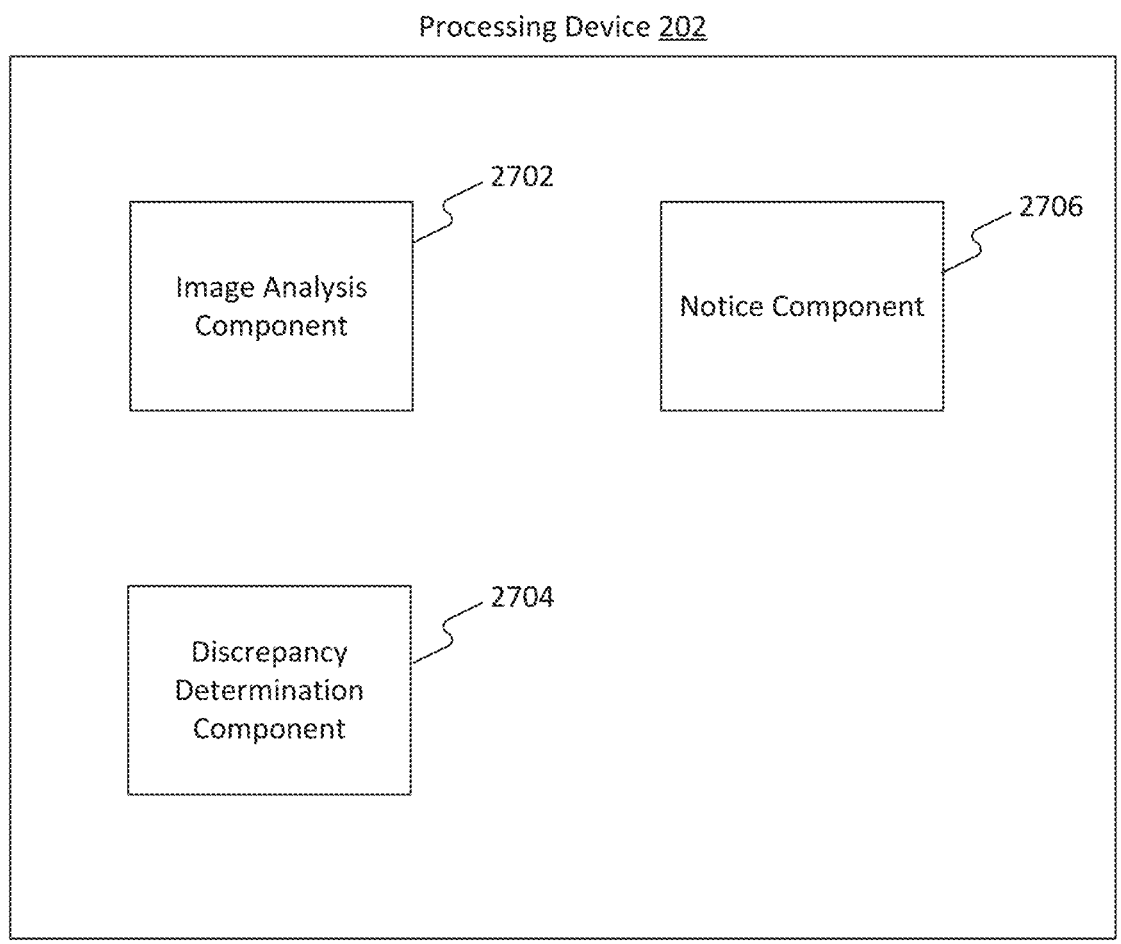
FIG. 27 is a block diagram of a system for processing images captured in a retail store and automatically identifying situations to withhold planogram incompliance notifications, consistent with the present disclosure.

FIG. 27 is a block diagram of a processing device 202 of system 100. Processing device 202 may execute one or more components (e.g., one or more software modules) configured to cause the processing device 202 to process images captured in a retail store and automatically determine relationships between products and shelf labels. Processing device 202 may execute an image analysis component 2702, a discrepancy determination component 2704, and a notice component 2706. Alternatively or additionally, components 2702, 2704, and/2706 may be stored in a memory device (e.g., memory device 226).

Image analysis component 2702 may be configured to receive one or more images from capturing device 125 and analyze the images to determine a product type of a product arranged on a store shelf. Image analysis component 2702 may be further configured to identify product arrangements and/or identify shelf labels associated with displayed products. Image analysis component 2702 may receive raw or processed data from capturing device 125 via respective communication links, and provide information to different system components using a network 150. Specifically, image analysis component 2702 may use any suitable image analysis technique including, for example, object recognition, object detection, image segmentation, feature extraction, optical character recognition (OCR), object-based image analysis, shape region techniques, edge detection techniques, pixel-based detection, artificial neural networks, convolutional neural networks, etc. In addition, image analysis component 2702 may use classification algorithms to distinguish between the different products or labels in the retail store. In some embodiments, image analysis component 2702 may utilize suitably trained machine learning algorithms and models to perform the product and/or label identification and to determine product types. In some embodiments, the products and/or labels may include scannable codes (e.g., barcodes or QR codes) used to identify a product type or product associated with a shelf label.

Figure 28A:
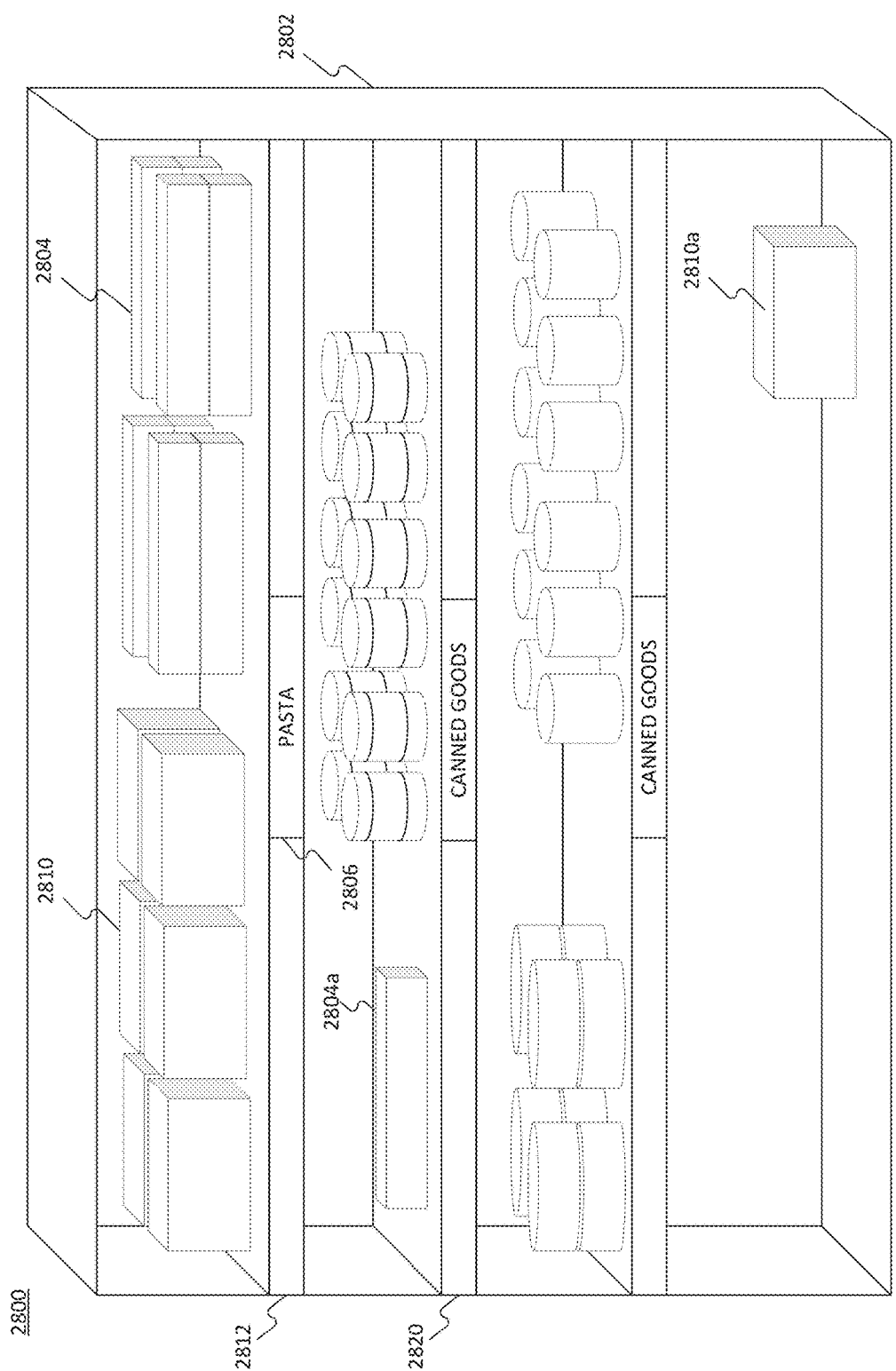
FIG. 28A is an illustration of an image of a retail shelving unit, consistent with the present disclosure.

With reference to FIG. 28A, a camera, e.g., capturing device 125, may capture an image 2800 of a shelving unit 2802. Capturing device 125 may be fixedly mounted to a retail shelving unit opposing the at least one store shelf, be mounted elsewhere in the retail store, be part of a mobile device, be part of a robot configured to capture images, and so forth. Image analysis component 2702 may receive the image data from capturing device 125, e.g., via network 150, and may perform one or more image processing techniques to identify one or more products and their associated product types. For example, image analysis component 2702 may identify a first product 2804. Image analysis component 2702 may determine that product 2804 is of product type "pasta," based on text recognition of label 2806, which is within a threshold proximity of product 2804. Image analysis component 2702 may use other techniques for identifying a product type including text recognition of a product label, a determination of the type of products adjacent to the product, etc., for example as described above. In one example, a machine learning model may be trained using training examples to identify product types from images and/or videos of products, and image analysis component 2702 may use the trained machine learning model to analyze the image and identify the type of the product. An example of such training example may include an image and/or a video depicting a product, together with a label indicating the product type of the depicted product.

Returning to FIG. 27, image analysis component 2702 may analyze the image, e.g., image 2800, and transmit the analyzed image data to discrepancy detection component 2704. Discrepancy detection component 2704 may receive the analyzed data and may also access one or more planograms associated with a product type determined to be present in image 2800. For example, discrepancy detection component 2704 may receive product type information from image analysis component 2702. Based on this product type information, discrepancy detection component 2704 may query a database, e.g., database 140, to retrieve one or more planograms associated with the identified product types. In some embodiments, planograms may be stored in a planogram database along with associated product type tags. Thus, a user or system may query the database using a product type and the database may return one or more planograms tagged with the particular product type.

Figure 28B:
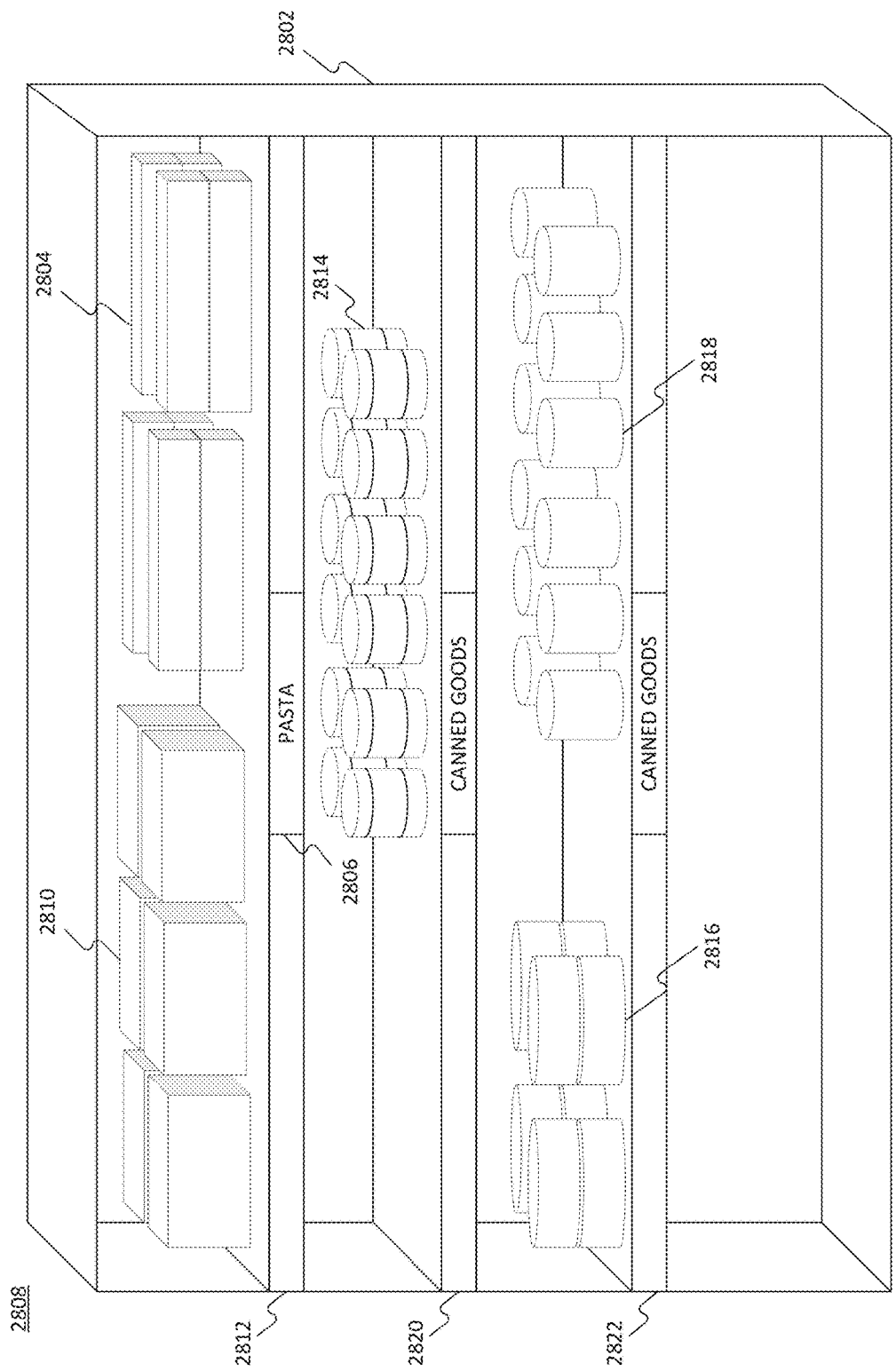
FIG. 28B is an illustration of a planogram, consistent with the present disclosure.

FIG. 28B illustrates an exemplary planogram 2808 associated with shelving unit 2802. The planogram may be associated with shelving unit 2802 based on the identification of "pasta" products on the shelf 2812 in image 2800, based on a location of shelving unit 2802, based on a visual code identifying shelving unit 2802, based on nearby shelves, and so forth. In some embodiments, the planogram for shelf 2812 may be based on the combination of product types on shelf 2812. As shown in FIG. 28B, a compliant shelf may include two brands of pasta products, products 2804 and 2810, displayed on a top shelf 2812 labeled "pasta." Shelving unit 2802 may also display various canned goods, e.g., products 2814, 2816, and 2818, on shelves 2820 and 2822, which both display a label for "canned goods." This planogram, e.g., planogram 2808, may represent a desired appearance of shelving unit 2802, with product placement determined, for example, by market research entity 110 or supplier 115.

Discrepancy determination component 2704 may access the planogram information, e.g., planogram 2808, and identify a discrepancy in the product placement when the desired placement of products indicates that products from a first product type are to be placed on the at least one shelf and the determined placement of products indicates that products from a second product type are placed on the at least one shelf. For example, as shown in FIG. 28A, an identified discrepancy may be a misplaced box of pasta 2804*a* on a shelf labelled "canned goods."

In some embodiments, a discrepancy may be based on a product's placement relative to a label, e.g., label 2806. For example, image analysis component 2702 may identify a pasta box 2810*a* on a bottom shelf of unit 2802 and may also identify a shelf 2812 labelled "pasta." Based on the distance between the pasta box 2810*a* and the "pasta" shelf label 2806 being greater than an allowable threshold, discrepancy determination component 2704 may determine that the box 2810*a* is misplaced, e.g., is on a non-compliant shelf. In another example, the discrepancy may be based, at least in part, on a product's to at least one promotion sign.

Notice component 2706 may receive discrepancy information from discrepancy determination component 2704, or based on other methods for identifying discrepancies as described above, and may determine whether a notice-override condition exists relative to the identified at least one product type due to misidentification of the product. For example, the system may typically notify an employee that a reorganization of a shelving unit should be performed if a particular product is misplaced. However, if the misplaced product is often misidentified, the system may override the notice. For example, the "misplaced" product may have been previously misidentified as a first product, when it is actually a second product and is in the correct placement.

Notice-override conditions may be based on, for example, a brand associated with the identified product type, a product size associated with the identified product type, an appearance of products of the identified product type, the retail store (e.g., particular retail store, the chain of the retail store, the type of the retail store, the geographical location of the retail store, past events in the retail store, etc.), the time the image was captured, the neighboring product types to the identified product type according to the at least one planogram, the neighboring product types to the identified product type according to an actual placement of products, image capturing parameters (e.g., lower resolution images may tend to cause confusion), similarities of products of the identified product type to products of at least one other product type (product type specified by the desired placement of products, product type of neighboring product, product type identified for products previously identified in the same location, etc.), past mismatch identifications between product types, and the like. Additional parameters may be received by notice component 2706, for example, from database 140, market research entities 110, suppliers 115, etc.

In some embodiments, system 100 may be configured to receive feedback via one or more user devices. For example, an employee may receive an instruction to move a misplaced product. However, the employee may determine that the actual product was misidentified by the system and is in the correct place. The employee may input data indicative of the mismatch, e.g., associating the correct product with the misidentified product. This information may be stored in a database, e.g., database 140. Misidentified products may occur when one or more product types have a similar shape, coloring, brand, label, etc. For example, a package of coffee may be misidentified as decaf due to a similar label of the caffeinated coffee of the same brand. In another example, referring to FIG. 28B, product 2814 and product 2818 may be often mistaken due to their similar size and shape.

The stored misidentification information may be used by notice component 2706 to determine whether a notice-override condition exists for a product type identified by image analysis component 2702. For example, notice component 2706 may be configured to retrieve information indicative of at least one past instance in which products from the first product type were erroneously identified as products from the second product type. Based on the at least one past instance, notice component 2706 may determine existence of a notice-override condition associated with the identified at least one product type, wherein the notice-override condition includes an erroneous identification of the products placed on the at least one shelf as products from the second product type. In this case, notice component 2706 may withhold issuance of a user-notification due to erroneous identification of the products placed on the at least one shelf as products from the second product type.

In some embodiments, the image analysis component 2702 may also analyze the image data to determine information about products placed adjacent to the products associated with the identified at least one product type. In this case, the determination of whether a notice-override condition exists may be based on the information about the products placed adjacent to the products associated with the identified at least one product type. For example, notice may be overridden if the visual appearance of neighboring products is similar.

In some embodiments, the system may determine patterns of product confusion based on accessed information from one or more databases. For example, information in database 140 may include feedback from an employee that the system issued a notice based on a misidentified product. In some embodiments, a confusion matrix of a likelihood that one product type is mistaken for another product type may be constructed from past performances. As an example, a sequence of identifications of a first product and a second product on a particular shelf may be (1,1,1,1,2,1,1,1,1,1,1, 1,2,1,1). This may indicate that the first product may tend to be mistakenly identified as the second product. Notice component 2706 may use the patterns of product confusion to determine the existence of the notice-override condition. Thus, a notification alerting an employee to a product of the second product type in the area of the first product may be overridden.

In cases in which a product is misidentified by the system, a notice may be erroneously issued to a user. Upon issuance of a user-notification associated with the discrepancy between the planogram and the shelf image, the system may receive data confirming that the discrepancy resulted from erroneous identification of the at least one product type. For example, an employee may input data indicative of a product misidentification. The system may update the stored patterns of product confusion to reflect that the discrepancy resulted from erroneous identification of the at least one product type.

In another embodiment, image analysis component 2702 may receive additional image data captured at a second time after a determination to withhold issuance of the user-notification due to existence of the notice-override condition. Discrepancy determination component 2704 may analyze the additional image data to determine that the discrepancy associated with the at least one store shelf disappeared without intervention of a store employee. For example, the discrepancy may have been resolved without a restock or reorganization event. In this case, the system may update the patterns of product confusion to reflect that the discrepancy resulted from erroneous identification of the at least one product type.

In another embodiment, notice component 2706 may determine whether a notice-override condition exists may be based on a last time that the at least one store shelf was organized by a store employee. For example, if the shelf was recently restocked, the change in product placement may have been intentional, and thus, issuance of a user notification is unnecessary. In some embodiments, the information about a last time that the at least one store shelf was organized by a store employee is based on an analysis of previous images captured from the retail store, information from a database of actions performed in the store, etc.

In some embodiments, a notice-override condition may be associated with an experience level of an employee. For example, notice component 2706 may determine the last employee who worked on a particular shelf and access information, e.g., in database 140, associated with the employee. For example, the system may determine whether a notice-override condition exists based on a level of experience of the store employee. If an employee is new, it may be more likely that a product is misplaced and notice is required to instruct the employee to correct the placement of the product.

In some embodiments, the determination of whether a notice-override condition exists is based on information about past events of planogram incompliance associated with the at least one store shelf. For example, past events of planogram incompliance may indicate that the shelf is in a high-traffic area and customers often misplace products on the shelf. In another example, products associated with a promotion may be depleted at a faster rate, resulting in planogram incompliance. In some embodiments, details of past events may be received as feedback input by an employee and stored in database 140.

In some embodiments, the notice-override condition may be based on inventory information. For example, the determination of whether a notice-override condition exists is based on inventory information associated with the identified at least one product type. If a product is placed in the wrong area, but the store does not have inventory of the correct product, the system may determine not to send an alert to an employee to restock the correct product. In another example, the determination of whether a notice-override condition exists is based on reference information associated with the identified at least one product type from other retail stores. Thus, if the store cannot transfer more inventory from another location, a notice to restock the correct product may not be sent to an employee.

In some determining notice component 2706 may access patterns of product availability of product types based on accessed information from one or more databases. Notice component 2706 may use the patterns of product availability to determine the existence of the notice-override condition. For example, no notice may be sent to restock a product if the availability pattern indicates that the product tends to run out at the time of day at which the image of the shelving unit was captured.

In some embodiments, notice component 2706 may determine a certainty level for the notice-override condition and issue a user-notification indicating that an event of planogram incompliance associated with the at least one store shelf had occurred when the certainty level is less than a threshold. The event of planogram incompliance may include a product being out of stock, an empty shelf, a shelf with incorrect products, etc.

The determination of the certainty level may be based on the at least one identified product type. For example, the certainty level may be lower for a product type that is misidentified at a particular rate (e.g., 25% of identifications of the product are incorrect, 10% of identifications are incorrect, etc.). The threshold for a certainty level may be based on the desired placement of products associated with the at least one store shelf. For example, the threshold may be higher for specific brands or products based on contractual obligations or rate of return on the product.

In some embodiments, image analysis component 2702 may receive additional image data captured at a second time after a determination to withhold issuance of the user-notification based on the existence of the notice-override condition by notice component 2706. The system may analyze the additional image data to determine an updated certainty level for the notice-override condition. Notice component 2706 may issue a user-notification indicating that an event of planogram incompliance associated with the at least one store shelf had occurred when the updated certainty level is less than a second threshold. In some embodiments, the notice may be issued with the second threshold is the same as the first threshold. In other embodiments, notice may be issued when the level of certainty is less than the first certainty level.

Figure 29:
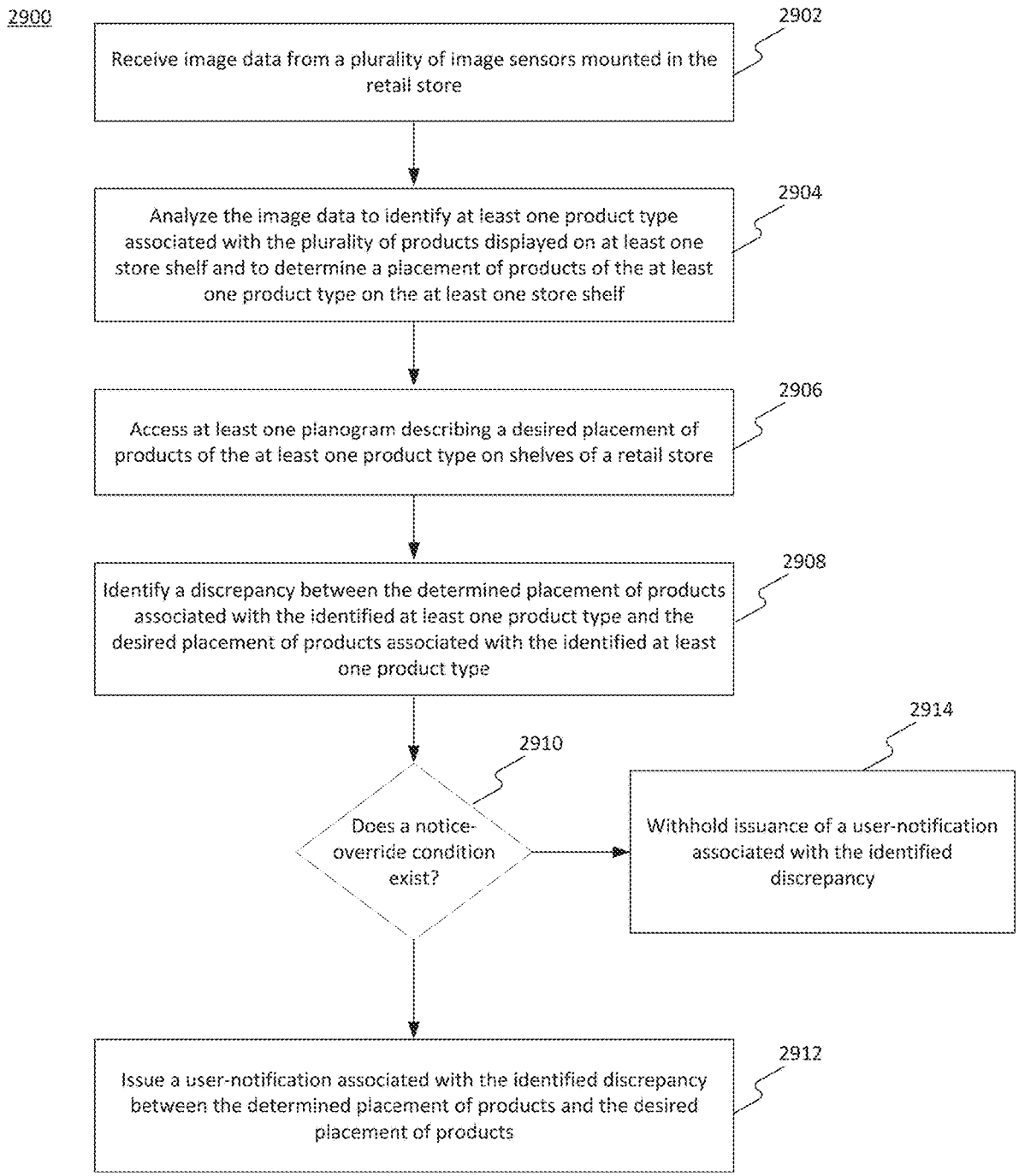
FIG. 29 is a flowchart of an exemplary method for processing images captured in a retail store and automatically identifying situations to withhold planogram incompliance notifications, consistent with the present disclosure.

FIG. 29 is a flowchart of a method 2900 for processing images captured in a retail store and automatically identifying situations to withhold planogram incompliance notifications. Method 2900 may be implemented by a general-purpose computer or a special-purpose computer built according to embodiments of the present disclosure. For example, method 2900 may be executed by at least one processor, e.g., processing unit 130.

At step 2902, the system, e.g., image analysis component 2702, may receive image data from a plurality of image sensors mounted in the retail store, wherein the image data depicts a plurality of products displayed on at least one store shelf. For example, image sensors may include capturing devices 125, which are mounted to a retail shelving unit and configured to capture images of opposing shelving units.

At step 2904, image analysis component 2702 may analyze the image data to identify at least one product type associated with the plurality of products displayed on at least one store shelf and to determine a placement of products of the at least one product type on the at least one store shelf. For example, as described above, image analysis component 2702 may use one or more image analysis techniques to recognize one or more product types associated with products in the captured image.

At step 2906, discrepancy determination component 2704 may access at least one planogram describing a desired placement of products of the at least one product type on shelves of a retail store. For example, discrepancy determination component 2704 may query a database, e.g., database 140, to retrieve one or more planograms associated with the product type or a combination of product types identified by image analysis component 2702.

At step 2908, discrepancy determination component 2704 may identify, based on the at least one planogram, a discrepancy between the determined placement of products associated with the identified at least one product type and the desired placement of products associated with the identified at least one product type.

At step 2910, notice component 2706 may determine whether a notice-override condition exists relative to the identified at least one product type due to misidentification of the product. For example, this determination may be made based on information associated with the product type, such as a pattern of misidentification. In other embodiments, the determination may be made, in part, based on product availability information or employee information.

At step 2912, if a notice-override condition is not determined to exist relative to the identified at least one product type, issue a user-notification associated with the identified discrepancy between the determined placement of products and the desired placement of products. A notification may include instructions for an employee to take a particular action with respect to the discrepancy. For example, the notification may instruct an employee to restock or reorganize a retail shelving unit.

At step 2914, if a notice-override condition exists relative to the identified at least one product type, withhold issuance of a user-notification associated with the identified discrepancy between the determined placement of products and the desired placement of products. In some embodiments, the withholding of the user notification may be based on a certainty level associated with the notice-override condition. For example, if the certainty level is above a threshold, a user notification may not be issued.

As described above, a plurality of capturing devices 125 may be connected to various forms of power sources. For example, capturing devices 125 may be configured to obtain electrical power from an associated mobile power source (e.g., one or more batteries), an external power supply (e.g., a power grid), a wireless power transmission system, and so forth. In some embodiments, capturing devices 125 may be configured to dynamically obtain electrical power from multiple sources. For example, a capturing device 125 may be configured to obtain electrical power from the power grid for a period of time but may be configured to obtain electrical power from the mobile power source at other times (e.g., when the camera is disconnected from the power grid, etc.). Accordingly, capturing device 125 (which may include one or more housings, such as housings 502 and 504 as described above) may be configured to dynamically connect to one or more mobile power sources. In some embodiments, the mobile power sources may be configured to attach to a shelving unit.

Figure 30A:
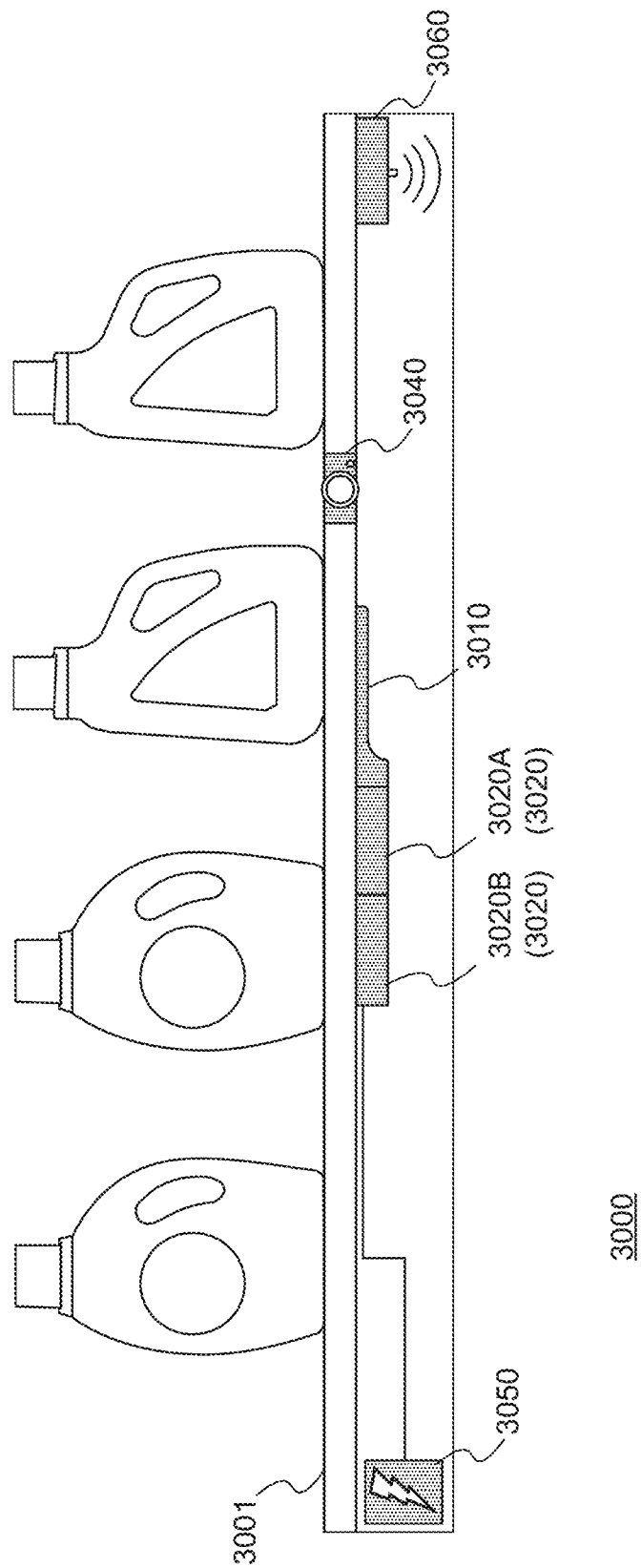
FIG. 30A is a schematic illustration of an example system for acquiring images of products in a retail store, consistent with the present disclosure.

FIG. 30A is a schematic illustration of an example system 3000 for acquiring images of products in a retail store, consistent with the present disclosure. As shown, system 3000 may include a control unit 3010, one or more mobile power sources 3020 (shown in FIG. 30A as multiple mobile power sources 3020A and 3020B), and one or more image capture devices 3040. Similar to with system 500 (described above with respect to FIG. 5A), in some embodiments, capturing device 125 may refer to some or all of the components of system 3000 shown in FIG. 30A. In some embodiments, one or more components of system 3000 may be configured to attach to a retail shelving unit 3001. For example, mobile power source 3020 and control unit 3010 may be configured to attach to a bottom of retail shelving unit 3001 via a track or other device. An example track system is described in greater detail below. Retail shelving unit 3001 may be a store shelf, as described in greater detail above.

Control unit 3010 may be configured to control one or more image capture devices 3040. In some embodiments, control unit 3010 may correspond to second housing 504 as described above. Accordingly, image capture device 3040 may correspond to image capture device 506, as described in greater detail above. Control unit 3010 may include one or more components of capturing device 125, including those shown in FIG. 3. For example, control unit 3010 may include processing device 302, network interface 306, memory interface 304, memory device 314, peripherals interface 308, etc. In some embodiments, image capture device 3040 may be integral to control unit 3010, as shown in FIG. 3. In other embodiments, the control unit may be included in a separate housing from image capture device 3040, for example, as described above with respect to FIGS. 5A-7B.

As shown in FIG. 30A, control unit 3010 may connect with mobile power source 3020. Mobile power source 3020 may include any device configured to receive, store, and/or supply electrical power. Mobile power source 3020 may supply power to control unit 3010, which may be used by control unit 3010 for performing the various functions described throughout the present disclosure. Mobile power source 3020 may further be configured to supply electrical power to image capture device 3040. In some embodiments, mobile power source 3020 may be configured to supply power directly to image capture device 3040. In other embodiments, control unit 3010 may be configured to convey some or all of the electrical energy received from mobile power source 3020 to image capture device 3040.

Mobile power source 3020 may further be configured to electrically connect to an electrical power grid 3050, as shown in FIG. 30A. An "electrical connection" as used herein may include any connection where electrical power and/or signals may be transferred between two or more components. In some embodiments, this may be a physical connection, through which power and/or data may be transmitted. In some embodiments, this may include a wireless transmission of power and/or data. As used herein, a "power grid" may refer to any interconnected network for delivering power to one or more devices. In some embodiments, a power grid may broadly refer to a municipal power grid, such as an electrical transmission system for delivering power to a plurality of customers, which may include the retail store in which system 3000 is being used. In other embodiments, a power grid may refer to a more local power network. Power grid 3050 may be a network of electrical connections for supplying power to capturing devices 125 and/or other components associated with system 100. For example, power grid 3050 may be local to a retail store, one or more aisles of shelves, one or more shelving units, etc. Accordingly, power grid 3050 may be configured to supply electrical power to multiple systems 3000. Mobile power source 3020 may receive power from power grid 3050, which it may convey to control unit 3010 and/or image capture device 3040 and/or use to charge one or more batteries included in mobile power source 3020 (described further below).

In some embodiments, mobile power source 3020 may be configured to electrically connect to additional mobile power sources. For example, mobile power source 3020A may be configured to electrically connect to one or more additional mobile power sources 3020B. Each of mobile power sources 3020A and 3020B may be configured to provide electrical power to control unit 3010 and/or image capture device 3040. In some embodiments, mobile power source 3020B may be configured to share energy with mobile power source 3020A, or vice versa. For example, mobile power source 3020B may be configured to transfer energy (either from one or more batteries included in mobile power source 3020B, or from power grid 3050) to mobile power source 3020A. Mobile power source 3020A may then transfer the received energy to an external device (e.g., control unit 3010 and/or image capture device 3040) or may store the received energy, for example, by charging a battery internal to mobile power source 3020A.

In some embodiments, system 3000 may include additional devices, such as beacon device 3060. Beacon device 3060 may be configured to emit one or more wireless signals via a wireless protocol, such as BLUETOOTH™, BLUETOOTH LE™ (BLE), Wi-Fi, near field communications (NFC), or the like. For example, the signal emitted by beacon device 3060 may be configured to enable external devices to calculate their location (e.g., within the store, with respect to the beacon, using signals from additional beacons, and so forth). In embodiments where components of system 3000 are affixed to a track system, beacon device 3060 may also be enabled to attach to and/or slide along the track. Beacon device 3060 may be configured to receive power from power grid 3050 and/or from mobile power source 3020. Mobile power source 3020 may include various electrical connectors for electrically connecting mobile power source 3020 to the various devices described herein. Such electrical connectors are described in greater detail below with respect to FIGS. 31A and 31B.

Figure 30B:
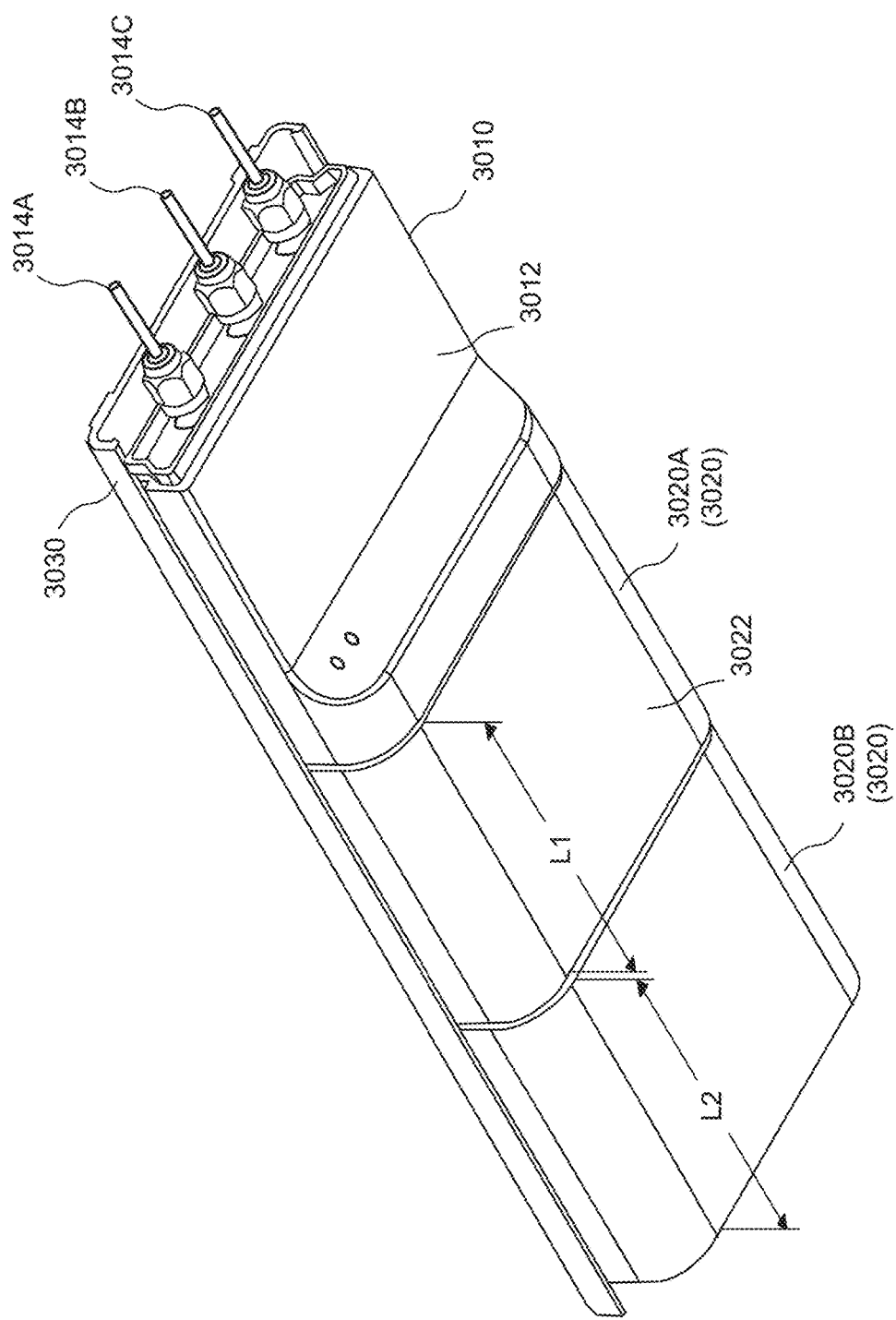
FIG. 30B is an illustration of an example control unit and mobile power sources, consistent with the present disclosure.

FIG. 30B is an illustration of an example control unit 3010 and mobile power sources 3020A and 3020B, consistent with the present disclosure. As described above, mobile power sources 2020 may be configured to supply electrical energy to control unit 3010. For example, control until 3010 may be electrically connected to mobile power source 3020A as shown in FIG. 30B. Further, mobile power source 3020A may be electrically connected to an additional mobile power source 3020B. Mobile power source 3020A may be configured to receive power from electrical grid 3050 and/or additional mobile power source 3020B.

Mobile power source 3020 may include a housing 3022, as shown in FIG. 30B. Housing 3022 may be configured to contain various internal components and circuitry of mobile power source 3020. Housing 3022 may be formed from a variety of materials. In some embodiments housing 3022 may be formed from a plastic material such as acrylic, acrylonitrile butadiene styrene (ABS), high-density polyethylene (HDPE), low-density polyethylene (LDPE), polyvinyl chloride (PVC), nylon, resin, etc. Housing 3022 may also be formed from other materials, such as metal, glass, wood, fiberglass, etc. In some embodiments, housing 3022 may comprise more than one material, for example, with multiple layers or subcomponents.

As described above, mobile power source 3020 may include one or more batteries. Accordingly, housing 3022 may be configured to retain at least one battery, which may include a rechargeable power source, or a one-time use power source. Housing 3022 may retain a single battery or may be configured to retain a plurality of batteries. The at least one battery may include any type of battery suitable for storing electrical power. For example, the battery may include, but is not limited to, a rechargeable lithium-ion battery, an alkaline battery, a nickel-metal hydride battery, a lead-acid battery, or the like.

Mobile power source 3020 may be configured to supply power to control unit 3010 from a battery associated with housing 3022 for controlling one or more image capture devices, such as image capture device 3040. In some embodiments, control unit may control multiple image capture devices (e.g., two, three, four, or more image capture devices.). In some embodiments, mobile power source 3020 may be configured to supply power to control unit 3010 from the battery associated with housing 3022 when power grid 3050 is unavailable. Power grid 3050 may be unavailable, for example, if power grid 3050 is offline or disabled (e.g., during a power outage, maintenance operation, an inadvertent disconnection, scheduled down time, etc.), if one or more components of system 3000 are disconnected or moved, or various other scenarios where power grid 3050 would not be able to supply power to mobile power source 3020. Accordingly, mobile power source 3020 may be configured to supply power to control unit 3010 from a battery. Mobile power source 3020 may be configured to recharge the at least one battery when the power grid is available.

Further, as described above, mobile power source 3020 may be configured to electrically connect to an additional mobile power source (e.g., mobile power source 3020B). In some embodiments, mobile power sources 3020A and 3020B may be the same. For example, system 3000 may be a modular system in which any number of mobile power sources 3020 may be connected together to supply power to control unit 3010 and/or other devices. Accordingly, mobile power source 3020A may have a length L1 which may be equal to a length L2 associated with mobile power source 3020B. In other embodiments, mobile power sources 3020A and 3020B may be different. For example, mobile power source 3020B may be larger or smaller than mobile power source 3020A. Accordingly, length L1 of the housing of mobile power source 3020A may be greater than length L2 of the additional mobile power source 3020B.

In some embodiments, mobile power source 3020A may be connected to mobile power source 3020B to increase an energy storage capacity that is available to control unit 3010. For example, the capacity of the at least one battery of mobile power source 3020A may be sufficient for capturing a certain number of images (e.g., 5,000, 7,500, 10,000, or greater). When mobile power source 3020A is connected to the additional mobile power source, a combined capacity of their batteries may sufficient for capturing a greater number of images (e.g., at least 10,000 images, at least 15,000 images, at least 20,000 images or more). In some embodiments, the capacities of mobile power source 3020A and 3020B may be different. For example, in embodiments where mobile power source 3020A has a length L1 that is greater than length L2 of mobile power source 3020B, mobile power source 3020A may have a greater storage capacity. While mobile power sources 3020A and 3020B are generally shown to be connected in series, in some embodiments, the mobile power sources may be connected in parallel. For example, the control unit (e.g., control unit 3010) may be configured to connect to a first mobile source (e.g., mobile power source 3020A) that is parallelly connected to a second mobile source (e.g., mobile power source 3020B). The control unit may be configured to draw power from the second mobile source before drawing power from first mobile source.

In some embodiments, the control unit may be configured to determine information pertaining to mobile power source 3020, which may be used to generate notifications relating to mobile power source 3020. For example, a processor included in control unit 3010 (e.g., processing device 302) may be configured to determine that a battery associated with the second mobile power source is below a predetermined charge level. For example, the predetermined charge level may be a certain percentage (e.g., 50%, 30%, 10%, etc.), an estimated time remaining (e.g., 1 day, 1 hour, 10 minutes, etc.), an estimated number of images remaining (e.g., 1,000 images, 500 images, 10 images, etc.) or the like. The processor may further be configured to, based on the determination, cause generation of a notification to a store employee for replacing the second mobile power source. For example, the second mobile power source may comprise a rechargeable power source, and the control unit may be configured to notify a store employee when the usability of the rechargeable power source at a selected time after being recharged is below a selected threshold. The notification may be presented to the employee in various ways, for example through a speaker or other output device associated with control unit 3010, through a light or other visual display associated with control unit 3010, by transmitting a notification to an employee device (e.g., output device 145D), transmitting a notification to server 135, or any other means for notifying an employee.

Similar to mobile power source 3020, control unit 3010 may include a housing 3012. Control unit 3010 may further comprise a plurality of connectors, such as connectors 3014A, 3014B, and 3014C shown in FIG. 30B. Each connector may be configured to enable a connection for transferring power to and for receiving data from to a separate image capture device fixedly mounted to the retail shelving unit. For example, connector 3014A may be configured to transfer power and receive data from image capture device 3040, whereas connectors 3014B and 3014C may each transfer power to and receive data from separate image capture devices.

In some embodiments, system 3000 may include an apparatus for slidably securing a selectable number of mobile power sources to a retail shelving unit. For example, control unit 3010 and mobile power source 3020 may be configured to slidably engage with a track 3030, as shown in FIG. 30B. Track 3030 may be attached to a retail shelf such that mobile power source 3020 and control unit 3010 may be slidably engaged with track 3030 to slide along the shelving unit. Track 3030 may include one or more rail arms configured to hold mobile power source 3020 and/or control until 3010. These rail arms are described in greater detail below with respect to FIG. 31A.

Figure 30C:
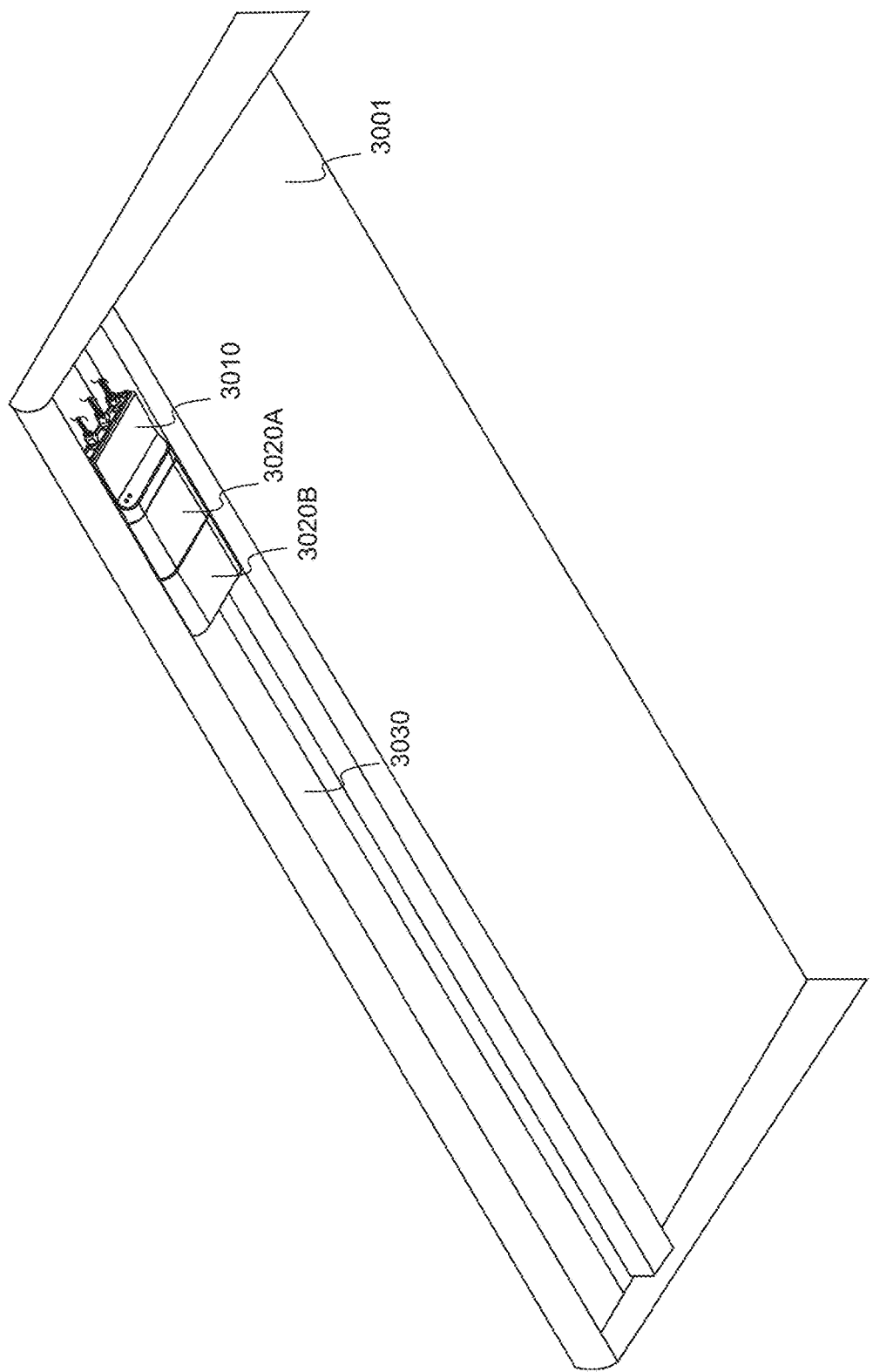
FIG. 30C illustrates an example retail shelving unit with a mobile power sources and a control unit slidably engaged along a track, consistent with the present disclosure.

FIG. 30C illustrates an example retail shelving unit with a mobile power sources 3020 and a control unit 3010 slidably engaged along a track 3030, consistent with the present disclosure. In some embodiments, track 3030 may be integral to retail shelving unit 3001. For example, the rail arms of track 3030 may be formed as part of shelving unit 3001. Accordingly, mobile power sources 3020A and 3020B and control unit 3010 may be configured to slidably engage with retail shelving unit 3001. In other embodiments, track 3030 may be separate from retail shelving unit 3001 and may be configured to attach to retail shelving unit 3001. For example, a base portion (e.g., base 3032 described below with respect to FIG. 31A) may be mounted on a first surface of the retail shelving unit opposite to a second surface of the retail shelving unit designated for placement of retail products, as shown in FIG. 30C. Track 3030 may be mounted to retail shelving unit 3001 by various methods, for example, using an adhesive (e.g., tape, glue, epoxy, etc.), staples, clips, pins, bolts, screws, nails, rivets, etc., or through manufacturing techniques (e.g., welding, creating from a mold, etc.). In some embodiments, the track and/or the retail shelving unit may have features such as notches, grooves, or cutouts to facilitate attachment.

Figure 31A:
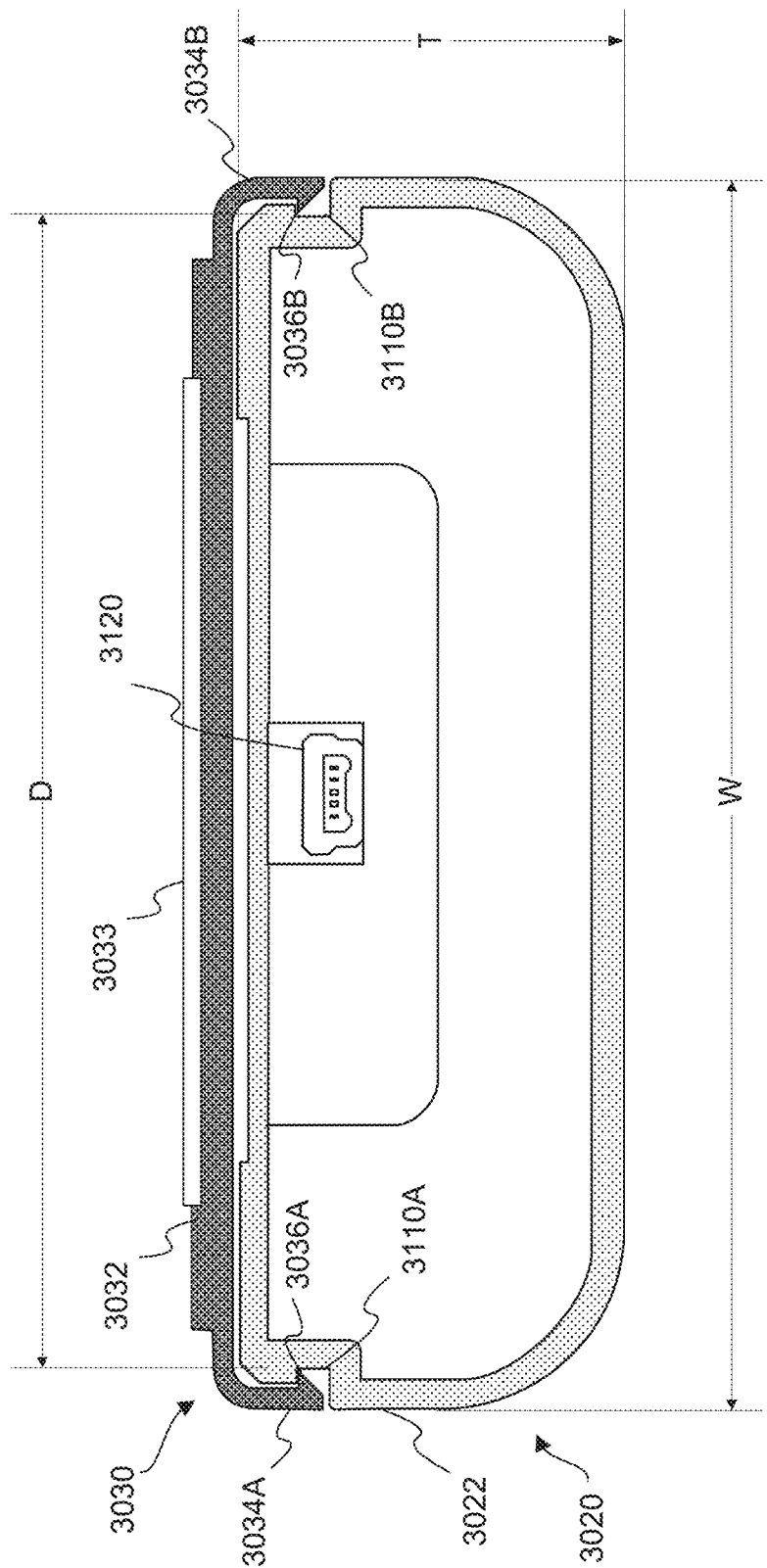
FIG. 31A is a side view illustrating an example apparatus for slidably securing a selectable number of mobile power sources to a retail shelving unit, consistent with the present disclosure.

FIG. 31A is a side view illustrating an example apparatus for slidably securing a selectable number of mobile power sources to a retail shelving unit, consistent with the present disclosure. As described above, system 3000 may include an apparatus, such as track 3030 for slidably mounting mobile power source 3020 and/or control unit 3010 to a retail shelving unit. Track 3030 may include a base 3032 configured to be mounted on a first surface of the retail shelving unit. The first surface may be opposite to a second surface of the retail shelving unit designated for placement of retail products, as illustrated in FIGS. 30A and 30C. In some embodiments, base 3032 may include an adhesive layer 3033 for mounting the apparatus to the first surface of the retail shelving unit. Adhesive layer 3033 may include any substance suitable for attaching the apparatus to the shelving unit, including, for example, tape, glue, epoxy, or the like. In some embodiments, base 3032 may be affixed to the first surface of the retail shelving unit by other means, including, for example, staples, clips, pins, bolts, screws, nails, rivets, hook-and-loop fasteners (e.g., Velcro™, 3M Dual Lock™, etc.), Suction cups, or any suitable fastening techniques. In some embodiments, base 3032 may be an integral part of the retail shelving unit. For example, base 3032 may be formed integrally with shelving unit through manufacturing techniques such as welding, creating from a mold, stamping, or other forming processes.

The apparatus may further include one or more rail arms for holding the mobile power source or the control unit. For example, track 3030 may include a first rail arm 3034A extending from base 3032, and a second rail arm 3034B extending from base 3032. First rail arm 3034A may include a first rail 3036A protruding from the first rail arm and extending in a longitudinal direction along first rail arm 3034A. Similarly, second rail arm 3034B may include a second rail 3036B protruding from the second rail arm in a direction toward first rail arm 3034A and extending in a longitudinal direction along second rail arm 3034B. The first and second rails may be configured to engage with corresponding grooves of one or more power sources to slidably secure the one or more power sources to the retail shelving unit. For example, mobile power source 3020 may include housing 3022, as described above, which may include a first guiding channel 3110A located on a first side of the housing and a second guiding channel 3110B located on a second side of the housing opposite to the first side of the housing. The first and second guiding channels being configured to engage with a track associated with a retail shelving unit in order to secure the housing to the retail shelving unit. For example, first guiding channel 3110A may be configured to engage with first rail 3036A and second guiding channel 3110B may be configured to be engaged with second rail 3036B.

The rail arms may be spaced such that mobile power source 3020 may be slidably engaged with track 3030. For example, the two opposing protrusions of rail arms 3034A and 3034B may be separated by a distance D, as shown in FIG. 31A. Distance D may be any suitable distance for engaging mobile power source 3020. In some embodiments, distance D may be between 45 mm to 85 mm. Mobile power source 3020 may have a width W and a thickness T. Width W may be any width suitable for engaging with track 3030. In some embodiments, the width W may be between 40 mm to 80 mm and thickness T may be between 10 mm to 25 mm. Any other suitable ranges of thicknesses and/or widths may also be used, for example, depending on the configuration of retail shelving unit 3001.

In some embodiments, the apparatus (e.g., track 3030) may be configured support two or more mobile power sources (e.g., mobile power sources 3020A and 3020B) configured to power a plurality of image capture devices mounted on a side of the retail shelving unit facing another retail shelving unit. In some embodiments, the mobile power sources may be located in separate housings, as shown in FIG. 30B. Track 3030 may further be configured to direct a first connector of a first mobile power source to a second connector of a second mobile power source, thereby allowing the first mobile power source to mate with the second mobile power source, which may be slidably positioned adjacent the first mobile power source along the track. For example, mobile power source 3020 may include an electrical connector 3120 configured to connect to a second mobile power source. Example connectors are described in greater detail below with respect to FIGS. 31B and 31C.

Track 3030 may be constructed of any suitable material for slidably engaging one or more mobile power sources. For example, track 3030 may be made, at least in part, of a plastic such as acrylic, acrylonitrile butadiene styrene (ABS), high-density polyethylene (HDPE), low-density polyethylene (LDPE), polyvinyl chloride (PVC), nylon, resin, etc. In other embodiments, track 3030 may be made, at least in part, of a metal, such as steel, aluminum, brass, copper, or any other suitable metal or metal alloy. In some embodiments, the material of track 3030 may be flexible such that mobile power source 3020 and/or control unit 3010 may be snapped into track 3030. In some embodiments, the mobile power source may only be snapped into track 3030 but may require a tool for removal. This may prevent theft or tampering with the components of system 3000. Accordingly, the apparatus may include a locking mechanism (not shown in FIG. 31A) that allows for toolless engagement of a power source with the rails, but may need a tool to disengage the power source from the rails. In some embodiments, the tool may be a prying device configured to deflect the first rail arm from and/or the second rail arm to allow the mobile power source to be removed. In other embodiments, the tool may allow the mobile power source to slide out of track 3030 on one end. For example, the tool may disengage a lock, a screw, or another member located on one end of track 3030, whereby disengaging the member allows the mobile power source to slide out of the end of the track.

While track 3030 is shown in FIG. 31A and described above in connection with attachment to mobile power source 3020, control unit 3010 and other devices (e.g., beacon device 3060) may similarly connect to track 3030. For example, housing 3012 of control unit 3010 may include a first guiding channel located on a first side of the housing and a second guiding channel located on a second side of the housing opposite to the first side of the housing, similar to guiding channels 3110A and 3110B, as described above. The first and second guiding channels may be configured to slidably engage with a track associated with a retail shelving unit, such as track 3030. Accordingly, any of the features, dimensions, or other disclosures above with respect to mobile power source 3020 may also apply to control unit 3010.

Figure 31B:
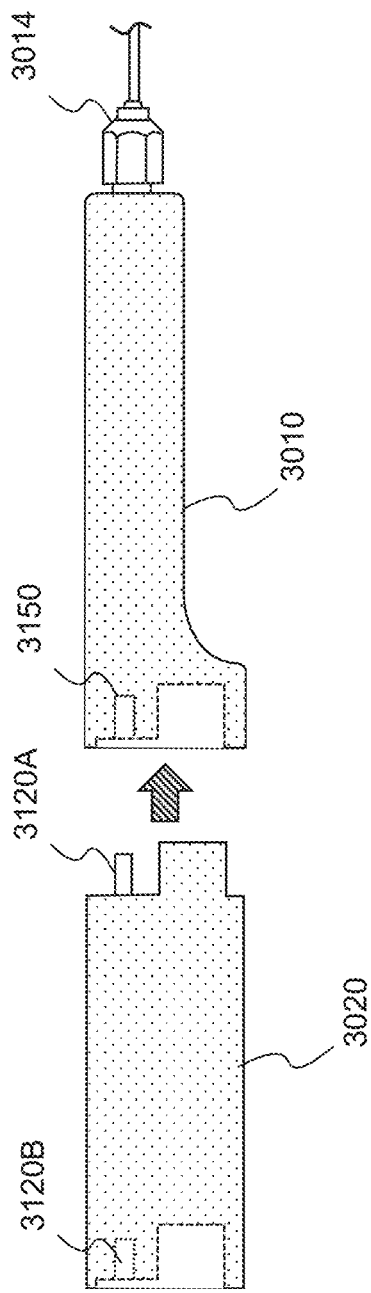
FIGS. 31B and 31C show example electrical connectors for connecting a mobile power source to a control unit and/or other mobile power sources, consistent with the present disclosure.
Figure 31C:
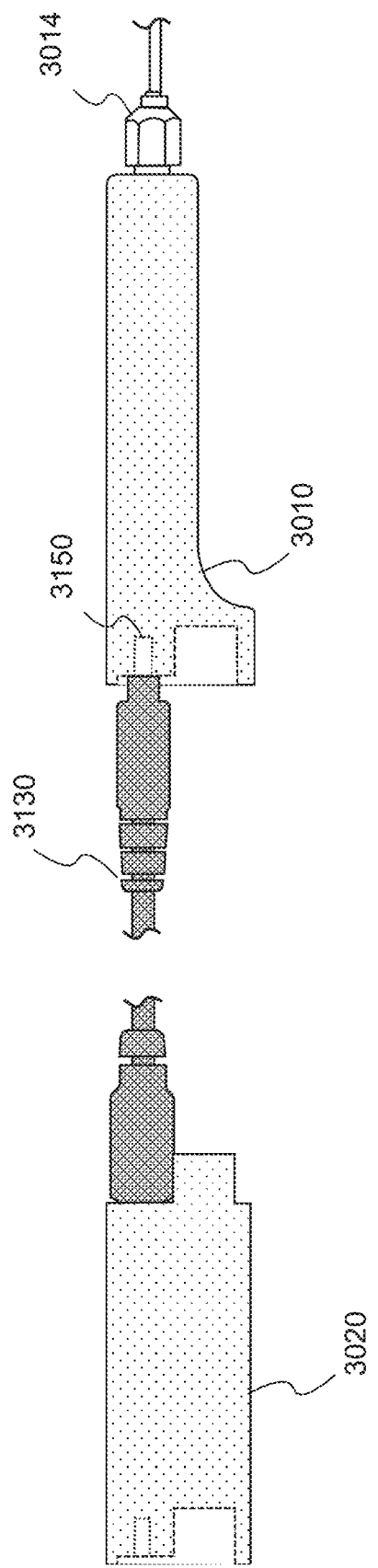

FIGS. 31B and 31C show example electrical connectors for connecting mobile power source 3020 to control unit 3010 and/or other mobile power sources, consistent with the present disclosure. In some embodiments, the various components may be configured to connect directly to each other. FIG. 31B shows an example mobile power source 3020 configured to connect directly to control unit 3010. Mobile power source 3020 may include a first electrical connector 3120A associated with housing 3022. First connector 3120A may be configured to electrically connect mobile power source 3020 to a control unit for at least one image capture device, such as control unit 3010. Mobile power source 3020 may also include a second electrical connector 3120B associated with housing 3022. Second electrical connector 3120B may be configured to electrically connect mobile power source 3020 to an additional mobile power source and/or a power grid. For example, mobile power source 3020A and may be configured to connect to additional mobile power source 3020B or may be configured to connect to power grid 3050. Accordingly, power grid 3050 may have a connector that is interchangeable with electrical connector 3120A such that it may connect to electrical connector 3120B. In some embodiments, the first electrical connector may be associated with a first end of the housing, and the second electrical connector configured to be electrically may be associated with a second end of the housing opposite to the first end of the housing, as shown in FIG. 31B. Mobile power source 3020 may further include circuitry (not shown in FIG. 31B) configured to convey power from the additional mobile power source to the at least one image capture device when the mobile power source is connected to the additional mobile power source, and to convey power from the power grid to the at least one image capture device when the mobile power source is connected to the power grid.

Electrical connectors 3120A and/or 3120B may be any suitable connectors for conveying electrical power and/or data between mobile power source 3020 and control unit 3010 or between two mobile power sources 3020. In some embodiments, electrical connectors 3120A and/or 3120B may be a USB connector (e.g., USB-A, USB-B, USB-C, Lightning, Micro-A, Micro-B, Mini-A, Mini-B, 5-pin, etc.). Electrical connectors 3120A and/or 3120B may be various other forms of connectors, including DVI, DisplayPort, eSATA, Firewire, 30-pin, HDMI, etc. In some embodiments, various other forms of connectors may be used and the present disclosure is not limited to the connectors described above. Accordingly, first electrical connector 3120A may further be configured to transfer data between mobile power source 3020 and control unit 3010. For example, the data may include data received from image capture device 3040, which may be conveyed through mobile power source 3020 and eventually through communications network 150. In other embodiments, the data may include information regarding mobile power source 3020, including a remaining charge level, as described above.

Control unit 3010 may include a power port 3150 configured to enable an electrical connection for receiving power from at least one mobile power source (e.g., mobile power source 3020), as shown in FIG. 31B. In some embodiments, power port 3150 may be interchangeable with electrical connector 3120B. Accordingly, electrical connector 3120A of mobile power source 3020 may be configured to connect with either another mobile power source 3020 or with control unit 3010. Thus, any number of mobile power sources 3020 may be connected together and/or connected with control unit 3010 as needed. In some embodiments, power port 3150 may be configured to connect directly to power grid 3050, without an intermediate mobile power source.

Control unit 3010 may further include a plurality of connectors 3014 (e.g., connectors 3014A, 3014B, and 3014C as described above), each of which may be configured to enable a connection for transferring power to and for receiving data from to a separate image capture device fixedly mounted to the retail shelving unit, as described above. The plurality of connectors may be located on a first end of housing 3012 of control unit 3010, and power port 3150 may be located on a second end of the housing opposite to the first end of the housing, as shown in FIG. 31B. In some embodiments, electrical connectors 3014A, 3014B, and 3014C may correspond to data conduit 508, as described above. Accordingly, any of the descriptions or disclosures associated with data conduit 508 may also apply to plurality of electrical connectors 3014.

As shown in FIG. 31C, mobile power source 3020 and control unit 3010 may be connected by a cable 3130. In some embodiments, cable 3130 may be integral to at least one of mobile power source 3020 or control unit 3010. In other embodiments, at least one end of cable 3130 may be removable. For example, cable 3130 may have an electrical connector configured to connect with power port 3150 and/or an electrical connector configured to connect with electrical connector 3120A. A similar cable may be used to connect two mobile power sources 3020, to connect mobile power source 3020 to power grid 3050, or to connect power grid 3050 directly to control unit 3010. In some embodiments, system 3000 may be configured such that mobile power source 3020 can connect with control unit 3010 either directly or using cable 3130. For example, cable 3130 may have an electrical connector on a first end configured to interface with electrical connector 3120A of mobile power source 3020 (and/or an electrical connector of power grid 3050). Cable 3130 may similarly have an electrical connector on a second end of the cable configured to connect with power port 3150 of control unit 3010 or with electrical connector 3120B of mobile power source 3020. Accordingly, the components of system 3000 may connect either directly with each other or via cable 3130, as needed. For example, cable 3130 may be used as an extender when connecting two components that are spaced apart from one another.

In some embodiments, electrical connectors 3120A and 3120B and power port 3150 may be integral to track 3030. For example, rails 3036A and 3036B may include conductive elements such that power and/or data may be transferred to mobile power source 3020 and/or control unit 3010. For example, guiding channels 3110A and 3110B may include corresponding conductive elements such that power may be transmitted from power grid 3050 through track 3030 to mobile power source 3020 and/or control unit 3010. In other embodiments, electrical connectors 3120A and 3120B and power port 3150 may be wireless. For example, mobile power source 3020 may be configured to wirelessly transmit power and/or data to control unit 3010. Various other forms of electrical connectors may also be used.

Figure 32:
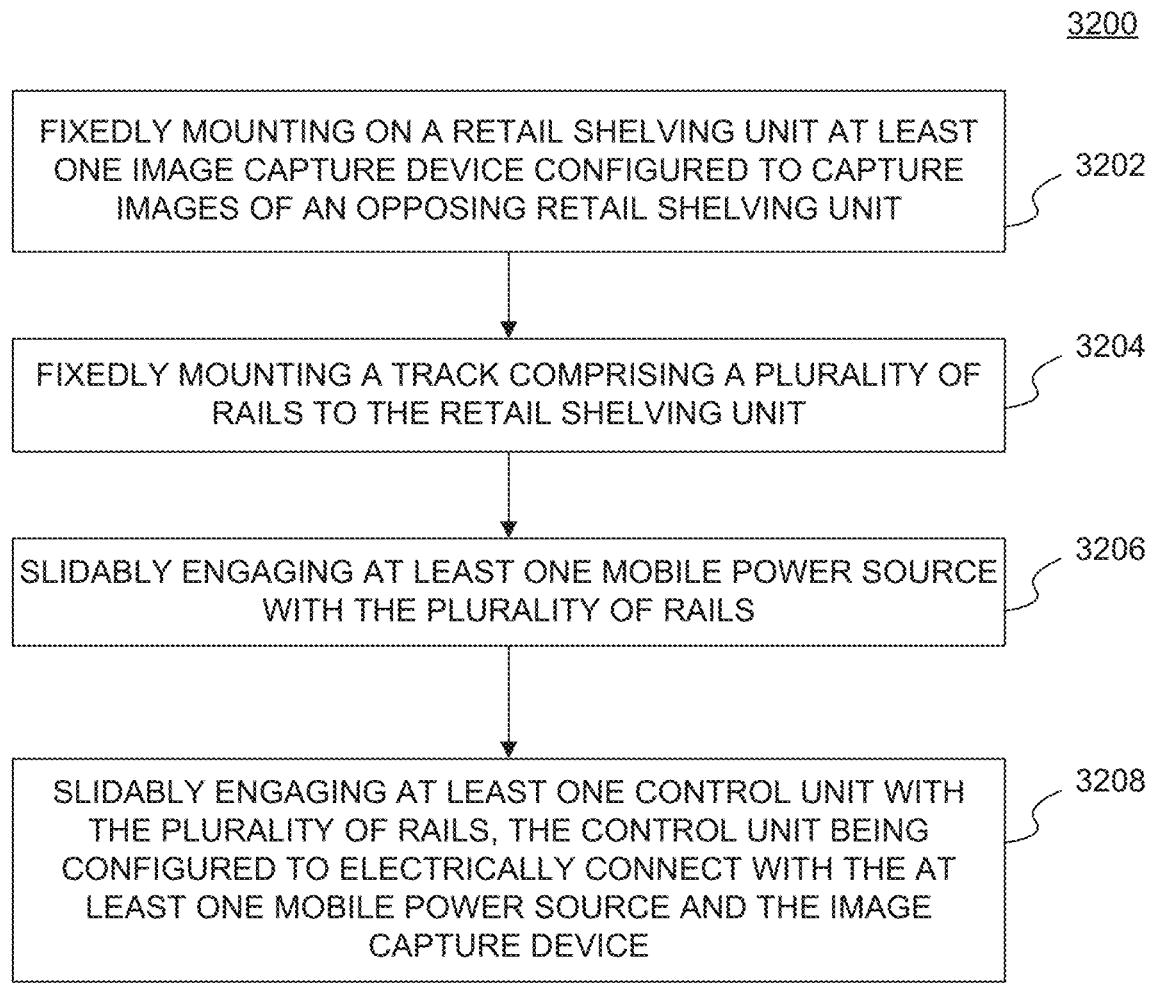
FIG. 32 provides a flowchart representing an exemplary method for using a dynamic number of power sources for a camera mountable on a retail shelving unit, in accordance with the present disclosure.

FIG. 32 provides a flowchart representing an exemplary method 3200 for using a dynamic number of power sources for a camera mountable on a retail shelving unit, in accordance with the present disclosure. For purposes of illustration, in the following description, reference is made to certain components of system 3000 as deployed in the configuration depicted in FIGS. 30A and 31A. It will be appreciated, however, that other implementations are possible and that other configurations may be utilized to implement the exemplary method. It will also be readily appreciated that the illustrated method can be altered to modify the order of steps, delete steps, or further include additional steps.

At step 3202, method 3200 may include fixedly mounting on a retail shelving unit at least one image capture device configured to capture images of an opposing retail shelving unit. For example, image capture device 3040 may be fixedly mounted to retail shelving unit 3001, as shown in FIG. 30A. In some embodiments the at least one image capture device may correspond to first housing 502. Accordingly, fixedly mounting the at least one image capture device may comprise mounting first housing 502 on first retail shelving unit 602 on a side of store shelf 622 facing second retail shelving unit 604, as described above. Various other configurations of image capture devices are described above with respect to method 700.

At step 3204, method 3200 may include fixedly mounting a track comprising a plurality of rails to the retail shelving unit. For example, step 3204 may include mounting track 3030 to shelving unit 3001. As described above with respect to FIG. 31A, track 3030 may comprise a base (e.g., base 3032) configured to be mounted on a first surface of the retail shelving unit opposite to a second surface of the retail shelving unit designated for placement of retail products. Track 3030 may further comprise a first rail arm (e.g., first rail arm 3034A) extending from the base. The first rail arm may include a first rail (e.g., first rail 3036A) protruding from the first rail arm and extending in a longitudinal direction along the first rail arm. Track 3030 may further comprise a second rail arm (e.g., second rail arm 3034B) extending from the base, the second rail arm including a second rail (e.g., second rail 3036B) protruding from the second rail arm in a direction toward the first rail arm and extending in a longitudinal direction along the second rail arm. The first and second rails may be configured to engage with corresponding grooves of one or more mobile power sources to slidably secure the one or more power sources to the retail shelving unit.

At step 3206, method 3200 may include slidably engaging at least one mobile power source with the plurality of rails. For example, mobile power source 3020 may be slidably engaged with track 3030, as described above. In some embodiments, the mobile power source may comprise a housing (e.g., housing 3022) configured to retain at least one battery. The housing may include a first guiding channel located on a first side of the housing and a second guiding channel located on a second side of the housing opposite to the first side of the housing. The first and second guiding channels may be configured to engage with a track associated with a retail shelving unit (e.g., track 3030) in order to secure the housing to the retail shelving unit.

In some embodiments, the mobile power source may further comprise a first electrical connector associated with the housing. The first connector may be configured to electrically connect the mobile power source to a control unit for at least one image capture device. For example, the first electrical connector may electrical connector 3120A, as described above. The mobile power source may further comprise a second electrical connector (e.g., electrical connector 3120B) associated with the housing. The second electrical connector may be configured to electrically connect the mobile power source to at least one of an additional mobile power source or a power grid. The mobile power source may further comprise circuitry configured to convey power from the additional mobile power source to the at least one image capture device when the mobile power source is connected to the additional mobile power source, and to convey power from the power grid to the at least one image capture device when the mobile power source is connected to the power grid.

At step 3208, method 3200 may include slidably engaging at least one control unit with the plurality of rails. In some embodiments, the control unit may be configured to electrically connect with the at least one mobile power source and the image capture device. For example, control unit 3010 may be slidably engaged with track 3030, as described above. The control unit may comprise a housing (e.g., housing 3012), which may include a first guiding channel located on a first side of the housing and a second guiding channel located on a second side of the housing opposite to the first side of the housing. The first and second guiding channels may be configured to slidably engage with a track (e.g., track 3030) associated with a retail shelving unit. In some embodiments, the control unit may further comprise a plurality of connectors (e.g., connectors 3014) located on a first end of the housing. Each connector may be configured to enable a connection for transferring power to and for receiving data from a separate image capture device fixedly mounted to the retail shelving unit. The control unit may further comprise a power port (e.g., power port 3150) on a second end of the housing opposite to the first end of the housing. The power port may be configured to enable an electrical connection for receiving power from at least one mobile power source.

As described above, a server may be configured to determine whether a shelf of a retail store is in compliance with a planogram based on images captured from a plurality of capturing devices 125. The server may further be configured to transmit alerts based on an identified incompliance event. For example, an alert may be sent to an employee of the retail store where the incompliance event occurred. In some embodiments, the identification of an incompliance event in one retail store may affect actions taken by the server in response to incompliance events identified in other retail stores. For example, feedback received from an employee in response to an alert for an incompliance event in a first store may indicate a proper remedial action to be performed in other stores. In another example, feedback may indicate that an incompliance event in another store was incorrectly identified. Accordingly, the action taken in response to an incompliance event may depend on feedback received based on a previous incompliance event, which may allow for more accurate or relevant actions to be taken in response to the incompliance event.

Figure 33:
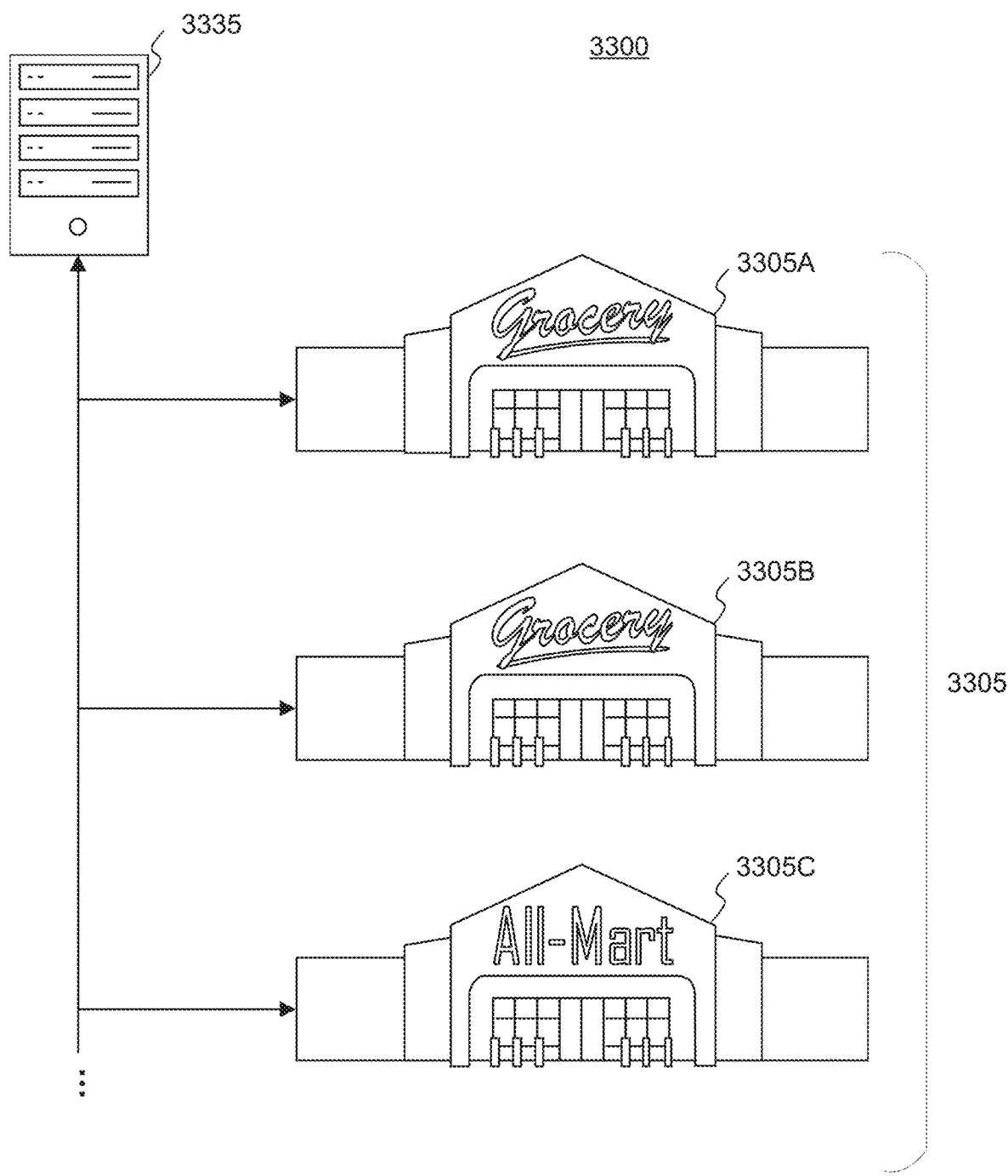
FIG. 33 illustrates an example system for detecting planogram compliance in multiple retail stores, consistent with the present disclosure.

FIG. 33 illustrates an example system 3300 for detecting planogram compliance in multiple retail stores, consistent with the present disclosure. System 3300 may include a server 3335 configured to receive and analyze image data captured in a plurality of retail stores 3305, such as retail stores 3305A, 3305B, and 3305C. In some embodiments system 3300 may correspond to system 100, described in detail above. For example, server 3335 may correspond to server 135 as shown in FIG. 1. Accordingly, any of the above descriptions or embodiments pertaining to server 135 may also apply to server 3335. Server 3335 may receive image data captured in retail stores 3305. For example, each of retail stores 3305A-C may contain one or more capturing devices 125 as described above. Server 3335 may communicate with devices in retail stores 3305 over a network connection, such as through communications network 150. Retail stores 3305A-C may correspond to retail stores 105A-C, as described above in reference to FIG. 1. Accordingly, any of the above descriptions or embodiments pertaining to retail stores 105A-C may equally apply to retail stores 3305. While three retail stores 3305A-C are shown by way of example, system 3330 may include more or fewer retail stores. Further, it should be understood that system 3300 is not limited to the elements shown in FIG. 33 and may contain additional elements not shown, including any of the elements included in FIG. 1.

As described above, retail stores 3305 may include any an establishment offering products for sale by direct selection either physically or through virtual shopping. Retail stores 3305A-C may be an establishment operated by a single retailer (e.g., a supermarket) or an establishment that includes stores operated by multiple retailers (e.g., a shopping mall). In some embodiments two or more of retail stores 3305 may be related. In one example, as shown in FIG. 33, retail store 3305A may be of a same type as retail store 3305B. For example, retail stores 3305A and 3305B may both be grocery stores. In some embodiments, retail stores 3305A and 3305B may be owned by the same company or parent company. For example, retail stores 3305A and 3305B may be part of the same chain of stores. Accordingly, retail stores 3305A and 3305B may be governed by the same or similar contractual planogram requirements. In other embodiments, some or all of retail stores 3305 may be of different types. For example, retail store 3305A may be a grocery store, while retail store 3305C may be a big box store (e.g., selling housewares and/or other general merchandise). In some embodiments, 3305C may have the same or similar planogram requirements, especially with respect to a particular product. Some or all of retail stores 3305 may have different planogram requirements, however. In some embodiments, retail stores may include other types of stores than those depicted in FIG. 33, including, but not limited to, electronics stores, hardware stores, department stores, wholesale or discount clubs, clothing stores, convenience stores, specialty stores (e.g., jewelers, florists, sporting goods stores, etc.), or any other type of retail store.

Server 3335 may receive images captured by capturing devices 125 included in retail stores 3305 and may analyze the captured images to assess planogram compliance by retail stores 3305. Server 3335 may determine appropriate actions to take in response to identified incompliance events associated with retail stores 3305 based on other incompliance events associated with retail stores 3305. In some embodiments, the determined response may be based on incompliance events occurring at a different store. For example, server 3335 may determine an appropriate action in response to an incompliance event identified at retail store 3305A based on an incompliance event identified at retail store 3305B or 3305C. In some embodiments, the incompliance event may be a previous incompliance event from the same store. For example, historical incompliance events from retail store 3305A may be assessed to determine an appropriate response to a current incompliance event.

FIG. 34 illustrates an example scenario for coordinating actions taken in response to identified incompliance events, consistent with the present disclosure. Server 3335 may be configured to receive image data from stores 3405A and 3405B. Retail stores 3405A and 3405B may correspond to retail stores 3305, described above. Accordingly, retail stores 3405A and 3405B may be the same type of retail store or may be of different types. Server 3335 may receive image data associated with images captured by capturing devices 3425A and 3425B, which may correspond to capturing devices 125 as described above.

Server 3335 may analyze image data received from an environment of retail store 3405 to determine that incompliance event 3420A has occurred. Incompliance event 3420A may indicate that shelf 3410A is not in compliance with one or more planograms associated with retail shelf 3410A. For example, a planogram may dictate a certain placement requirement for product 3412A, which may refer to a product of a particular type. As used herein, a product type may refer to a particular category of product (e.g., soda, beer, sports drinks, etc.), a particular brand (e.g., Coca-Cola™, Pepsi™ etc.), a particular model or subtype (e.g., Diet Pepsi™, Crystal Pepsi™, etc.), a group of individual products (e.g., products having a certain expiration date, products associated with a particular shipment, etc.), or any other classification of product. The planogram may be associated with contractual obligations and/or other preferences related to retailer, supplier, or manufacturer methodology for placement of products on retail store shelves. In response to incompliance event 3420A, server 3335 may generate a notification 3442A and provide it to an employee 3430A of store 3405A. Employee 3430A may be a human employee, a robot, a store owner, a manager, or the like. In some embodiments, notification 3442A may be transmitted for display on an employee device 3440A of store employee 3430A, which may correspond to output device 145, as described above.

Incompliance event 3420A may be any detected event in which shelf 3410A does not comply with an expected or desired condition. Incompliance event 3420A may correspond to the various examples of planogram compliance described throughout the present disclosure. For example, incompliance event 3420A may be based on product facing, product placement, planogram compatibility, price correlation, promotion execution, product homogeneity, restocking rate, and planogram compliance of adjacent products. Various examples of incompliance events 3420 are provided below.

Notification 3442A may be any form of electronic communication indicating that incompliance event 3420A has been detected. Notification 3442A may be presented in various manners, including as an email, an SMS message, a MMS message, a app notification, an audible notification, a visual notification (e.g., an LED light, etc.), an in-app indicator, or the like. In some embodiments, notification 3442A may be presented on a GUI, such as GUI 1120, 1130, and/or 1140, as described above. In some embodiments, notification 3442A may further include instructions for employee 3430A to take an action in response to incompliance event 3420A.

Server 3335 may further receive feedback 3444A in response to notification 3442A. In this context, "feedback" may include any received information pertaining to incompliance event. In some embodiments, feedback 3444A may refer to a response from employee 3430A. For example, employee 3430A may input information pertaining to incompliance event 3420A in employee device 3440A. In other embodiments, feedback 3444A may be generated by an automated system (e.g., by a computer system of retail store 3405A, a computer system of a manufacturer or supplier of product 3412A, etc.), by a manager of retail store 3405A, by a supplier or manufacturer (e.g., of product 3412A), or any other suitable source of feedback relating to an incompliance event. In some embodiments, feedback 3444A may indicate an action that was taken in response to notification 3442A. In other embodiments, feedback 3444A may be a confirmation of incompliance event 3420A. For example, employee 3430A may confirm that incompliance event 3420 occurred. In some embodiments, feedback 3444A may dismiss or justify incompliance event 3420A. For example, feedback 3444A may indicate an exception to the planogram compliance (e.g., based on a holiday, a special promotion, an expiration of a planogram or contractual obligation, a change in planogram or contractual obligations, etc.), a reason why the planogram may not be complied with (e.g., a product shortage, etc.), an indication that the incompliance event was detected by mistake, or the like. Various other examples of feedback are provided below. In some embodiments, feedback 3444A may be based on an analysis of one or more additional images captured after notification 3442A was provided. For example, the one or more additional images may be analyzed to determine whether an action was taken in response to notification 3442A (e.g., within a particular time frame), and/or to determine the type of action taken, and feedback 3444A may include and/or be based on such determination. For example, a machine learning model may be trained using training examples to determine whether actions were taken and/or the types of taken actions from images and/or videos, and the trained machine learning model may be used to analyze the one or more additional images to determine whether the action was taken in response to notification 3442A, and/or to determine the type of action taken. An example of such training example may include an image and/or a video, together with a label indicating whether an action was taken (e.g., before the image and/or the video was captured, while the image and/or video were captured, etc.) and/or the type of action.

As described above, an incompliance event may be identified based on various scenarios. In some embodiments, incompliance event 3420A may be based on an amount of product 3412A displayed on shelf 3410A. For example, an amount of product 3412A may fall below a selected threshold. The threshold may be selected based on a planogram, based on contractual obligations of retail store 3405A, based on historic amounts of product 3412A in the retail store, based on amount of product 3412A in other retail stores, based on area of shelf 3410A dedicated to product 3412A, and so forth. Some examples of such an amount may include number of product facings (e.g., a number of product 3412A placed on the front edge of shelf 3410A), an amount of inventory on shelf, a weight of products, a volume of products, and so forth.

Accordingly, notification 3442A may include instructions for restocking at least part of shelf 3410A previously dedicated to product 3412A with products of a different product type. In some embodiments, feedback 3444A may comprise an indication of a shortage of a product of a particular type. For example, employee 3430A may indicate that product 3412A is out of stock, that a shipment of product 3412A was not received, or the like. In some examples, feedback 3444A may comprise an indication of a repositioning of a product type to a different part of retail store 3405A. In some examples, feedback 3444A may comprise an indication of a removal of a product of a particular type from a retail store. For example, employee 3430A may indicate that retail store 3405A no longer carries product 3412A, that product 3412A has been discontinued, etc. In some examples, feedback 3444A may comprise an indication of a reduction of a shelf area dedicated to product 3412A in retail store 3405A. In some examples, the feedback may comprise an indication of a lessening of an amount requirement related to product 3412A. For example, retail store 3405A, or a supplier or manufacturer of product 3412A may change a planogram associated with shelf 3410A to lessen the required amount of product 3412A.

In some embodiments, incompliance event 3420A may be based on a price label related to product 3412A indicating an unexpected price for the particular product type. In some examples, the first action and/or the second action and/or the third action may include modifying the price label. For example, a price displayed on shelf 3410A (which may be detected based on various image analysis techniques described above) may not correspond to an expected price for that product type. In such embodiments, feedback 3444A may comprise an indication of a price change for product 3412A, for example based on a change in pricing set by retail store 3405A, a supplier or manufacturer of product 3412A, a promotion of product 3412A, or the like.

In some embodiments, incompliance event 3420A may be based on product 3412A (or products of another product type) being in an unexpected position within the retail store. For example, product 3412A may be detected in another part of retail store 3405A, or a product other than product 3412A may be detected on shelf 3410A. Accordingly, notification 3442A may include instructions for moving the products from the unexpected position. In some examples, the feedback may comprise an indication that the products are rightfully placed in the unexpected position. For example, the unexpected position of product 3412A may be in a promotion area within retail store 3405A, and feedback 3444A may comprise an indication of a current promotion of product 3412A.

In some embodiments, incompliance event 3420A may be based on a failure to identify at least one product in the retail store. For example, product 3412A may not be detected by any capturing devices within store 3405A. Accordingly, in some examples, notification 3442A may include instructions for capturing at least one image of product 3412A in higher resolution than the image data captured using the capturing devices. In other examples, notification 3442A may include instructions for scanning a barcode associated with the at least one product, which may confirm a presence of product 3412A within retail store 3405A. In some examples, the first action and/or the second action and/or the third action may include identifying the at least one product. Feedback 3444A may comprise at least one image of the at least one product in the higher resolution or other identifying information of the at least one product.

Server 3335 may further receive an indication of a second incompliance event 3420B associated with shelf 3410B in retail store 3405B. Similar to incompliance event 3420A, incompliance event 3420B may be determined based on analysis of image data captured by capturing device 3425B within an environment of retail store 3405B. In some embodiments, incompliance event 3420B may be associated with a product 3412B. Server 3335 may determine that shelf 3410B is associated with shelf 3410B. For example, in some embodiments, server 3335 may determine that products 3412A and 3412B are of the same type, as described above. For example, products 3412A and 3412B may be of the same product category, the same brand, the same model or subtype, the same product group, may be placed next to similar neighboring products, etc. In some embodiments, shelf 3410A may be similar to shelf 3410B in other respects. For example, shelves 3410A and 3410B may be in a similar location within the store (e.g., similar aisle, similar position in relation to a store entrance, a checkout station, a backroom, etc.), may have a similar shelf height, a similar shelf size, or the like. In some examples, a machine learning model may be trained using training examples to determine whether two shelves are associated from images and/or videos of the two shelves, and the trained machine learning model may be used to analyze an image and/or a video of shelf 3410B and an image and/or a video of shelf 3410B to determine whether shelf 3410B is associated with shelf 3410B. An example of such training example may include an image and/or a video of a first shelf and an image and/or a video of a second shelf, together with a label indicating whether the two shelves are associated. In some examples, a machine learning model may be trained using training examples to determine whether two shelves are associated from data related to the two shelves, and the trained machine learning model may be used to analyze data related to shelf 3410B and data related to shelf 3410B to determine whether shelf 3410B is associated with shelf 3410B. Some non-limiting examples of such data related to a shelf may include location of a shelf within a retail store, products corresponding to a shelf (e.g., according to a planogram, according to ana analysis of images of the shelf, etc.), height of shelf, structure of shelf, information related to nearby items in the retail store, and so forth. An example of such training example may include data related to a first shelf and data related to a second shelf, together with a label indicating whether the two shelves are associated.

Based on the determined association between shelves 3410A and 3410B, server 3335 may consider feedback 3444A in determining an appropriate action to take in response. For example, in some embodiments, server 3335 may generate a notification 3442B for an employee 3430B of store 3405B, which may be presented on an employee device 3440B, similar to notification 3442A. In some embodiments, notification 3442B may include instructions for employee 3430B, similar to the instructions described above with respect to notification 3442A. The content of notification 3442B may be based, at least in part, on feedback 3444A. For example, if feedback 3444A confirms the occurrence of incompliance event 3420A, notification 3442B may alert employee 3430B to incompliance event 3420B. Notification 3442B may include the same or different instructions as those included in notification 3442A. In some embodiments, notification 3442B may further include information about incompliance event 3420A, for example, a time of the event, a location of the event, a type of event, whether the incompliance was resolved, how the incompliance was resolved, etc.

In another example, feedback 3444A may indicate an action that was taken in response to incompliance event 3420A. For example, feedback 3444A may indicate how incompliance event 3420A was resolved. The action taken in response to incompliance event 3420A may or may not be the same as an instructed action notification 3442A. For example, feedback 3444A may include a confirmation that an instructed action was taken or may indicate an alternative action. Notification 3442B may include an instruction to take the same action that was taken in response to incompliance event 3420A. In other embodiments, the action taken in response to incompliance event 3420A may not resolve the incompliance. Accordingly, notification 3442B may include instructions to take a different action. In other embodiments, the instructions may be to consult with employee 3430A, or with retail store 3405A for an appropriate action.

In another example, feedback 3444A may dismiss or otherwise resolve incompliance event 3420A. For example, feedback 3444A may indicate a change in planogram requirements, an exception to the planogram requirements, extenuating circumstances (e.g., a product shortage, a temporary promotion or other change in planogram requirements, etc.), or another reason why the incompliance is justified or not relevant. This information may be used in determining a course of action in response to incompliance event 3420B. For example, server 3335 may withhold notification 3442B based on the information in feedback 3444A if the same information might be applicable to incompliance event 3420B. In other embodiments, server 3335 may transmit notification 3442B but may withhold instructions based on feedback 3444A. For example, notification 3442B may alert employee 3430B as to the incompliance but may not include instructions. In some embodiments, notification 3442B may include all or some of feedback 3444A. This may alert employee 3430B to the conditions identified by employee 3430A, which may eliminate or reduce the investigation or other efforts required by employee 3430B. In some embodiments, some or all of the information in feedback 3444A may be provided in a notification to employee 3430B even before incompliance event 3420A is detected. Similarly, feedback 3444A may indicate that incompliance event 3420A was detected erroneously. Accordingly, based on context provided in feedback 3444A, server 3335 may determine that incompliance event 3420A was similarly erroneous and may forego generating notification 3442B.

In some embodiments, incompliance event 3420B may be detected prior to receiving feedback 3444A. Server 3335 may forego action based on incompliance event 3420B at least temporarily, until feedback 3444A is received. In some embodiments, server 3335 may wait a predetermined period of time (e.g., 5 minutes, 30 minutes, several hours, several days, several weeks, etc.) before taking action. Accordingly, server 3335 may provide more relevant recommendations or otherwise take a more appropriate action once feedback 3444A is received. If feedback 3444A is not received before the predetermined period of time has elapsed, another action may be taken, for example, the same action taken in response to incompliance event 3420A.

Figure 35:
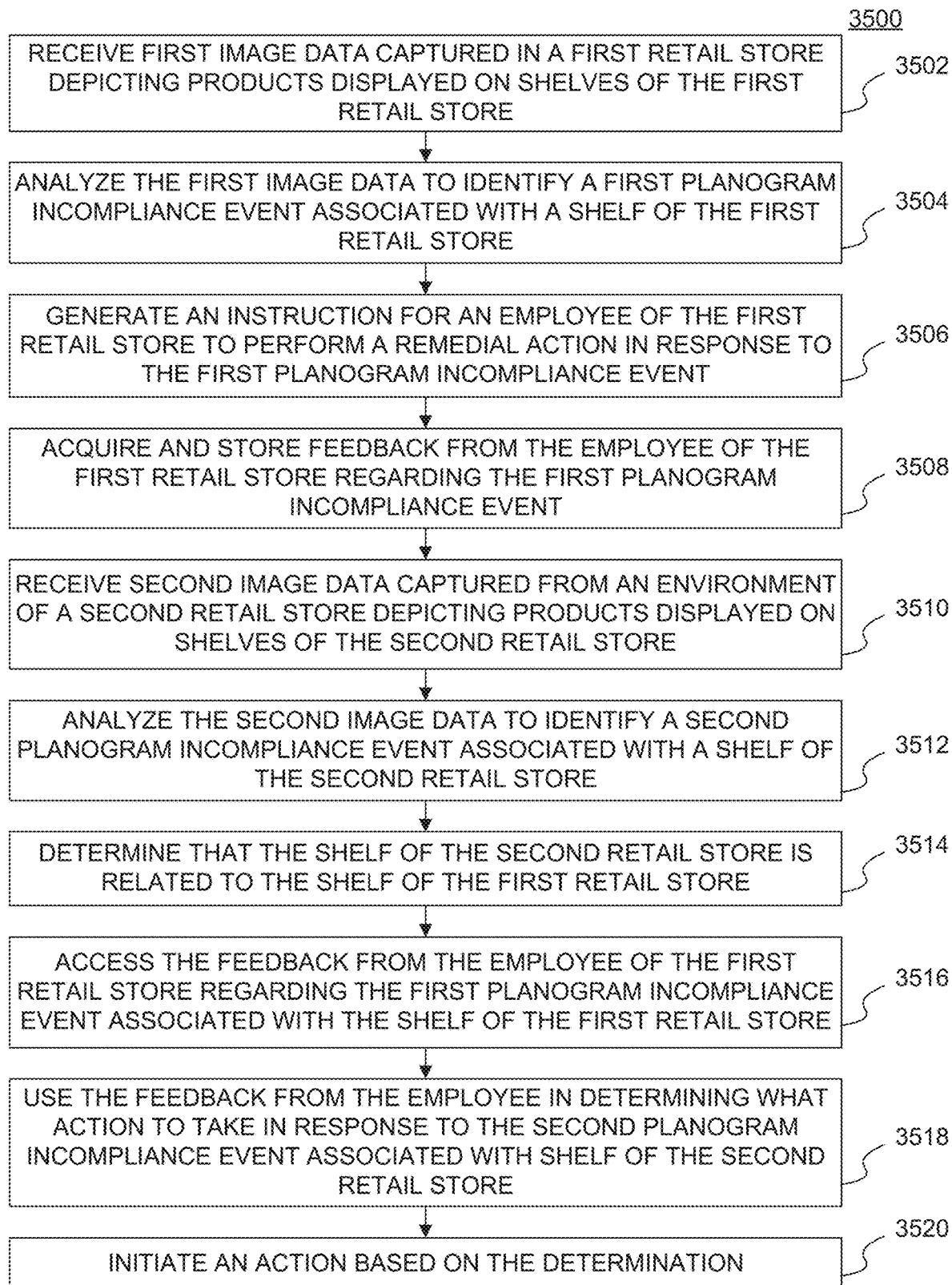
FIG. 35 provides a flowchart representing an exemplary method for processing images captured in multiple retail stores and automatically coordinating actions across two or more retail stores, in accordance with the present disclosure.

FIG. 35 provides a flowchart representing an exemplary method 3500 for processing images captured in multiple retail stores and automatically coordinating actions across two or more retail stores, in accordance with the present disclosure. For purposes of illustration, in the following description, reference is made to certain components of system 3300 as deployed in the configuration depicted in FIGS. 33 and 34. It will be appreciated, however, that other implementations are possible and that other configurations may be utilized to implement the exemplary method. It will also be readily appreciated that the illustrated method can be altered to modify the order of steps, delete steps, or further include additional steps.

At step 3502, method 3500 may include receiving first image data captured from an environment of a first retail store depicting products displayed on shelves of the first retail store. For example, server 3335 may receive image data captured by capturing device 3425A from within an environment of retail store 3405A. In some embodiments, the first image data may include images acquired by a plurality of image sensors fixedly mounted on at least one retail shelving unit of the first retail store, by image sensors mounted elsewhere in the retail store, by image sensors of mobile devices, by robots configured to capture images, and so forth. Further details regarding mounted image sensors, such as capturing device 125, are provided above.

At step 3504, method 3500 may include analyzing the first image data to identify a first planogram incompliance event associated with at least one shelf of the first retail store, for example as described above. For example, the image data captured by capturing device 3425A may include information identifying incompliance event 3420A associated with shelf 3410A, as described above.

At step 3506, method 3500 may include generating an instruction for an employee of the first retail store to perform a remedial action in response to the identified first planogram incompliance event. For example, a server, such as server 3335 may generate notification 3442A, which may include an instruction for employee 3430A to take a remedial action in response to the identified incompliance event 3420A, as described above. In some embodiments, the employee may be a human store associate. In other embodiments, the employee of the first retail store may be a robot. In such embodiments, the feedback from the employee of the first retail store may be based on images (and/or on an analysis of images) captured by the robot.

At step 3508, method 3500 may include acquiring and storing feedback from the employee of the first retail store regarding the first planogram incompliance event. The feedback may correspond to feedback 3444A, as described above. The feedback may be stored, in memory, such as in database 140, described above. In some embodiments, the employee may input the feedback through a computing device, such as employee device 3440A. In some embodiments, the feedback may be detected based on actions of the employee detected by the capturing device. In other words, the feedback from the employee of the first retail store may be acquired from additional image data captured by the plurality of image sensors fixedly mounted on the at least one retail shelving unit of the first retail store. For example, the feedback may include an indication that the employee has mitigated the incompliance event, which may be detected based on the additional image data. In other embodiments, the feedback may include an indication that the employee has determined not to take any action, or that an alternative action has been taken other than the instructed action.

At step 3510, method 3500 may include receiving second image data captured from an environment of a second retail store depicting products displayed on shelves of the second retail store. For example, server 3335 may receive second image data captured by capturing device 3425B from within an environment of store 3405B. At step 3512, method 3500 may include analyzing the second image data to identify a second planogram incompliance event associated with at least one shelf of the second retail store. For example, server 3335 may identify incompliance event 3420B associated with shelf 3410B, as described in greater detail above.

At step 3514, method 3500 may include determining that the at least one shelf of the second retail store is related to at least one shelf of the first retail store. For example, server 3335 may determine that shelf 3410A is related to shelf 3410B, as described in greater detail above. The at least one shelf of the second retail store may be related to at least one shelf of the first retail store in various ways. For example, the at least one shelf of the first retail store and the second retail store may hold products of a similar or same product type (e.g., same category, same brand, same model or subtype, etc.). In other embodiments, the shelves may have a similar location within the store (e.g., in a similar aisle, in a similar position with respect to a store entrance, checkout station, backroom, etc.). The shelves may share various other properties, including similar shelf height, similar shelf size, similar neighboring products, or any other common properties.

At step 3516, method 3500 may include accessing the feedback from the employee of the first retail store regarding the first planogram incompliance event associated with the at least one shelf of the first retail store. For example, server 3335 may access the feedback from database 140 or another storage location. At step 3518, method 3500 may include using the feedback from the employee of the first retail store in determining what action to take in response to the second planogram incompliance event associated with at least one shelf of the second retail store. The action may depend on the contents and the nature of the feedback, as described above. In some embodiments, step 3516 may include, in response to a first feedback from the employee of the first retail store, generating an instruction for an employee of the second retail store to perform a remedial action in response to the identified second planogram incompliance event. Further, in response to a second feedback received from the employee of the first retail store, step 3516 may include forgoing generating the instruction for the employee of the second retail store to perform the remedial action in response to the identified second planogram incompliance event. For example, the first feedback may confirm the planogram incompliance event. Accordingly, the remedial action for the employee of the second retail store may correspond to the remedial action performed by the employee of the first retail store in response to the identified first planogram incompliance event. In another example, the feedback may indicate an alternative cause for the identified planogram incompliance event, and that a different action should be instructed. Accordingly, the remedial action for the employee of the second retail store may be different from the remedial action performed by the employee of the first retail store in response to the identified first planogram incompliance event.

At step 3520, method 3500 may include initiating an action based on the determination. For example, initiating the action may include transmitting a notification (e.g., notification 3442B), foregoing transmitting a notification, transmitting a notification including a particular instruction, transmitting a notification but omitting an instruction, or various other actions. In some examples, the initiated action may include analyzing one or more additional images captured after a notification is provided to determine whether a recommended step was performed (for example, by a store employee, by a robot, through crowd sourcing, and so forth). For example, the recommended step may include removal of an item (such as a promotion sign, a label, a product, etc.), and the one or more additional images may be analyzed to determine whether the item was successfully removed or is still present. In another example, the recommended step may include moving an item (such as a promotion sign, a label, a product, etc.) from a first location to a second location, and the one or more additional images may be analyzed to determine whether the item was successfully moved from the first location to the second location (i.e., to determine that the item is not present at the first location and is present at the second location) or not. In yet another example, the recommended step may include restocking a retail shelf, and the one or more additional images may be analyzed to determine whether the retail shelf was successfully restocked. In an additional example, the recommended step may include cleaning a particular part of a retail store (such as an aisle), and the one or more additional images may be analyzed to determine whether the particular part is clean.

Method 3500 may be applied to various forms of planogram incompliance events, as described above. In some embodiments, identifying at least one of the first planogram incompliance event and the second planogram incompliance event may include a detection of a number of products of a particular product type falling below a predetermined threshold. For example, a planogram may require a predetermined number of products to be displayed on a shelf and the incompliance event may include a detection of an insufficient number of displayed products. Accordingly, the remedial action in response to the identified first planogram incompliance event may include restocking at least part of a shelf with products of the particular product type. As another example, the remedial action may include restocking at least part of a shelf previously dedicated to the particular product type with products of a different product type. Further, the feedback acquired from the employee of the first retail store regarding the first planogram incompliance event may include at least one of: an indication of a shortage of products of the particular product type, an indication of a repositioning of the particular product type to a different part of the first retail store, an indication of a removal of the particular product type from the first retail store, an indication of a reduction of a shelf area dedicated to the particular product type in the first retail store, or an indication of a lessening of a requirement related to the particular product type in the first retail store, an indication of a misidentification of the first planogram incompliance event, an indication of a change in a visual appearance of the particular product type, an indication of a reason for an inability to take a first remedial action (for example, a shortage of the particular product type in inventory, regulatory requirement, etc.), and so forth. Various other examples of employee feedback are provided above.

In some embodiments, identifying at least one of the first planogram incompliance event and the second planogram incompliance event may include identifying a shelf label related to a particular product type indicating an incorrect detail for the particular product type. For example, the label may display an incorrect wrong price, may advertise a date that has ended (e.g., a duration of a promotional event, etc.), may indicate incorrect product information (e.g., incorrectly indicating a product is "Gluten free," etc.), or any other information displayed on a shelf label that may not meet a planogram compliance requirement. Accordingly, the remedial action in response to the identified first planogram incompliance event includes modifying the label. For example, notification 3442A may include instructions to remove the label, replace the label, update information on the label, etc. Consistent with this example, the feedback from the employee of the first retail store regarding the first planogram incompliance event may include at least one of: an indication of a price change for the particular product type, an indication of a promotion of the particular product type, and an indicator of a misplaced label, or any other information that may be relevant to the incompliance event. The action to take in response to the second planogram incompliance event may be determined based on this feedback.

In some embodiments, identifying at least one of the first planogram incompliance event and the second planogram incompliance event may include identifying products of a particular product type in an unexpected location within the retail store. Accordingly, the remedial action in response to the identified first planogram incompliance event may include moving the products of the particular product type from the unexpected position. In some embodiments, the feedback from the employee of the first retail store regarding the first planogram incompliance event may include an indication that the products of the particular product type are rightfully placed in the unexpected position. For example, the unexpected position may be a promotion area within the first retail store, and therefore the unexpected position may be valid. As another example, the feedback may include an indication of a misidentification of the type of the products. For example, the employee may determine that the detected products are not actually of the particular product type and thus the incompliance event is invalid.

In an embodiment, identifying at least one of the first planogram incompliance event and the second planogram incompliance event may include a failure to identify at least one product in the retail store. For example, a planogram may require a specific product to be displayed on shelves of a retail store and server 3335 may not detect the specific product in the image data. Accordingly, the remedial action in response to the identified first planogram incompliance event may include at least one of: capturing at least one image of the at least one product in higher resolution than the first image data, scanning a barcode associated with the at least one product, or providing identifying details on the at least one product. The first feedback may include information associated with the remedial action (e.g., a higher resolution image, identifying details, etc.). Additional examples of incompliance events with associated instructions and feedback are provided in detail above.

In some embodiments, the determined action may be based on whether the incompliance events are the same or similar. For example, method 3500 may include determining whether a type of the first planogram incompliance event is the same as a type of the second planogram incompliance event. Method 3500 may further include, in response to a determination that the type of the first planogram incompliance event is the same as the type of the second planogram incompliance event, generating an instruction for an employee of the second retail store to perform a remedial action in response to the identified second planogram incompliance event. For example, if the first and second incompliance events are the same type, similar remedial actions may be required in the first and second retail stores. Conversely, in response to a determination that the type of the first planogram incompliance event differs from the type of the second planogram incompliance event, method 3500 may include forgoing generation of the instruction for the employee of the second retail store to perform a remedial action in response to the identified second planogram incompliance event. For example, the differing types of incompliance events may indicate that an instruction provided in response to the first incompliance event is not applicable to the second incompliance event.

As described above, image data associated with retail shelving may be received and analyzed by a server. In some embodiments, the server may be configured to estimate shelf capacity based on the captured image data and provide suggestions for improving store procedures and reoccurring tasks. For example, the suggestions may help a retail store optimize product placement in shelves, optimize store or shelf layout, optimize inventory control (e.g., managing product storage, managing product orders, etc.), optimize employee tasks (e.g., shelf-restocking rates, etc.), meet customer needs, or otherwise improve store execution of procedures and tasks. In some instances, shelf capacity may not be readily determined from the captured images and thus further processing and analysis may be undertaken. For example, the depth of the shelving unit may be occluded by products placed on the shelving unit and/or the angle of the camera. As a result, a depth of the shelving unit may not be geometrically measurable from the image, and the area of the portion of the shelving unit may be directly computable based on geometry. Instead, the depth and/or area and/or capacity of the shelving unit are may be estimated from other visual cues, such as type of shelving unit, type of product, type of retail store, and so forth. Accordingly, capacity of products of a particular product type on a portion of a shelving unit may be estimated.

Figure 36:
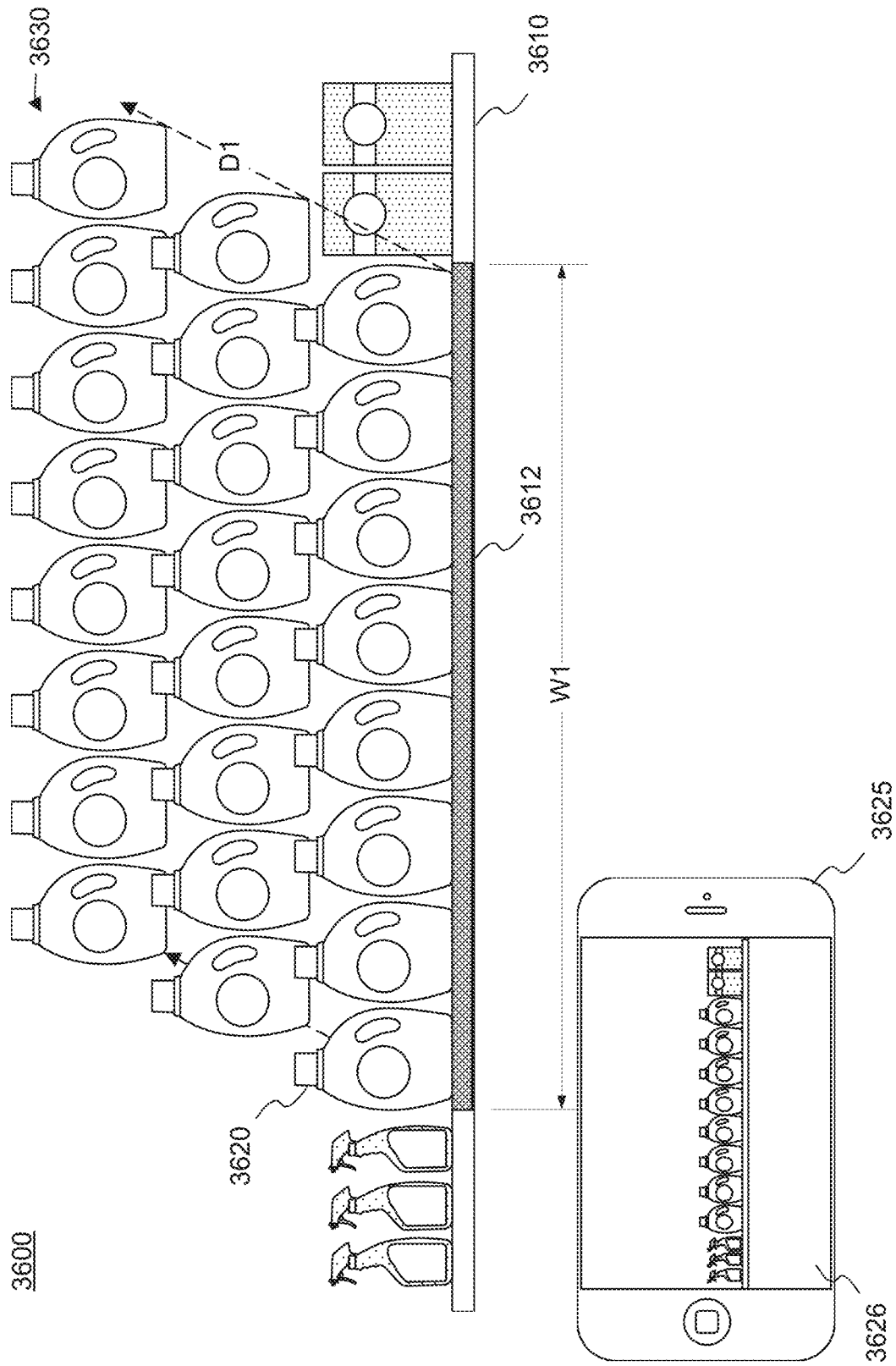
FIG. 36 illustrates an example environment for automatically determining options for store execution based on shelf capacity, consistent with the present disclosure.

FIG. 36 illustrates an example environment 3600 for automatically determining options for store execution based on shelf capacity, consistent with the present disclosure. Environment 3600 may be included within a retail store, such as retail stores 105A-C, as described above. Environment 3600 may include a shelving unit 3610, which may be a retail store shelf, as described in greater detail above.

Shelving unit 3610 may be configured to hold a plurality of products, as shown in FIG. 36. While shelving unit 3610 is illustrated in FIG. 36 as having a single shelf for ease of illustration, it is understood that shelving unit 3610 may comprise multiple shelves at various heights. Further, shelving unit 3610 may have other forms. For example, at least a portion of shelving unit 3610 may include a rack with products hanging on the rack. Other forms of shelving unit 3610 may also be used in accordance with the disclosed embodiments. Shelving unit 3610 may include a portion 3612 dedicated to a product 3620 having a particular product type. As described above, a product type may refer to a particular category of product (e.g., soda, beer, etc.), a particular brand (e.g., Pepsi®, etc.), a particular model or subtype (e.g., Diet Pepsi®, etc.), a group of individual products (e.g., products having a certain expiration date, products associated with a particular shipment, etc.), or any other classification of product. In some embodiments, shelf portion 3612 may be a certain portion of the width of a retail shelf, as shown in FIG. 36. In other embodiments, shelf portion 3612 may include multiple shelves, a portion of multiple shelves, or any other section of shelving unit 3610 that may be dedicated to a product of a particular type. Shelf portion 3612 may also be a rack, a bar, or other forms of displaying multiple rows of items. Shelf portion 3612 may have a width W1 as shown in FIG. 36.

Images of shelving unit 3610 may be captured by capturing device 3625. In some embodiments, capturing device 3625 may be a handheld device, as shown in FIG. 36. For example, capturing device 3625 may be a smartphone, a tablet, a mobile station, a personal digital assistant, a laptop, a retail inventory device, or any other handheld device. In other embodiments, capturing device 3625 may be fixedly mounted within a retail store (e.g., to store shelves, walls, ceilings, floors, refrigerators, checkout stations, displays, dispensers, rods which may be connected to other objects in the retail store, and so forth) as described above with respect to FIG. 4A. In some embodiments capturing device 3625 may correspond to capturing device 125, as described above. Accordingly, any of the above descriptions or embodiments pertaining to capturing device 125 may also apply to capturing device 3625. As shown above, capturing device 3625 may be configured to capture image data associated with shelving unit 3610. An example image 3626 that may be captured by capturing device 3625 is shown on a display of capturing device 3625.

Image data captured by capturing device 3625 may be received at a server, such as server 135 described above with respect to FIG. 1. For example, a set of images captured from retail stores 105A-C may be transmitted through communications network 150 and may be received at image processing unit 130. Server 135 may be configured to receive a set of images and analyze the images to assess a shelf capacity and provide suggestions for improving store execution. This analysis is described in greater detail below.

Shelving unit 3610 may have a depth that is occluded from view based on the angle at which image 3626 is captured. For example, image 3626 shows a single row of eight products 3620 on shelf portion 3612. The actual product capacity for product 3620 on shelf portion 3612 may be greater due to the depth of shelving unit 3610. For example, as shown in FIG. 36, shelf portion 3612 may have a product capacity 3630 that is based on multiple rows of product 3620. Therefore, the depth of shelving unit 3610 may not be geometrically measured from the image and the capacity of shelf portion 3612 may not be directly computed from image 3626. Accordingly, server 135 may be configured to analyze image 3626 and/or other images captured during a period time to determine a product capacity for portion 3612 of shelving unit 3610.

To estimate a capacity for product 3620, server 135 may identify shelf portion 3612 based on captured image (or images) 3626. For example, using image recognition techniques described above, server 135 may detect product 3620 within image 3626. Shelf portion 3612 may be identified as the portion of shelving unit 3610 that is associated with product 3620 (e.g., the portion of shelving unit 3610 that is directly below instances of product 3620 within image 3626). In some embodiments, shelf portion 3612 may be identified using a trained machine learning model. For example, a machine learning model may be trained using training examples to identify portions of shelving units dedicated to selected product types from images and/or videos. The trained machine learning model may then be used to analyze the image data and identify a portion of the shelving unit dedicated to a particular product type. An example of such training example may include images and/or videos depicting a shelving unit together with the desired identification of portions of the depicted shelving unit dedicated to the selected product types. Another example of such training example may include images and/or videos depicting a shelving unit together with indication that no part of the depicted shelving is dedicated to the selected product types. The machine learning algorithm may include a logistic regression, a linear regression, a regression, a random forest, a K-Nearest Neighbor (KNN) model, a K-Means model, a decision tree, a cox proportional hazards regression model, a Naïve Bayes model, a Support Vector Machines (SVM) model, an artificial neural network (such as convolutional neural network, deep neural networks, etc.), a gradient boosting algorithm, or any other form of machine learning model or algorithm.

To estimate the capacity of shelf portion 3612, server 135 may obtain data indicative of a depth D1 of the shelving unit. The depth data may be obtained in various ways. In some embodiments, the depth of the shelving unit may be estimated based on the image data. For example, a depth of shelving unit 3610 may be estimated based on image 3626. In some embodiments, a type of shelving unit dedicated to the particular product type may be used to estimate the depth of the shelving unit. The type of shelving unit may include a manufacturer or model of the shelving unit, a style of shelf of the shelving unit, or any other classification that may associated with a particular depth. In some examples, a data structure connecting types of shelving with common depths may be accessed to determine the corresponding depth. For example, a data structure may be stored in database 140 and accessed by server 135. The type of shelf may be recognized by server 135 using various image processing algorithms described above. For example, shelving unit 3610 may have distinguishing features represented in image 3626 that may indicate a particular type of shelving unit. In some examples, a machine learning model may be trained using training examples to identify types of shelves from images and/or videos. The trained machine learning model may be used to analyze the captured image data and identify the type of the shelving unit dedicated to the particular product type. An example of such training example may include images and/or videos depicting shelves (and in some cases with an indication of a selected portion of the shelves) together with their types. The various machine learning models and/or artificial neural networks described above may be used for determining a shelving unit type.

The data indicative of the depth of the shelving unit may be obtained in various other ways. In some embodiments, the shelving depth (or a shelving type) may be estimated based on information about the retail store. For example, a particular chain of retail stores may commonly be associated with a particular shelving depth or shelving type, which may be used to estimate depth. A data structure may be accessed associating retail store types with particular shelving unit depths and/or types. In some embodiments, the depth (or type) of the shelving unit may be provided by an employee or other entity associated with the retail store. In some embodiments, the particular type of product may be used to estimate a depth of the shelving unit. For example, it may be common in retail stores (or in retail stores of a particular type) to place some product types on a particular type of shelf or on a shelf of a particular depth. In some embodiments, a data structure may connect certain product types with common shelf types or depths. The data structure may be accessed by server 135 using the particular type of product (e.g., product 3620) detected in the images to determine the depth.

In some embodiments, a machine learning model may be used to estimate the depth based on image data. For example, a machine learning model may be trained using training examples to estimate depth of selected portions of shelves from images and/or videos, and the trained machine learning model may be used to analyze the image data and estimate the depth of the portion of the shelving unit dedicated to the particular product type. An example of such training example may include images and/or videos depicting shelves (and in some cases an indication of a selected portion of the shelves) together with the desired estimation of the depth. Various other means for determining shelf depth may be used consistent with the present disclosure. In some embodiments, a machine learning model may be used to estimate the product capacity for the portion of the shelving unit dedicated to the particular product type based on image data. For example, a machine learning model may be trained using training examples to estimate product capacity of shelves from images and/or videos, and the trained machine learning model may be used to analyze the image data and estimate the product capacity of the portion of the shelving unit dedicated to the particular product type. An example of such training example may include images and/or videos depicting shelves (and in some cases an indication of a selected portion of the shelves) together with the desired estimation of the product capacity.

Figure 37:
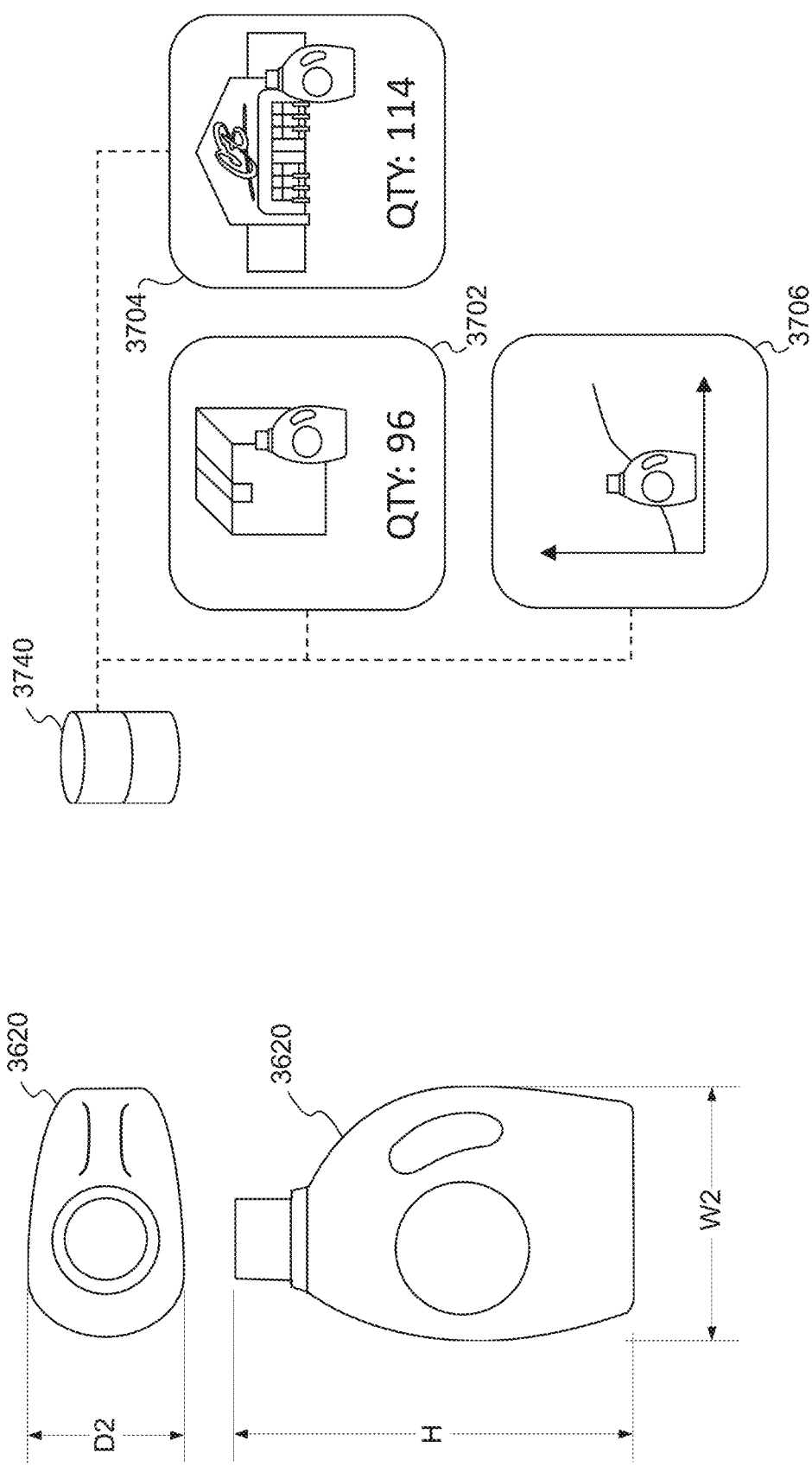
FIG. 37A illustrates example dimensions for a product that may be determined for estimating shelf capacity, consistent with the disclosed embodiments.
FIG. 37B illustrates various stored data that may be accessed for generating a suggestion for improving store execution, consistent with the disclosed embodiments.

Server 135 may then determine the product capacity for the portion of the shelving unit dedicated to the particular product type based on the depth of the shelving unit. In some embodiments, the server may analyze the set of images to determine at least one dimension of products from the particular product type. For example, the dimension may include a width, height, or depth of the product. FIG. 37A illustrates example dimensions for a product 3620 that may be determined for estimating shelf capacity, consistent with the disclosed embodiments. As shown in FIG. 37A, product 3620 may have a width W2, a height H, and a depth D2. The dimensions for product 3620 may be determined in various ways. Some of the dimensions may be measurable based on received image data. For example, the height H and the width W2 of product 3620 may be measured and/or estimated based on image 3626. In some embodiments, one or more dimensions may be determined based on the type of product 3620. For example, a type of product 3620 may be determined based on analysis of the images as described above. Dimensions associated with product 3620 may be determined by accessing a data structure associating various product types with known dimensions.

In some embodiments, server 135 may be configured to determine a product capacity for the portion of the shelving unit dedicated to the particular product type based on the depth of the shelving unit and the at least one dimension of products from the particular product type. For example, based on the dimension of products from the particular product type determined above, server 135 may determine a maximum number of products from the particular product type that can be placed in a front row of products associated with the portion of the shelving unit dedicated to the particular product type. The possible number of products that may be placed on a front row can be obtained in a variety of ways. In some embodiments, the possible number of front row products may be obtained from a user, for example through a user input. In some embodiments the number of front row products may be estimated by analyzing image data. For example, a width W1 of shelf portion 3612 (FIG. 36) may be compared to a product width W2 (FIG. 37A) to determine the number of products having a width W2 that can fit within width W1. Server 135 may also account for spacing between products, which may be specified by retailer and/or manufacturer preference (e.g., a planogram), product properties, a default product spacing, or various other values. In some embodiments, the number of front row products may be estimated based on additional data or information. For example, the number of front row products may be estimated by analyzing readings from pressure sensors positioned on the shelf, estimated by analyzing readings from light sensors positioned on the shelf, estimated based on the particular product type, estimated based on measurements of the particular type of product, estimated based on a type of the retail store, or any other information accessible by server 135 that may be relevant. In some embodiments, a machine learning model may be used to estimate the number of front row products. For example, a machine learning model may be trained using training examples to estimate the number of products that may be placed on a shelf for products of selected product types in selected portions of shelves from images and/or videos. The trained machine learning model may be used to analyze the image data and estimate the possible number of products of the particular product type in the portion of the shelving unit dedicated to the particular product type. An example of such training may include using images and/or videos depicting shelves with an indication of a selected portion of the shelves together with the desired estimation of the number of products that may be placed on the front row.

Further, sever 135 may be configured to determine, based on the obtained shelf depth, a maximum number of products from the particular product type that can be placed behind the front row of products. For example, server 135 may compare the estimated shelf depth D1 with a product depth D2 to determine the number of products of depth D2 that will fit within depth D1. Server 135 may then determine a product capacity 3630 associated with the portion of the shelving unit dedicated to the particular product type based on the maximum number of products that can be placed in the front row and the maximum number of products that can be placed behind the front row. For example, the product capacity may correspond to the number of products that can be placed in the front row times the maximum number of products of depth D2 that can fit within depth D1.

Server 135 may be configured to generate at least one suggestion for improving store execution using the determined product capacity. In some embodiments, the at least one suggestion may further be based on stored data. Accordingly, server 135 may further be configured to access stored data about a second plurality of products from the particular product type. Each of the second plurality of products may be located separately from the shelving unit at the time the images were captured (e.g., when a period of time during which the set of images is captured ends).

FIG. 37B illustrates various stored data that may be accessed for generating a suggestion for improving store execution of procedures and tasks, consistent with the disclosed embodiments. The data may be stored on a database 3740, as shown. Database 3740 may include any memory device or other data storage location capable of storing data. In some embodiments, database 3740 may correspond to database 140. Accordingly, any of the example databases or other descriptions pertaining to database 140 may also apply to database 3740. Database 3740 may be part of server 135 or may be accessed by server 135 via a communication link. In some embodiments, the stored data may include a quantity of products of the particular product type in a different location. For example, inventory data 3702 may indicate a number of product 3620 located in storage. In some embodiments, inventory data 3702 may refer to a number of products stored in a storeroom or other storage area associated with a retail store. For example, inventory data 3702 may refer to an inventory of product 3620 included in a storage area of the retail store including shelving unit 3610. In this context, a storage area may refer to any location in which a plurality of products may be stored. The storage area may be a storage room, a portion of a shelving unit within the retail store dedicated to storage (e.g., a top shelf, etc.), or any other suitable storage location. In other embodiments, inventory data 3702 may refer to off-site storage, for example, in a warehouse, in a delivery truck, or the like.

In some embodiments, server 135 may access reference data 3704, which may include a quantity of products of the particular type available on a shelving unit of at least one other retail store. The other retail store may be a retail store of the same type as the retail store associated with environment 3600. For example, the retail stores may be of the same chain, may be owned by the same parent category, may be of the same category (e.g., grocery store, hardware store, big box store, etc.), may receive shipments from the same supplier or suppliers, or may carry products of the same product type (e.g., product 3620). In some embodiments, server 135 may access stored sales data 3706, which may include sales data associated with product 3620. For example, sales data 3706 may indicate the number of products 3620 sold over a given time period. The sales data may be local to the retail store including environment 3600, may be associated with one or more other retail stores, or may be global or regional sales data associated with product 3620. The sales data may be read from memory, may be received through a communication network using a communication device, may be received from an external device, may be received from a sales database, and so forth.

Various forms of suggestions for improving the store execution may be generated based on the product capacity of shelf portion 3612 and the accessed data. In some embodiments, the suggestion may be intended to reduce a wasted demand for a product. As used herein, "wasted demand" may refer to instances where a customer wishing to buy a product of the particular product type may have given up on buying the product because the customer failed to find the product in the retail store. Wasted demand may be identified by comparing product capacity 3630 (and/or product population) to sales data 3706. In order to reduce wasted demand for product 3620, server 135 may generate a suggestion to increase restock rate of the particular product type, to increase number of facings of the particular product type, to increase shelf capacity of the particular product type, and so forth.

In some embodiments, the suggestion may include changing a size of the portion of the at least one store shelf dedicated to products from the particular product type. For example, server 135 may determine that the product capacity for product 3620 does not coincide with the demand of product 3620 (e.g., based on sales data 3706). In some embodiments, server 135 may generate a recommendation to increase or decrease width W1 of shelf portion 3612. In another example, server 135 may recommend placing product 3620 on a shelf with a larger or smaller capacity, on a different shelf type, etc.

In other embodiments, the suggestion for improving the store execution may include changing a re-stocking frequency of products from the particular product type at the at least one store shelf. For example, sales data 3706 may indicate that a product capacity of product 3620 cannot meet a demand for product 3620 based on the current restocking rate. Accordingly, server 135 may generate a suggestion to increase a re-stocking frequency of product 3620. Conversely, sales data 3706 may indicate that the re-stocking frequency can be decreased based on sales data 3706. In some embodiments, the recommendation to change re-stocking frequency may be based on inventory data 3702. For example, server 135 may determine that, based on the product capacity in shelf portion 3612 and the inventory of product 3620, the re-stocking frequency can be increased or decreased. This may ensure that a number of products on a shelving unit does not drop below a certain threshold (e.g., a threshold set by a planogram, a minimum desired product availability, etc.).

In accordance with the present disclosure, the suggestion for improving store execution may include various shelf planning optimization recommendations. In some embodiments, the suggestion may include changing a product assortment for the retail store or retail shelving unit. For example, product capacity 3630 and/or other stored data may indicate that too much (or too little) of a product type is displayed on shelving unit 3610 or in the retail store. In some embodiments, the suggestion may include changing a position of products on the shelving unit and/or changing space dedicated to products from the particular product type. For example, server 135 may recommend moving product 3620 to a higher or lower shelf, moving product 3620 closer to an end or middle of an aisle, moving product 3620 to a different location in a store, etc. This may be based on additional data, such as sales data 3706, which may indicate, for example, that the current position for product 3620 is not optimized based on a demand for product 3620. In some embodiments, the suggestion may include recommended modifications to shelving unit 3610, such as changing a type of shelf of the shelving unit, changing a spacing between shelves of the shelving unit, or any other modification to the shelving unit that may increase or decrease capacity. For example, moving shelves vertically closer together may allow additional shelving to be inserted, which may allow for greater product capacity in order to meet demand, etc. Various other shelf planning suggestions may be generated.

In some embodiments, the suggestion for improving the store execution may include various inventory planning optimization recommendations. For example, the suggestion may be directed to optimizing product storage in the storage area, managing a supply chain of a product type (e.g., changing order rate, etc.), or the like. In some embodiments, the suggestion may include changing a storage capacity of products from the particular product type in the storage area. Similarly, the suggestion may be an order recommendation for restocking the storage area. For example, storage capacity 3630 and/or sales data 3706 may indicate that a current inventory capacity and/or order frequency is insufficient to keep up with the demand for the product. Accordingly, a suggestion to increase the inventory and/or order frequency for the product may be generated. In some embodiments, the suggestion may be for changing a location of products from the particular product type in the storage area. For example, server 135 may determine based on storage capacity 3630, inventory data 3702, and/or sales data 3706 that inventory for product 3620 should be more readily accessible (e.g., located nearer to a entrance to the retail portion of the store, located nearer to a loading dock, located on a lower or higher shelf, etc.) in order to improve efficiency of restocking or reordering product 3620.

In some example embodiments, the suggestion may be based at least in part on a product population associated with product 3620. As used herein, a product population may refer to an amount of products placed in a designated shelf portion compared to the capacity of the shelf portion. For example, the product population may refer to an estimated number of product 3620 located in shelf portion 3612 divided by the total capacity 3630 of shelf portion 3612. Accordingly, a product population may be expressed as a percentage (e.g., 75%), a fraction (e.g., ¾, 0.75, etc.), a number of products (e.g., 30), or any other suitable format. In some embodiments, the product population may be determined based on analyzing the set of images. For example, server 135 may use various object detection or image processing techniques to estimate the number of products within shelf portion 3612 at the time the image was taken. In some embodiments, this may be based on a machine learning model. For example, a machine learning model may be trained using training examples (e.g., images and/or videos of shelving units with associated product populations) and may then be used to estimate product populations based on other images, such as image 3626. The product population may also be determined from other information, such as pressure sensor data, light sensor data, input by a store employee, or the like.

In some embodiments, server 135 may track product populations over a period of time (e.g., a period of time when the set of images was captured). Server 135 may identify correlations between the sales data and the changes in levels of product population and may generate the suggestion for improving store execution based on the correlation. For example, the correlation may indicate that sales are higher when the product population is higher (e.g., above a determined threshold, etc.). Accordingly, the suggestion to improve store execution may be to increase a restock rate of product 3620, increase a product capacity of shelf portion 3612, increase an inventory capacity of product 3620, or various other recommendations consistent with the present disclosure.

Some aspects of the present disclosure may involve comparing product populations to inventory data associated with a type of product 3620. For example, as described above, the stored data may include inventory data 3702, which may be indicative of a number of a plurality of products available in at least one storage area associated with the retail store. Server 135 may be configured to identifying changes in a level of product population at shelf portion 3612 during the period of time based on the set of images and the determined product capacity. Server 135 may then generate the at least one suggestion for improving the store execution based on the changes in the level of product population and the inventory data. For example, the suggestion may include increasing a restocking rate to ensure the product population does not fall below a certain threshold, as descried above. In other examples, the suggestion may be to increase a product capacity, increase a size of shelf portion 3612, modify shelving unit 3610, increase an order rate for product 3620, or the like.

In some embodiments, server 135 may generate a suggestion based on reference data indicative of a number of products available on a shelving unit of at least one other retail store, such as reference data 3704, described above. For example, server 135 may identify changes in a level of product population at shelf portion 3612 during a period of time based on the set of images and the determined product capacity, as described above. Server 135 may then generate and provide the suggestion for improving the store execution based on the changes in a level of product population and the reference data. For example, the reference data may indicate that the same or similar product at the other retail store is being depleted slower or faster than the product on shelving unit 3610. The suggestion may be to match shelving unit 3610 with the shelving unit in the other retail store (e.g., modifying shelving unit 3610, increasing or decreasing shelf portion 3612, or the like). In other embodiments, the suggestion may be to differentiate shelving unit 3610 from the other retail store in at least one aspect.

Similar to product populations, server 135 may track product facings for a particular product type. As used herein, product facings may refer to the placement of a product in a particular orientation. In some embodiments, product facings refer to products along a front row of a shelf facing in a uniform orientation. Server 135 may compare the determined product capacity 3630 for the portion of the shelving unit dedicated to the particular product type with a capacity for product facings for the particular product type at shelf portion 3612. For example, the capacity for product facings may represent a number of products 3620 that may be included on a first row of shelf portion 3612. Server 135 may generate a suggestion for changing the capacity for product facings based on the comparison. In some embodiments, the suggestion may depend on a ratio of the number of product facings to the product capacity. For example, when the product capacity is at least 5 times the capacity of product facings, server 135 may suggest increasing the capacity for product facings. This may include a suggestion for increasing width of portion 3612, changing shelf spacing, or various other actions. When the product capacity is below 5 times the capacity of product facings, another action may be suggested, such as foregoing providing a suggestion, decreasing the capacity for product facings, increasing a restocking rate, or the like. While a ratio of 5 times the capacity of product facings is used by way of example, various other ratios may be used.

In some embodiments, server 135 may detect a number of front facing products placed on the portion of shelving unit dedicated to the particular product over a period of time. For example, server 135 may analyze a received set of images captured during a period of time and track a change in the number of front facing products over the period of time. Using the product capacity and the detected changes in the number of front facing products, server 135 may generate and display the at least one suggestion for improving store execution. For example, the suggestion may be to change a restocking rate of product 3620, increase a product facing capacity of shelf portion 3612, increasing an ordering rate for product 3620, or various other actions described herein.

In some embodiments, a planogram or contractual obligation may specify a minimum number of front facing products and the suggestion may be generated to ensure the minimum number of front facing products is met. For example, server 135 may further use the determined product capacity and the detected changes in the number of front facing products to predict a time when the number of front facing products is less than a threshold. For example, a rate at which front facing products is decreasing may be determined based on the number of front facing products detected in the images and timestamps associated with the images. The rate may then be extrapolated to determine the predicted time. In some embodiments, the rate may be compared to other data, such as sales data 3706 which may be used to refine the time prediction. For example, the rate at which a number front facing products decreases may be assumed to taper off at times when sales are expected to be lower (e.g., late at night, etc.). The threshold may correspond to a maximum number of product facings, a percentage of products with the desired product facings (e.g., 75%, 50%, 30%, etc.), or any other suitable threshold. In these embodiments, the suggestion may be for restocking the portion of the shelving unit dedicated to the particular product type before the predicted time. Accordingly, the suggestion may be transmitted to an employee (e.g., via output device 145C), as described in greater detail below. In some embodiments, the suggestion may include causing restocking shelf portion 3612 while the number of front facing products is at a maximum possible number of front facing products associated with shelf portion 3612. For example, server 135 may time recommendations for restocking shelf portion 3612 to ensure that a front row of shelf portion 3612 stays full, or that each stack of products along a depth of shelf portion 3612 has at least one of product 3620, etc.

Consistent with the present disclosure, server 135 may be configured to assess one or more of the generated suggestions described above. In some embodiments, the suggestion may be assessed based on additional sales data. For example, server 135 may obtain additional sales data indicative of products 3620 sold during a second period of time after the at least one suggestion was implemented. For example, the second time period may be within a few days, a few weeks, a few months, etc. from when the suggestion was implemented. Server 135 may further determine whether implementing the at least one suggestion resulted in higher sales of the particular product type during the second period of time. For example, server 135 may access sales data 3706 to determine the number (or rate) of sales of product 3620 during the second time period as compared to the first time period (or another time period before the suggestion being implemented). If the sales increased, server 135 may correlate the increased sales to the suggested recommendation. Similarly, a decrease or consistency in sales data may indicate the suggested recommendation was not successful or beneficial. The correlation between the suggested recommendation and the effect on sales may be used to improve future recommendations.

Server 135 may be configured to provide the at least one suggestion for improving store execution. In some embodiments providing the at least one suggestion may include transmitting a notification to a store employee. For example, the suggestion may be transmitted to an output device (e.g., output device 145C) of a store employee, which may include a smartphone, a tablet, an augment reality headset, or the like. In some embodiments, the suggestion may be provided through a public device, such as a computerized display listing tasks in the retail store. In some embodiments, the suggestion may be provided through a task scheduling system (e.g., a supply chain management system, an employee task management system, an employee work scheduling system, etc.), or any other system associated with the retail store or product. In some embodiments, providing the suggestion may include storing the suggestion in memory, such as in database 140 or database 3740. In some embodiments, the suggestion may be transmitted through communications network 150 to another component of system 100. In some embodiments the suggestion may correspond to notification 3442A or 3442B, as described above.

Figure 38:
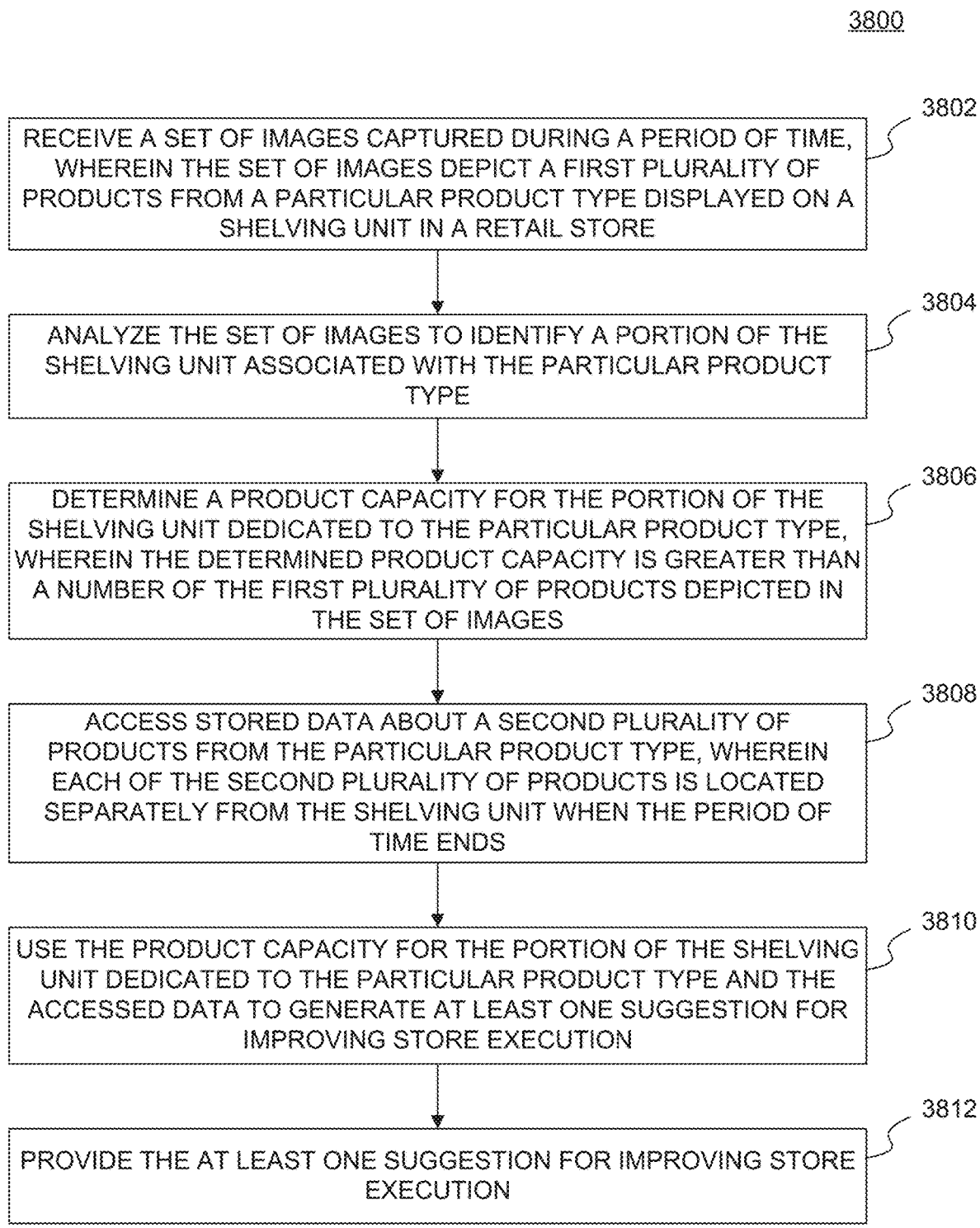
FIG. 38 provides a flowchart representing an exemplary method for processing images captured in a retail store and automatically determining options for store execution based on shelf capacity, consistent with the disclosed embodiments.

FIG. 38 provides a flowchart representing an exemplary method 3800 for processing images captured in a retail store and automatically determining options for store execution based on shelf capacity, consistent with the disclosed embodiments. For purposes of illustration, in the following description, reference is made to certain components of system 100 as deployed in the configuration depicted in FIGS. 1 and 36. It will be appreciated, however, that other implementations are possible and that other configurations may be utilized to implement the exemplary method. It will also be readily appreciated that the illustrated method can be altered to modify the order of steps, delete steps, or further include additional steps. In some embodiments, method 3800 may be performed by at least one processing device, which may include server 135.

At step 3802, method 3800 may include receiving a set of images captured during a period of time. For example, the images may be captured by image capture device 3625, as described above. The set of images may depict a first plurality of products from a particular product type displayed on a shelving unit in a retail store. For example, the images may depict a first plurality of product 3620 included on shelving unit 3610.

At step 3804, method 3800 may include analyzing the set of images to identify a portion of the shelving unit dedicated to the particular product type. For example, the set of images may be analyzed to detect shelf portion 3612. As described above, the portion of the shelving unit dedicated to the particular product type may be determined using one or more object detection or image recognition algorithms. In some embodiments, the portion of the shelving unit dedicated to the particular product type may be determined using a trained machine learning model.

At step 3806, method 3800 may include determining a product capacity for the portion of the shelving unit dedicated to the particular product type. For example, the product capacity may correspond to product capacity 3630 described above. The determined product capacity may be greater than a number of the first plurality of products depicted in the set of images, as shown in FIG. 36. In some embodiments, step 3806 may include obtaining data indicative of a depth of the shelving unit. For example, the depth may be obtained using image data to identify the type of the shelving unit, which may be indicative of a depth of the shelving unit. In another example, the depth may be estimate based on the type of product placed on the shelf. For example, products of the particular product type may be commonly associated with a certain shelf depth. Similarly, the shelf depth may be estimated based on details about the store. In another example, the shelf depth may be received from store a employee, for example through a GUI of an employee device.

Step 3806 may further include determining the product capacity for the portion of the shelving unit dedicated to the particular product type based on the depth of the shelving unit. In some embodiments, step 3806 may include analyzing the set of images to determine at least one dimension of products from the particular product type. For example, the set of images may be analyzed to determine a depth D2 of product 3620 using the various methods described above. Step 3806 may include determining the product capacity for the portion of the shelving unit dedicated to the particular product type based on the depth of the shelving unit and the at least one dimension of products from the particular product type.

In some embodiments, step 3806 may include determining a maximum number of products from the particular product type that can be placed in a front row of products associated with the portion of the shelving unit dedicated to the particular product type. For example, the maximum number of products that can be placed in the front row may be based on the at least one dimension of products from the particular product type. Step 3806 may further include determining, based on the obtained shelf depth, a maximum number of products from the particular product type that can be placed behind the front row of products. The product capacity associated with the portion of the shelving unit dedicated to the particular product type may then be determined based on the maximum number of products that can be placed in the front row and the maximum number of products that can be placed behind the front row, as described above.

At step 3808, method 3800 may include accessing stored data about a second plurality of products from the particular product type, wherein each of the second plurality of products is located separately from the shelving unit when the period of time ends. In some embodiments, accessing the stored data may include accessing a database, such as database 3740, or another memory device or storage location. Various examples of stored data types are described above with respect to FIG. 37A.

At step 3810, method 3800 may include using the determined product capacity and the accessed data to generate at least one suggestion for improving store execution. In some embodiments, the at least one suggestion for improving the store execution may include changing a size of the portion of the at least one store shelf dedicated to products from the particular product type, as described above. In some embodiments, the at least one suggestion for improving the store execution may include changing a re-stocking frequency of products from the particular product type at the at least one store shelf. The at least one suggestion may further include a shelf planning optimization action, such as changing product assortment for the retail store, changing product assortment for the shelving unit, changing position of products in the shelving unit, changing space dedicated to products from the particular product type, changing type of shelf of the shelving unit, or changing spacing between shelves of the shelving unit. In some embodiments, the at least one suggestion may include an inventory planning optimization action, such as changing storage capacity of products from the particular product type in the store's backroom, changing a location of products from the particular product type in the store's backroom, or providing order recommendation for restocking the store's backroom.

In some embodiments, the stored data may include sales data indicative of a number of the second plurality of products sold during the period of time and step 3810 may include identifying changes in a level of product population during the period of time and determining the at least one suggestion for improving the store execution based on identified correlations between the sales data and the changes in the level of product population. In some embodiments, the stored data may include inventory data indicative of a number of the second plurality of products available in at least one storage area associated with the retail store. For example, the stored data may include inventory data 3702, as described above. Step 3810 may include identifying changes in a level of product population at the portion of the shelving unit dedicated to the particular product type during the period of time based on the set of images and the determined product capacity; generating the at least one suggestion for improving the store execution based on the changes in the level of product population and the inventory data; and displaying the at least one suggestion to an employee of the retail store. Further, in some embodiments, the stored data may include reference data indicative of a number of the second plurality of products available on a shelving unit of at least one other retail store. For example, the stored data may include reference data 3704. Step 3810 may include identifying changes in a level of product population at the portion of the shelving unit dedicated to the particular product type during the period of time based on the set of images and the determined product capacity and generating and providing the at least one suggestion for improving the store execution based on the changes in a level of product population and the reference data. These processes are described in greater detail above.

In some embodiments, step 3810 may include comparing the determined product capacity for the portion of the shelving unit dedicated to the particular product type with a capacity for product facings for the particular product type at the portion of the shelving unit dedicated to the particular product type and providing the at least one suggestion based on a result of the comparison. For example, step 3810 may include, in response to a first result of the comparison, providing a suggestion for changing the capacity for product facings for the particular product type at the portion of the shelving unit dedicated to the particular product type; and in response to a second result of the comparison, forgoing providing the suggestion.

In some embodiments, the at least one suggestion may be based at least in part on product facings, as described above. For example, step 3810 may include analyzing the set of images to detect changes during the period of time in a number of front facing products placed on the portion of the shelving unit dedicated to the particular product type and using the product capacity and the detected changes in the number of front facing products to generate and display the at least one suggestion for improving store execution. The at least one suggestion may include changing a restocking schedule of products from the particular product type to reduce a time duration where the number of front facing products is less than a threshold. In some embodiments, step 3810 may include using the determined product capacity and the detected changes in the number of front facing products to predict a time when the number of front facing products is less than a threshold and determining at least one suggestion for restocking the portion of the shelving unit dedicated to the particular product type before the predicted time. In some embodiments, step 3810 may include causing restocking of the portion of the shelving unit dedicated to the particular product type while the number of front facing products is at a maximum possible number of front facing products associated with the portion of the shelving unit dedicated to the particular product type, as described above.

At step 3812, method 3800 may include providing the at least one suggestion for improving store execution. For example, step 3812 may include providing the at least one suggestion to an employee of the retail store, to a supplier of the retail store, to a robot, to an external store rearrangement service, to a store optimization module, or the like.

In some embodiments, method 3800 may include additional steps not shown in FIG. 38. For example, method 3800 may include performing an assessment of the at least one suggestion, as described above. Method 3800 may include obtaining additional sales data indicative of products from the particular product type sold during a second period of time after the at least one suggestion was implemented. Method 3800 may further include determining whether implementing the at least one suggestion resulted in higher sales of the particular product type during the second period of time.

Retailers may need to deal with products running out of stock on a regular or even daily basis. These out-of-stock events have a cumulative effect that may substantially and adversely affect the retailers' profit. One might think this problem may be solved easily by simply monitoring the store shelves with a camera and an inventory management system that triggers low-stock alerts when the number of products of a specific product type reaches a predetermined threshold. But experience teaches that this solution often fails to eliminate out-of-stock events for several reasons. First, an image processing system may have difficulty determining the exact number of products stocked on a shelf because the captured images typically depict only the first row of products. This means that the camera may not have sufficient visibility of the products in any rows behind the first row. Second, retail stores often work under the premise that having a large number of products facing customers drives product sales. Accordingly, store employees are typically instructed to organize products to create the look of a perfectly stocked shelf by maximizing the number of products display in the first row. To obtain a more accurate understanding of when a particular product's level of stock is running, the present disclosure describes using Machine Learning (ML) algorithms or other predictive algorithms to predict when a next low-stock event will occur and generate an alert associated with the predicted next low-stock event.

FIGS. 39A-39F illustrate six images captured in a retail store, consistent with the present disclosure. The six images represent a chronological sequence of events illustrating inventory changes in at least a portion of a retail shelving unit dedicated to products of a specific product type. In the following example, the image illustrated in FIG. 39A was captured before the image of FIG. 39B, the image illustrated in FIG. 39B was captured before the image of FIG. 39C, and so forth through FIG. 39E.

Figure 39A:
FIGS. 39A-39F are illustrations of images captured in a retail store consistent with the present disclosure.
Figure 39D:
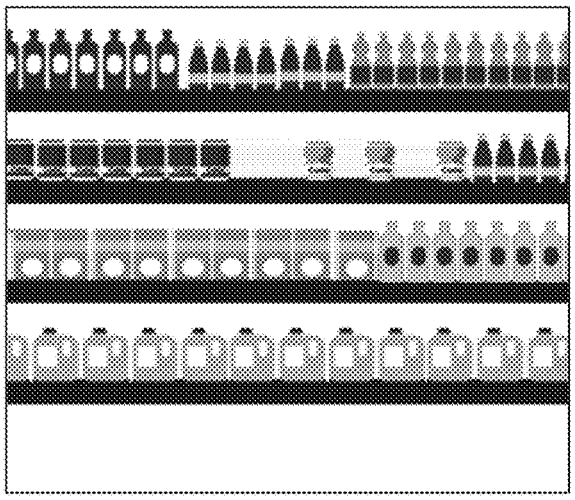
Figure 39B:
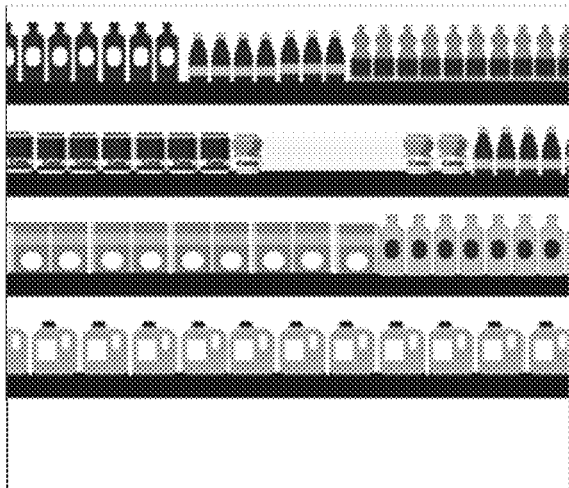
Figure 39E:
Figure 39C:
Figure 39F:
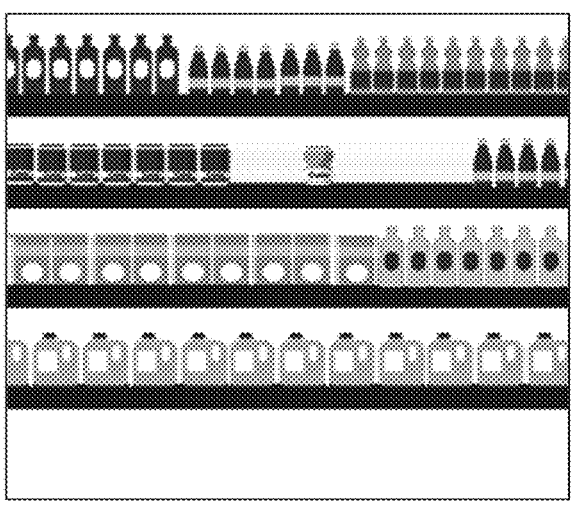

The image illustrated in FIG. 39A depicts a restocking event associated with a store shelf 3900. A restocking event may be determined when at least a portion of a retail shelving unit is replenished with additional products. As illustrated, a store employee 3902 (or other individuals) may replenish store shelf 3900 with additional products of the specific product type from cart 3904. The image illustrated in FIG. 39B depicts a first low-facing event associated with a store shelf 3900. A low-facing event may be determined when the number of products placed in a front row of products in at least a portion of the retail shelving unit is less than a facing threshold. For example, if the facing threshold is 50%, a low-facing event may be determined when the number of products placed in a front row of products of store shelf 3900 is three. In one embodiment, after identifying a low-facing event, the system may issue a notification that causes a store employee to reorganize the products on the store shelf. The image illustrated in FIG. 39C depicts a first facing event associated with a store shelf 3900. A facing event may be determined when products placed on at least a portion of the retail shelving unit are reorganized by a store employee such that more products are placed in a front row of at least a portion of the retail shelving unit. For example, store employee 3906 (or other individual) may reorganize the products on store shelf 3900 such that seven products may be placed in the front row of products of store shelf 3900. The image illustrated in FIG. 39D depicts a second low-facing event associated with store shelf 3900 similar to the first low-facing event illustrated in FIG. 39B. The image illustrated in FIG. 39E depicts a second facing event associated with store shelf 3900 similar to the first facing event illustrated in FIG. 39C. The image illustrated in FIG. 39F depicts a low-stock event associated with store shelf 3900. A low-stock event may be determined when the number of products placed in at least a portion of the retail shelving unit is less than a quantity threshold. For example, if the quantity threshold is 5%, a low-stock event may be determined when the number of products placed in store shelf 3900 is less than two.

Figure 40A:
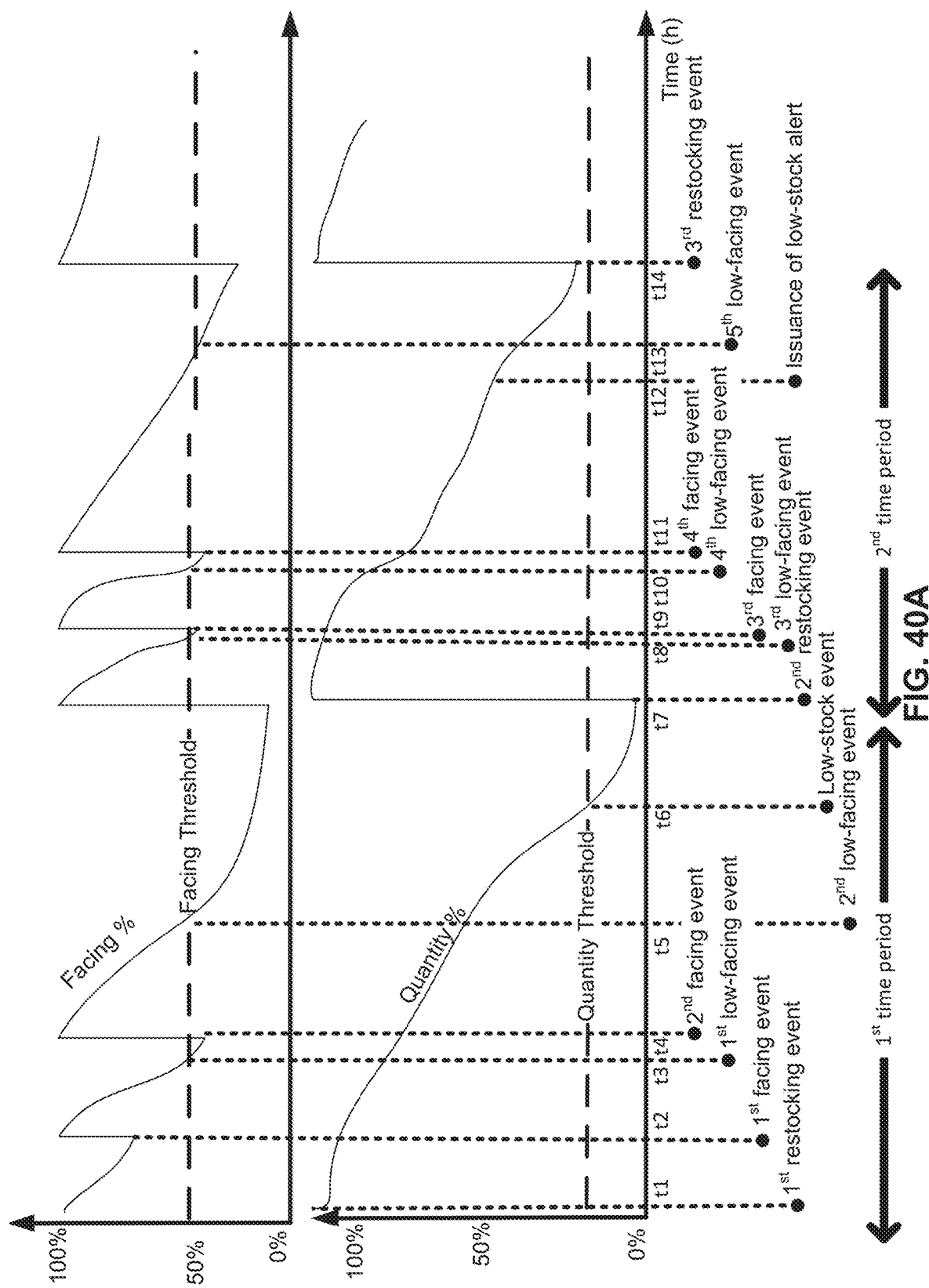
FIG. 40A includes two graphs showing example changes in facing directions and quantities of products placed on a retail shelving unit consistent with the present disclosure.

FIG. 40A illustrates two graphs that schematically show changes of products from a specific product type placed on a shelf of a retail shelving unit during two periods of time. The information presented in FIG. 40A may be determined from images that are continuously or periodically received from at least one image capturing device that monitors the shelving unit. In one example, the upper graph shows the identified changes in the facing percentage of products from the specific product type. To determine the facing level, the system may determine a maximum number of products from the specific product type that can be placed in a front row of products associated with the portion of the shelving unit dedicated to the specific product type and calculate how much of the front row of products is populated. The upper graph has an example facing threshold that is set to 50%. When the facing level reaches the facing threshold, the system may determine that a low-facing event is starting. In another example, the lower graph shows the estimated changes in the quantity percentage of products from the specific product type. The quantity level depicted in the lower graph is estimated because the system typically cannot accurately determine the quantity of the products on a shelf using only image data. The lower graph has an example quantity threshold that is set to 15%. When the estimated quantity of products from the specific product type on the store shelf reaches the quantity threshold, the system may determine that a low-stock event is starting.

The first time period starts at t1 when the system detects a first restocking event during which a store employee replenishes a store shelf dedicated to products from a specific product type. Between t1 and t2, the facing level and the quantity of products from the specific product type decrease, and at t2 the system detects a first facing event in which the facing level returns to 100%. For example, the system detects a store employee has reorganized the products on the store shelf. Next, between t2 and t3, the facing level and the quantity of products from the specific product type decrease, and at t3 the system detects a first low-facing event. For example, the system may determine that the facing level in the associated store shelf is at 50% and assign a facing task to a store employee to reorganize the products on the store shelf. Between t3 and t4, the facing level and the quantity of products from the specific product type continue to decrease, and at t4 the system detects a second facing event during which the facing level returns to 100%. For example, the second facing event may be triggered by the system after detecting the first low-facing event. Between t4 and t5, the facing level and the quantity of products from the specific product type continue to decrease, and at t5 the system detects a second low-facing event. Between t5 and t6, the facing level and the quantity of products from the specific product type continue to decrease, and at t6 the system detects a low-stock event. In one example, the system may determine that the quantity of products from the specific product type placed on the store shelf is at 15% and assign a restocking task to a store employee to replenish the store shelf with additional products. Between t6 and t7, the facing level and the quantity of products from the specific product type continue to decrease, and at t7 the system detects a second restocking event during which a store employee replenishes the store shelf with products from the specific product type. At t7, both the quantity and the facing level of products from the specific product type return to 100%. In one example, the second restocking event may be triggered by the system after detecting the low-stock event at t6. As discussed above, the system provides a solution to out-of-stock events in retail stores. With reference to the illustrated example, the system aims to minimize and preferably to eliminate the time duration between t6 and t7.

The second time period starts at t7 when the system detects the second restocking event. Between t7 and t8, the facing level and the quantity of products from the specific product type decrease, and at t8 the system detects a third low-facing event. Between t8 and t9, the facing level and the quantity of products from the specific product type continue to decrease, and at t9 the system detects a third facing event during which the facing level returns to 100%. Between t9 and t10, the facing level and the quantity of products from the specific product type decrease, and at t10 the system detects a fourth low-facing event. Between t10 and t11, the facing level and the quantity of products from the specific product type continue to decrease, and at t11 the system detects a fourth facing event during which the facing level returns to 100%. Between t11 and t12, the facing level and the quantity of products from the specific product type continue to decrease, and at t12 the system generates an alert associated with a predicted next low-stock event. The alert may be generated before the quantity of the products from the specific product type reaches to the quantity threshold. In one embodiment, the system may time the issuance of the alert such that the next restocking event will take place before the quantity of products from the specific product type reaches the quantity threshold. Specifically, the system may take into account the time it would take for a store employee to transport additional products from a storage area and replenish the store shelf. Between t12 and t13, the facing level and the quantity of products from the specific product type continues to decrease, and at t13 the system detects a fifth low-facing event. Between t13 and t14, the facing level and the quantity of products from the specific product type continue to decrease, and at t14 the system detects a third restocking event. As shown, the third restocking event takes place before the quantity of products from the specific product type reaches the quantity threshold.

Figure 40B:
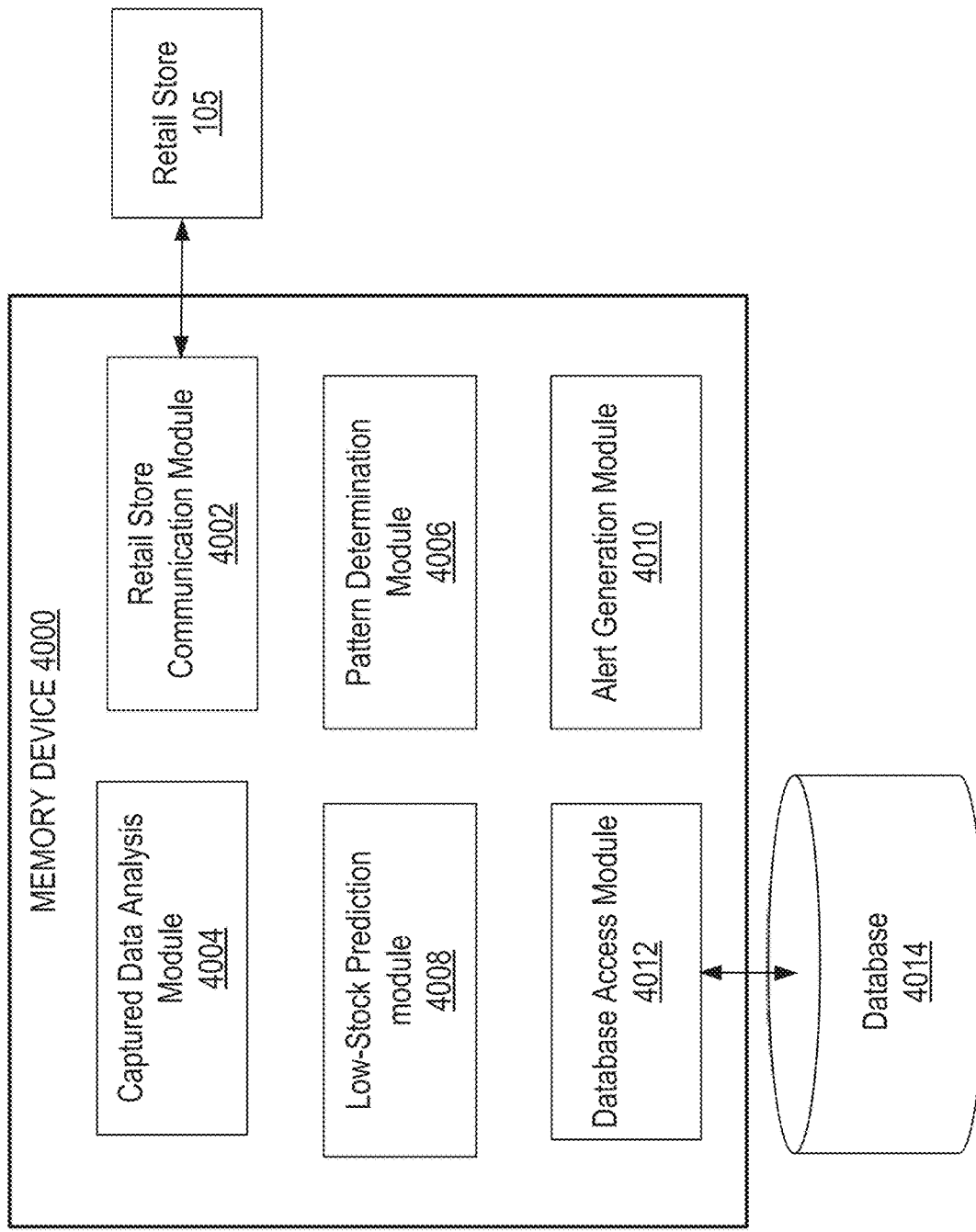
FIG. 40B is a block diagram illustrating an exemplary embodiment of a memory device containing software modules for executing methods consistent with the present disclosure.

FIG. 40B illustrates an exemplary embodiment of a memory device 4000 containing software modules consistent with the present disclosure. In particular, as shown, memory device 4000 may include a retail store communication module 4002, a captured data analysis module 4004, a pattern determination module 4006, a low-stock prediction module 4008, an alert generation module 4010, a database access module 4012, and a database 4014. Modules 4002, 4004, 4006, 4008, 4010, and 4012 may contain software instructions for execution by at least one processor (e.g., processing device 202) associated with system 100. Retail store communication module 4002, captured data analysis module 4004, pattern determination module 4006, low-stock prediction module 4008, alert generation module 4010, database access module 4012, and database 4014 may cooperate to perform multiple operations. For example, retail store communication module 4002 may receive image data from one or more image capturing devices 125 in retail store 105. Captured data analysis module 4004 may use the received image data to identify restocking events, low-facing events, facing events and low-stock events in at least a portion of a retail shelving unit dedicated to products from a specific product type. Pattern determination module 4006 may determine the demand pattern for products from the specific product type based on the identified events. Low-stock prediction module 4008 may predict, based on additional image data and the determined demand pattern, when the next low-stock event will occur. Alert generation module 4010 may determine when an how to alert a store employee about a predicted next low-stock event.

In some embodiments, memory device 4000 may be a part of system 100 such as, for example, memory device 226. Alternatively, memory device 4000 may be stored in an external database or an external storage communicatively coupled with server 135, such as one or more databases or memories accessible over communication network 150. Further, in other embodiments, the components of memory device 4000 may be distributed in more than one server and more than one memory device.

In some embodiments, retail store communication module 4002 may receive information from sensors located in retail store 105. In one example, retail store communication module 4002 may receive images captured by a plurality of image sensors fixedly mounted in retail store 105 or receive data derived from images captured by a plurality of image sensors fixedly mounted in retail store 105. In another example, retail store communication module 4002 may receive image data (e.g., images or data derived from images) from robotic capturing devices configured to navigate autonomously within retail store 105 and to capture images of multiple types of perishable products. In yet another example, retail store communication module 4002 may receive data from one or more shelf sensors configured to measure properties of the products placed on a store shelf. The one or more shelf sensors may include pressure sensitive pads, light detectors, weight sensors, light sensors, odor sensors, resistive sensors, ultrasonic sensors, and more.

In some embodiments, captured data analysis module 4004 may process the information collected by retail store communication module 4002 to identify restocking events, low-facing events, facing events, and low-stock events associated with retail shelving units in retail store 105. Consistent with the present disclosure, each event may be associated with at least one criteria that captured data analysis module 4004 is configured to identify. As described above, restocking events may be identified when the captured data depicts a store employee has replenished a retail shelving unit with additional products of a specific product type. In some cases, the image data may further depict means to deliver the additional products to the retail shelving unit (e.g., a cart, a pallet pump, a box, etc.). The restocking events may be triggered by low-stock events or may be initiated according to a schedule of tasks of the store employees. Low-facing events may be identified when the captured data depicts that the number of products placed in a front row of products in at least a portion of the retail shelving unit is less than a facing threshold. In some cases, the facing threshold may be determined based on the product type, the brand of the product, the time of day, and so forth. Facing events may be identified when the captured data depicts that the products placed on at least a portion of the retail shelving unit are reorganized by a store employee such that more products will be placed in a front row of the at least a portion of the retail shelving unit. The facing events may be triggered by low-facing events or may be initiated according to a schedule of tasks of the store employees. Low-stock events may be identified when the captured data depicts that the number of products placed in at least a portion of the retail shelving unit is less than a quantity threshold. Captured data analysis module 4004 may identify each of the events using data captured by at least one of the following types of sensors: image sensors, pressure sensitive pads, light detectors, weight sensors, light sensors, odor sensors, resistive sensors, and ultrasonic sensors.

In some embodiments, captured data analysis module 4004 may further be configured to preprocess the image data to identify the events (e.g., restocking events, low-facing events, facing events, and low-stock events). In some examples, the image data may be preprocessed by transforming the image data using a transformation function to obtain a transformed image data, and the preprocessed image data may include the transformed image data. For example, the transformation function may comprise convolutions, visual filters (such as low-pass filters, high-pass filters, band-pass filters, all-pass filters, etc.), nonlinear functions, and so forth. In some examples, the image data may be preprocessed by smoothing the image data, for example, by using Gaussian convolution, using a median filter, and so forth. In some examples, the image data may be preprocessed to obtain a different representation of the image data. For example, the preprocessed image data may include: a representation of at least part of the image data in a frequency domain; a Discrete Fourier Transform of at least part of the image data; a Discrete Wavelet Transform of at least part of the image data; a time/frequency representation of at least part of the image data; a representation of at least part of the image data in a lower dimension; a lossy compression representation of at least part of the image data; a lossless compression representation of at least part of the image data; a time order series of any of the above; any combination of the above; and so forth. In some examples, the image data may be preprocessed to extract edges, and the preprocessed image data may include information based on and/or related to the extracted edges. In some examples, the image data may be preprocessed to extract visual features from the image data. Some examples of such visual features include edges, corners, blobs, ridges, Scale Invariant Feature Transform (SIFT) features, temporal features, and so forth. One of ordinary skill in the art will recognize that the image data may be preprocessed using other kinds of preprocessing methods.

In some embodiments, pattern determination module 4006 may determine a demand pattern for products from the specific product type based on the identified restocking event, the at least one low-facing event, the at least one facing event, and the low-stock event. Pattern determination module 4006 may determine the demand pattern based on data captured during the first time period. In one embodiment, pattern determination module 4006 may determine the demand pattern based on at least one first time duration between the restocking event and the at least one facing event, and at least one second time duration between the at least one facing event and the low-stock event. With reference to FIG. 40A, at least one first time duration may include the time duration between the first restocking event and the first facing event (i.e., between t1 to t2) and/or the time duration between the first restocking event and the second facing event (i.e., between t1 to t4). At least one second time duration may include the time duration between the first restocking event and the first low-stock event (i.e., between t2 to t6) and/or the time duration between the second facing event and the first low-stock event (i.e., between t4 to t6). In another embodiment, pattern determination module 4006 may determine the demand pattern based on the time duration between facing events. For example, the time duration between the first facing event and the second facing event (i.e., between t2 to t4). In another embodiment, pattern determination module 4006 may determine the demand pattern based on the time duration between at least one low-facing event and the low-stock event. For example, the time duration between the first low-facing event and the first low-stock event (i.e., between t3 to t6) and/or the time duration between the second low-facing event and the first low-stock event (i.e., between t5 to t6). In another embodiment, pattern determination module 4006 may determine the demand pattern based on a number of low-facing events or facing events that precede the low-stock event. Generally, pattern determination module 4006 may determine the demand pattern based on any other relationships between identified events that occurred during the first period and/or any characteristics of the identified events that occurred during the first period.

In some embodiments, low-stock prediction module 4008 may predict when the next low-stock event will occur based on additional image data associated with images captured during a second period of time and the determined demand pattern. Low-stock prediction module 4008 may receive from captured data analysis module 4004 data about events that took place during the second time period. The received data may include image data and may also include data from other shelf sensors. For example and with reference to FIG. 40A, low-stock prediction module 4008 may receive data about the second restocking event that took place at t7, the third low-facing event that took place at t8, the third facing event that took place at t9, the fourth low-facing event that took place at t10, the fourth facing event that took place at t11, the fifth low-facing event that took place at t13, and the third restocking event that took place at t14. Consistent with the present disclosure, low-stock prediction module 4008 may determine, based on at least some of the identified events, a predicted time for the next low-stock event. In one embodiment, low-stock prediction module 4008 may predict that a time duration between the second restocking event that took place at t7 and the predicted next low-stock event will be greater than the time duration between the first restocking event that took place at t1 and the low-stock event that took place at t6. In another embodiment, low-stock prediction module 4008 may predict that a time duration between the second restocking event that took place at t7 and the predicted next low-stock event will be less than the time duration between the first restocking event that took place at t1 and the low-stock event that took place at t6. Consistent with embodiments of the present disclosure, low-stock prediction module 4008 may predict when the next low-stock event will occur based on image data and/or additional information retrieved from one or more sources. For example, the additional information may include one or more of checkout data (e.g., the number of sold items during the first period of time), calendar data (e.g., holidays, sport games, etc.), historical product turnover data (e.g., the number of turkeys sold per day during the three weeks prior to Thanksgiving of last year), and average turnover (e.g., per hour in a day, per day in a week, per special events), and more.

In some embodiments, alert generation module 4010 may determine whether an alert associated with the predicted next low-stock event should be generated and to generate alerts when needed. The term "alert" refers to any text message, voice message, notification, or other data provided by the system to an entity associated with the retail store about a potential low-stock event in at least a portion of the retail shelving unit that should be replenished with additional products of a specific product type associated with the at least a portion of the retail shelving unit. In one embodiment, alert generation module 4010 may obtain inventory data associated with the specific product type. Based on the inventory data, alert generation module 4010 may determine to withhold the alert associated with the predicted next low-stock event. For example, there is no reason to generate an alert associated with the predicted next low-stock event when there are not available products from the specific product type to replenish at least a portion of the retail shelving unit. When the alert generation module 4010 determines to withhold the alert associated with the predicted next low-stock event, the system may initiate an alternate action to change the arrangement of products on the retail shelving unit. For example, the alternate action may include instructing a store employee to place products from a differing product type on the at least a portion of a retail shelving unit. In another embodiment, alert generation module 4010 may obtain schedule data associated with scheduled restocking events. Based on the schedule data, alert generation module 4010 may determine to forgo providing the alert associated with the predicted next low-stock event. For example, there may be little value in generating an alert associated with the predicted next low-stock event when a store employee is scheduled to replenish the at least a portion of the retail shelving unit in the next five minutes.

In some embodiments, database access module 4012 may cooperate with database 4014 to retrieve information such as product supply information. The product supply information may include, for example, one or more of a schedule providing arrival dates and/or times of additional products, inventory records, checkout data, calendar data, and historical product turnover data. Alert generation module 4010 may use the product supply information stored in database 4014 when determining whether to issue or to withhold an alert associated with the predicted next low-stock event. Database 4014 may include separate databases, including, for example, a vector database, raster database, tile database, viewport database, and/or a user input database, configured to store data. The data stored in database 4014 may be received from modules 4002-4012, server 135, from any communication device associated with retail stores 105. Moreover, the data stored in database 4014 may be provided as input using data entry, data transfer, or data uploading.

Modules 4002-4012 may be implemented in software, hardware, firmware, a mix of any of those, or the like. For example, if the modules are implemented in software, the modules may be stored in a server (e.g., server 135) or distributed over a plurality of servers. In some embodiments, any one or more of modules 4002-4012 and data associated with database 4014 may be stored in database 140 and/or located on server 135, which may include one or more processing devices. Processing devices of server 135 may be configured to execute the instructions of modules 4002-4012. In some embodiments, aspects of modules 4002-4012 may include software, hardware, or firmware instructions (or a combination thereof) executable by one or more processors, alone, or in various combinations with each other. For example, modules 4002-4012 may be configured to interact with each other and/or other modules of server 135 to perform functions consistent with disclosed embodiments.

Figure 41:
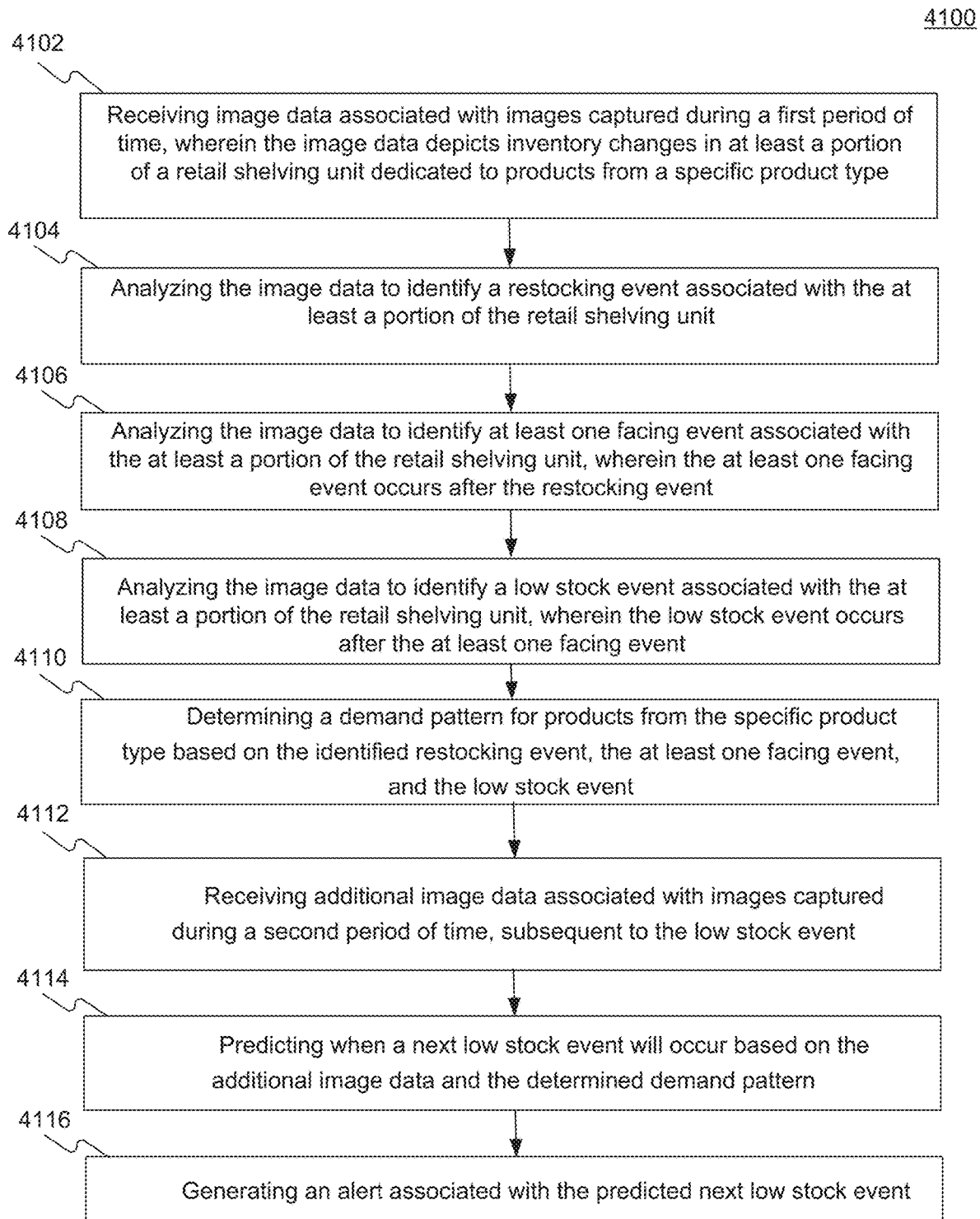
FIG. 41 is a flowchart of an exemplary method for generating low-stock alerts consistent with the present disclosure.

FIG. 41 depicts an exemplary method 4100 for generating low-stock alerts before a low-stock event is predicted to occur. For purposes of illustration, in the following description, reference is made to certain components of system 100. It will be appreciated, however, that other implementations are possible and that other components may be utilized to implement the exemplary method. It will also be readily appreciated that the illustrated method can be altered to modify the order of steps, delete steps, or further include additional steps.

At step 4102, a processing device (e.g., processing device 202) may receive image data associated with images captured during a first period of time, wherein the captured data depicts inventory changes in at least a portion of a retail shelving unit dedicated to products from a specific product type. Consistent with the present disclosure, the first time period may be longer than a day, longer than a week, or longer than a month. In one embodiment, the image data may be acquired by any one of image capturing devices 125 illustrated in FIG. 4A-4C. For example, the image data may be acquired by a plurality of image sensors fixedly mounted in retail store 105. Details of the image capturing devices mounted in retail store 105 and configured to acquire the images captured during a first period of time are described with references to FIGS. 5A-5C. The image data may include processed images (e.g., cropped images, video streams, and more) or information derived from the captured images (e.g., data about events identified in captured images, data that may be used to construct a 3D image, and more). In one embodiment, the processing device may periodically receive images that correspond with the current inventory of the products from the specific product type. For example, the processing device may receive one or more images at predetermined time intervals (e.g., every minute, every 5 minutes, every 15 minutes, every 30 minutes, etc.). In another embodiment, the processing device may receive the one or more images in response to a detection of an identified event. In one example, the processing device may receive the one or more images after an event, such as a detected lifting of a product from the specific product type from the shelving unit.

At step 4104, the processing device may analyze the image data to identify a restocking event associated with the at least a portion of the retail shelving unit. In one embodiment, identifying the restocking event may include detecting a store employee replenishing the at least a portion of the retail shelving unit with additional products of the specific product type. For example, as illustrated in FIG. 39A, store employee 3902 (or other individual) may replenish store shelf 3900 with additional products from cart 3904. In disclosed embodiments, identifying the restocking event may include detecting a store employee replenishing at least a portion of the retail shelving unit with additional products of the specific product type. Moreover, the processing device may be configured to identify a time of day that the store employee replenished at least a portion of the retail shelving unit. In some cases, the identified time of day may later be used for determining a demand pattern for products of the specific product type.

At step 4106, the processing device may analyze the image data to identify at least one facing event associated with the at least a portion of the retail shelving unit, wherein the at least one facing event occurs after the restocking event. In one embodiment, identifying the at least one facing event may include detecting a store employee reorganizing products from the specific product type such that more products out of the products already placed on the at least a portion of the retail shelving unit will be placed in a front row of the at least a portion of the retail shelving unit. For example, as illustrated in FIG. 39C, store employee 3906 (or other individual) may replenish at least a portion of the retail shelving unit with products already on store shelf 3900. In some embodiments, identifying the at least one facing event may include detecting a store employee reorganizing products from the specific product type such that more products out of the products already placed on the at least a portion of the retail shelving unit will be placed in a front row of the at least a portion of the retail shelving unit. Moreover, the processing device may be configured to assign a facing level for the at least one facing event or for the low-facing event. The facing level may represent the percentage or number of products placed in a front row of the at least a portion of the retail shelving unit. In some cases, the facing level for the at least one facing event or for the at least one low-facing event may be used later for determining the demand pattern.

At step 4108, the processing device may analyze the image data to identify a low-stock event associated with the at least a portion of the retail shelving unit, wherein the low-stock event occurs after the at least one facing event. In one embodiment, identifying the low-stock event includes detecting that a number of products from the specific product type in the at least a portion of the retail shelving unit is less than threshold. For example, as illustrated in FIG. 39F, the threshold may be a single product in the front row of store shelf 3900. In some embodiments, identifying the low-stock event includes detecting that a number of products from the specific product type in the at least a portion of the retail shelving unit is less than a quantity threshold. Moreover, the processing device may be configured to determine a typical time duration from the identification of the low-stock event of products from the specific product type until the at least a portion of the retail shelving unit is replenished. In some cases, the determined time duration may be used later in order to determine a time for issuing the alert.

At step 4110, the processing device may determine a demand pattern for products from the specific product type based on the identified restocking event, the at least one facing event, and the low-stock event. Consistent with the present disclosure, the processing device may perform big data analytics on the image data and the identified events. Typically, the big data analytics are executed in an automatic or autonomous manner without using any user input during the learning analysis. In one embodiment, the processing device may perform large-scale data analysis on the received information to discover, detect, or learn new data. For example, the large-scale data analysis may involve the process of examining large quantities of data (e.g., data mining, data discovery, etc.) to extract new or previously unknown interesting data or patterns such as unusual demand times for the specific product type. The processing device may also perform large-scale data analysis on the stored data (e.g., machine learning analysis, data modeling, pattern recognition, predictive analysis, correlation analysis, etc.) to predict, calculate, or identify implicit relationships or inferences within the stored data. For example, the determined demand pattern may correlate a combination of different parameters to product sales and/or to depletion of product from retail shelves. The different parameters may include the quantity of products on display, the predicted demand for the products, the location that the products are being displayed, the time of day, the day of the week, the price of products, and more. For example, when the first time period is longer than a week, the determined pattern may take into account certain days of the week with higher demand for the specific product type. In disclosed embodiments, the processing device may obtain statistical data indicative of a number of consumers in the retail store during different hours of a day and determine the demand pattern based on the statistical data. In some embodiments, the processing device may take into account the current number and the expected number of consumers in the retail store when determining a time for issuing the alert such that the next restocking event would take place before the quantity of products from the specific product type reaches to the quantity threshold. In some examples, the determined demand pattern may include a stochastic model (such as a random walk model, a Markov model, Levy model, and so forth) for predicting product sales and/or depletion of product from retail shelves based on the different parameters. In some examples, the determined demand pattern may include a machine learning model trained using training examples to predict product sales and/or depletion of product from retail shelves based on the different parameters. For example, at least one of the training examples may be based on past information collected from the retail store as described above. In another example, at least one of the training examples may be based on information collected from the other retail stores.

At step 4112, the processing device may receive additional image data associated with images captured during a second period of time, subsequent to the low-stock event, by the plurality of image capturing devices. The additional image data may depict additional inventory changes in the at least a portion of the retail shelving unit. Consistent with the present disclosure, the processing device may analyze the additional image data associated with images captured during the second period to detect a second low-stock event that happened earlier than a predicted time of the predicted low-stock event. When this happens, the processing device may use a machine learning module or other data gathering algorithm to update the demand pattern with the second low-stock event. For example, the predicted time of the predicted low-stock event was based on the predicted number of customers in the store and the actual number of customers was higher. In addition, the processing device may estimate a number of products picked up from the at least a portion of the retail shelving unit during the second period of time to improve a certainty level for the predicted next low-stock event.

At step 4114, the processing device may predict when the next low-stock event will occur based on the additional image data and the determined demand pattern. In some embodiments, the processing device may determine a confidence level associated with the predicted next low-stock event. When the confidence level is lower than a threshold, the processing device may withhold the alert associated with the predicted next low-stock event, and initiate an action to increase the confidence level. In some cases, the action to improve the confidence level may include instructing a store employee to count a current number of products from the specific product type located on the at least a portion of the retail shelving unit. Consistent with the present embodiments, the threshold for the confidence level associated with the predicted next low-stock event may be depend on the type of products (e.g., products stored in cold rooms may be associated with higher threshold for the confidence level than other products). Additionally, the threshold for the confidence level associated with the predicted next low-stock event may be depend on the time of day (e.g., in the mornings, the threshold for the confidence level may be lower than in the afternoons).

At step 4116, the processing device may generate an alert associated with the predicted next low-stock event. In some embodiments, the processing device may obtain inventory data associated with the specific product type. Based on the inventory data, the processing device may determine to withhold the alert associated with the predicted next low-stock event. For example, the inventory data may indicate that there are no additional products from the specific product type in storage, thus there is no point in sending the alert. The processing device may initiate an alternate action to change the arrangement of products on the retail shelving unit. For example, the alternate action may include instructing a store employee to place products from a differing product type on at least a portion of a retail shelving unit. In other embodiments, the processing device may obtain schedule data associated with scheduled restocking events. The schedule data may include details on the status of restocking task. Based on the schedule data, the processing device may determine to forgo providing the alert associated with the predicted next low-stock event. In addition, the processing device may analyze the additional image data associated with images captured during the second period to detect a second low-stock event that happened before the restocking event triggered by the system. When this happens, the processing device may use a machine learning module or other algorithm to update the timing of the alert. For example, it may take 10 minutes to obtain additional products of a first product type from a storage location and about 20 minutes to obtain additional products of a second product type from a storage location.

Embodiments of the present disclosure may allow for a system to process images captured in a retail store and automatically identify products displayed on shelving units. For example, the system may receive a first image depicting a shelving unit with a plurality of products of differing product types displayed thereon and a first plurality of labels coupled to the shelving unit. Each label depiction in the first image may have at most a first image resolution. The system may receive a set of second images depicting a second plurality of labels. Each label depiction in the set of second images may at least a second image resolution greater than the first image resolution. The system may correlate a first label depiction of a specific label included in the first image to a second label depiction of the same specific label included in a second image. The second image may be included in the set of second images. The system may use information derived from the second label depiction to determine a type of products displayed in the first image in proximity to the specific label. The system may initiate an action based on the determined type of products displayed in proximity to the specific label.

Figure 42:
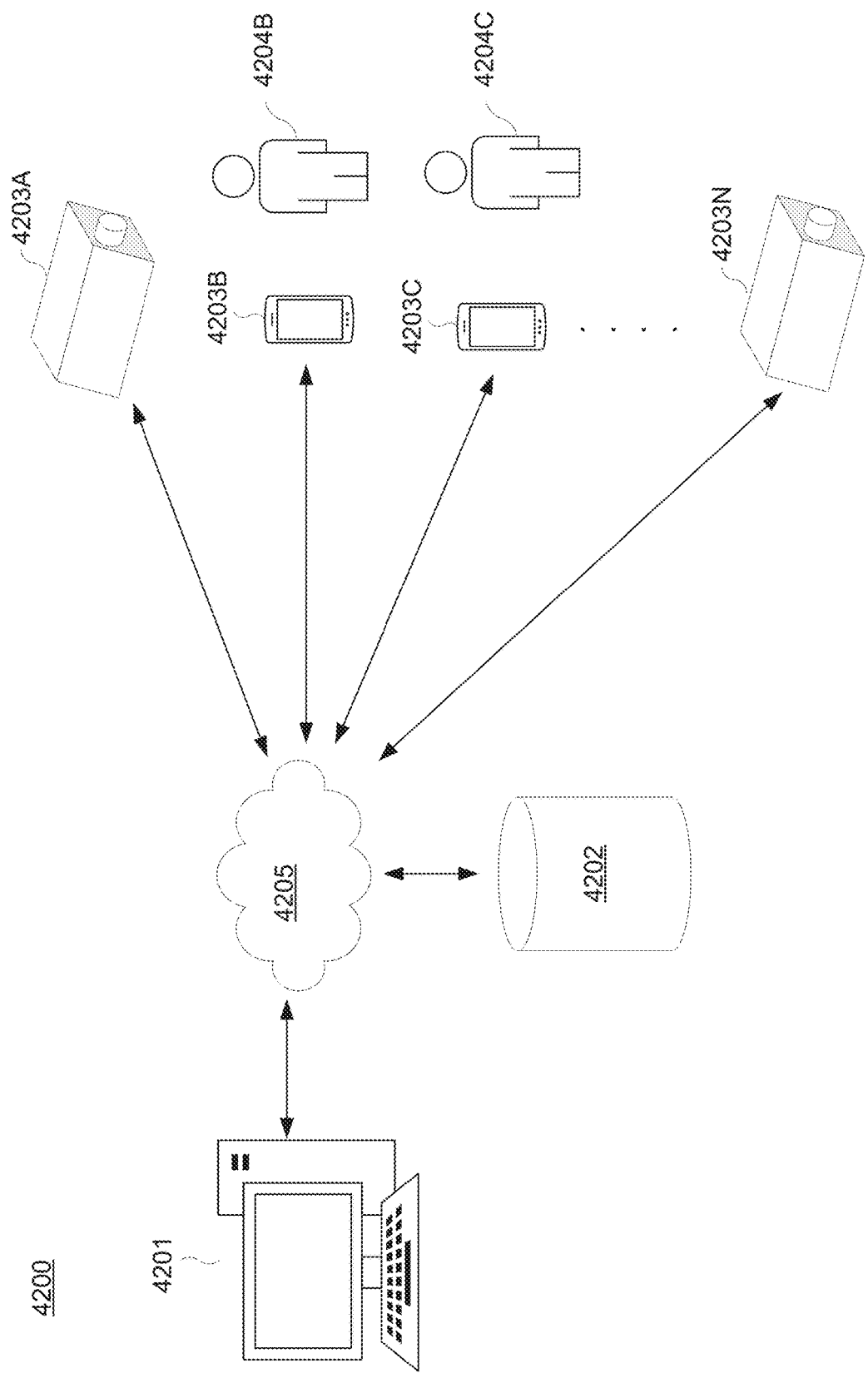
FIG. 42 is a schematic illustration of an example system for processing images captured in a retail store to automatically identify products displayed on shelving units, consistent with the embodiments of the present disclosure.

FIG. 42 is a schematic illustration of an example system 4200 for processing images captured in a retail store and automatically identifying products displayed on shelving units, consistent with the embodiments of the present disclosure. As illustrated in FIG. 42, system 4200 may include a computing device 4201, database 4202, one or more image capturing devices 4203A, 4203B, 4203C, . . . , 4203N (or capturing device 4203, collectively), and network 4205.

Computing device 4201 may be configured to receive one or more images captured in a retail store. Computing device 4201 may receive the images from capturing device 4203 directly or via network 4205. Alternatively, the one or more images captured in the retail store may be prestored in database 4202, and computing device 4201 may retrieve the images from database 4202 directly or via network 4205.

Computing device 4201 may also be configured to process the one or more images captured in the retail store to automatically identify products displayed on shelving units. Computing device 4201 may use any suitable image analysis technique including, for example, object recognition, object detection, image segmentation, feature extraction, optical character recognition (OCR), object-based image analysis, shape region techniques, edge detection techniques, pixel-based detection, artificial neural networks, convolutional neural networks, etc. In addition, computing device 4201 may use classification algorithms to distinguish between different products in the retail store. In some embodiments, computing device 4201 may utilize suitably trained machine learning algorithms and models to perform the product identification. For example, computing device 4201 may derive information from a label depicted in one of the images captured in the retail store, and use the derived information to determine a type of the products displayed in proximity to the label.

Computing device 4201 may also be configured to initiate an action based on the determined type of the products displayed in proximity to the label. For example, computing device 4201 may determine whether the arrangement of the products on the shelving units comply with a predetermined planogram. If the arrangement of the products on the shelving units does not comply with a predetermined planogram, computing device 4201 may issue a notification to a store employee. For another example, computing device 4201 may use information derived from the one or more images to determine a displayed price associated with a specific label, and determine whether the type of the products displayed in proximity to the specific label is consistent with the displayed price. If the type of the products displayed in proximity to the specific label is inconsistent with the displayed price, computing device 4201 may issue a notification to a store employee.

Database 4202 may be configured to store information and/or data for one or more components of system 4200. For example, database 4202 may be configured to store one or more images captured by capturing device 4203. Computing device 4201 may access the one or more images stored in database 4202. As another example, database 4202 may store information relating to a retail store, information relating to one or more store shelves of a retail store, information relating to one or more products, information relating to one or more non-employee individuals, or the like, or a combination thereof. Computing device 4201 may access information stored in database 4202. For example, computing device 4201 may access information relating to one or more properties of a store shelf, the physical location of the store shelves, one or more products associated with the store shelf.

Image capturing device 4203 may be any device configured to acquire image data representative of products displayed in the retail store. Examples of capturing devices may include a digital camera, a time-of-flight camera, a stereo camera, an active stereo camera, a depth camera, a Lidar system, a laser scanner, CCD based devices, or any other sensor based system capable of converting received light into electric signals. In one embodiment, capturing device 4203 (e.g., capturing devices 4203A and 4203N shown in FIG. 42) may include a stationary camera with communication layers (e.g., a dedicated camera fixed to a store shelf, a security camera, etc.). The stationary cameras may be fixedly mounted on in the retail store (e.g., on an opposing retail shelving unit). In another embodiment, capturing device 4203 (e.g., capturing devices 4203B and 4203C shown in FIG. 42) may include a handheld device (e.g., a smartphone, a tablet, a mobile station, a personal digital assistant, a laptop, a digital camera, and more) or a wearable device (e.g., smart glasses, a smartwatch, a clip-on camera). Capturing devices 4203B and 4203C may be associated with human store employee 4204B and 4204C or a robot store employee (or with other individuals).

Network 4205 may be configured to facilitate the communication between the components of system 1200. For example, computing device 4201 may receive the one or more images captured in the retail store from capturing device 4203 via network 4205. Network 4205 may include a local area network (LAN), a wide area network (WAN), portions of the Internet, an Intranet, a cellular network, a short-ranged network (e.g., a Bluetooth™ based network), or the like, or a combination thereof.

In some embodiments, the images captured by capturing devices 4203A, 4203B, 4203C, . . . , 4203N may have various image resolutions. The term "image resolution" is a measure of the degree to which the image represents the fine details of a captured retail object (i.e., a product, a label, promotion, etc.). The quality of a digital image may be determined by the total number of pixels and the range of brightness values available for each pixel.

The images captured by stationary cameras (e.g., capturing devices 4203A and 4203N) fixedly mounted on in the retail store (e.g., on an opposing retail shelving unit) may have a relatively low resolution, to the extent that the barcode and the item description on the labels may be too small for recognition from images captured by the stationary cameras. Therefore, in some embodiments of the present disclosure, system 4200 may use two types of images. One type of images (hereinafter referred to as "first images") may depict a plurality of products and a plurality of labels. The first images are captured by using, for example, from capturing devices 4203A and 4203N fixedly mounted in the retail store. The first images may have a first image resolution. Another type of images (hereinafter referred to as "second images") may depict labels. The second images may be captured by using, for example, capturing devices associates with a human store employee, a robot store employee, or a dedicated stationary image sensor. The second images may have a second and enhanced image resolution such that the barcode and text (e.g., product ID, item descriptions) on the labels depicted in the second images may be recognized by computing device 4201. In one embodiment, the capturing devices for capturing the second images may include m*n pixels. For example, a capturing device for capturing the second images may have an 8 MP image sensor that includes an array of 3280*2464 pixels. Each pixel may include at least one photo-voltaic cell that converts the photons of the incident light to an electric signal. The electrical signal may be converted to digital data by an A/D converter and processed by an image processor (ISP). In one embodiment, the image sensor of the capturing device for capturing the second images may be associated with a pixel size of between 1.1×1.1 um² and 1.7×1.7 um², for example, 1.4×1.4 um².

Figure 43A:
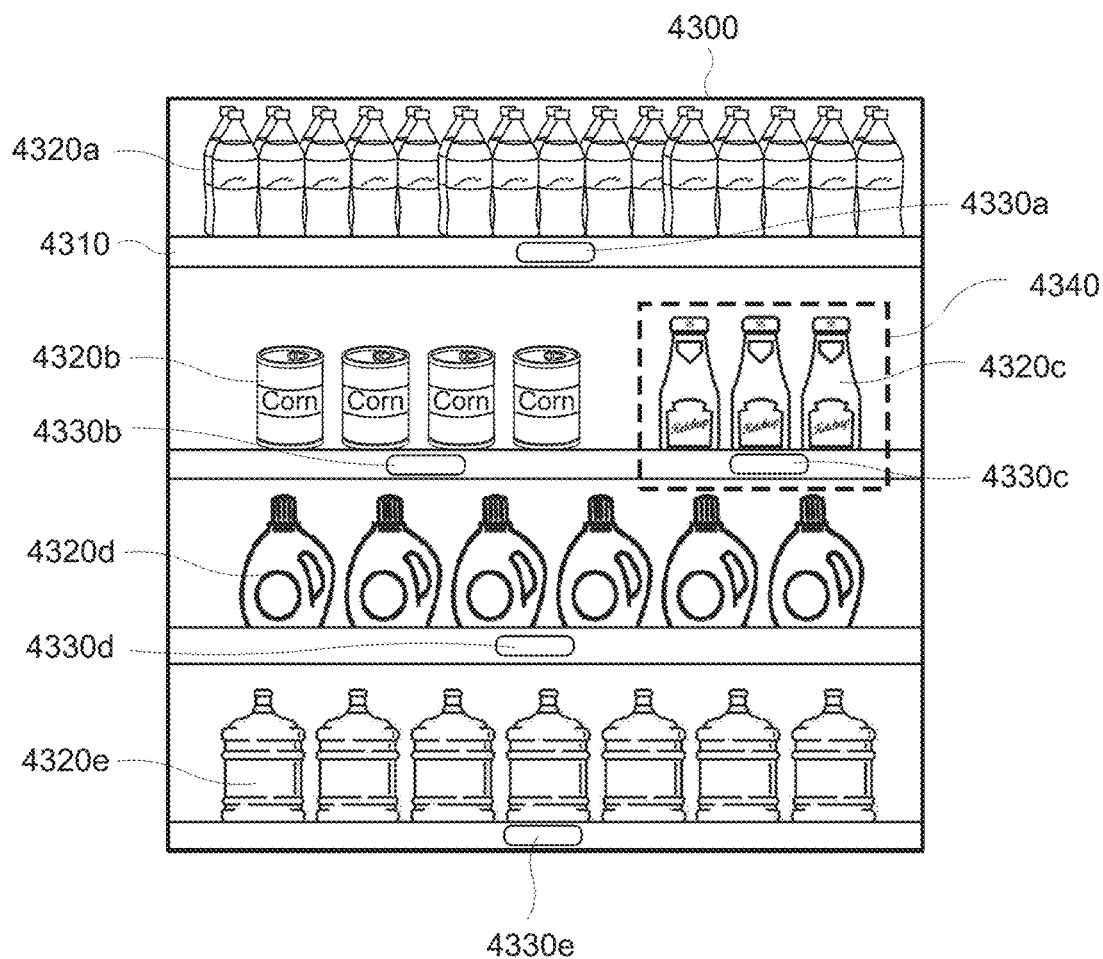
FIG. 43A is a schematic illustration of an exemplary first image, consistent with the embodiments of the present disclosure.

FIG. 43A is a schematic illustration of an exemplary first image 4300, consistent with the embodiments of the present disclosure. As shown in FIG. 43A, first image 4300 may depict a shelfing unit 4310, a plurality of products 4320a, 4320b, 4320c, 4320d, 4320e of different types, that are displayed on shelfing unit 4310, and a plurality of labels 4330a, 4330b, 4330c, 4330d, 4330e, that are coupled to shelfing unit 4310. Each type of the plurality of products 4320a, 4320b, 4320c, 4320d, 4320e may be associated with one of the plurality of labels 4330a, 4330b, 4330c, 4330d, 4330e. For example, products 4320a are associated with label 4330a; products 4320b are associated with label 4330b; and so on.

First image 4300 may have a first image resolution. In some embodiments, the first image resolution may be insufficient to identify the type of products displayed in first image 4300 above a predetermined threshold. In some examples, information (e.g., bar code, product price, product ID) on labels 4330a, 4330b, 4330c, 4330d, 4330e depicted in first image 4300 having the first image resolution may not be readable in the first image resolution.

Figure 43B:
FIG. 43B is a schematic illustration of an exemplary second image, consistent with the embodiments of the present disclosure.

FIG. 43B is a schematic illustration of an exemplary second image 4350, consistent with the embodiments of the present disclosure. As shown in FIG. 43B, second image 4350 may depict a label 4360. Label 4360 may include information regarding a type of product depicted in first image 4300. The information may include, but not limited, a product ID 4362, a product price 4364, a visual code 4366, etc. Visual code 4366 may be a visual code (such as Barcode or QR-code) associated with product ID 4362. When scanned by a code scanner, the visual code (such as the Barcode or the QR-code) may provide information related to a type of a product. Label 4360 depicted in second image 4350 may be associated with an area in first image 4300. For example, label 4360 in second image 4350 may be associated with label 4330 in area 4340 in first image 4300.

Second image 4350 may have a second image resolution. In some embodiments, label 4360 in second image 4350 may have at least 2 times, 5 times, 10 times, or 30 times more pixels than label 4330c in first image 4300. For example, the first image resolution of the captured images may be referred to hereinafter as low-resolution and may have a value or range of values lower than 5 megapixels, lower than, 2 megapixels, lower than 1 megapixel. For example, the second image resolution may be referred to hereinafter as high-resolution and may have a value or range of values higher than 2 megapixels, higher than 5 megapixels, higher than 10 megapixels, for example, between 10 megapixels and 20 megapixels, or about 15 megapixels. In some embodiments, the second image resolution associated with the second label depiction in second image 4350 may be at least ten times the first image resolution associated with the first label depiction in first image 4300.

Figure 44:
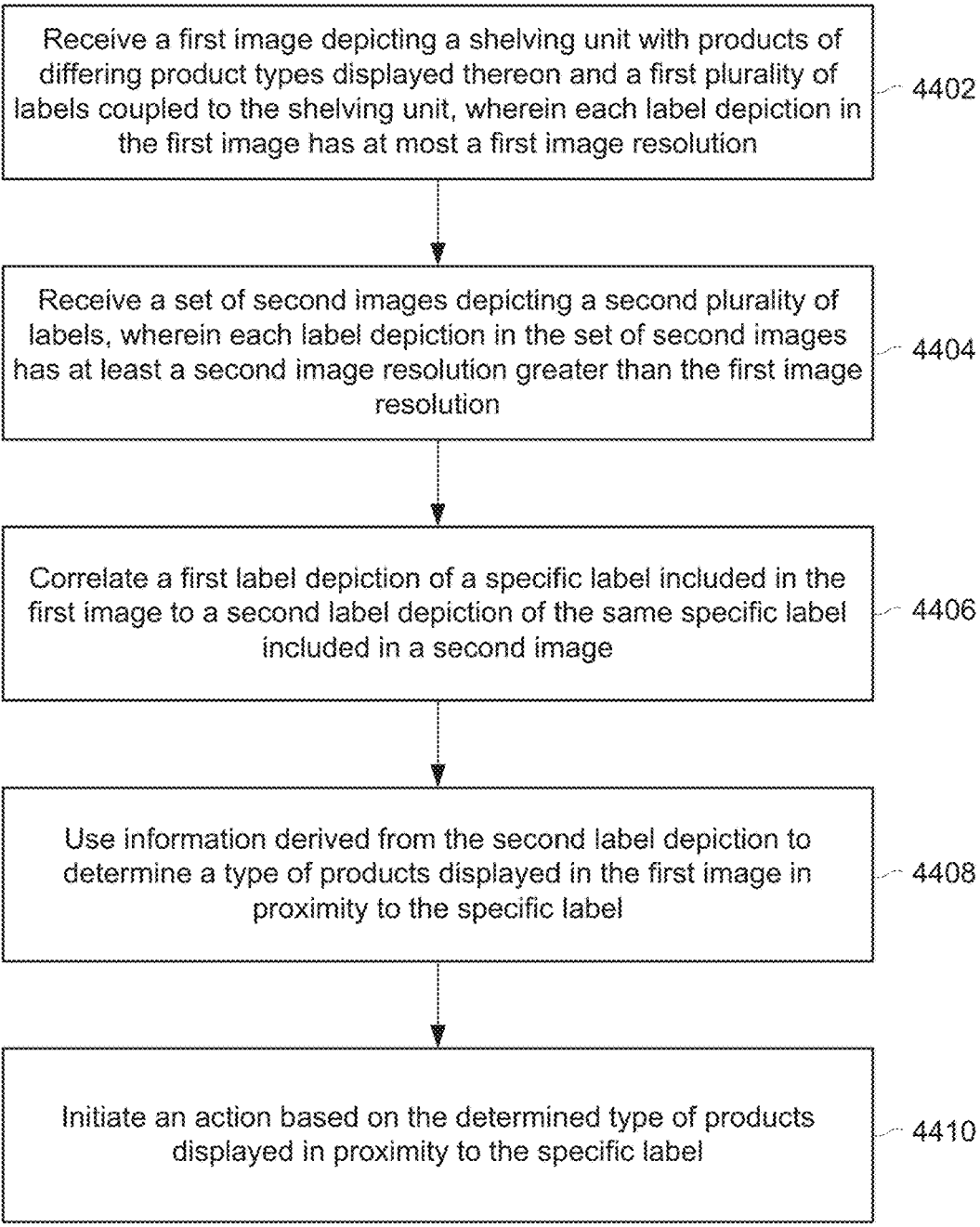
FIG. 44 is a flowchart representing an exemplary method for processing images captured in a retail store, consistent with embodiments of the present disclosure.

FIG. 44 includes a flowchart representing an exemplary method 4400 for processing images captured in a retail store, in accordance with example embodiments of the present disclosure. Method 4400 may be performed by a processor at a server (e.g., server 135) or a computer (e.g., one of devices 145A, 145B, 145C, and 145D, or computing device 4201). For purposes of illustration, in the following description, reference is made to certain components of images shown in FIGS. 42, 43A, and 43B. It will be appreciated, however, that other implementations are possible and that other configurations may be utilized to implement the exemplary method. It will also be readily appreciated that the illustrated method can be altered to modify the order of steps, delete steps, or further include additional steps.

At step 4402, method 4400 may include receiving a first image 4300 depicting a shelving unit 4310 with products 4320a, 4320b, 4320c, 4320d, 4320e of differing product types displayed thereon and a first plurality of labels 4330a, 4330b, 4330c, 4330d, 4330e coupled to shelving unit 4310. Each label depiction in first image 4300 may have at most a first image resolution. First image 4300 may be captured by a stationary camera (e.g., capturing devices 4203A or 4203N) fixedly mounted on in the retail store (e.g., on an opposing retail shelving unit). Alternatively, first image 4300 may be captured by a capturing device associated with store employee (e.g., a human store employee, or a robot store employee). First image 4300 may be read from memory (e.g., database 4202), may be received through a communication network (e.g., network 4205) using a communication device (e.g., network interface 206 in FIG. 2), may be received from an external device (e.g., one of devices 145A, 145B, 145C, and 145D in FIG. 1).

At step 4404, method 4400 may include receiving a set of second images 4350 depicting a second plurality of labels 4360. Each label depiction in the set of second images 4350 may have at least a second image resolution greater than the first image resolution. The second plurality of images 4350 depicting the plurality of labels 4360 may be captured by a capturing device associated with store employee (e.g., a capturing device carried by a human store employee or a robot store employee. Alternatively, the second plurality of images 4350 may be captured by a dedicated stationary image sensor that is configured to produce an image having a resolution greater than the first image resolution. The second plurality of images 4350 may be read from memory (e.g., database 4202), may be received through a communication network (e.g., network 4205) using a communication device (e.g., network interface 206 in FIG. 2), may be received from an external device (e.g., one of devices 145A, 145B, 145C, and 145D in FIG. 1).

At step 4406, method 4400 may include correlating a first label depiction of a specific label included in first image to a second label depiction of the same specific label included in a second image included in the set of second images. For example, the processor may correlate label 4330c depicted in first image 4300 illustrated in FIG. 43A to label 4360 depicted in second image 4350 illustrated in FIG. 43B. In some examples, step 4406 may include estimating a low resolution depiction of label 4360 (for example, by blurring the depiction of label 4360 in second image 4350, by sub-sampling pixels from the depiction of label 4360 in second image 4350, and so forth), and comparing the estimated low resolution depiction with the depiction of label 4330c in the first image. For example, the estimated low resolution depiction and the depiction of label 4330c may be compared using an image similarity function to obtain a similarity score, the similarity score may be compared with a selected threshold, and step 4406 may determine a correlation between label 4330c and label 4360 based on a result of the comparison (e.g., determine that the two correlates when the similarity score is below the selected threshold). In some examples, a machine learning model may be trained using training examples to determine whether two depictions of labels are depictions of the same real world label, and step 4406 may use the trained machine learning model to analyze the depiction of label 4330c in first image 4300 and the depiction of label 4360 in second image 4350 to determine if the two depiction correlates to the same real world label. An example of such training example may include a high resolution image of a label and a low resolution image of a label, together with a label indicating whether the two images depicts the same real world label.

In some embodiments, step 4406 may include identifying at least one feature in first image 4300 other than the first label depiction, and identifying the at least one feature in the set of second images for correlating the first label depiction to the second label depiction. The at least feature may include, but not limited to, color, pattern, shape, size, etc., of shelfing unit 4310 or products 4320a, 4320b, 4320c, 4320d, and 4320e, or the relative positions between the shelfing unit 4310, products 4320a, 4320b, 4320c, 4320d, 4320e, and labels 4330a, 4330b, 4330c, 4330d, 4330e. For example, the processor may analyze first image 4300 by using any suitable image analysis technique including, for example, object recognition, object detection, image segmentation, feature extraction, optical character recognition (OCR), object-based image analysis, shape region techniques, edge detection techniques, pixel-based detection, artificial neural networks, convolutional neural networks, etc. As a result of the image analysis on first image 4300, the processor may identify a color of a product in proximity to a specific label 4330c depicted in first image 4300. Computing device 4201 may then search, among the set of second images 4350, for an image that depicts at least a portion of a product that has the same color as the color identified in first image 4300. Once such image is found, computing device 4201 may correlate the depiction of the specific label 4330c in first image 4300 with the label (e.g., label 4360) in second image 4350.

In some embodiments, step 4406 may include correlating the label depictions in the first and second images based on the positions of the label depictions. For example, a positioning sensor may also be integrated with, or connected to, capturing devices 4203A, 4203B, 4203C, . . . , 4203N. Such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. The positioning sensor may be built into a mobile capturing device, such as smartphone devices 4203B and 4203C. Alternatively, position software may allow mobile capturing devices to use internal or external positioning sensors (e.g., connecting via a serial port or Bluetooth). The processor may determine a capturing position and orientation of first image 4300 based on positioning information obtained from the positioning sensor that is integrated into the capturing device which captures first image 4300. The processor may then determine a real world position of a specific label (e.g., label 4330c) depicted in first image 4300 based on a relative position of the specific label within first image 4300, and the capturing position and orientation of first image 4300 determined based on the positioning information obtained from the positioning sensor. Similarly, the processor may determine a real world position of label 4360 depicted in second image 4350. Further, in some examples, the processor may correlate a specific label (e.g., label 4330c) depicted in first image 4300 to label 4360 depicted in second image 4350 based on a correlation of the determined real world position of the specific label and determined real world position of label 4360. For example, the processor may correlate the two labels when the difference between the determined real world positions of the two labels is below a selected threshold. The selected threshold may be selected manually, may be determined based on estimated accuracy of the real world position determination process, and so forth. In another example, the process may correlate label 4360 to the label of the first image that has the nearest determined real world position to the determined real world position of label 4360.

At step 4408, method 4400 may include deriving information from the second label depiction, and using information derived from the second label depiction to determine a type of products displayed in first image 4300 in proximity to the specific label 4330c. In this step, it is assumed that the products that are arranged in proximity to the specific label 4330c are related to the specific label 4330c.

In some embodiments, step 4408 may include analyzing second image 4350 to derive information from the second label depiction. For example, the processor may analyze second image 4350 by using any suitable image analysis technique. As discussed above the suitable image analysis technique may include, for example, object recognition, object detection, image segmentation, feature extraction, optical character recognition (OCR), object-based image analysis, shape region techniques, edge detection techniques, pixel-based detection, artificial neural networks, convolutional neural networks, etc. As a result of the image analysis on second image 4350, the processor may recognize some text associated with a particular meaning on label 4360 second image 4350. Based on the recognized text, the processor may determine the product ID, product price, and product description (e.g., size, volume, color, brand name, manufacturer) shown on label 4360. Based on the product ID and product description, the processor may determine the type of the products that are arranged in proximity to the specific label 4330c.

In some embodiments, step 4408 may include performing an optical character recognition (OCR) process on the second label depiction to determine the type of products in first image 4300 displayed in proximity to the specific label 4330c. For example, the processor may perform an OCR process on second label 4360 to recognize some text. The processor may compare the recognized text against the text in a product inventory or catalog associated with the retail store and stored in a database (e.g., database 4202), and may identify a product ID or product description that matches the recognized text.

In some embodiments, step 4408 may include processing a visual code shown in the second label depiction to determine the type of products displayed in first image 4300 in proximity to the specific label 4330c. For example, the processor may identify a visual code 4366 (such as a Barcode or a QR-code) shown in second label 4360, and retrieve information associated with the visual code (such as the Barcode or the QR-code) from a local database or from an external database (e.g., database 4202) via network 4205. The information associated with the visual code (such as the Barcode or the QR-code) may include a product type, a product ID, a product price, and/or a product description (e.g., size, volume, color, brand name, manufacturer, and so forth).

In some examples, step 4408 may include determining the type of product displayed in an area in a first image based, at least in part, on data collected from multiple retail stores. For example, the processor may analyze an image captured in another retail store that is different from the retail store being monitored. The processor may identify, in the image of the other retail store, a label that is similar as label 4360 depicted in second image 4350. The processor may then identify, in the image of the other retail store, a type of products arranged in proximity to the similar label. The processor may determine that the identified product type is the same as the products in area 4340 in proximity to label 4330c, which is related to label 4360 depicted in second image 4350.

In some examples, the type of product displayed in an area in a first image (e.g., area 4340 in first image 4300) may be determined based, at least in part, on a representation of a plurality of products determined from a label or a label embedded in a plastic cover that may be used for displaying prices.

At step 4410, method 4400 may include initiating an action based on the determined type of products displayed in proximity to the specific label.

In some embodiments, step 4410 may include determine planogram compliance based on the type of products and data derived from at least one first image captured at the first image resolution. A planogram may be associated with contractual obligations and/or other preferences related to the retailer methodology for placement of a type of products on the store shelves. For example, the planogram may describe a desired placement of a plurality of types of products on the store shelves. The data derived from at least one first image captured at the first image resolution may include an actual placement of a plurality of products relative to a plurality of labels. The processor may retrieve at least one planogram regarding one or more types of products from a store database or an external database (database 4202) via network 4205, based on the type of products determined based on the label depicted in the second image 4350. The processor may also analyze first image 4300 to determine an actual placement of the plurality of products relative to a plurality of labels. The processor may then detect differences between the at least one planogram and the actual placement of the plurality of products relative to plurality of labels. The processor may determine a planogram incompliance event based, at least in part, on detected differences. Step 4410 may also include, in response to determining the planogram incompliance event, generating and issuing a user-notification about the planogram incompliance event. The user-notification may include information about a correct display location of a misplaced product, information about a store shelf associated with the misplaced product, information about a type of the misplaced product, and/or a visual depiction of the misplaced product.

In some embodiments, the planogram stored in the store datable or the external database may include a detail (e.g., product name, brand name, price, sale, etc.) of a type of products. Thus, step 4410 may include using information derived from the second label depiction to determine a displayed detail associated with the type of products displayed in first image 4300 in proximity to the specific label 4330c. For example, the processor may determine a product price displayed on a label next to the products based on data derived from second image 4350, and compare the label price with the price described by the planogram retrieved from the store database. The processor may determine a planogram incompliance event based, at least in part, on one or more inconsistencies between the detail displayed on the label and the detail included in the planogram. Step 4410 may also include initiating the action based on the planogram incompliance event. For example, the processor may correct the product detail in the store database or correct the label. The processor may also determine that the correlation of the first label depiction of a specific label included in the first image to the second label depiction of the same specific label included in a second image was incorrect, and/or reduce a certainty level associated with the correlation.

In some embodiments, the action initiated at step 4410 may include updating a machine learning model for product recognition. For example, when the processor determines that the correlation of the first label depiction of a specific label included in the first image to the second label depiction of the same specific label included in a second image was incorrect, the processor may update a machine learning model for recognizing products in first image 4300 based on the information derived from the label in second image 4350. Alternatively, the processor may update a machine learning model for recognizing text in the label in second image 4350 based on the product identified in first image 4300.

In some embodiments, step 4410 may include generating a representation of the shelving unit that includes at least one continuous area from the at least one first image and a plurality of discontinuous areas from the set of second images. For example, the continuous area may be the entire area shown in first image 4300 in FIG. 43A, and the plurality of discontinuous areas may include a plurality of labels shown in different second images, including second image 4350 in FIG. 43B.

In some embodiments, step 4410 may further include using information derived from first image 4300 to identify a group of products associated with a type of products identified in the specific label 4330c, and initiating an action when a location of the group of products relative to the specific label 4330c deviates from store policies. For example, when the specific label 4330c should be below the products associated with the specific label 4330c, but it is determined based on the information derived from first image 4300 that the specific label 4330c is above the products, the processor may generate and issue an instruction for a store employee to move the specific label 4330c or the products.

In some embodiments, method 4400 may further include receiving a plurality of first images 4300 captured by at least one image sensor fixedly mounted on a shelving unit opposing shelving unit 4310 associated with the specific label 4330c, analyzing the plurality of first images 4300 to identify a time when a new label is presented on shelving unit 4310, and generating an instruction for a human store employee to capture a second image 4350 of the new label. Additionally or alternatively, method 4400 may include issuing a crowd sourcing task for a store employee or a dedicated sensor to capture a second image 4350 of the new label. The instruction for the store employee to capture the second image 4350 of the new label includes information may include a location of the new label. Alternatively, the instruction for the store employee to capture the second image of the new label may include at least a portion of the first image that includes the new label. The store employee instructed to capture the second image of the new label may be a robot employee or a human employee.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for identifying perishable products in a retail store based on analysis of image data and for automatically generating offers relating to the identified products, the system comprising:
   an image capture device mounted to a first shelving unit in a retail store;
   at least one processor configured to:
   receive an image from the image capture device depicting a plurality of perishable products of at least one product type displayed on a second shelving unit in the retail store, wherein the received image comprises inventory information taken from a first time interval;
   with a data analysis software module, analyze the image to determine information about a displayed inventory of the plurality of perishable products;
   access a database storing information about the at least one product type, wherein the accessed information comprises inventory information taken from a second time interval;
   use the information about the displayed inventory and the stored information about the at least one product type to determine at least one offer associated with the at least one product type, wherein the determined offer is at least in part based on a comparison between the inventory information from the first and second time intervals; and
   via at least one mobile device in communication with the processor, provide the at least one offer to at least one customer of the retail store.

2. The system of claim 1, wherein the information about the displayed inventory includes quality indicators for the plurality of perishable products, and wherein the at least one processor is configured to:
   determine the quality indicators for the plurality of perishable products based on an analysis of the image; and
   use the determined quality indicators for the plurality of perishable products to determine the at least one offer associated with the at least one product type.

3. The system of claim 2, wherein the at least one processor is configured to use the determined quality indicators to determine a shelf-life estimation of the plurality of perishable products, and to determine the at least one offer associated with the at least one product type based on shelf-life estimation of the plurality of perishable products.

4. The system of claim 1, wherein the at least one processor is configured to identify a specific customer that will likely to be interested in discounted products from the at least one product type.

5. A computer program product for identifying perishable products in a retail store based on analysis of image data and for automatically generating offers relating to the identified products embodied in a non-transitory computer-readable medium and executable by at least one processor, the computer program product including instructions for causing the at least one processor to execute a method comprising:
   from an image capture device mounted to a first shelving unit in a retail store, receiving an image depicting a plurality of perishable products of at least one product type displayed on a second shelving unit in the retail store, wherein the received image comprises inventory information taken from a first time interval,
   with a data analysis software module, analyzing the image to determine information about a displayed inventory of the plurality of perishable products;
   accessing a database storing information about the at least one product type, wherein the accessed information comprises inventory information taken from a second time interval;
   using the information about the displayed inventory and the stored information about the at least one product type to determine at least one offer associated with the at least one product type, wherein the determined offer is at least in part based on a comparison between the inventory information from the first and second time intervals; and
   via at least one mobile device in communication with the processor, providing the at least one offer to at least one customer of the retail store.

6. The computer program product of claim 5, wherein the stored information includes information about additional perishable products from the at least one product type available in a storage area of the retail store, and the method further includes:
   using the information about the displayed inventory and the information about the additional perishable products available in the storage area to determine the at least one offer associated with the at least one product type.

7. The computer program product of claim 5, wherein the stored information includes information about additional perishable products from the at least one product type scheduled to be delivered to the retail store, and the method further includes:
   using the information about the displayed inventory and the information about the additional perishable products scheduled to be delivered to the retail store to determine the at least one offer associated with the at least one product type.

8. The computer program product of claim 5, wherein the stored information includes costs associated with the at least one product type, and the method further includes:
  using the information about the displayed inventory and the costs associated with the at least one product type to determine the at least one offer associated with the at least one product type.

9. The computer program product of claim 5, wherein the stored information includes a current price for the at least one product type, and the method further includes:
  using the information about the displayed inventory and the current price for the at least one product to determine the at least one offer associated with the at least one product type.

10. The computer program product of claim 5, wherein the stored information includes details of at least one previous sale of products from the at least one product type, and the method further includes:
  using the information about the displayed inventory and the details of the at least one previous sale to determine the at least one offer associated with the at least one product type.

11. The computer program product of claim 10, wherein the details of at least one previous sale includes demographic characteristic of customers that bought the at least one product type, and wherein the method further includes:
  providing the at least one offer to at least one customer of the retail store based on a predetermined demographic characteristic associated with the at least one customer.

12. The computer program product of claim 5, wherein the method further includes:
  receiving one or more additional images depicting the at second shelving unit in the retail store after the at least one offer was provided to at least one customer;
  analyzing the one or more additional images to determine current inventory of products from the at least one product type;
  when the current inventory of products from the at least one product type is less than a threshold, via the at least one mobile device in communication with the processor, informing the at least one customer that the offer is expired.

13. The computer program product of claim 5, wherein the method further includes:
  receiving one or more additional images depicting the second shelving unit in the retail store after the at least one offer was provided to the at least one customer;
  analyzing the one or more additional images to determine a current inventory of products of the at least one product type;
  using the current inventory of products of the at least one product type and the stored information to determine at least one updated offer associated with the at least one product type; and
  via the at least one mobile device in communication with the processor, providing the at least one updated offer to at least one customer.

14. The computer program product of claim 5, wherein the method further includes:
  obtaining information indicative of products from multiple product types that a customer is likely to buy;
  using the information about the displayed inventory, the stored information about the at least one product type, and the information indicative of products that the customer is likely to buy to determine a personalized offer for the customer; and
  via a mobile device of the at least one mobile device in communication with the processor, providing the personalized offer for the customer.

15. The computer program product of claim 14, wherein the method further includes:
  determining the information indicative of products from multiple product types that the customer is likely to buy based on cashier data.

16. The computer program product of claim 14, wherein the method further includes:
  determining the information indicative of products from multiple product types that the customer is likely to buy based on image analysis of products found in the customer's cart.

17. The computer program product of claim 5, the at least one mobile device is a mobile communication device associated with the customer used to display information related to the offer.

18. The computer program product of claim 5, wherein the at least one mobile device is an augmented reality system associated with the customer used to display information related to the offer.

19. The computer program product of claim 5, wherein the at least one mobile device is a display attached to a cart associated with the customer used to display information related to the offer.

20. A method for identifying perishable products in a retail store based on analysis of image data and for automatically generating offers relating to the identified products, the method comprising, with a processor operably connected to a memory:
  from an image capture device mounted to a first shelving unit in a retail store, receiving an image depicting a plurality of perishable products of at least one product type displayed on a second shelving unit in the retail store, wherein the received image comprises inventory information taken from a first time interval;
  with a data analysis software module, analyzing the image to determine information about a displayed inventory of the plurality of perishable products;
  accessing a database storing information about the at least one product type, wherein the accessed information comprises inventory information taken from a second time interval;
  using the information about the displayed inventory and the stored information about the at least one product type to determine at least one offer associated with the at least one product type, wherein the determined offer is at least in part based on a comparison between the inventory information from the first and second time intervals; and
  via at least one mobile device, providing the at least one offer to at least one customer of the retail store.

* * * * *